(12) United States Patent
Ashrafi

(10) Patent No.: US 11,489,573 B2
(45) Date of Patent: *Nov. 1, 2022

(54) HYBRID DIGITAL-ANALOG MMWAVE REPEATER/RELAY WITH FULL DUPLEX

(71) Applicant: NxGen Partners IP, LLC, Dallas, TX (US)

(72) Inventor: Solyman Ashrafi, Plano, TX (US)

(73) Assignee: NXGEN PARTNERS IP, LLC, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/487,298

(22) Filed: Sep. 28, 2021

(65) Prior Publication Data
US 2022/0014248 A1 Jan. 13, 2022

Related U.S. Application Data

(63) Continuation of application No. 17/080,384, filed on Oct. 26, 2020, now Pat. No. 11,152,991.

(60) Provisional application No. 62/965,019, filed on Jan. 23, 2020.

(51) Int. Cl.
*H04B 7/06* (2006.01)
*H01Q 21/06* (2006.01)

(52) U.S. Cl.
CPC ......... *H04B 7/0617* (2013.01); *H01Q 21/065* (2013.01)

(58) Field of Classification Search
CPC ............................ H04B 7/0617; H01Q 21/065
USPC ....................................................... 375/267
See application file for complete search history.

(56) References Cited

U.S. PATENT DOCUMENTS

| | | | |
|---|---|---|---|
| 3,459,466 | A | 8/1969 | Giordmaine |
| 3,614,722 | A | 10/1971 | Jones |
| 4,379,409 | A | 4/1983 | Primbsch et al. |
| 4,503,336 | A | 3/1985 | Hutchin et al. |

(Continued)

OTHER PUBLICATIONS

Vasnetsov, M. V., Pasko, V.A. & Soskin, M.S.; Analysis of orbital angular momentum of a misaligned optical beam; New Journal of Physics 7, 46 (2005).

(Continued)

*Primary Examiner* — Fitwi Y Hailegiorgis
(74) *Attorney, Agent, or Firm* — Gregory M. Howison

(57) ABSTRACT

A repeater for transmitting millimeter wave signals. A transceiver communicates with a plurality of remote locations over millimeter wave communications links. The of transceiver comprises a patch antenna array including a plurality of patch antennas. The plurality of patch antennas include a transmitter array portion in a first orientation for transmitting signals and a receiver array portion in a second orientation for receiving signals. The receiver array portion is vertically separated from the transmitter array portion by a predetermined distance. The first and second orientations and the predetermined distance vertically separating the transmitter array portion from the receiver array portion limit interference between the transmitted signals and the received signals. Transceiver circuitry transmits the millimeter wave signals with at least a first millimeter wave transceiver at first one of the plurality of remote locations and a second millimeter wave transceiver at a second one of the plurality of remote locations.

20 Claims, 87 Drawing Sheets

(56) References Cited

U.S. PATENT DOCUMENTS

| | | | |
|---|---|---|---|
| 4,736,463 A | 4/1988 | Chavez |
| 4,792,814 A | 12/1988 | Ebisui |
| 4,862,115 A | 8/1989 | Lee et al. |
| 5,051,754 A | 9/1991 | Newberg |
| 5,220,163 A | 6/1993 | Toughlian et al. |
| 5,222,071 A | 6/1993 | Pezeshki et al. |
| 5,272,484 A | 12/1993 | Labaar |
| 5,543,805 A | 8/1996 | Thaniyavarn |
| 5,555,530 A | 9/1996 | Meehan |
| 6,337,659 B1 | 1/2002 | Kim |
| 6,992,829 B1 | 1/2006 | Jennings et al. |
| 7,577,165 B1 | 8/2009 | Barrett |
| 7,729,572 B1 | 6/2010 | Pepper et al. |
| 7,792,431 B2 | 9/2010 | Jennings et al. |
| 8,184,972 B2 | 5/2012 | Parker et al. |
| 8,432,884 B1 | 4/2013 | Ashrafi |
| 8,503,546 B1 | 8/2013 | Ashrafi |
| 8,559,823 B2 | 10/2013 | Izadpanah et al. |
| 8,811,366 B2 | 8/2014 | Ashrafi |
| 8,994,593 B2 | 3/2015 | Fakharzadeh et al. |
| 9,077,577 B1 | 7/2015 | Ashraf et al. |
| 9,267,877 B2 | 2/2016 | Ashraf et al. |
| 9,294,259 B2 | 3/2016 | Jalloul et al. |
| 9,312,919 B1* | 4/2016 | Barzegar ............... H04B 15/02 |
| 9,331,875 B2 | 5/2016 | Ashraf et al. |
| 9,575,001 B2 | 2/2017 | Ashraf et al. |
| 9,662,019 B2 | 5/2017 | Ashraf et al. |
| 9,705,949 B2 | 7/2017 | Cui et al. |
| 9,900,196 B2 | 2/2018 | Mehrabani et al. |
| 9,998,187 B2 | 6/2018 | Ashraf et al. |
| 10,015,681 B2 | 7/2018 | Agarwal et al. |
| 10,153,845 B2 | 12/2018 | Ashraf |
| 10,187,156 B2 | 1/2019 | Ashraf |
| 10,205,655 B2 | 2/2019 | Barzegar et al. |
| 11,152,991 B2* | 10/2021 | Ashrafi ............... H01Q 21/065 |
| 2004/0184398 A1 | 9/2004 | Walton et al. |
| 2004/0203528 A1 | 10/2004 | Ammar et al. |
| 2005/0094714 A1 | 5/2005 | Robinson |
| 2005/0141716 A1 | 6/2005 | Kumar et al. |
| 2005/0254826 A1 | 11/2005 | Jennings et al. |
| 2005/0259914 A1 | 11/2005 | Padgett et al. |
| 2008/0256009 A1 | 10/2008 | Jiang et al. |
| 2009/0028579 A1 | 1/2009 | Deng |
| 2009/0272424 A1 | 11/2009 | Ortabasi |
| 2009/0279490 A1 | 11/2009 | Alcorn |
| 2010/0013696 A1 | 1/2010 | Schmitt et al. |
| 2010/0227547 A1 | 9/2010 | DiPiazza |
| 2011/0158150 A1 | 6/2011 | Kawamura et al. |
| 2011/0176581 A1 | 7/2011 | Thomas et al. |
| 2011/0243553 A1 | 10/2011 | Russell |
| 2011/0285589 A1 | 11/2011 | Bull |
| 2011/0287716 A1 | 11/2011 | Lortz |
| 2012/0020423 A1 | 1/2012 | Reuven et al. |
| 2012/0044917 A1 | 2/2012 | O'Keeffe |
| 2012/0071091 A1 | 3/2012 | Vancot et al. |
| 2012/0121220 A1 | 5/2012 | Krummrich |
| 2012/0207470 A1 | 8/2012 | Djordjevic et al. |
| 2012/0284492 A1 | 11/2012 | Zievers |
| 2012/0303835 A1 | 11/2012 | Kempf et al. |
| 2013/0027774 A1 | 1/2013 | Bovine et al. |
| 2013/0028073 A1 | 1/2013 | Tatipamula et al. |
| 2013/0071120 A1 | 3/2013 | Marlcevic et al. |
| 2013/0089204 A1 | 4/2013 | Kumar et al. |
| 2013/0148963 A1 | 6/2013 | Cvijetic et al. |
| 2013/0165177 A1 | 6/2013 | Berg et al. |
| 2013/0207841 A1 | 8/2013 | Negus et al. |
| 2013/0235744 A1 | 9/2013 | Chen et al. |
| 2013/0235885 A1 | 9/2013 | Chen et al. |
| 2013/0332359 A1 | 12/2013 | Qteishat |
| 2014/0016786 A1 | 1/2014 | Sen |
| 2014/0064335 A1 | 3/2014 | Breun et al. |
| 2014/0098815 A1 | 4/2014 | Mishra et al. |
| 2014/0140189 A1 | 5/2014 | Shattil |
| 2014/0254373 A1 | 9/2014 | Varma |
| 2014/0321282 A1 | 10/2014 | Pragada et al. |
| 2014/0339913 A1 | 11/2014 | Tsuji et al. |
| 2014/0355624 A1 | 12/2014 | Li et al. |
| 2015/0055623 A1 | 2/2015 | Li et al. |
| 2015/0071248 A1 | 3/2015 | Faerber et al. |
| 2015/0098697 A1 | 4/2015 | Marom et al. |
| 2015/0117435 A1 | 4/2015 | Baldemair et al. |
| 2015/0181502 A1 | 6/2015 | Hans et al. |
| 2015/0207724 A1 | 7/2015 | Choudhury et al. |
| 2015/0245139 A1 | 8/2015 | Park |
| 2015/0333865 A1 | 11/2015 | Yu et al. |
| 2015/0043910 A1 | 12/2015 | Koebele et al. |
| 2015/0349910 A1 | 12/2015 | Huang et al. |
| 2015/0350077 A1 | 12/2015 | Durrani et al. |
| 2016/0029403 A1 | 1/2016 | Roy et al. |
| 2016/0041523 A1 | 2/2016 | Ashrafi et al. |
| 2016/0127073 A1 | 5/2016 | Ashraf et al. |
| 2016/0134356 A1 | 5/2016 | Rappaport et al. |
| 2016/0156513 A1 | 6/2016 | Zhang et al. |
| 2016/0204896 A1 | 7/2016 | Yu et al. |
| 2016/0241314 A1 | 8/2016 | Ferrante et al. |
| 2016/0262068 A1 | 9/2016 | Won et al. |
| 2016/0285750 A1 | 9/2016 | Saquib et al. |
| 2016/0294441 A1 | 10/2016 | Fazlollahi et al. |
| 2016/0302096 A1 | 10/2016 | Chari et al. |
| 2016/0337937 A1 | 11/2016 | McCann et al. |
| 2016/0380678 A1 | 12/2016 | Mcmanus et al. |
| 2017/0019811 A1 | 1/2017 | Parulkar |
| 2017/0048290 A1 | 2/2017 | Cui et al. |
| 2017/0054595 A1 | 2/2017 | Zhang et al. |
| 2017/0077979 A1 | 3/2017 | Papa et al. |
| 2017/0079059 A1 | 3/2017 | Li et al. |
| 2017/0093228 A1 | 3/2017 | Fisher et al. |
| 2017/0111482 A1 | 4/2017 | Mishra et al. |
| 2017/0142226 A1 | 5/2017 | Foy et al. |
| 2017/0147722 A1 | 5/2017 | Greenwood |
| 2017/0229782 A1 | 8/2017 | Adriazola et al. |
| 2017/0245316 A1 | 8/2017 | Salkintzis |
| 2017/0290049 A1 | 10/2017 | Reisslein et al. |
| 2017/0331577 A1 | 11/2017 | Parkvall et al. |
| 2017/0332359 A1 | 11/2017 | Tsai et al. |
| 2018/0026722 A1 | 1/2018 | Ashraf et al. |
| 2018/0041934 A1 | 2/2018 | Agarwal et al. |
| 2018/0049064 A1 | 2/2018 | Li et al. |
| 2018/0062773 A1 | 3/2018 | Kusunoki et al. |
| 2018/0063674 A1 | 3/2018 | Hershey et al. |
| 2018/0227144 A1 | 8/2018 | Khan |
| 2018/0249346 A1 | 8/2018 | Plestid et al. |
| 2018/0302807 A1 | 10/2018 | Chen et al. |
| 2018/0324605 A1 | 11/2018 | Agarwal et al. |
| 2018/0352498 A1 | 12/2018 | Reisslein et al. |
| 2019/0075512 A1 | 3/2019 | Jin et al. |
| 2019/0158653 A1 | 5/2019 | Sonntag |
| 2019/0173582 A1* | 6/2019 | Ashrafi ............... H01Q 25/005 |
| 2020/0336168 A1* | 10/2020 | Hormis ............... H03L 7/22 |

OTHER PUBLICATIONS

Vladimir Golovko, Yury Savitsky, and Nikolaj Maniakov, "Chapter 6 Neural Networks for Signal Processing in Measurement Analysis and Industrial Applications", 2003, NATO Science Series Sub Series III Computer and Systems Sciences 185, pp. 119-144. (Year: 2003).

Vutha Va and Robert W. Heath Jr.; "Basic Relationship between Channel Coherence Time and Beamwidth in Vehicular Channels"; Wireless Networking and Communications Group, The University of Texas at Austin; 978-1-4799-8091-8-15; 2015 IEEE; 5 pgs.

Vutha Va et al.; "Beam Design for Beam Switching Based Milimeter Wave Vehicle-to-Infrastructure Communications" Wireless Networking and Communications Group; The University of Texas at Austin; Austin, TX; Toyota InfoTechnology Center, U.S.A., Inc.; Mountain View, CA; IEE ICC 2016—Wireless Communications Symposium; 6 pgs.

Vutha Va et al.; "The Impact of Beamwidth on Temporal Channel Variation in Vehicular Channels and Its Implications" IEEE Transactions on Vehicular Technology, vol. 66, No. 6, Jun. 2017; 16 pgs.

Vutha Va et al; "Beam Switching for Millimeter Wave Communication to Support High Speed Trains" Wireless Networking and

(56) References Cited

OTHER PUBLICATIONS

Communications Group, The University of Texas at Austin; Austin, TX; Qualcomm Inc.; San Diego, CA; 978-1-4799-8091-8/15; 2015 IEEE; 5 pgs.
Wang et al: "Terabit free-space data transmission employing orbital angular momentum multiplexing", Nature Photonics, vol. 6, Jul. 2012, pp. 488-496.
Wang, Jian, et al.; Terabit free-space data transmission employing orbital angular momentum multiplexing. Nature Photonics; 6, 488-496 (2012).
Weiser, Mark; "The Computer for the 21st Century"; Scientific American Ubicomp Paper after Sci Am editing; Sci Amer Weiser; Sep. 1991; 8 pgs.
WirelessHD Product Listing; Website: http://www.wirelesshd.org/consumers/product-listing/; Accessed Oct. 4, 2017; 4 pgs.
WLANParts; "Mikrotic RBDYNADISHG-5HAC DynaDish 5 802. 11ac outdoor 25dBi antenna"; on the Internet at http://www.wlanparts.com/mikrotik/mikrotik-rbdynadishg-5hac-dynadish-5-802-11ac-outdoor-25dbi-antenna/; retrieved on Sep. 22, 2017; 2 pgs.
Wonbin Hong et al.; Study and Prototyping of Practically Large-Scale mmWave Antenna Systems for 5G Cellular Devices; Millimeter-Wave Communications for 5G; IEEE Communications Magazine; Sep. 2014; 0163-6804/14; 7 pgs.
Wonil Roh et al.; "Millimeter-Wave Beamforming as an Enabling Technology for 5G Cellular Communications Theoretical Feasibility and Prototype Results" Samsung Electronics Co., Ltd.; Samsung Research America; IEEE Communications Magazine; Feb. 2014; 8 pgs.
Xia et al.; "Robust Analog Precoding Designs for Millimeter Wave MIMO Transceivers" Key Lab of Embedded System and Service Computing, Tongji University, Shanghai China; The University of Texas at Austin, Austin, Texas; University of Vigo; Vigo, Spain; ISBN 978-3-8007-4177-9; WSA 2016; Mar. 9-11, 2016, Munich, Germany; 8 pgs.
Xingqin Lin and Jeffrey G. Andrews; "Connectivity of Millimeter Wave Networks With Multi-Hop Relaying" IEEE Wireless Communications Letter, vol. 4, No. 2, Apr. 2015; 4 pgs.
Y. Li, M. Chen; Software-Defined Network Function Virtualization: A Survey; IEEE 2015, pp. 2169-3536.
Yongxiong Ren et al, Experimental Investigation of Data Transmission Over a Graded-index Multimode Fiber Using the Basis of Orbital Angular Momentum Modes (pending publication).
Yongxiong Ren et al.; Experimental Investigation of Data Transmission Over a Graded-index Multimode Fiber Using the Basis of Orbital Angular Momentum Modes; Dec. 2016; 2 pgs.
Yoshihisa Kishiyama et al; "Future Steps of LTE-A: Evolution Toward Integration of Local Area and Wide Area Systems"; Multicell Cooperation; NTT Docomo, Inc.; Docomo Innovations, Inc.: 1536-1284/13; 2013 IEEE; IEEE Wireless Communications; Feb. 2013; 7 pgs.
Zhouyue Pi and Farooq Khan, Samsung Electronics "An Introduction to Millimeter-Wave Mobile Broadband Systems"; Topics in Radio Communications; IEEE Communications Magazine; Jun. 2011; 7 pgs.
Zhouyue Pi et al.; "Millimeter-Wave Gigabit Broadband Evolution toward 5H: Fixed Access and Backhaul" IEEE Communication Magazine; 0163-6804/16; Apr. 2016; 7 pgs.
M. Nouri et al., Perturbations of Laguerre-Gaussian Beams by Chiral Molecules (pending publication).
Mahmouli, F.E. & Walker, D. 4-Gbps Uncompressed Video Transmission over a 60-GHz Orbital Angular Momentum Wireless Channel. IEEE Wireless Communications Letters, vol. 2, No. 2, 223-226 (Apr. 2013).
Molina-Terriza, G., et al.; Management of the Angular Momentum of Light: Preparation of Photons in Multidimensional Vector States of Angular Momentum; Physical Review Letters; vol. 88, No. 1; 77, 013601/1-4(2002).
Myerburg RJ (2005) Cardiac Arrest and Sudden Cardiac Death in Heart Disease: A Textbook of Cardiovascular Medicine, 7th edition. Philadelphia: WB Saunders.

N. Handigol, S. Seetharaman, M. Flajslik, N. McKeown, and R. Johari; Plug-n-serve: Load-balancing Web traffic using OpenFlow; Proc. ACM SIGCOMM Demo, Aug. 2009, pp. 1-2.
N. McKeown et al.; OpenFlow: Enabling innovation in campus net-works; ACM SIGCOMM Comput. Commun. Rev., vol. 38, No. 2, pp. 69-74, 2008.
M. Packard et al., "Geometry From a Time Series," Phys. Rev. Lett., 45, 1980.
N.L.M. van Adrichem, B.J. Van Asten, and F.A. Kuipers; Fast recovery in software-defined networks; Software Defined Networks (EWSDN), 2014 Third European Workshop; pp. 61-66; Sep. 2014.
Nichol G, Thomas E, Callaway CW, Hedges J, Powell JL, et al... (2008) Regional variation in out-of-hospital cardiac arrest incidence and outcome. JAMA. 300, 1423-1431.
Open Networking Foundation; Openflow switch specification; Version 1.1.0 implemented (wire protocol 0×02); Dec. 31, 2009.
P. Sun, M. Yu, M. J. Freedman, J. Rexford, and D. Walker; Hone: Joint host-network traffic management in software-defined networks; Journal of Network and Systems Management, vol. 23, No. 2; Apr. 2014.
P. Dely, A. Kassler, and N. Bayer; Openflow for wireless mesh networks; Computer Communications and Networks (ICCCN), 2011; Proceedings of 20th International Conference; Jul. 2011.
P. Quinn and T. Nadeau; Service Function Chaining Problem Statement; document draft-quinn-sfc-problem-statement-02, Apr. 2015.
Padgett, Miles J. et al., Divergence of an orbital-angular-momentum-carrying beam upon propagation. New Journal of Physics 17, 023011 (2015).
PCT: International Preliminary Report on Patentability for PCT/US16/43475 (related application); dated Feb. 1, 2018; 11 pgs.
PCT: International Preliminary Report on Patentability of PCT/US2015/55349 (related application), Yukari Nakamura; dated Apr. 18, 2017; 10 pages.
PCT: International Search Report and Written Opinion of PCT/US16/43475 (related application), dated Sep. 30, 2016; 12 pgs.
PCT: International Search Report and Written Opinion of PCT/US2015/55349 (related application), dated Feb. 2, 2016, 31 pgs.
Piotr Antonik, Michiel Hermans, Marc Haelterman, and Serge Massar, "Photonic Reservoir Computer With Output Feedback forChaotic Time Series Prediction", Jul. 3, 2017, IEEE, pp. 2407-2413. (Year: 2017).
R. Bifulco, R. Canonico, M. Brunner, P. Hasselmeyer, and F. Mir; A practical experience in designing an OpenFlow controller; Proc. IEEE. Eur. Workshop Softw. Defined Netw. (EWSDN), Oct. 2012, pp. 61-66.
R. Mortier et al.; Control and understanding: Owning your home net-work; Proc. IEEE 4th Int. Conf. Commun. Syst. Netw. (COMSNETS), Jan. 2012, pp. 1-10.
Rapport, T.S.; Millimeter Wave Mobile Communications for 5G Cellular: It Will Work!; IEEE Access, 1, 335-349 (2013).
Ren, Y. et al.; Experimental Demonstration of 16 Gbit/s millimeter-wave Communications using MIMO Processing of 2 OAM Modes on Each of Two Transmitter/Receiver Antenna Apertures. In Proc. IEEE Global TElecom. Conf. 3821-3826 (2014).
Ricardo de A. Araujo, Adriano L. I. de Oliveira, and Sergio C. B. Soares, "A Quantum-Inspired Hybrid Methodology for FinancialTime Series Prediction", 2010 IEEE, pp. 1-8. (Year: 2010).
S. Ashrafi and L. Roszman, "Evidence of Chaotic Pattern in Solar Flux Through a Reproducible Sequence of Period-Doubling-Type Bifurcations," Proceedings of Flight Mechanics/Estimation Theory Symposium, National Aeronautics and Space Administration, Goddard Space Flight Center, Greenbelt, Maryland, May 1991.
S. Ashrafi and L. Roszman, "Lyapunov Exponent of Solar Flux Time Series," Proceedings of First Experimental Chaos Conference, Jun. 1991.
S. Ashrafi and L. Roszman, "Nonlinear Techniques for Forecasting Solar Activity Directly From its Time Series," Proceedings of Flight Mechanics/Estimation Theory Symposium, National Aeronautics and Space Administration, Goddard Space Flight Center, Greenbelt, Maryland May 21-23, 1992.

(56) References Cited

OTHER PUBLICATIONS

S. Ashrafi and L. Roszman, Detecting and Disentangling Nonlinear Structure from Solar Flux Time Series, 43rd Congress of the International Astronautical Federation, Aug. 1992.

S. Ashrafi and L. Roszman, Solar Flux Forecasting Using Mutual Information with Optimal Delay, AAS 93-311, Spaceflight Dynamics 1993, American Astronautical Society Publication, Advances in the Astronautical Sciences, vol. 84 Part II pp. 901-913.

S. Ashrafi, Combining Schatten's Solar Activity Prediction Model With a Chaotic Prediction Model, National Aeronautics and Space Administration, Goddard Space Flight Center, Greenbelt, Maryland, 554-FDD-911125, Nov. 1991.

S. Ashrafi, et al, "Detecting and Disentangling Nonlinear Structure from Solar Flux Time Series," Conference Paper (National Aeronautics and Space Administration, 1993).

S. Ashrafi, et al, "Nonlinear Techniques for Forecasting Solar Activity Directly From its Time Series," Technical Report (National Aeronautics and Space Administration, 1992).

S. Ashrafi, et al, "PCS System Design Issues in the Presence of Microwave OFS," Electromagnetic Wave Interaction Series on Stability, Vibration and Control of Systems: vol. 12 (1996).

S. Ashrafi, et al, "Solar Flux Forecasting Using Mutual Information with an Optimal Delay," Conference Paper (National Aeronautics and Space Administration, 1993).

S. Ashrafi, et al, "Combining Schatten's Solar Activity Prediction Model with a Chaotic Prediction Model," Technical Report (National Aeronautics and Space Administration, 1991).

S. Ashrafi, et al, "Demonstration of Distance Emulation for an Orbital-Angular-Momentum Beam," OSA Technical Digest (Optical Society of America, 2015).

S. Ashrafi, et al, "Experimental Demonstration of a 400-Gbit/s Free Space Optical Link Using Multiple Orbital-Angular-Momentum Beams with Higher Order Radial Indices," OSA Technical Digest (Optical Society of America, 2015).=.

S. Ashrafi, et al, "Experimental Demonstration of Two-Mode 16-Gbit/s Free-Space mm-Wave Communications Link Using Thin Metamaterial Plates to Generate Orbital Angular Momentum Beams," (The Institute of Electrical and Electronics Engineers, 2015).

S. Ashrafi, et al, "Free-Space Optical Communications Using Orbital-Angular-Momentum Multiplexing Combined with MIMO-Based Spatial Multiplexing," OSA Technical Digest (Optical Society of America, 2015).

S. Ashrafi, et al, "Future Mission Studies: Forecasting Solar Flux Directly from its Chaotic Time Series," Technical Report (National Aeronautics and Space Administration, 1991).

S. Ashrafi, et al, "Future Mission Studies: Preliminary Comparisons of Solar Flux Models," Technical Report (National Aeronautics and Space Administration, 1991).

S. Ashrafi, et al, "Performance Enhancement of an Orbital-Angular-Momentum-Based Free-Space Optical Communication Link Through Beam Divergence Controlling," OSA Technical Digest (Optical Society of America, 2015).

S. Ashrafi, et al. "400-Gbit/s Free Space Optical Communications Link Over 120-meter Using Multiplexing of 4 Collocated Orbital-Angular-Momentum Beams," OSA Technical Digest (Optical Society of America, 2015).

S. Ashrafi, et al. "Channeling Radiation of Electrons in Crystal Lattices," Essays on Classical and Quantum Dynamics, Chap. 12 (1991).

S. Ashrafi, et al. "Enhanced Spectral Efficiency of 2.36 bits/s/Hz using Multiple Layer Overlay Modulation for QPSK over a 14-km Single Mode Fiber Link," OSA Technical Digest (Optical Society of America, 2015).

S. Ashrafi, et al. "Optical communications using orbital angular momentum beams," Advances in Optics and Photonics vol. 7 (Optical Society of America, 2015).

S. Ashrafi, et al. "Performance Metrics and Design Considerations for a Free-Space Optical Orbital-Angular-Momentum-Multiplexed Communication Link," Optics Letters vol. 40 (Optical Society of America, 2015).

S. Ashrafi, et al. "Splitting and Contrary Motion of Coherent Bremsstrahlung Peaks in Strained-Layer Superlattices," (Optical Society of America, 1991).

S. Ashrafi, et al. "Splitting of Channeling-Radiation Peaks in Strained-Layer Superlattices," Journal vol. 8 (Optical Society of America, 1991).

Yan, Y. et al.; High-capacity millimetre-wave communications with orbital angular momentum multiplexing; Nature Communications; 5, 4876 (2014).

"Taking an ECG with the ECG App on Apple Watch Series 4 or Later." Apple Support, Mar. 24, 2020, support.apple.com/en-us/HT208955.

A. Berl, H. de Meer, H. Hlavacs, and T. Treutner; Virtualization in energy-efficient future home environments; IEEE Commun. Mag., vol. 47, No. 12, pp. 62-67; Dec. 11, 2009.

A. Gember et al.; Stratos: A network-aware orchestration layer for virtual middleboxes in clouds; [Online]. Available: http://arxiv.org/abs/1305.0209; May 1, 2013.

A. Patro and S. Banerjee; Outsourcing coordination and management of home wireless access points through an open api; Computer Communications (Infocom); 2015 IEEE Conference on. IEEE; May 1, 2015.

A. Dixit, F. Hao, S. Mukherjee, T. V. Lakshman, and R. Kompella; Towards an elastic distributed SDN controller; Proc. 2nd ACM SIGCOMM Workshop Hot Topics Softw. Defined Netw.; pp. 7-12; Aug. 16, 2013.

A. Doria et al.; Forwarding and Control Element Separation (ForCES) Protocol Specification; document 5810; Mar. 2010.

A. Doria et al.; General switch management protocol (GSMP) V3; Tech. Rep.; doi: http://dx.doi.org/10.17487/RFC3292; Jun. 2002.

A. Hurtado-Borras, J. Pala-Sole, D. Camps-Mur, and S. Sallent-Ribes; sdn wireless backhauling or small cells; Communications (ICC); 2015 IEEE International Conference; pp. 3897-3902; Jun. 8-12, 2015.

Allen, L., Beijersbergen, M., Spreeuw, R.J.C., and Woerdman, J.P.; Orbital Angular Momentum of Light and the Transformation of Laguerre-Gaussian Laser Modes; Physical Review A, vol. 45, No. 11; 8185-8189 (1992).

Anderson, Jorgen Bach; Rappaport, Theodore S.; Yoshida, Susumu; Propagation Measurements and Models for Wireless Communications Channels; 33 42-49 (1995).

B. Raghavan, M. Casado, T. Koponen, S. Ratnasamy, A. Ghodsi, and S. Shenker; Software-defined Internet architecture: Decoupling archi-tecture from infrastructure; Proc. 11th ACM Workshop Hot Topics Netw., Oct. 29-30, 2012, pp. 43-48.

Byrne R, Constant O, Smyth Y, Callagy G, Nash P, et al... (2008) Multiple source surveillance incidence and aetiology of out-of-hospital sudden cardiac death in a rural population in the West of Ireland. Eur Heart J., 29, 1418-1423.

Byun, S.H., Haji, G.A. & Young, L.E.; Development and application of GPS signal multipath simulator; Radio Science, vol. 37, No. 6, 1098 (2002).

Chugh SS (2001) Sudden cardiac death with apparently normal heart: clinical implications of progress in pathophysiology. Cardiac Electrophysiology Review, 5, 394-402.

Chugh SS, Jui J, Gunson K, Stecker EC, John BT, et al... (2004) Current burden of sudden cardiac death: multiple source surveillance versus retrospective death certificate-based review in a large U.S. Community. J Am Coll Cardiol. 44, 1268-1275.

Chugh SS, Kelly KL, Titus JL (2000) Sudden cardiac death with apparently normal heart. Circulation, 102, 649-654.

Chugh SS, Reinier K, Teodorescu C, Evanado A, Kehr E, et al... (2008) Epidemiology of sudden cardiac death: clinical and research implications. Prog Cardiovasc Dis 51, 213-228.

D. Drutskoy, E. Keller, and J. Rexford; Scalable network virtualization in software-defined networks; IEEE Internet Comput, vol. 17, No. 2, pp. 20-27, Nov. 27, 2012.

D. Joseph and I. Stoica; Modeling middleboxes; IEEE Netw., vol. 22, No. 5, pp. 20-25, Sep. 19, 2008.

D. Katz and D. Ward; Bidirectional Forwarding Detection (BFD). RFC 5880 (Proposed Standard); Jun. 2010; Updated by RFC 7419.

E. Baake et al., "Fitting Ordinary Differential Equations to Chaotic Data," Phys. Rev. A, 45, 1985.

(56) References Cited

OTHER PUBLICATIONS

E. D. Zwicky, S. Cooper, and D. B. Chapman; Building Internet Firewalls; Sebastopol, CA, USA: O'Reilly Media, 2000.

Ebrahimzadeh E, Pooyan M (2011) Early detection of sudden cardiac death by using classical linear techniques and time-frequency methods on electrocardiogram signals. Biomedical Science and Engineering, 11, 699-706.

F. T. Leighton and D. M. Lewin; Content delivery network using edge-of-network servers for providing content delivery to a set of participating content providers; U.S. Pat. No. 6,553,413, Apr. 22, 2003.

F. Takens, "Detecting Strange Attractors in Turbulence," In Lecture Notes in Mathematics, vol. 898, 366 Berlin: Springer-Verlag, 1981.

Fishman GI, Chugh SS, Dimarco JP, Albert CM, Anderson ME, et al... (2010) Sudden Cardiac Death Prediction and Prevention: Report from a National Heart, Lung, and Blood Institute and Heart Rhythm Society Workshop. Circulation, 122, 2335-2348.

Fox CS, Evans JC, Larson MG, Kannel WB, Levy D (2004) Temporal trends in coronary heart disease mortality and sudden cardiac death from 1950 to 1999: the Framingham Heart Study. Circulation, 110, 522-527.

G. Lu et al.; Serverswitch: A programmable and high performance platform for data center networks; Proc. NSDI, vol. 11. Mar. 2011, pp. 1-14.

Gibson, G. et al., Free-space information transfer using light beans carrying orbital angular momentum; Optical Express 12, 5448-5456 (2004).

H. Hawilo, A. Shami, M. Mirahmadi, and R. Asai; NFV: State of the art, challenges, and implementation in next generation mobile net-works (vEPC); IEEE Netw., vol. 28, No. 6, pp. 18-26, Nov./Dec. 2014.

H. Ludwig et al.; Web service level agreement (WSLA) language specification; IBM Corp., New York, NY, USA; Tech. Rep.,; Jan. 2003, pp. 815-824.

H. Van Loon and K. Labitzke, "Association Between the 11-Year Solar Cycle, the QBO, and the Atmosphere, Part II," J. Climate, 1, 1988.

H. Yao et al., Patch Antenna Array for the Generation of Millimeter-wave Hermite-Gaussian Beams, IEEE Antennas and Wireless Propagation Letters, (pending publication).

H. Yao et al.; Patch Antenna Array for the Generation of Millimeter-wave Hermite-Gaussian Beams, IEEE Antennas and Wireless Propagation Letters; 2016.

Huang, Hao et al.; Crosstalk mitigation in a free-space orbital angular momentum multiplexed communication link using 4×4 MIMO equalization; Optics Letters, vol. 39, No. 15; 4360-4363; (2014).

Hur, Sooyoung et at.; Millimeter Wave Beamforming for Wireless Backhaul and Access in Small Cell Networks. IEEE Transactions on Communications, vol. 61, 4391-4402 (2013).

Iskander, Magdy F.; Propagation Prediction Models for Wireless Communication Systems; IEEE Transactions on Microwave Theory and Techniques, vol. 50., No. 3, 662-673 (2002).

Ismail Koyuncu, Ahmet Turan Ozcerit, and Ihsan Pehlivan, "Implementation of FPGA-based real time novel chaotic oscillator", 2014, Nonlinear Dyn (2014) 77, pp. 49-59. (Year: 2014).

J. Case, M. Fedor, M. Schoffstall, and J. Davin; A Simple Network Management Protocol (SNMP); document 1157, May 1990.

J. Martins et al.; ClickOS and the art of network function virtualization; Proc. 11th USENIX Symp. Netw. Syst. Design Implement. (NSDI), Seattle, WA, USA, Apr. 2-4, 2014, pp. 459-473.

J.H. Bentley, "Multidimensional Binary Search Trees in Data Base Applications," IEEE Transactions on Software Engineering, 5 (4), 1979.

J.M. Martinerie et al., "Mutual Information, Strange Attractors, and the Optimal Estimation of Dimension," Phys. Rev. A., 45, 1992.

Joo S, Choi KJ, Huh SJ (2012) Prediction of spontaneous ventricular tachyarrhythmia by an artificial neural network using parameters gleaned from short-term heart rate variability. Expert Systems with Applications, 39, 3862-3866.

K. Phemius and M. Bouet; Monitoring latency with openflow; Network and Service Management (CNSM), 2013; 9th International Conference on. IEEE; Oct. 2013.

Kari Seppänen, Jorma Kilpi, and Tapio Suihko; Integrating wmn based mobile backhaul with sdn control; Mob.Netw. Appl., 20(1):32-39; Oct. 29, 2014.

Katayama, Y., et al.; Wireless Data Center Networking with Steered-Beam mmWave Links; IEEE Wireless Communication Network Conference; 2011, 2179-2184 (2011).

Lei Zhang, "Artificial Neural Network Model Design and Topology Analysis for FPGA Implementation of Lorenz Chaotic Generator", Apr. 2017, 2017 IEEE 30th Canadian Conference on Electrical and Computer Engineering (CCECE), pp. 1-4. (Year: 2017).

Li, X. et al.; Investigation of interference in multiple-input multiple-output wireless transmission at W band for an optical wireless integration system. Optics Letters 38, 742-744 (2013).

Lloyd-Jones D, Adams RJ, Brown TM, Camethon M, Dai S, et al. (2010) American Heart Association Statistics Committee and Stroke Statistics Subcommittee. Heart disease and stroke statistics2010 update: a report from the American Heart Association. Circulation 121: e46e215.

Solyman Ashrafi, Free-Space Optical Communications Using Orbital-Angular-Momentum Multiplexing Combined with MIMO-Based Spatial Multiplexing. Optics Letters, vol. 40, No. 18, Sep. 4, 2015.

Solyman Ashrafi, Future Mission Studies: Forecasting Solar Flux Directly From Its Chaotic Time Series, Computer Sciences Corp., Dec. 1991.

Solyman Ashrafi, Link Analysis of Using Hermite-Gaussian Modes for Transmitting Multiple Channels in a Free-Space Optical Communication System, The Optical Society, vol. 2, No. 4, Apr. 2015.

Solyman Ashrafi, Nonlinear Techniques for Forecasting Solar Activity Directly From its Time Series, Proceedings of Flight Mechanics/Estimation Theory Symposium, National Aeronautics and Space Administration, May 1992.

Solyman Ashrafi, Optical Communications Using Orbital Angular Momentum Beams, Adv. Opt. Photon. 7, 66-106, Advances in Optics and Photonic, 2015.

Solyman Ashrafi, Orbital-Angular-Momentum-Multiplexed Free-Space Optical Communication Link Using Transmitter Lenses, Applied Optics, vol. 55, No. 8, pp. 2098-2103, 2016.

Solyman Ashrafi, PCS system design issues in the presence of microwave OFS, Electromagnetic Wave Interactions, Series on Stability, Vibration and Control of Systems, World Scientific, Jan. 1996.

Solyman Ashrafi, PCS system design issues in the presence of microwave OFS, Electromagnetic Wave Interactions, Series on Stability, Vibration and Control of Systems, Worid Scientific, Jan. 1996.

Solyman Ashrafi, Performance Enhancement of an Orbital-Angular-Momentum based Free-space Optical communications Link Through Beam Divergence Controlling, IEEE/OSA Conference on Optical Fiber Communications (OFC) and National Fiber Optics Engineers Conference (NFOEC),paper M2F.6, Los Angeles, CA, Mar. 2015 (Optical Society of America, Washington, D.C., 2015).

Solyman Ashrafi, Performance Enhancement of an Orbital-Angular-Momentum-Based Free-Space Optical Communication Link through Beam Divergence Controlling, OSA Technical Digest (online), paper M2F.6. The Optical Society, 2015.

Solyman Ashrafi, Performance Metrics and Design Considerations for a Free-Space Optical Orbital-Angular-Momentum Multiplexed Communication Link, The Optical Society, vol. 2, No. 4, Apr. 2015.

Solyman Ashrafi, Performance Metrics and Design Parameters for an FSO Communications Link Based on Multiplexing of Multiple Orbital-Angular-Momentum Beams, IEEE Globecom 2014, paper 1570005079, Austin, TX, Dec. 2014(IEEE, Piscataway, NJ, 2014).

Solyman Ashrafi, Performance Metrics and Design Parameters for an FSO Communications Link Based on Multiplexing of Multiple Orbital-Angular-Momentum Beams, Globecom 2014 OWC Workshop, 2014.

Solyman Ashrafi, Performance Metrics for a Free-Space Communication Link Based on Multiplexing of Multiple Orbital Angular Momentum Beams with Higher Order Radial Indice. OSA Technical Digest (online), paper JTh2A.62. The Optical Society, 2015.

(56) References Cited

OTHER PUBLICATIONS

Solyman Ashrafi, Physical Phaseplate for the Generation of a Millimeter-Wave Hermite-Gaussian Beam, IEEE Antennas and Wireless Propagation Letters, RWS 2016; pp. 234-237.
Solyman Ashrafi, Solar Flux Forecasting Using Mutual Information with an Optimal Delay, Advances in the Astronautical Sciences, American Astronautical Society, vol. 84 Part II, 1993.
Solyman Ashrafi, Splitting and contrary motion of coherent bremsstrahlung peaks in strained-layer superlattices, Journal of Applied Physics 70:4190-4193, Dec. 1990.
Solyman Ashrafi, Splitting of channeling-radiation peaks in strained-layer superlattices, Journal of the Optical Society of America B 8(12), Nov. 1991.
Solyman Ashrafi, Spurious Resonances and Modelling of Composite Resonators, 37th Annual Symposium on Frequency Control, 1983.
Solyman Ashrafi, Tunable Generation and Angular Steering of a Millimeter-Wave Orbital-Angular-Momentum Beam using Differential Time Delays in a Circular Antenna Array, IEEE International Communication Conference (ICC) 2016, paper 1570225424, Kuala Lumpur, Malaysia, May 2016 (IEEE, Piscataway, NJ, 2016).
Solyman Ashrafi; Future Mission Studies: Preliminary Comparisons of Solar Flux Models; NASA Goddard Space Flight Center Flight Dynamics Division; Flight Dynamics Division Code 550; Greenbelt, Maryland; Dec. 1991.
T. Wu, L. Rui, A. Xiong, and S. Guo; An automation PCI allocation method foreNodeB and home eNodeB cell; Proc. IEEE 6th Int. Conf. Wireless Commun. Netw. Mobile Comput. (WiCOM); Sep. 2010, pp. 1-4.
Tamburini, Fabrizio; Encoding many channels on the same frequency through radio vorticity: first experimental test; New Journal of Physics 14, 033001 (2012).
Texas Instruments; "TRG2432EVM" User's Guide; SLWU036A; Jun. 2006; Revised Oct. 2006; 19 pgs.
Texas Instruments; "TSW1265 Dual-Wideband RF-to-Digital Receiver"; Matt Guibord; TI Designs High Speed: Verified Design; TIDU126; Sep. 2013; 15 pgs.
Texas Instruments; "TSW1265EVM Evaluation Module" User's Guide; SLAU429; Mar. 2012; 18 pgs.
Texas Instruments; "TSW1266 Wideband RF-to-Digital Complex Receiver-Feedback Signal Chain" TI Designs High Speed: Verified Design; Matt Guibord; TIDU127; Sep. 2013; 14 pgs.
Texas Instruments; "TSW1266EVM Evaluation Module" User's Guide; SLAU484; Jan. 2013; 21 pgs.
Texas Instruments; "TSW308x Evaluation Module" User's Guide; SLAU374B; Dec. 2011; Revised May 2016; 36 pgs.
Texas Instruments; "TSW308x Wideband Digital to RF Transmit Solution" TI Designs High Speed: CerTIfied Design; Kang Hsia; TIDU128; Sep. 2013; 31 pgs.
Texas Instruments; Reference Design; TSW1266; Oct. 29, 2012; 9 pgs.
Theodore S. Rappaport et al.; "Millimeter Wave Mobile Communications for 5G Cellular: It Will Work!" NYU Wireless, Polytechnic Institute of New York University; New York, NY; vol. 1, 2013; 2169-3536; 2013 IEEE Access; 15 pgs.
Thomas L. Marzetta; "Noncooperative Cellular Wireless with Unlimited Numbers of Base Station Antennas"; IEEE Transactions on Wireless Communications, vol. 9, No. 11, Nov. 2010; 1536-1276/10; 2010 IEEE; 11 pgs.
Tianyang Bai and Robert W. Heath Jr. "Asymptotic Coverage and Rate in Massive MIMO Networks" Wireless Networking and Communication Group; The University of Texas at Austin; Austin, TX; GlobalSIP 2014: Massive MIMO Communications; 5 pgs.
Tianyang Bai and Robert W. Heath Jr.; "Analysis of Self-body Blocking Effects in Millimeter Wave Cellular Networks" Wireless Networking and Communication Group, The University of Texas at Austin; IEEE; Asilomar 2014; 5 pgs.
Tianyang Bai and Robert W. Heath Jr.; "Asymptotic SINR for Millimeter Wave Massive MIMO Cellular Networks" Wireless Networking and Communication Group; The University of Texas at Austin; Austin, TX; 2015 IEEE 16th International Workshop on Signal Processing Advances in Wireless Communications (SPAWC); 5 pgs.
Tianyang Bai and Robert W. Heath, Jr.; "Coverage and Rate Analysis for Millimeter-Wave Cellular Networks" IEE Transactions on Wireless Communications; vol. 14, No. 2; 1536-1276; 2014 IEEE; Feb. 2015; 15 pgs.
Tianyang Bai et al.; "Uplink Massive MIMO SIR Analysis: How do Antennas Scale with Users?" The University of Texas at Austin; Austin, Texas; Dec. 2015; 6 pgs.
Tianyang Bai et al; "Analysis of Blockage Effects on Urban Cellular Networks" IEEE Transactions on Wireless Communications; vol. 13, No. 9; Sep. 2014; 14 pgs.
Tianyang Bai, Ahmed Alkhateeb and Robert W. Heath, Jr.; "Coverage and Capacity of Millimeter-Wave Cellular Networks" Millimeter-Wave Communications for 5G; 0163-6804-14; 2104 IEEE; IEEE Communications Magazine; Sep. 2014; 8 pgs.
S. Ashrafi, et al. "Spurious Resonances and Modelling of Composite Resonators," (The Institute of Electrical and Electronics Engineers, 1983).
S. Ashrafi, et al. "Demonstration of an Obstruction-Tolerant Millimeter-Wave Free-Space Communications Link of Two 1-Gbaud 16-QAM Channels using Bessel Beams Containing Orbital Angular Momentum," (Society of Photo-optical Instrumentation Engineers, 2015).
S. Ashrafi, et al. "Evidence of Chaotic Pattern in Solar Flux Through a Reproducible Sequence of Period-Doubling-Type Bifurcations," Technical Report (National Aeronautics and Space Administration, 1991).
S. Ashrafi, et al. "Experimental Measurements of Multipath-Induced Intra- and Inter-Channel Crosstalk Effects in a Millimeter-Wave Communications Link using Orbital-Angular-Momentum Multiplexing," (The Institute of Electrical and Electronics Engineers, 2015).
S. Ashrafi, et al. "Lyapunov Exponent of Solar Flux Time Series," (Proceedings of First Experimental Chaos Conference, 1991).
S. Ashrafi, et al. "Acoustically Induced Stresses in Elastic Cylinders and their Visualization," (Acoustical Society of America, 1987).
Solyman Ashrafi, 32 Gbit/s 60 GHz Millimeter-Wave Wireless Communications using Orbital-Angular-Momentum and Polarization Mulitplexing, IEEE International Communication Conference (ICC) 2016, paper 1570226040, Kuala Lumpur, Malaysia, May 2016 (IEEE, Piscataway, NJ, 2016).
Solyman Ashrafi, 4 Gbit/s Underwater Transmission Using OAM Multiplexing and Directly Modulated Green Laser, APS/IEEE/OSA Conference on Lasers and Electro-Optics (CLEO), paper 2477374, San Jose, CA, Jun. 2016 (OSA, Wash., D.C., 2016).
Solyman Ashrafi, 400-Gbit/s Free Space Optical Communications Link Over 120-meter using Multiplexing of 4 Collocated Orbital-Angular-Momentum Beams, IEEE/OSA Conference on Optical Fiber Communications (OFC) and National Fiber Optics Engineers Conference (NFOEC),paper M2F.1, Los Angeles, CA, Mar. 2015 (Optical Society of America, Washington, D.C., 2015).
Solyman Ashrafi, 400-Gbit/s Free-Space Optical Communications Link Over 120-meter Using Multiplexing of 4 Collocated Orbital-Angular-Momentum Beams. OSA Technical Digest (online), paper M2F.1. The Optical Society, 2015.
Solyman Ashrafi, A Dual-Channel 60 GHz Communications Link Using Patch Antenna Arrays to Generate Data-Carrying Orbital-Angular-Momentum Beams, IEEE International Communication Conference (ICC) 2016, paper 1570224643, Kuala Lumpur, Malaysia, May 2016 (IEEE, Piscataway, NJ, 2016).
Solyman Ashrafi, Acoustically induced stresses in elastic cylinders and their visualization, The Journal of the Acoustical Society of America 82(4):1378-1385, Sep. 1987.
Solyman Ashrafi, An Information Theoretic Framework to Increase Spectral Efficiency, IEEE Transactions on Information Theory, vol. XX, No. Y, Oct. 2014, Dallas, Texas.
Solyman Ashrafi, Channeling Radiation of Electrons in Crystal Lattices, Essays on Classical and Quantum Dynamics, Gordon and Breach Science Publishers, 1991.
Solyman Ashrafi, CMA Equalization for a 2 Gb/s Orbital Angular Momentum Multiplexed Optical Underwater Link through Thermally Induced Refractive Index Inhomogeneity, APS/IEEE/OSA

(56) References Cited

OTHER PUBLICATIONS

Conference on Lasers and Electro-Optics (CLEO), paper 2479987, San Jose, CA, Jun. 2016 (OSA, Wash., D.C., 2016).
Solyman Ashrafi, Combining Schatten's Solar Activity Prediction Model with a Chaotic Prediction Model, National Aeronautics and Space Administration, Nov. 1991.
Solyman Ashrafi, Demonstration of an Obstruction-Tolerant Millimeter-Wave Free-Space Communications Link of Two 1-Gbaud 16-QAM Channels using Bessel Beams Containing Orbital Angular Momentum, Third International Conference on Optical Angular Momentum (ICOAM), Aug. 4-7, 2015, New York USA.
Solyman Ashrafi, Demonstration of Distance Emulation for an Orbital-Angular-Momentum Beam. OSA Technical Digest (online), paper STh1F.6. The Optical Society, 2015.
Solyman Ashrafi, Demonstration of OAM-based MIMO FSO link using spatial diversity and MIMO equalization for turbulence mitigation,IEEE/OSA Conference on Optical Fiber Communications (OFC), paper Th1H.2, Anaheim, CA, Mar. 2016 (Optical Society of America, Washington, D.C., 2016).
Solyman Ashrafi, Demonstration of OAM-based MIMO FSO link using spatial diversity and MIMO equalization for urbulence mitigation, IEEE/OSA Conference on Optical Fiber Communications (OFC), paper Th1H.2, Anaheim, CA, Mar. 2016 (Optical Society of America, Washington, D.C., 2016).
Solyman Ashrafi, Demonstration of using Passive Integrated Phase Masks to Generate Orbital-Angular-Vlomentum Beams in a Communications Link, APS/IEEE/OSA Conference on Lasers and Electro-Optics (CLEO), paper 2480002, San Jose, CA, Jun. 2016 (OSA, Wash., D.C., 2016).
Solyman Ashrafi, Detecting and Disentangling Nonlinear Structure from Solar Flux Time Series, 43rd Congress of be International Astronautical Federation, Aug. 1992.
Solyman Ashrafi, Detecting and Disentangling Nonlinear Structure from Solar Flux Time Series, 43rd Congress of the International Astronautical Federation, Aug. 1992.
Solyman Ashrafi, Dividing and Multiplying the Mode Order for Orbital-Angular-Momentum Beams, European Conference on Optical Communications (EEOC), paper Th.4.5.1, Valencia, Spain, Sep. 2015.
Solyman Ashrafi, Dividing and Multiplying the Mode Order for Orbital-Angular-Momentum Beams, European Conference on Optical Communications (ECOC), paper Th.4.5.1, Valencia, Spain, Sep. 2015.
Solyman Ashrafi, Enhanced Spectral Efficiency of 2.36 bits/s/Hz Using Multiple Layer Overlay Modulation for QPSK over a 14-km Single Mode Fiber Link. OSA Technical Digest (online), paper SW1M.6. The Optical Society, 2015.
Solyman Ashrafi, Evidence of Chaotic Pattern in Solar Flux Through a Reproducible Sequence of Period-Doubling-Type Bifurcations; Computer Sciences Corporation (CSC); Flight Mechanics/Estimation Theory Symposium; NASA Goddard Space Flight Center; Greenbelt, Maryland; May 21-23, 1991.
Solyman Ashrafi, Evidence of Chaotic Pattern in Solar Flux Through a Reproducible Sequence of Period-Doubling-Type Bifurcations, Proceedings of Flight Mechanics/Estimation Theory Symposium, National Aeronautics and Space Administration, May 1991.
Solyman Ashrafi, Experimental Characterization of a 400 Gbit/s Orbital Angular Momentum Multiplexed Free-space Optical Link over 120-meters, Optics Letters, vol. 41, No. 3, pp. 622-625, 2016.

Solyman Ashrafi, Experimental Demonstration of 16-Gbit/s Millimeter-Wave Communications Link using Thin Metamaterial Plates to Generate Data-Carrying Orbital-Angular-Momentum Beams, ICC 2015, London, UK, 2014.
Solyman Ashrafi, Experimental Demonstralion of a 400-Gbit/s Free Space Optical Link Using Multiple Orbital-Angular-Momentum Beams with Higher Order Radial Indices. OSA Technical Digest (online), paper SW4M.5. The Optical Society, 2015.
Solyman Ashrafi, Experimental Demonstration of a 400-Gbit/s Free Space Optical Link using Multiple Orbital-Angular-Momentum Beams with Higher Order Radial Indices, APS/IEEE/OSA Conference on Lasers and Electro-Optics (CLEO), paper SW4M.5, San Jose, CA, May 2015 (OSA, Wash., D.C., 2015).
Solyman Ashrafi, Experimental demonstration of enhanced spectral efficiency of 1.18 symbols/s/Hz using multiple-layer-overlay modulation for QPSK over a 14-km fiber link. OSA Technical Digest (online), paper JTh2A.63. The Optical Society, 2014.
Solyman Ashrafi, Experimental Demonstration of Two-Mode 16-Gbit/s Free-Space mm-Wave Communications Link Using Thin Metamaterial Plates to Generate Orbital Angular Momentum Beams, Optica, vol. 1, No. 6, Dec. 2014.
Solyman Ashrafi, Experimental Demonstralion of Two-Mode 16-Gbit/s Free-Space mm-Wave Communications Link Using Thin Metamaterial Plates to Generate Orbital Angular Momentum Beams, Optica, vol. 1, No. 6, Dec. 2014.
Solyman Ashrafi, Experimental Demonstration of Using Multi-Layer-Overlay Technique for Increasing Spectral Efficiency to 1.18 bits/s/Hz in a 3 Gbit/s Signal over 4-km Multimode Fiber. OSA Technical Digest (online), paper UTh2A.63. The Optical Society, 2015.
Solyman Ashrafi, Experimental Demonstralion of Using Multi-Layer-Overlay Technique for Increasing Spectral Efficiency to 1.18 bits/s/Hz in a 3 Gbit/s Signal over 4-km Multimode Fiber. OSA Technical Digest (online), paper JTh2A.63. The Optical Society, 2015.
Solyman Ashrafi, Experimental Measurements of Multipath-Induced Intra- and Inter-Channel Crosstalk Effects in a Millimeter-wave Communications Link using Orbital-Angular-Momentum Multiplexing, IEEE International Communication Conference(ICC) 2015, paper1570038347, London, UK, Jun. 2015(IEEE, Piscataway, NJ, 2015).
Solyman Ashrafi, Experimental Measurements of Multipath-Induced Intra- and Inter-Channel Crosstalk Effects in a Millimeter-Wave Communications Link using Orbital-Angular-Momentum Multiplexing, ICC 2015, London, UK, 2014.
Solyman Ashrafi, Exploiting the Unique Intensity Gradient of an Orbital-Angular-Momentum Beam for Accurate Receiver Alignment Monitoring in a Free-Space Communication Link, European Conference on Optical Communications (ECOC), paper We.3.6.2, Valencia, Spain, Sep. 2015.
U.S. Appl. No. 15/216,474, issued as U.S. Pat. No. 9,998,187.
U.S. Appl. No. 15/926,087, issued as U.S. Pat. No. 10,374,710.
U.S. Appl. No. 16/053,252, issued as U.S. Pat. No. 10,334,446.
U.S. Appl. No. 16/053,271, issued as U.S. Pat. No. 10,757,576.
U.S. Appl. No. 16/161,840, issued as U.S. Pat. No. 10,755,188.
U.S. Appl. No. 16/278,784, issued as U.S. Pat. No. 10,554,264.
U.S. Appl. No. 16/595,148 and U.S. Appl. No. 17/080,384 which are relied upon in the current application for an earlier filing date under 35 U.S.C. §120. Pursuant to 37 C.F.R. 1.98(d), such previously submitted items are not provided herein.

\* cited by examiner $$\Delta h = \frac{\ell \lambda}{n-1}$$

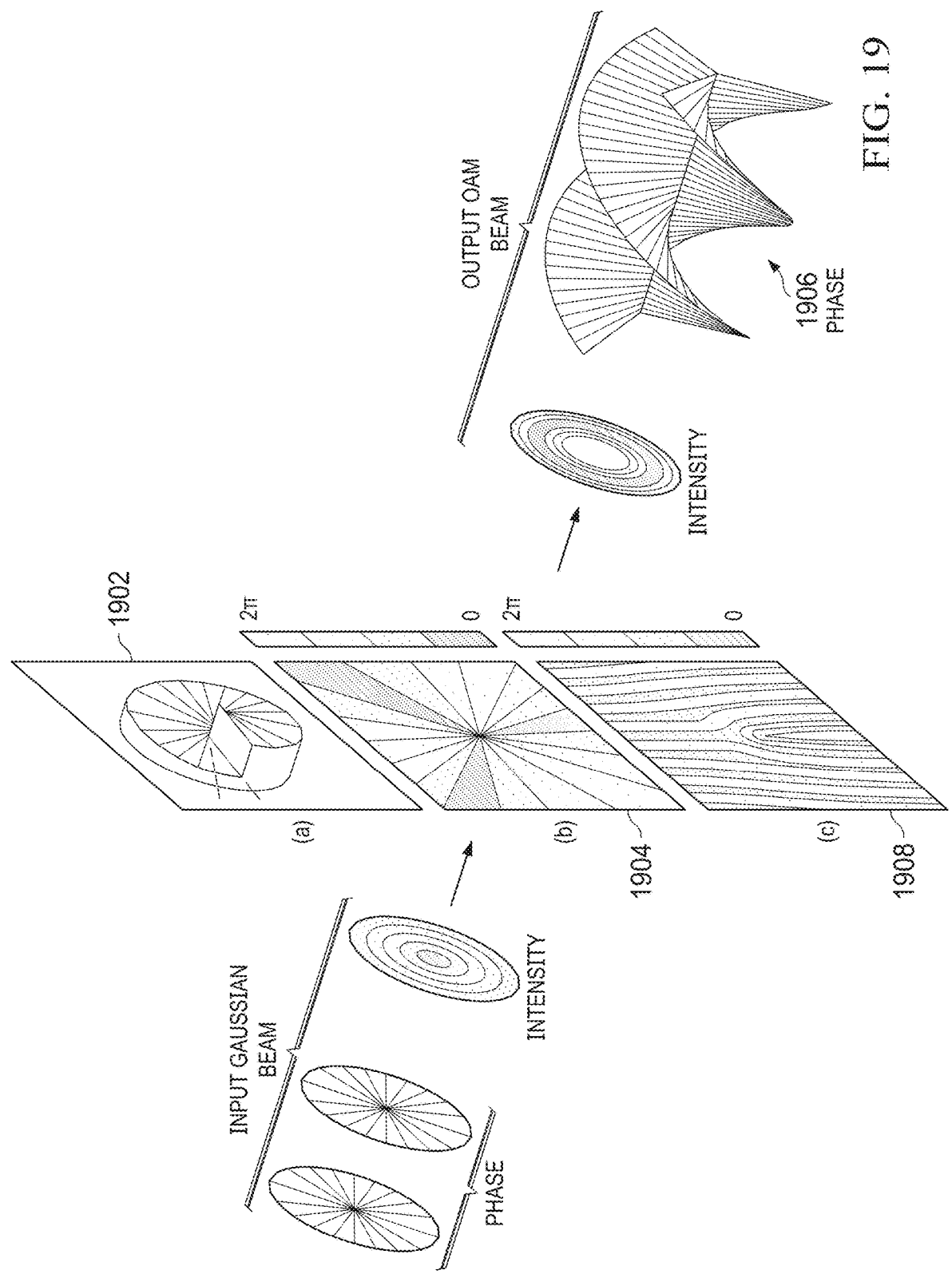

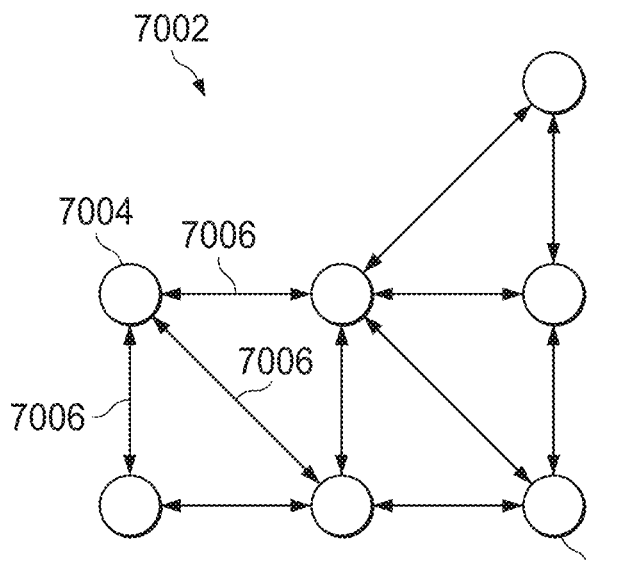
FIG. 70
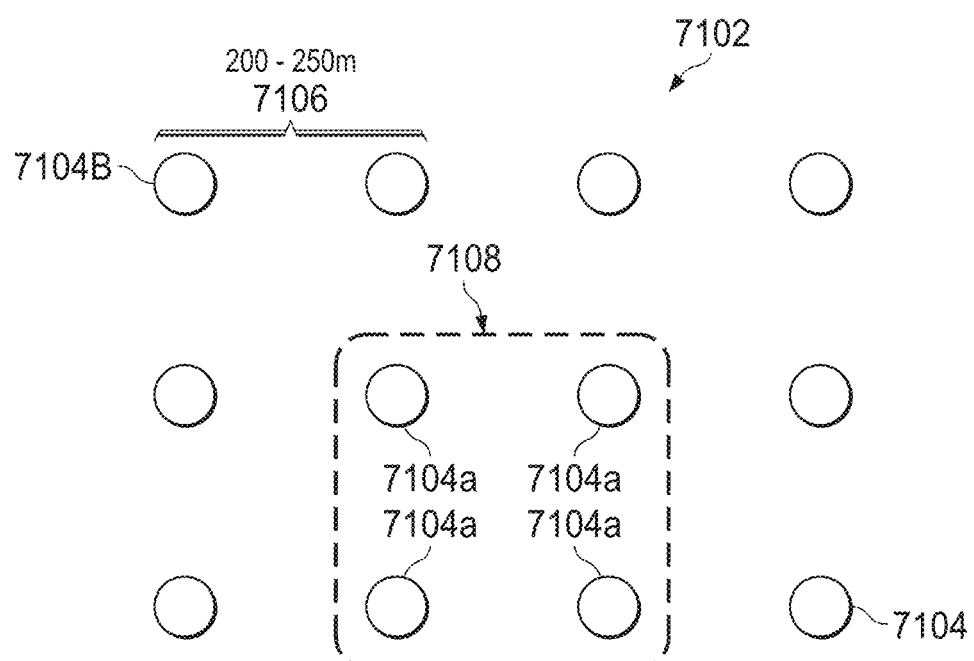
FIG. 71

| ROTATION OF PATCHES (DEGREES) | | Rx V(dB) FOR l=1 | Rx V(dB) FOR l=-1 | ΔRx V (dB) |
|---|---|---|---|---|
| 0 DEGREES | | 27.5 | 26.6 | 1.1dB |
| 45 DEGREES | | 31.1 | 30.86 | 0.24dB |
| 90 DEGREES | | 45 | 42 | 3dB |
| 0 DEGREES | | 34.23 | 26.02 | 8.23dB |
| 90 DEGREES | | 56.14 | 41.28 | 14.72dB |

| ROTATION OF PATCHES (DEGREES) | | Rx V(dB) FOR l=1 | Rx V(dB) FOR l=-1 | ΔRx V (dB) |
|---|---|---|---|---|
| 0 DEGREES | | 31.57 | 31.25 | 0.32 |
| 45 DEGREES | | 37 | 32 | 5 |
| 90 DEGREES | | 54 | 43 | 11 |
| 0 DEGREES | | 33 | 27 | 6 |
| 45 DEGREES | | 34 | 31 | 3 |
| 90 DEGREES | | 49 | 43 | 5.8 |

| OFFSET OF Rx IN z(mm) | | Rx V(dB) FOR l=1 | Rx V(dB) FOR l=-1 | ΔRx V(dB) |
|---|---|---|---|---|
| 0mm (CONCENTRIC) | | 31.57 | 31.25 | 0.32 |
| 10mm | | 41.96 | 33.7 | 8.26 |
| 20mm | | 43 | 37 | 6.11 |
| 30mm | | 38 | 36 | 2 |
| 40mm | | 48 | 47 | 1 |
| 50mm | | 45 | 44 | 1 |
| 10mm WITH 90 DEGREES ROTATION OF Rx | | 76.81 | 47.71 | 29.1 |

FIG. 88

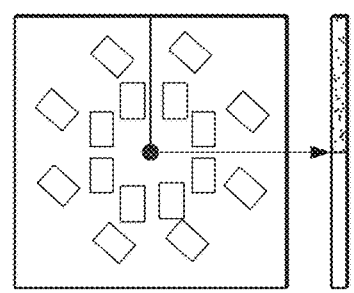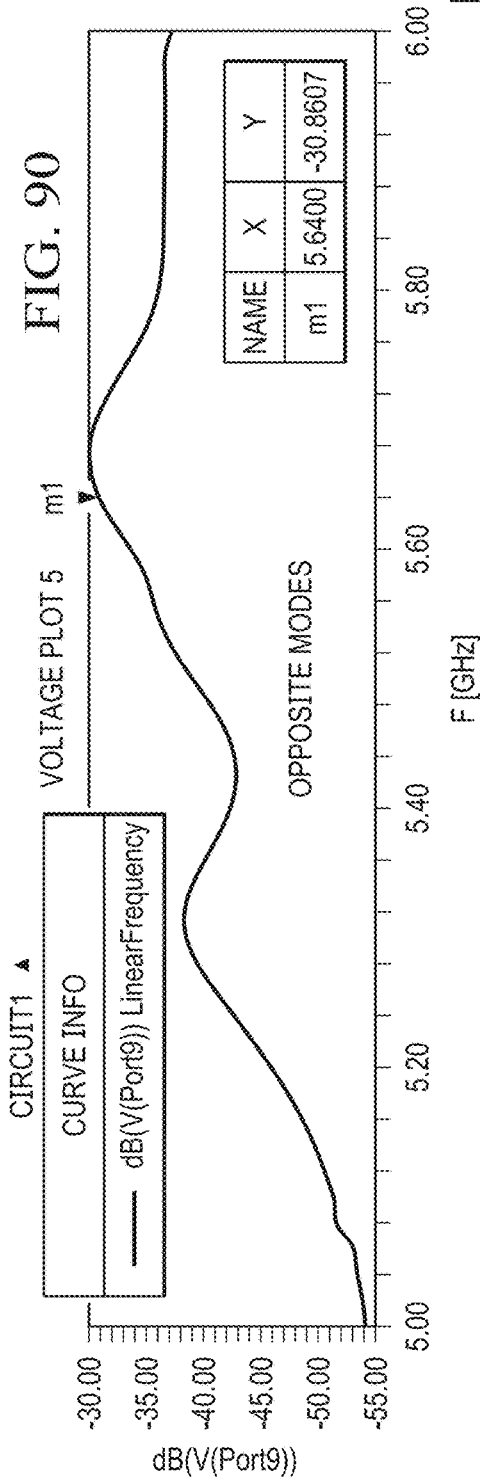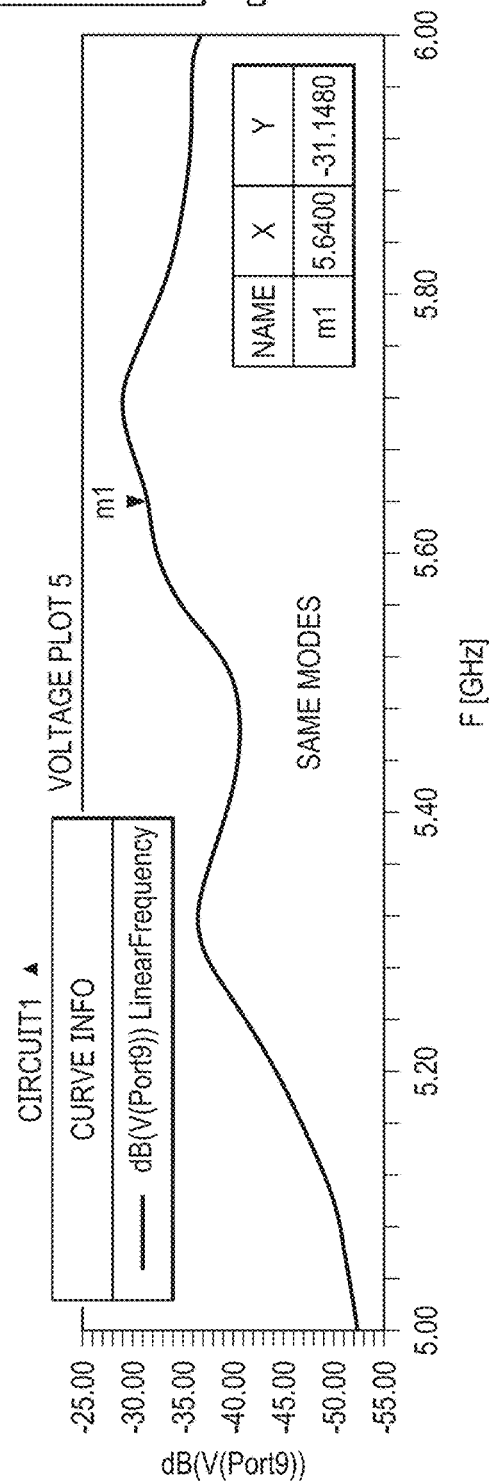
FIG. 90

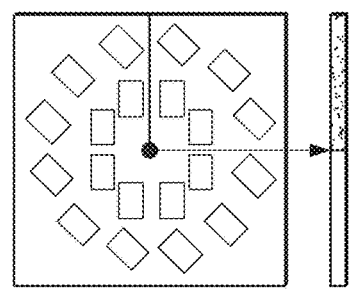
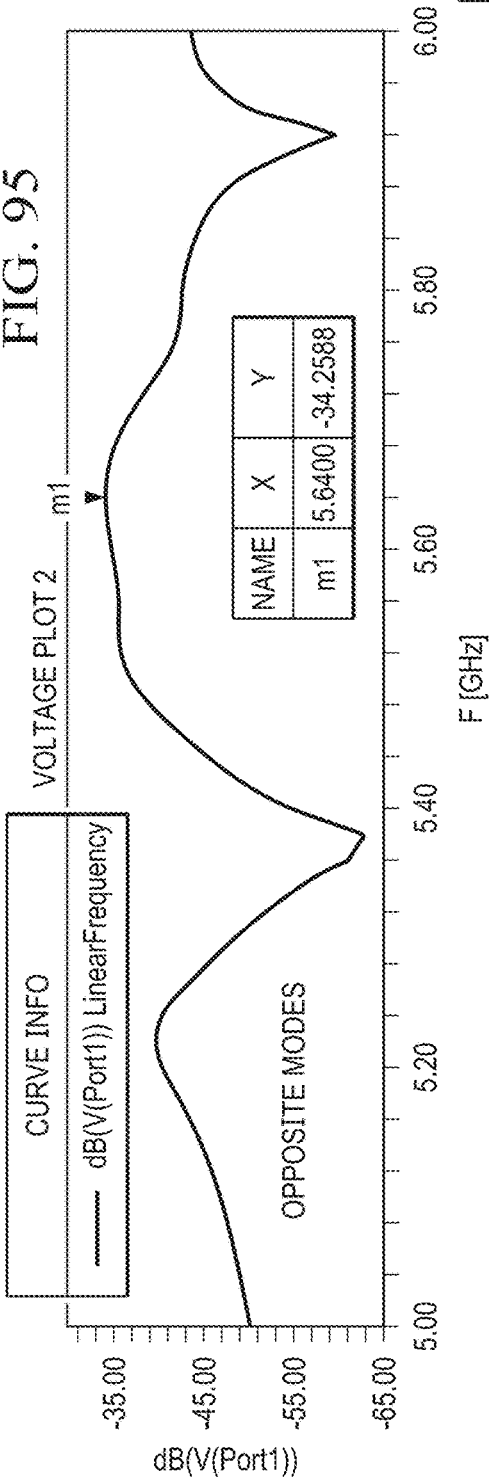
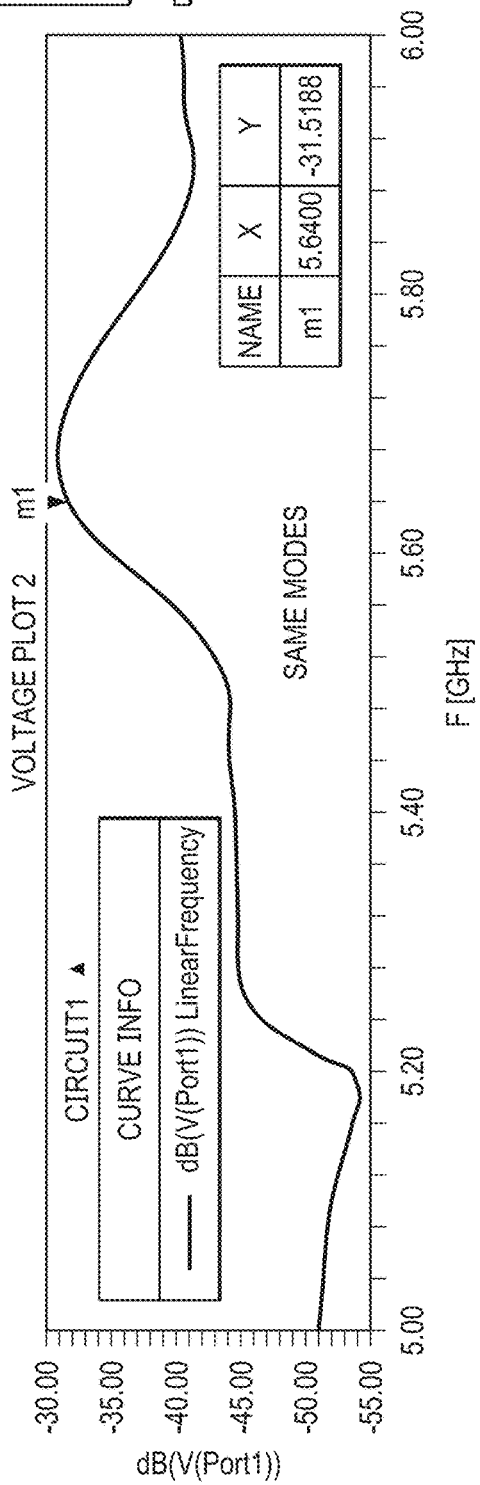
FIG. 95

FIG. 100
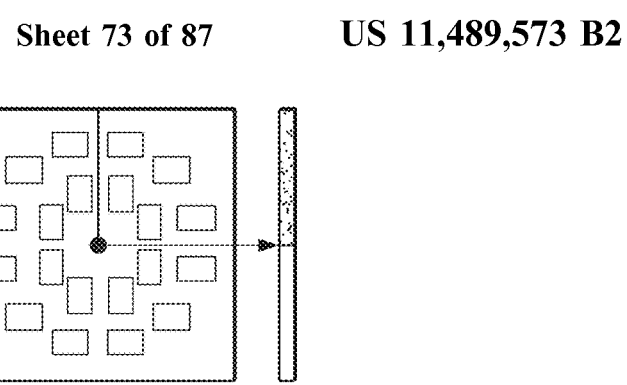
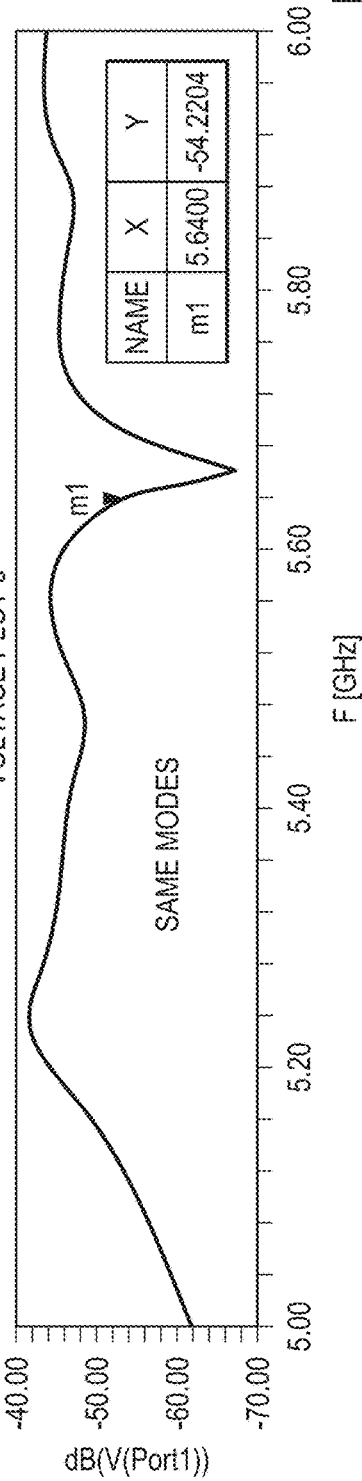
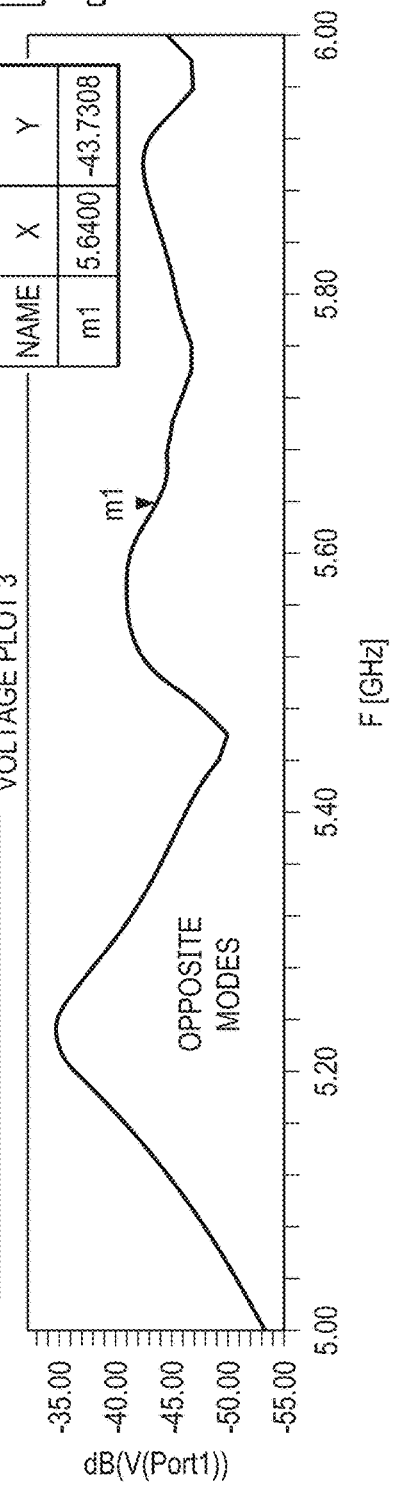

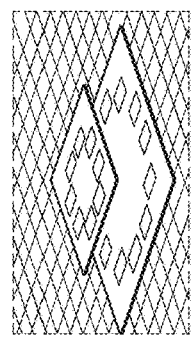
FIG. 102
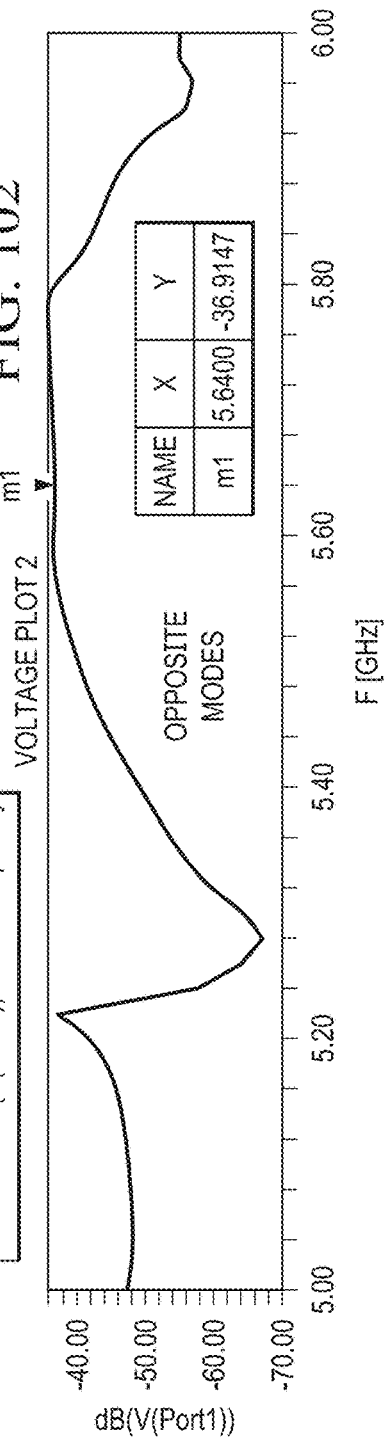
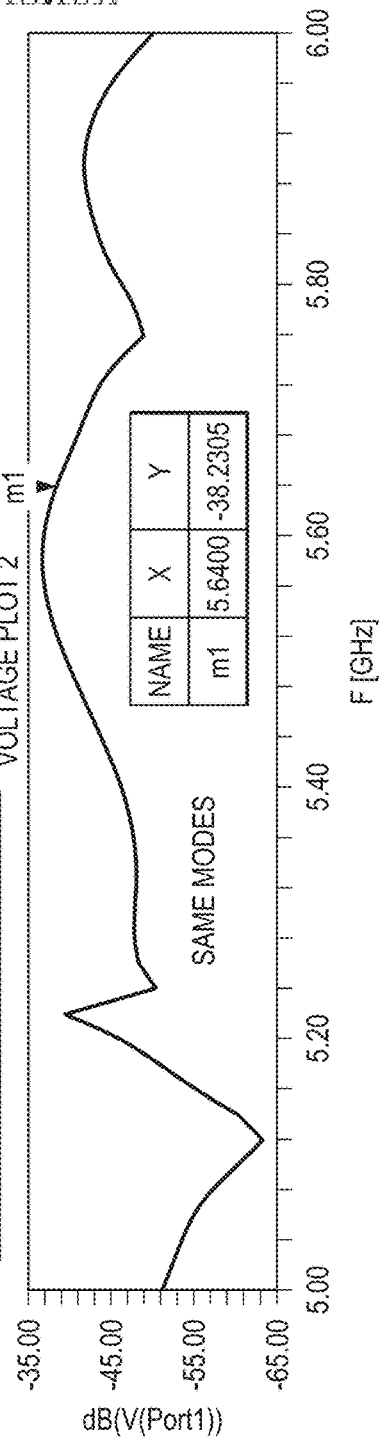

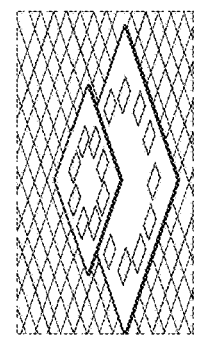
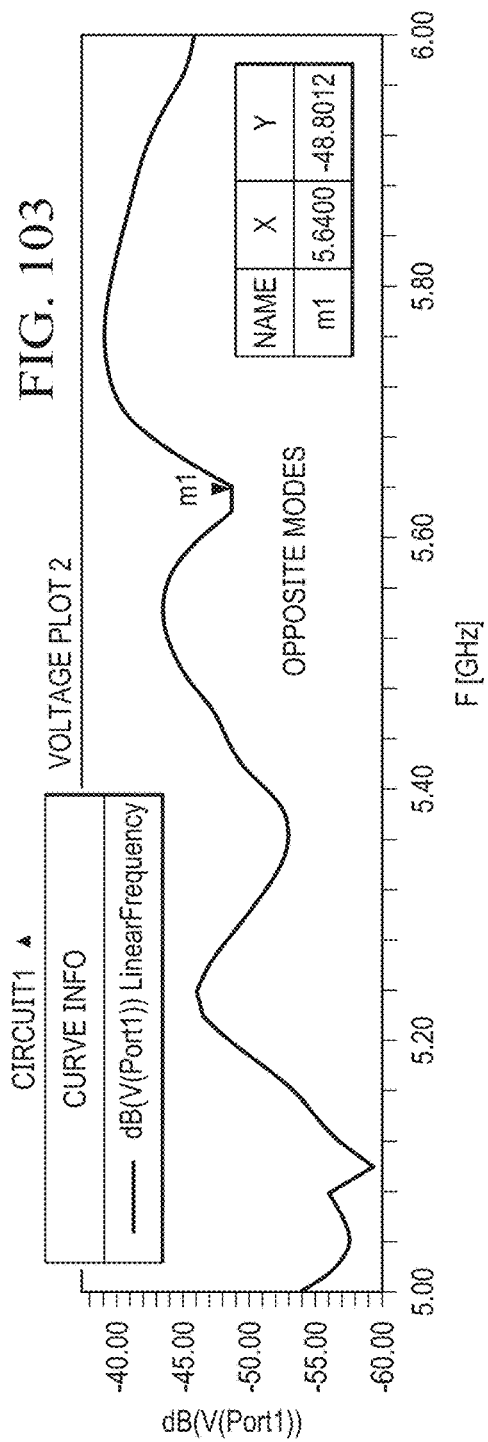
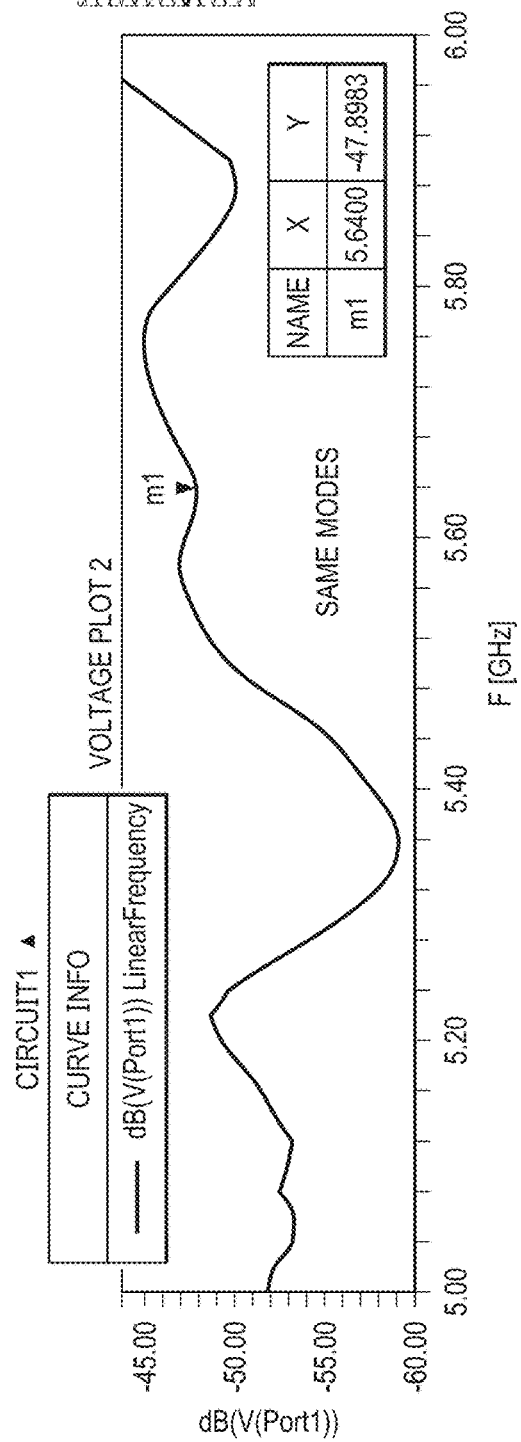
FIG. 103

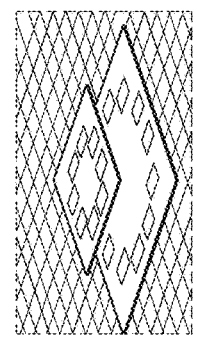
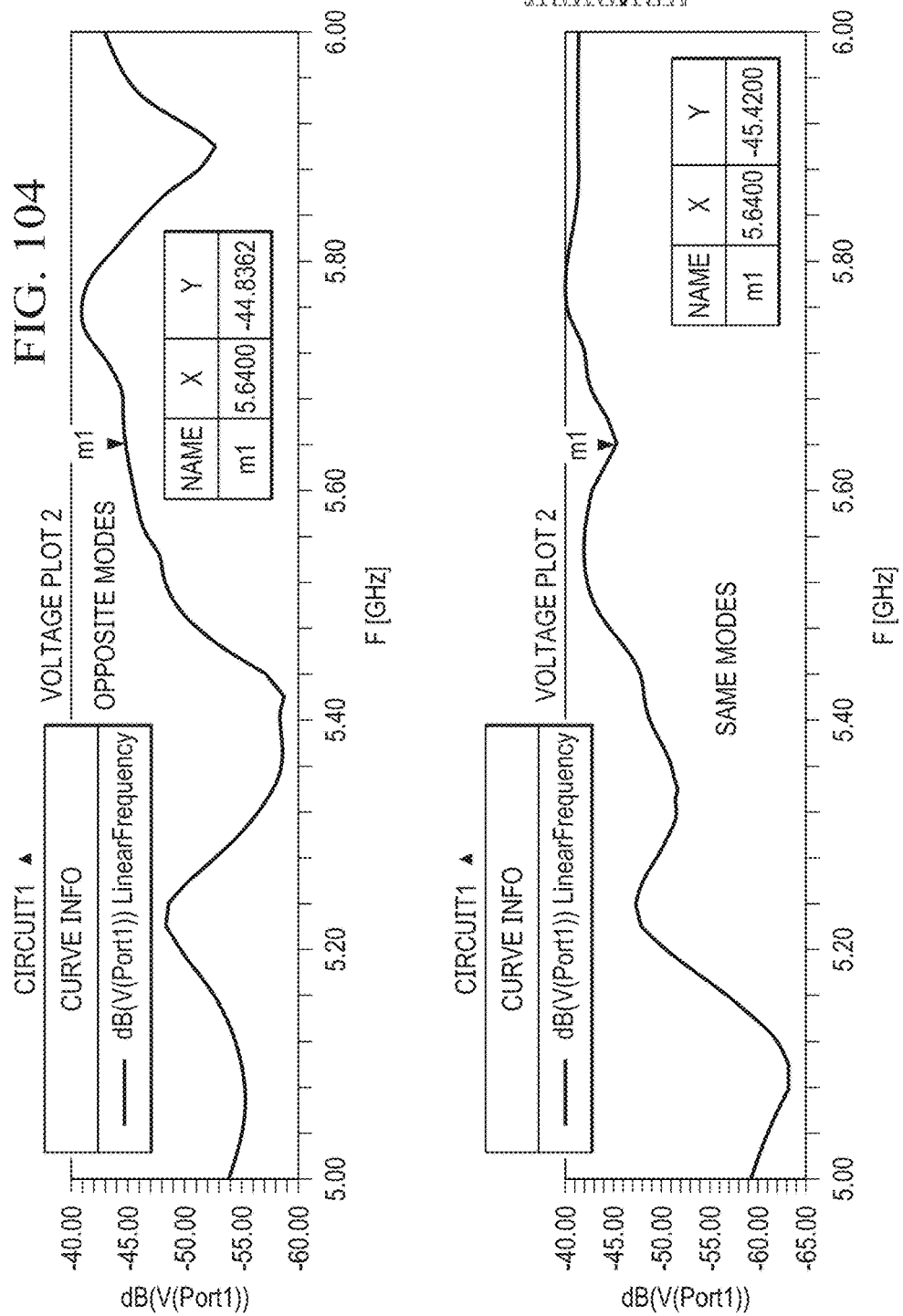
FIG. 104

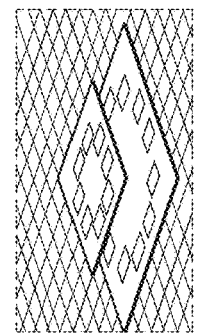
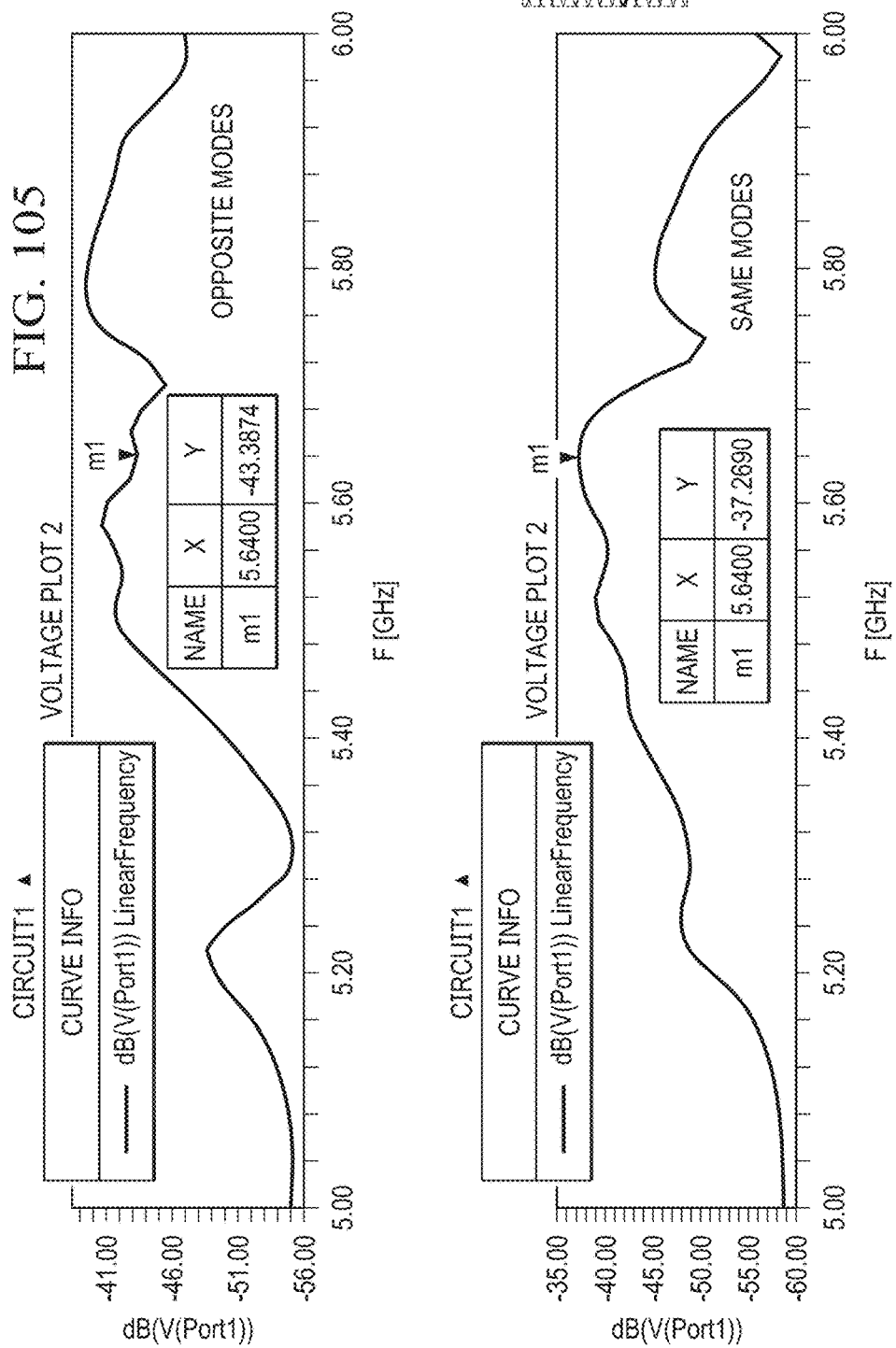
FIG. 105

FIG. 106
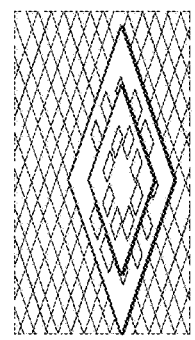
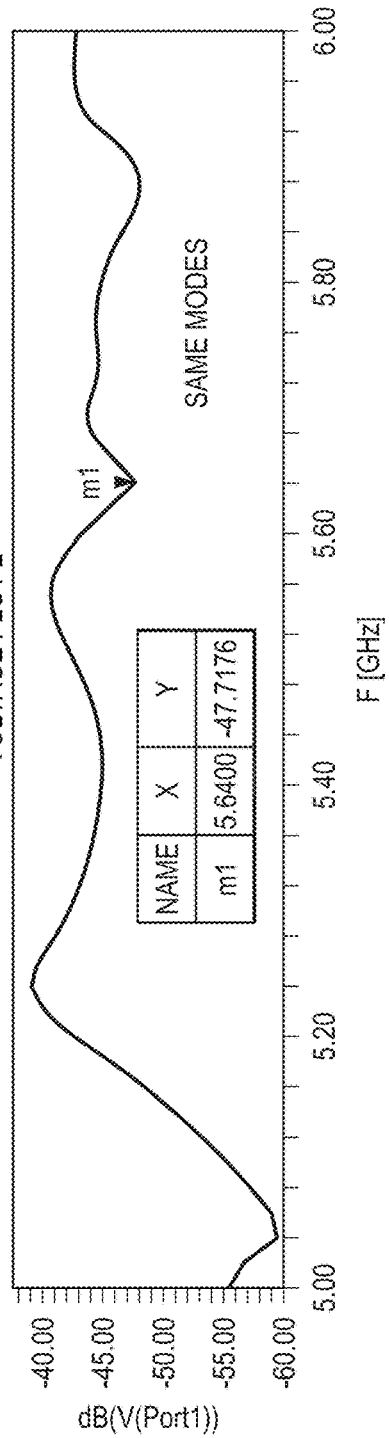
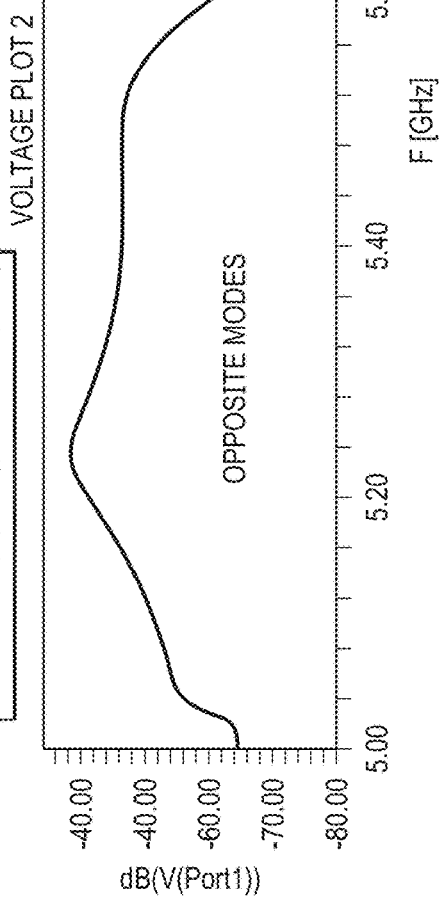

HYBRID DIGITAL-ANALOG MMWAVE REPEATER/RELAY WITH FULL DUPLEX

CROSS-REFERENCE TO RELATED APPLICATIONS

This application is a Continuation of U.S. patent application Ser. No. 17/080,384, filed Oct. 26, 2020, entitled HYBRID DIGITAL-ANALOG MMWAVE REPEATER/RELAY WITH FULL DUPLEX, which claims the benefit of U.S. Patent Application No. 62/965,019, filed Jan. 23, 2020, entitled HYBRID DIGITAL-ANALOG MMWAVE REPEATER/RELAY WITH FULL DUPLEX, which is incorporated by reference herein in its entirety.

TECHNICAL FIELD

The present invention related to repeater/relay transmitters, and more particularly, to a millimeter wave repeater/relay using full duplex.

SUMMARY

The present invention, as disclosed and described herein, in one aspect thereof, comprises a repeater for transmitting millimeter wave signals. A transceiver communicates with a plurality of remote locations over millimeter wave communications links. The of transceiver comprises a patch antenna array including a plurality of patch antennas. The plurality of patch antennas include a transmitter array portion in a first orientation for transmitting signals and a receiver array portion in a second orientation for receiving signals. The receiver array portion is vertically separated from the transmitter array portion by a predetermined distance. The first and second orientations and the predetermined distance vertically separating the transmitter array portion from the receiver array portion limit interference between the transmitted signals and the received signals. Transceiver circuitry transmits the millimeter wave signals with at least a first millimeter wave transceiver at first one of the plurality of remote locations and a second millimeter wave transceiver at a second one of the plurality of remote locations.

BRIEF DESCRIPTION OF THE DRAWINGS

For a more complete understanding, reference is now made to the following description taken in conjunction with the accompanying Drawings in which:

FIG. 19 illustrates various manners for converting a Gaussian beam into an OAM beam;

FIG. 70 illustrates a number of mesh network nodes;

FIG. 71 illustrates a mesh network with interfering structure;

FIG. 88 illustrates received voltage values for different patch antenna configurations;

FIGS. 89-106 illustrate various voltage plots for differing patch antenna array durations of a circular transmitter array and a circular receiver array;

DETAILED DESCRIPTION

Figure 1:
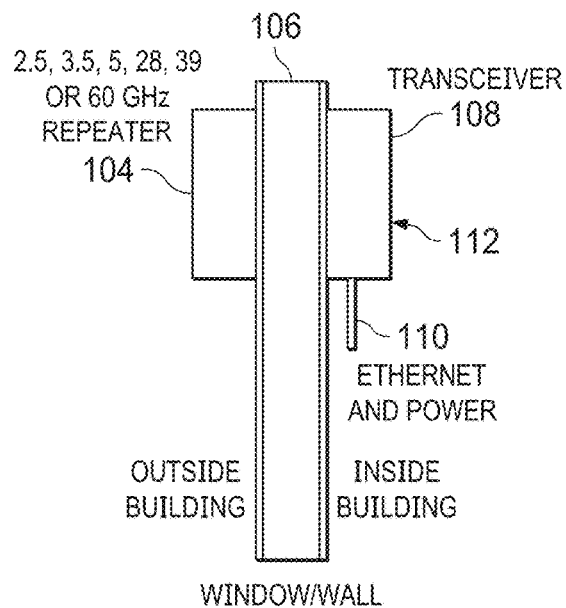
FIG. 1 is a block diagram of a building penetration system.

Referring now to the drawings, wherein like reference numbers are used herein to designate like elements throughout, the various views and embodiments of hybrid digital-analog mmwave repeater/relay with full duplex and various embodiments associated therewith are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

One issue with wireless telecommunications is the inability of high frequency RF waves to penetrate through windows and walls of homes and business offices. If a window includes any infrared (TR) shielding in order to save energy within the house or office building, the losses in signals transmitted through the shielding are typically up to 40 or 50 dB. Thus, the millimeter wave system described herein provides the ability to provide tunneling of such optical and high frequency radio waves without requiring the need to drill through the glass, window or building to provide a physical portal therethrough would provide great benefits to wireless communication technologies. This may be done at any frequency that has problems penetrating through the glass or building. Glass is one of the most popular and versatile due to its constantly improving solar and thermal performance. One manner for achieving this performance is through the use of passive and solar control low emissivity coatings. These low emissivity glass materials produce a huge loss for millimeter wave spectrum transmissions and create a huge problem for transmission of millimeter waves through such glass. The system described herein below provides for the ability to allow frequencies having a problem penetrating through a glass or building to be processed in such a manner to enable the signals to be transmitted into or out of a home or building.

Millimeter wave signaling was developed when the FCC devised a band plan making 1300 MHz of the local multipoint distribution service (LMDS) spectrum available within each basic trading area across the United States. The plan allocated two LMDS licenses per BTA (basic trading area), an "A Block" and a "B Block" in each. The A Block license comprised 1150 MHz of total bandwidth, and the B Block license consisted of 150 MHz of total bandwidth. A license holder Teligent developed a system for fixed wireless point to multipoint technology that could send high speed broadband from rooftops to surrounding small and medium-size businesses. However, the system, as well as others provided by Winstar and NextLink, did not succeed and many of the LMDS licenses fell back into the hands of the FCC. These licenses and related spectrum are seen as useful for 5G trials and services.

Additionally there is a need to provide signals between the base station transceivers that are connected to a voice or data transmission network and the devices associated with the homes or buildings enabling the transmission of signals into the interior of the buildings as described more fully herein.

Referring now to FIG. 1, there is illustrated a general block diagram of the building penetration transmission system 102. The building penetration transmission system 102 uses 5G fixed millimeter wave deployments to overcome high building penetration losses due to RF and optical obstructions such as windows, brick and concrete walls. The building penetration transmission system 102 greatly increases the number of enterprise and residential buildings where 5G millimeter wave signals can be used to deliver gigabyte ethernet services. The system provides an optical or RF tunnel through the window or wall 106 without requiring the drilling of any holes or the creation of some type of signal permeable portal within the window or wall. The generation of direction radio waves using the describe system enables the generation of directional beams to tunnel through low-e glass or walls. The system enables link budgets between the interior and exterior transceviers be satisfied. The system greatly increases the number of building that may use millimeter wave signals to deliver Gigabit Ethernet using consumer installed devices.

The building penetration transmission system 102 generally includes an exterior repeater transmitter 104 located on the exterior of the window or wall 106. The repeater transmitter 104 transmits and receives a number of frequencies including 2.5 GHz band, 3.5 GHz band, 5 GHz band, 24 GHz band, 28 GHz band (A1, A2, B1 and B2), 39 GHz band, 60 GHz band, 71 GHz band and 81 GHz band. The 3.5 GHz band is CBRS (Citizens Band Radio Service), the 60 GHz band is V-band and the 71 GHz and 81 GHz are E-band. The repeater transmitter 104 is powered using magnetic resonance or inductive coupling such that the outside unit requires no external power source. The repeater 104 transmits received signals through the window or wall 106 to a transceiver 108 located on the interior of the building. The transceiver 108 includes an antenna 110 for providing ethernet and/or power connections. The building penetration transmission system 102 may provide one gigabit per second throughput traffic tunneling through a building structure such as a window or wall. The transceiver 108 may include a port 112 providing femto cell connectivity, but in general transmits Wi-Fi indoors using the antenna 110. Alternatively, the ethernet or power connections can be hardwired to the transceiver 108. The building penetration transmission system 102 may be located at any point on a wall or window of a structure. The building penetration transmission system 102 is designed to work with different types of walls and windows in order to enable millimeter wave signals to penetrate different types of structures. The repeater 104 and transceiver 108 are constructed of a metal/plastic design to withstand the harshest environments including precipitation, hot/cold weather and high/low humidity.

The transceiver 108 includes gigabyte ethernet ports, a power output, at least one USB 2.0 port and dual flash image support. The building penetration transmission system 102 provides a range of up to 200 feet (60 m). The system requires a 24 V/M passive gigabyte PoE and has a 20 W maximum power consumption that may be powered using magnetic resonance wireless charging in one embodiment. The system provides 2 GHz of channel bandwidth 60 GHz.

Figure 2:
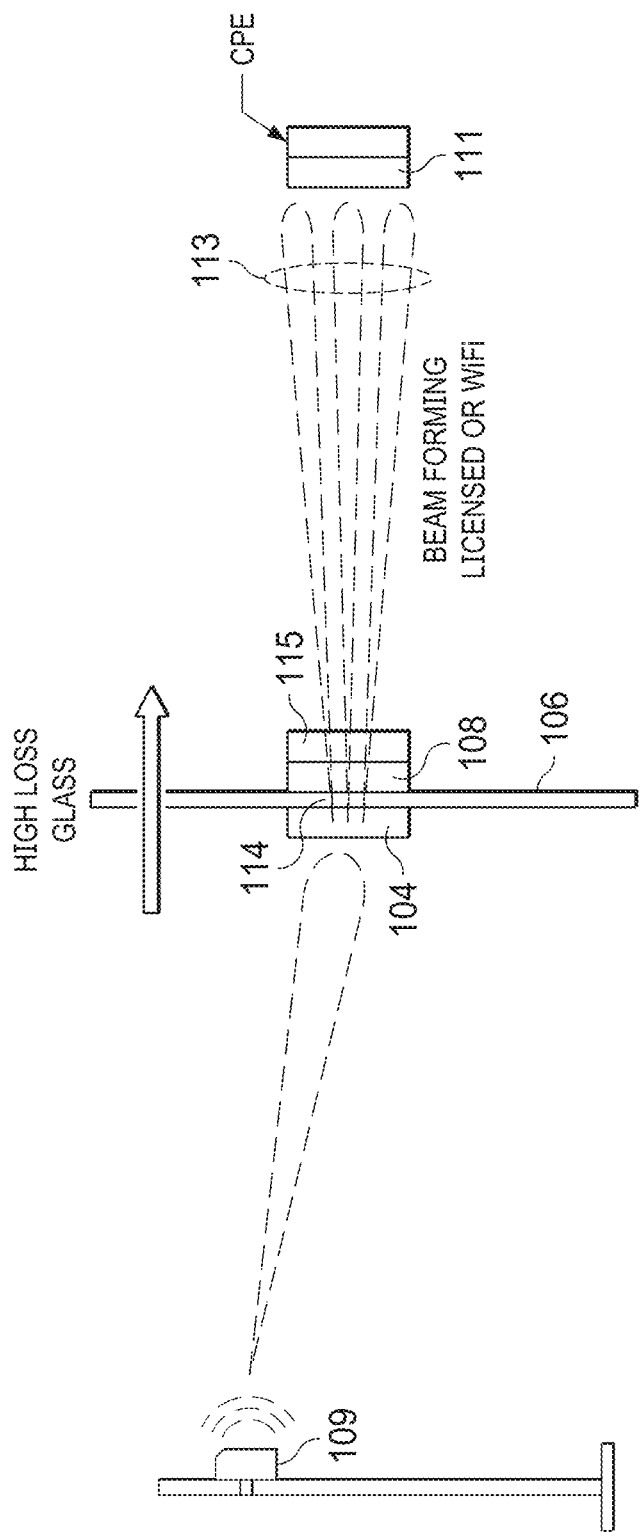
FIG. 2 illustrates the bi-directional nature of the building penetration system for transmissions from the outside.
Figure 3:
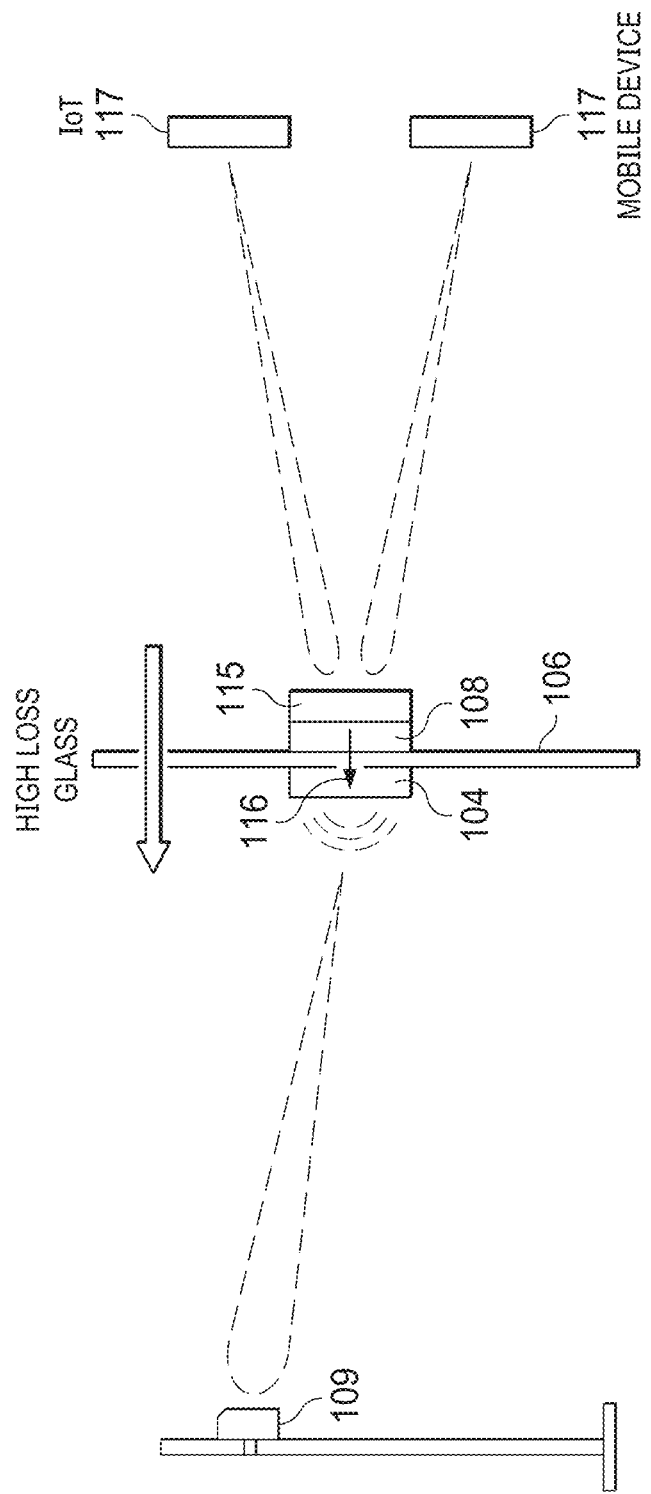
FIG. 3 illustrates the bi-directional nature of the building penetration system for transmissions from the inside.

FIGS. 2 and 3 illustrates the bidirectional communication between transceiver 104 located on the exterior side of the window or wall 106 and transceiver 108 located on the interior side of the window or wall 106. A remote base station transmitter 109 transmits wireless signals to an external transceiver 104. Communication transmissions from the exterior transceiver 104 to the interior transceiver 108 occur over a communications link 114. The signals transmitted to the interior may then be transmitted to consumer premises equipment (CPE) 111 using beam forming or WiFi 113 from an internal router 115. As shown in FIG. 1C, internal devices 117 (such as mobile devices or Internet-of-Things devices) transmit signals to the internal router 115. The internal router 115 provides the signals to the internal transceiver 108. Transmissions from the interior of the window or wall 106 to the exterior are from transceiver 108 to transceiver 104 are on communications link 116. The external transceiver 104 then transmits the signals to the external base station 109. Thus, the system enables bidirectional communications that may utilize RF, optical or other types of communication technologies as more fully described hereinbelow.

Figure 4:
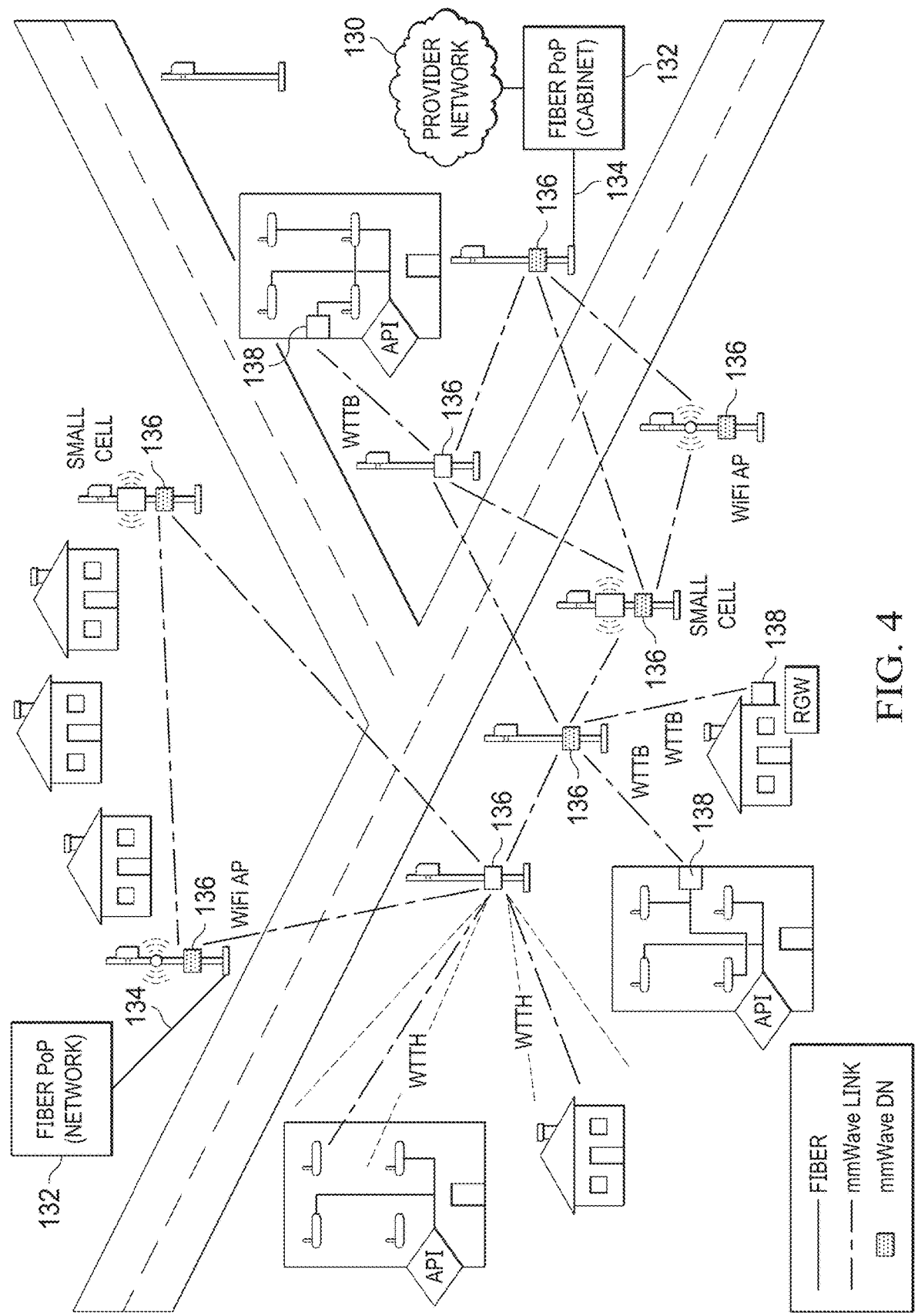
FIG. 4 illustrates a network deployment of the building penetration system of FIG. 1A.

Referring now to FIG. 4, there is illustrated a network deployment of the building penetration system discussed with respect to FIGS. 1-3. A provider network 130 interfaces with the local network through fiber PoP (point of presence) cabinets 132. The cabinets 132 have a fiber link 134 to an access point 136. Each of the access points 136 wirelessly communicates with a network of other access points 136 that are located for example on light poles within a local area over wireless communication links using any number of communication frequencies as will be described herein. The access points 136 communicate with transceiver systems 138 that comprise the building penetration system described herein where in signals are wirelessly transmitted to an external transceiver and then transmitted to the interior of the business or home such that information may be bi-directionally transmitted from the provider network 130 to/from devices located within the interior of various structures. In this manner, data may be provided between the network provider 130 and devices of all types located within the structures using wireless communications that normally would not penetrate to the interior of the structures due to losses occurring by penetration of the signals into the interior of the structures.

Figure 5:
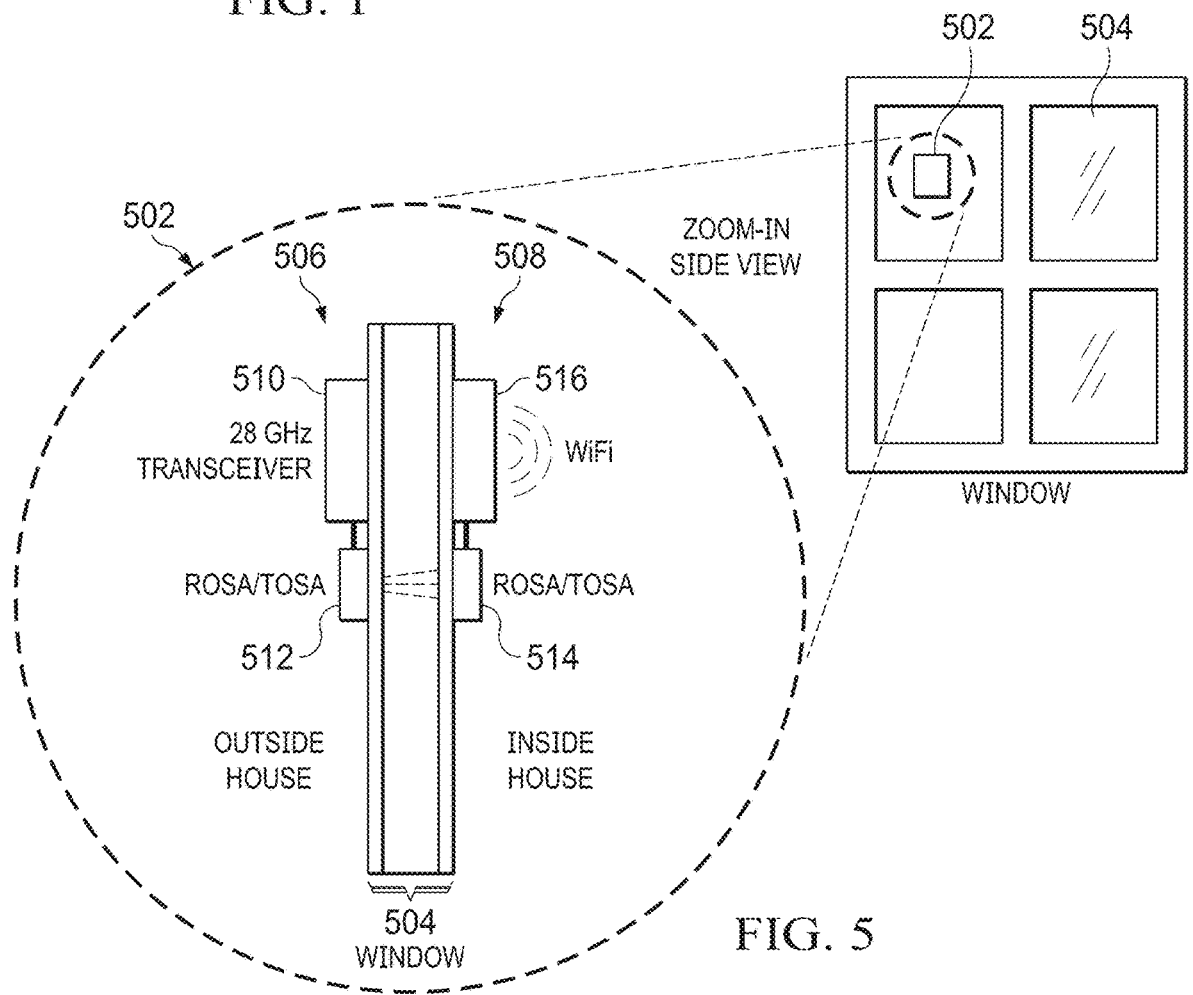
FIG. 5 illustrates a block diagram of an optical bridge for transmitting millimeter wave transmissions through a window.

FIG. 5 illustrates one manner for transmitting millimeter wave signals inside of a building using an optical bridge 502 mounted to a window 504. The optical bridge 502 includes a first portion 506 included on an outside of the window 504 and a second portion 508 included on the inside of the window 504. The first portion 506 includes a 28 GHz transceiver 510 that is mounted on the outside of the window 504. The 28 GHz transceiver 510 receives the millimeter wave transmissions that are being transmitted from, for example, a base station 104 such as that described with respect to FIG. 1. The received/transmitted signals are transmitted to and from the transceiver 510 using a receiver optical subassembly (ROSA)/transmission optical subassembly (TOSA) 512. A receiver optical subassembly is a component used for receiving optical signals in a fiber optic system. Similarly, a transceiver optical subassembly is a component used for transmitting optical signals in a fiber optic system. ROSA/TOSA component 512 transmits or receives the optical signals through the window 504 to a ROSA/TOSA component 514 located on the inside of the window 504. The signals are forwarded from the ROSA/TOSA 514 to a Wi-Fi transmitter 516 for transmissions within the building.

Figure 6:
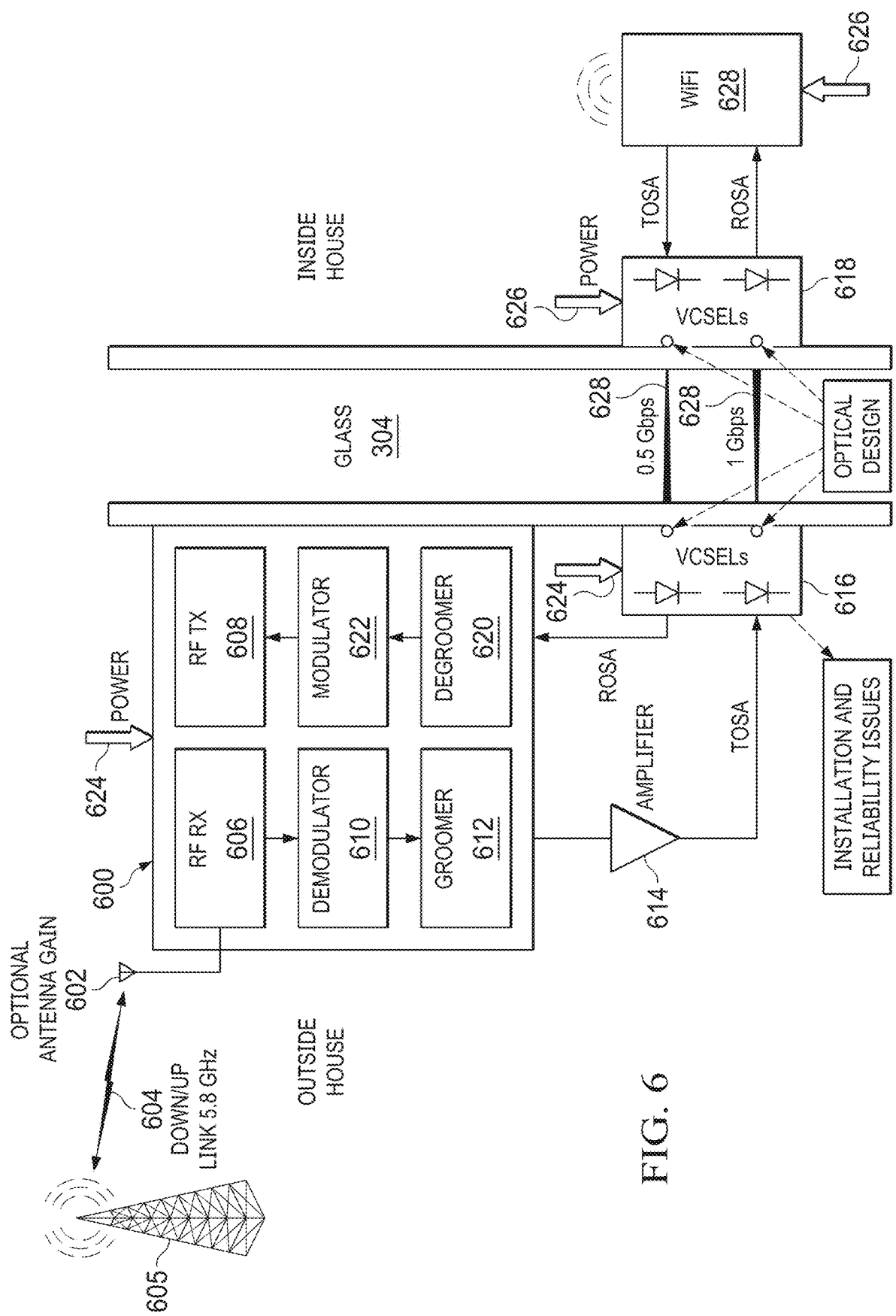
FIG. 6 is a more detailed block diagram of the millimeter wave regeneration and retransmission circuitry.

Referring now to FIG. 6, there is illustrated a more detailed illustration of the components for transmitting millimeter wave transmissions through a window or wall of a building. The transceiver 600 includes an optional antenna gain element 602 for receiving the millimeter wave transmissions transmitted on a down/up link 604 from a base station 605. The down/uplink 604 comprises a 28 GHz beam transmission. However other frequency transmissions may also be utilized. An RF receiver 606 is used for receiving information from the base station 204 over the down/up link 604. Similarly, the RF transmitter 608 is used for transmitting information on the down/up link 604 to a base station 605. Receive signals are provided to a demodulator 610 for demodulation of any received signals. The demodulated signals are provided to a groomer 612 which places the signals in the appropriate configuration for transmission by the optical transmission components. When translating different modulations (say from a high order QAM to OOK (On-Off Keying)), there are signaling conversions that require some grooming (or signal conditioning) to ensure all bits translate properly and still provide a low BER. The present system translates from RF at a high QAM rate to raw bit rates of OOK to enable transmissions using the VCSELs to go through the glass of the window. VCSELs only work with OOK and therefore a translation using the groomer 612 is needed. If a received signal were just down-convert from 28 GHz directly to 5.8 GHz (because 5.8 GHz does pass through the wall and glass), then we do not need to worry about complications of translating to low order modulation. The problem is that down-converting signal from 28 GHz to 5.8 GHz requires expensive components. The groomer 612 completes the translation of the received 28 GHz signal to a frequency for transmission through a glass or wall without the more expensive components.

The signals to be transmitted are passed through an amplifier 614 to amplify the signal for transmission. The amplified signal is provided to VCSELs 616 for optically transmitting the signal. The VCSEL 616 is a vertical cavity surface emitting laser that is a type of semiconductor laser diode with laser beam omissions perpendicular from the top surface. In a preferred embodiment, the VCSEL 616 comprises a Finisar VCSEL having a wavelength of approximately 780 nm, a modulation rate of 4 Gb per second and an optical output power of 2.2 mW (3.4 to dBm). In alternative embodiments the components for transmitting the optical signals across the window 604 may comprise an LED (light emitting diode) or EEL (edge emitting lasers). The different lasers enable different optical re-transmissions at different frequencies based on different characteristics of a window such as tint.

The VCSEL 616 includes a transmission optical subassembly (TOSA) for generating the optical signals for transmission from VCSEL 616 to VCSEL 618 located on the opposite side of the window 604. The VCSELs 616 and 618 comprise a laser source for generating the optical signals for transmission across the window 604. In one embodiment, the VCSEL comprises a Finisar VCSEL that provides a 780 nm optical signal having a maximum modulation rate of 4

Gb per second when running at 1 Gb per second and an optical output power of 3 mW (5 dBm). The TOSA includes a laser device or LED device for converting electrical signals from the amplifier 614 into light signal transmissions. Transmissions from the outside VCSEL 616 to the inside VCSEL 418 and an associated receiver optical subassembly (ROSA).

The optical signals are transmitted through the window 604 using optical focusing circuitry 617. The optical link 628 between VCSEL 616 and VCSEL 618 has an optical link budget associated therewith that defines the losses that may be accepted while still transmitting the information between the VCSELs 616, 618. The VCSEL has an output power of approximately 5 dBm. The detector at the receiver within the VCSEL can detect a signal at approximately −12 dBm. The glass losses associated with the optical signal passing through the glass at a wavelength of 780 nm is 7.21 dB. The coupling loss and lens gain associated with the transmission is approximately 0.1 dB. The maximum displacement loss caused by a lens displacement of 3.5 mm is 6.8 dB. Thus, the total link margin equals 2.88 dB based upon a subtraction of the detector sensitivity, glass losses, coupling loss and lens gain and maximum displacement loss from the VCSEL output power. The 2.88 dB link margin is provided for unexpected an extra losses such as len's losses and unexpected output variances.

Figure 7:
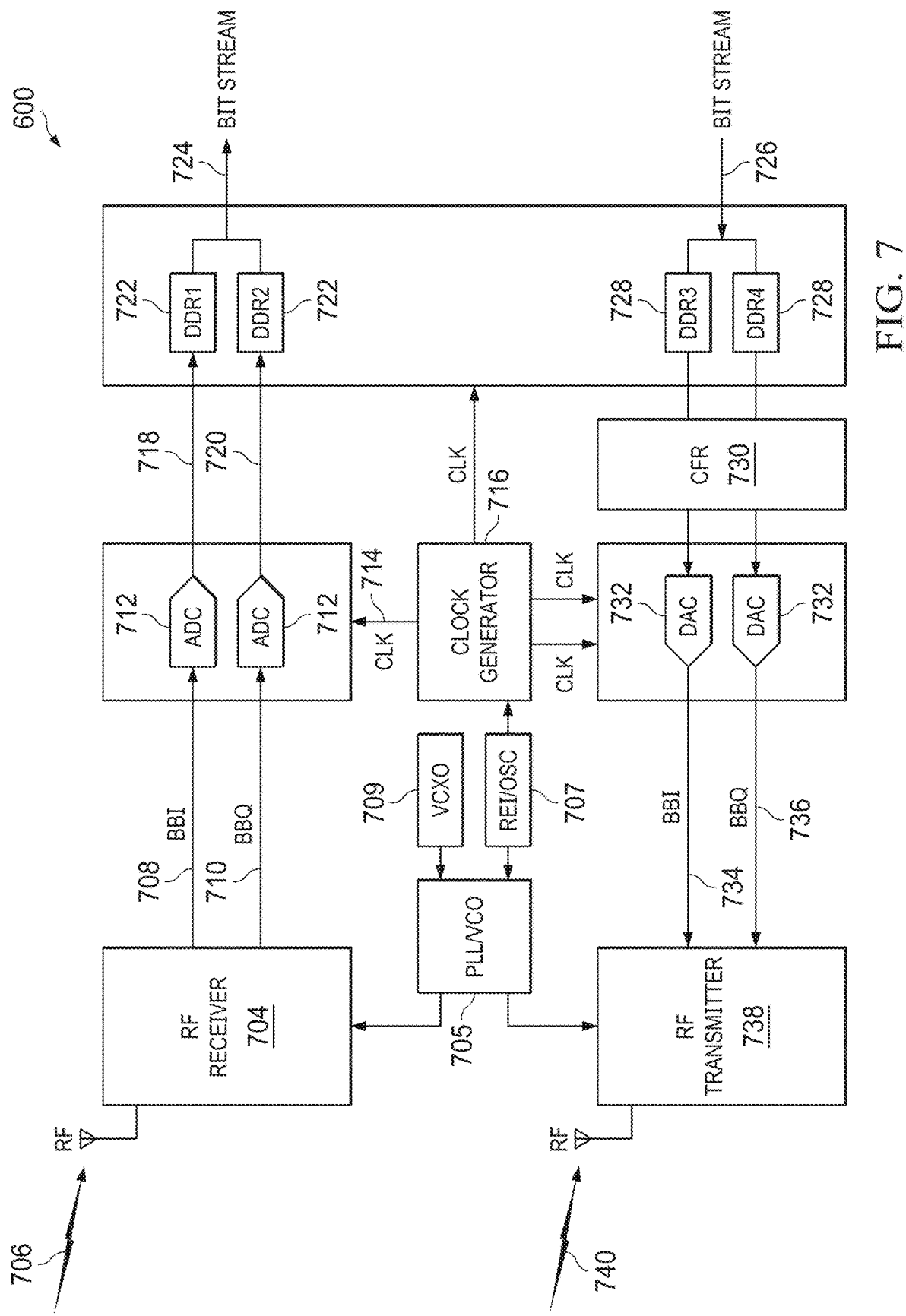
FIG. 7 illustrates the RF transceiver circuitry of the millimeter wave regeneration and retransmission circuitry.

Referring now to FIG. 7 there is illustrated a more detailed block diagram of the transceiver 310. The receiver portion 702 includes an RF receiver 704 for receiving the RF signals transmitted from the base station on the downlink 706. The receiver 704 generates output signals having a real portion BBI 708 and an imaginary portion BBQ 710. The RF receiver 704 generates the real signal 708 and imaginary signal 710 responsive to the receive signal and inputs from a phase locked loop/voltage control oscillator 705. The phase locked loop/voltage control oscillator 705 provides inputs to the RF receiver 704 responsive to a reference oscillator signal provided from reference oscillator 707 and a voltage controlled oscillator signal provided from oscillator 709. The real signal 708 and the imaginary signal 710 are provided to analog-to-digital converters 712 for conversion to a digital signal. The analog-to-digital converters 712 are clocked by an associated clock input 714 provided from clock generation circuit 716. The clock generation circuit 716 also receives an input from the reference oscillator 707. The real and imaginary digital signals 718 and 720 are input to a digital down converter 722. The digital signals are down converted to a lower frequency and output as a bit stream 724 to the optical transmission circuitry (VCSEL) for transmitting across the window glass.

The transmitter portion 724 receives a digital bitstream 726 from the optical circuitry and provides this bitstream to the real and imaginary portions of digital up converters 728 to convert the digital data to a higher frequency for transmission. The real and imaginary portions of the up-converted digital signal are provided to a crest factor reduction processor 730. Some signals (especially OFDM-based systems) have high peak-to-average power ratio (PAR) that negatively impacts the efficiency of power amplifiers (PAs). Crest factor reduction (CFR) schemes implemented by the processor help reduce PAR and have been used for many networks (CDMA & OFDM). However, CFR schemes developed primarily for CDMA signals have a poor performance when used in in OFDM (given the tight error vector magnitude (EVM) requirements). With a well-designed CFR algorithm on FPGAs, one can achieve low-latency, high-performance that can significantly reduce the PAR of the output signal which improves PA efficiency and reduced cost.

The real and imaginary signals are provided from the crest factor reduction processor 730 to a digital to analog converter 732. The digital to analog converter 732 converts the real and imaginary digital signals into real and imaginary analog signals BBI 734 and BBQ 736. The real and imaginary analog signals are inputs to the RF transmitter 738. The RF transmitter 738 processes the real signal 734 and imaginary signal 736 responsive to input from the phase locked loop/voltage control oscillator 704 to generate RF signals for transmission on the uplink 740 to generate the millimeter wave and transmissions.

Figure 8:
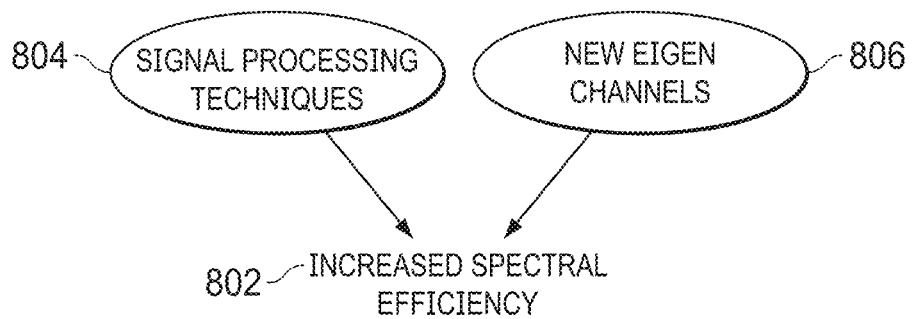
FIG. 8 illustrates various techniques for increasing spectral efficiency within a transmitted signal.
Figure 9:
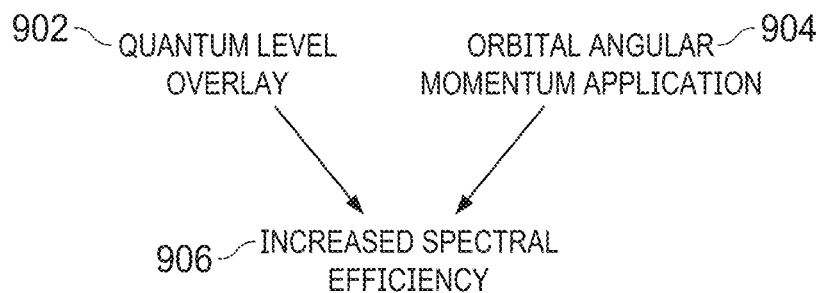
FIG. 9 illustrates a particular technique for increasing spectral efficiency within a transmitted signal.

Referring now to FIG. 8, the communication system configuration introduces two techniques, one from the signal processing techniques 804 category and one from the creation of new eigen channels 806 category that are entirely independent from each other. Their combination provides a unique manner to disrupt the access part of an end to end communications system from twisted pair and cable to fiber optics, to free space optics, to RF used in cellular, backhaul and satellite. The first technique involves the use of a new signal processing technique using new orthogonal signals to upgrade QAM modulation using non sinusoidal functions. This particular embodiment is referred to as quantum level overlay (QLO) 902 as shown in FIG. 9. The second embodiment involves the application of new electromagnetic wavefronts using a property of electromagnetic waves or photon, called orbital angular momentum (QAM) 904. Application of each of the quantum level overlay techniques 902 and orbital angular momentum application 904 uniquely offers orders of magnitude higher spectral efficiency 906 within communication systems in their combination.

With respect to the quantum level overlay technique 902, new eigen functions are introduced that when overlapped (on top of one another within a symbol) significantly increases the spectral efficiency of the system. The quantum level overlay technique 302 borrows from quantum mechanics, special orthogonal signals that reduce the time bandwidth product and thereby increase the spectral efficiency of the channel. Each orthogonal signal is overlaid within the symbol acts as an independent channel. These independent channels differentiate the technique from existing modulation techniques.

With respect to the application of orbital angular momentum 904, this embodiment introduces twisted electromagnetic waves, or light beams, having helical wave fronts that carry orbital angular momentum (OAM). Different OAM carrying waves/beams can be mutually orthogonal to each other within the spatial domain, allowing the waves/beams to be efficiently multiplexed and demultiplexed within a communications link. OAM beams are interesting in communications due to their potential ability in special multiplexing multiple independent data carrying channels.

With respect to the combination of quantum level overlay techniques 902 and orbital angular momentum application 904, the combination is unique as the OAM multiplexing technique is compatible with other electromagnetic techniques such as wave length and polarization division multiplexing. This suggests the possibility of further increasing system performance. The application of these techniques together in high capacity data transmission disrupts the access part of an end to end communications system from twisted pair and cable to fiber optics, to free space optics, to RF used in cellular/backhaul and satellites.

Each of these techniques can be applied independent of one another, but the combination provides a unique opportunity to not only increase spectral efficiency, but to increase spectral efficiency without sacrificing distance or signal to noise ratios.

Using the Shannon Capacity Equation, a determination may be made if spectral efficiency is increased. This can be mathematically translated to more bandwidth. Since bandwidth has a value, one can easily convert spectral efficiency gains to financial gains for the business impact of using higher spectral efficiency. Also, when sophisticated forward error correction (FEC) techniques are used, the net impact is higher quality but with the sacrifice of some bandwidth. However, if one can achieve higher spectral efficiency (or more virtual bandwidth), one can sacrifice some of the gained bandwidth for FEC and therefore higher spectral efficiency can also translate to higher quality.

Telecom operators and vendors are interested in increasing spectral efficiency. However, the issue with respect to this increase is the cost. Each technique at different layers of the protocol has a different price tag associated therewith. Techniques that are implemented at a physical layer have the most impact as other techniques can be superimposed on top of the lower layer techniques and thus increase the spectral efficiency further. The price tag for some of the techniques can be drastic when one considers other associated costs. For example, the multiple input multiple output (MIMO) technique uses additional antennas to create additional paths where each RF path can be treated as an independent channel and thus increase the aggregate spectral efficiency. In the MIMO scenario, the operator has other associated soft costs dealing with structural issues such as antenna installations, etc. These techniques not only have tremendous cost, but they have huge timing issues as the structural activities take time and the achieving of higher spectral efficiency comes with significant delays which can also be translated to financial losses.

The quantum level overlay technique 902 has an advantage that the independent channels are created within the symbols without needing new antennas. This will have a tremendous cost and time benefit compared to other techniques. Also, the quantum layer overlay technique 902 is a physical layer technique, which means there are other techniques at higher layers of the protocol that can all ride on top of the QLO techniques 902 and thus increase the spectral efficiency even further. QLO technique 902 uses standard QAM modulation used in OFDM based multiple access technologies such as WIMAX or LTE. QLO technique 902 basically enhances the QAM modulation at the transceiver by injecting new signals to the I & Q components of the baseband and overlaying them before QAM modulation as will be more fully described herein below. At the receiver, the reverse procedure is used to separate the overlaid signal and the net effect is a pulse shaping that allows better localization of the spectrum compared to standard QAM or even the root raised cosine. The impact of this technique is a significantly higher spectral efficiency.

Figure 10:
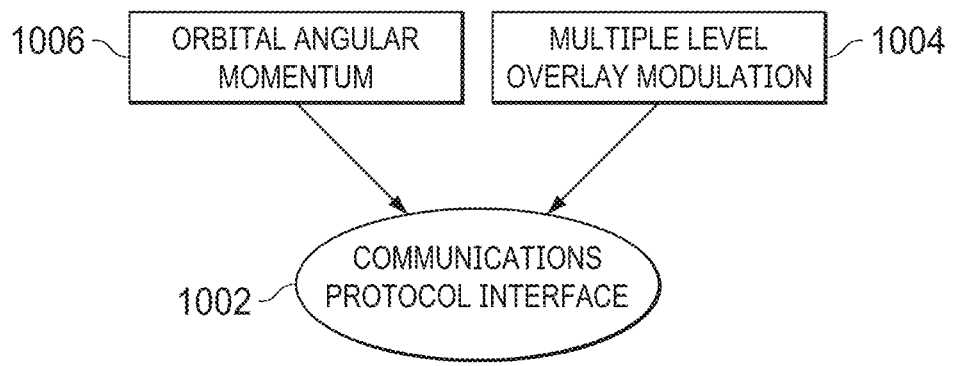
FIG. 10 illustrates a general overview of the manner for providing communication bandwidth between various communication protocol interfaces.

Referring now more particularly to FIG. 10, there is illustrated a general overview of the manner for providing improved communication bandwidth within various communication protocol interfaces 1002, using a combination of multiple level overlay modulation 1004 and the application of orbital angular momentum 1006 to increase the number of communications channels. The following discussions of orbital angular momentum processing and multiple level overlay modulation illustrate two techniques that may or may not be implemented in RF transmissions in the below described systems and embodiments. RF transmissions may be configured to implement one, both or neither of the techniques in the described embodiments.

The various communication protocol interfaces 1002 may comprise a variety of communication links, such as RF communication, wireline communication such as cable or twisted pair connections, or optical communications making use of light wavelengths such as fiber-optic communications or free-space optics. Various types of RF communications may include a combination of RF microwave or RF satellite communication, as well as multiplexing between RF and free-space optics in real time.

By combining a multiple layer overlay modulation technique 1004 with orbital angular momentum (OAM) technique 1006, a higher throughput over various types of communication links 1002 may be achieved. The use of multiple level overlay modulation alone without OAM increases the spectral efficiency of communication links 1002, whether wired, optical, or wireless. However, with OAM, the increase in spectral efficiency is even more significant.

Multiple overlay modulation techniques 1004 provide a new degree of freedom beyond the conventional 2 degrees of freedom, with time T and frequency F being independent variables in a two-dimensional notational space defining orthogonal axes in an information diagram. This comprises a more general approach rather than modeling signals as fixed in either the frequency or time domain. Previous modeling methods using fixed time or fixed frequency are considered to be more limiting cases of the general approach of using multiple level overlay modulation 1004. Within the multiple level overlay modulation technique 1004, signals may be differentiated in two-dimensional space rather than along a single axis. Thus, the information-carrying capacity of a communications channel may be determined by a number of signals which occupy different time and frequency coordinates and may be differentiated in a notational two-dimensional space.

Within the notational two-dimensional space, minimization of the time bandwidth product, i.e., the area occupied by a signal in that space, enables denser packing, and thus, the use of more signals, with higher resulting information-carrying capacity, within an allocated channel. Given the frequency channel delta ($\Delta f$), a given signal transmitted through it in minimum time $\Delta t$ will have an envelope described by certain time-bandwidth minimizing signals. The time-bandwidth products for these signals take the form;

$$\Delta t \Delta f = \tfrac{1}{2}(2n+1)$$

where n is an integer ranging from 0 to infinity, denoting the order of the signal.

These signals form an orthogonal set of infinite elements, where each has a finite amount of energy. They are finite in both the time domain and the frequency domain, and can be detected from a mix of other signals and noise through correlation, for example, by match filtering. Unlike other wavelets, these orthogonal signals have similar time and frequency forms.

The orbital angular momentum process 1006 provides a twist to wave fronts of the electromagnetic fields carrying the data stream that may enable the transmission of multiple data streams on the same frequency, wavelength, or other signal-supporting mechanism. This will increase the bandwidth over a communications link by allowing a single frequency or wavelength to support multiple eigen channels, each of the individual channels having a different orthogonal and independent orbital angular momentum associated therewith.

Figure 11:
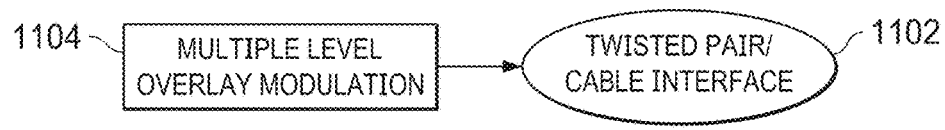
FIG. 11 illustrates the manner for utilizing multiple level overlay modulation with twisted pair/cable interfaces.

Referring now to FIG. 11, there is illustrated a further communication implementation technique using the above described techniques as twisted pairs or cables carry electrons (not photons). Rather than using each of the multiple level overlay modulation 1004 and orbital angular momentum techniques 1006, only the multiple level overlay modulation 1004 can be used in conjunction with a single wireline interface and, more particularly, a twisted pair communication link or a cable communication link 1102. The operation of the multiple level overlay modulation 1104, is similar to that discussed previously with respect to FIG. 10, but is used by itself without the use of orbital angular momentum techniques 1006, and is used with either a twisted pair communication link or cable interface communication link 1102.

Figure 12:
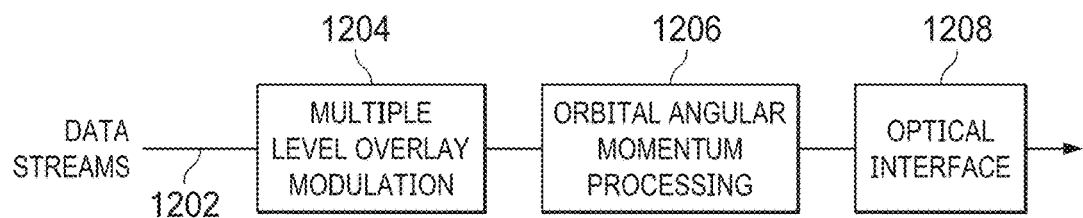
FIG. 12 illustrates a general block diagram for processing a plurality of data streams within an optical communication system.

Referring now to FIG. 12, there is illustrated a general block diagram for processing a plurality of data streams 1202 for transmission in an optical communication system. The multiple data streams 1202 are provided to the multi-layer overlay modulation circuitry 1204 wherein the signals are modulated using the multi-layer overlay modulation technique. The modulated signals are provided to orbital angular momentum processing circuitry 1206 which applies a twist to each of the wave fronts being transmitted on the wavelengths of the optical communication channel. The twisted waves are transmitted through the optical interface 1208 over an optical communications link such as an optical fiber or free space optics communication system. FIG. 12 may also illustrate an RF mechanism wherein the interface 1208 would comprise and RF interface rather than an optical interface.

Figure 13:
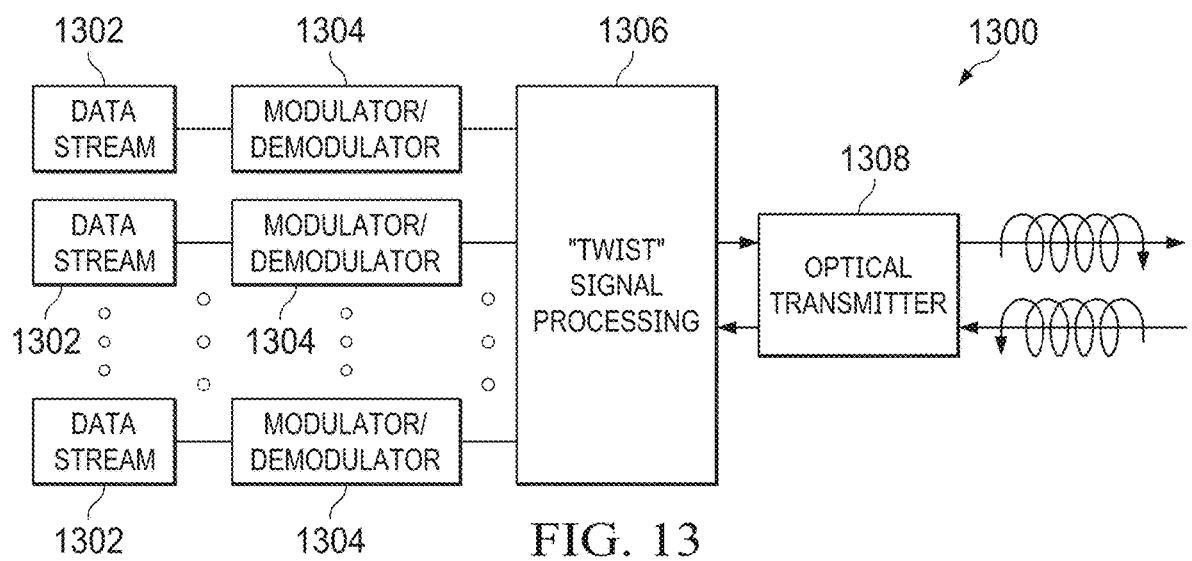
FIG. 13 is a functional block diagram of a system for generating orbital angular momentum within a communication system.

Referring now more particularly to FIG. 13, there is illustrated a functional block diagram of a system for generating the orbital angular momentum "twist" within a communication system, such as that illustrated with respect to FIG. 10, to provide a data stream that may be combined with multiple other data streams for transmission upon a same wavelength or frequency. Multiple data streams 1302 are provided to the transmission processing circuitry 1300. Each of the data streams 1302 comprises, for example, an end to end link connection carrying a voice call or a packet connection transmitting non-circuit switch packed data over a data connection. The multiple data streams 1302 are processed by modulator/demodulator circuitry 1304. The modulator/demodulator circuitry 1304 modulates the received data stream 1302 onto a wavelength or frequency channel using a multiple level overlay modulation technique, as will be more fully described herein below. The communications link may comprise an optical fiber link, free-space optics link, RF microwave link, RF satellite link, wired link (without the twist), etc.

The modulated data stream is provided to the orbital angular momentum (OAM) signal processing block 1306. Each of the modulated data streams from the modulator/demodulator 1304 are provided a different orbital angular momentum by the orbital angular momentum electromagnetic block 1306 such that each of the modulated data streams have a unique and different orbital angular momentum associated therewith. Each of the modulated signals having an associated orbital angular momentum are provided to an optical transmitter 1308 that transmits each of the modulated data streams having a unique orbital angular momentum on a same wavelength. Each wavelength has a selected number of bandwidth slots B and may have its data transmission capability increase by a factor of the number of degrees of orbital angular momentum 1 that are provided from the OAM electromagnetic block 1306. The optical transmitter 1308 transmitting signals at a single wavelength could transmit B groups of information. The optical transmitter 1308 and OAM electromagnetic block 1306 may transmit 1×B groups of information according to the configuration described herein.

In a receiving mode, the optical transmitter 1308 will have a wavelength including multiple signals transmitted therein having different orbital angular momentum signals embedded therein. The optical transmitter 1308 forwards these signals to the OAM signal processing block 1306, which separates each of the signals having different orbital angular momentum and provides the separated signals to the demodulator circuitry 1304. The demodulation process extracts the data streams 1302 from the modulated signals and provides it at the receiving end using the multiple layer overlay demodulation technique.

Figure 14:
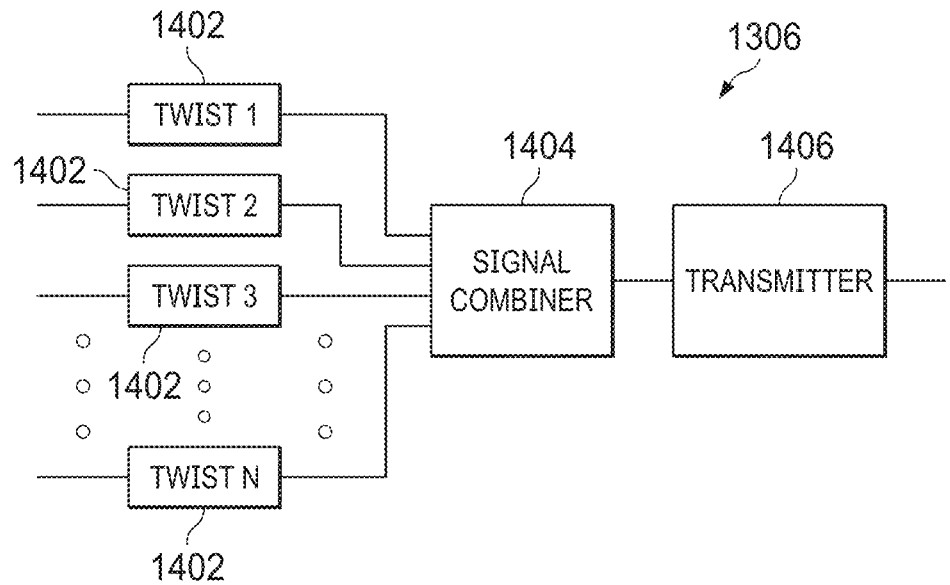
FIG. 14 is a functional block diagram of the orbital angular momentum signal processing block of FIG. 7.

Referring now to FIG. 14, there is provided a more detailed functional description of the OAM signal processing block 1406. Each of the input data streams are provided to OAM circuitry 1402. Each of the OAM circuitry 1402 provides a different orbital angular momentum to the received data stream. The different orbital angular momentums are achieved by applying different currents for the generation of the signals that are being transmitted to create a particular orbital angular momentum associated therewith. The orbital angular momentum provided by each of the OAM circuitries 1402 are unique to the data stream that is provided thereto. An infinite number of orbital angular momentums may be applied to different input data streams using many different currents. Each of the separately generated data streams are provided to a signal combiner 1404, which combines the signals onto a wavelength for transmission from the transmitter 1406.

Figure 15:
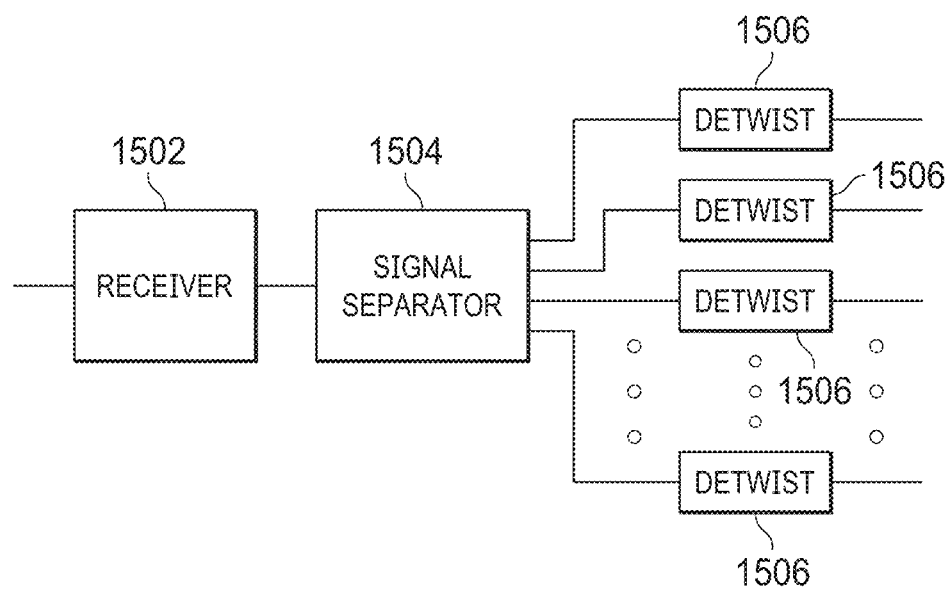
FIG. 15 is a functional block diagram illustrating the manner for removing orbital angular momentum from a received signal including a plurality of data streams.

Referring now to FIG. 15, there is illustrated the manner in which the OAM processing circuitry 1306 may separate a received signal into multiple data streams. The receiver 1502 receives the combined OAM signals on a single wavelength and provides this information to a signal separator 1504. The signal separator 1504 separates each of the signals having different orbital angular momentums from the received wavelength and provides the separated signals to OAM de-twisting circuitry 1506. The OAM de-twisting circuitry 1506 removes the associated OAM twist from each of the associated signals and provides the received modulated data stream for further processing. The signal separator 1504 separates each of the received signals that have had the orbital angular momentum removed therefrom into individual received signals. The individually received signals are provided to the receiver 1502 for demodulation using, for example, multiple level overlay demodulation as will be more fully described herein below.

Figure 16:
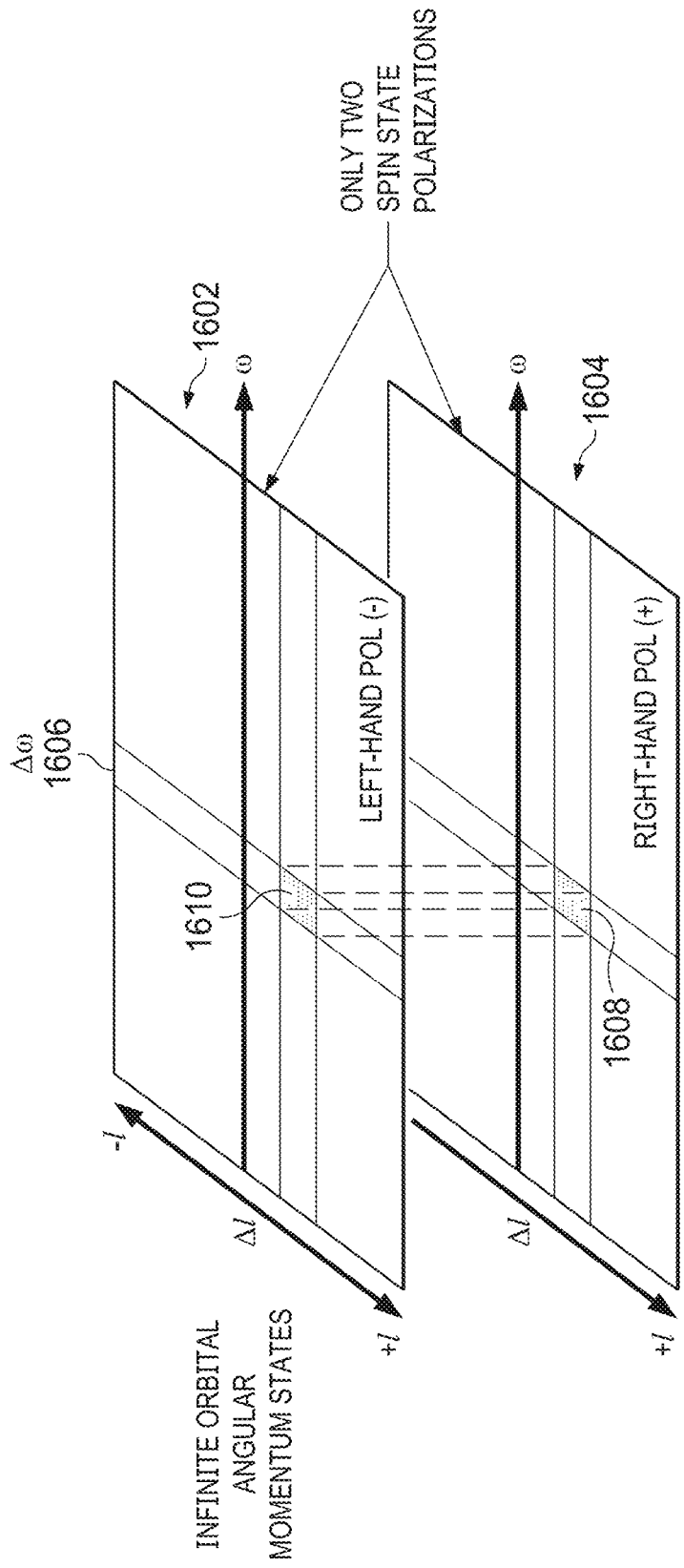
FIG. 16 illustrates a single wavelength having two quanti-spin polarizations providing an infinite number of signals having various orbital angular momentums associated therewith.

FIG. 16 illustrates in a manner in which a single wavelength or frequency, having two quanti-spin polarizations may provide an infinite number of twists having various orbital angular momentums associated therewith. The 1 axis represents the various quantized orbital angular momentum states which may be applied to a particular signal at a selected frequency or wavelength. The symbol omega (ω) represents the various frequencies to which the signals of differing orbital angular momentum may be applied. The top grid 1602 represents the potentially available signals for a left handed signal polarization, while the bottom grid 1604 is for potentially available signals having right handed polarization.

By applying different orbital angular momentum states to a signal at a particular frequency or wavelength, a potentially infinite number of states may be provided at the frequency or wavelength. Thus, the state at the frequency Δω or wavelength 1606 in both the left handed polarization plane 1602 and the right handed polarization plane 1604 can provide an infinite number of signals at different orbital angular momentum states Δl. Blocks 1608 and 1610 represent a particular signal having an orbital angular momentum Δl at a frequency Δω or wavelength in both the right handed polarization plane 1604 and left handed polarization plane 1610, respectively. By changing to a different orbital angular momentum within the same frequency Δω or wavelength 1606, different signals may also be transmitted. Each angular momentum state corresponds to a different determined current level for transmission from the optical transmitter. By estimating the equivalent current for generating a particular orbital angular momentum within the optical domain and applying this current for transmission of the signals, the transmission of the signal may be achieved at a desired orbital angular momentum state.

Thus, the illustration of FIG. 16, illustrates two possible angular momentums, the spin angular momentum, and the orbital angular momentum. The spin version is manifested within the polarizations of macroscopic electromagnetism, and has only left and right hand polarizations due to up and down spin directions. However, the orbital angular momentum indicates an infinite number of states that are quantized. The paths are more than two and can theoretically be infinite through the quantized orbital angular momentum levels.

Using the orbital angular momentum state of the transmitted energy signals, physical information can be embedded within the radiation transmitted by the signals. The Maxwell-Heaviside equations can be represented as:

$$\nabla \cdot E = \frac{\rho}{\varepsilon_0}$$

$$\nabla \times E = -\frac{\partial B}{\partial t}$$

$$\nabla \cdot B = 0$$

$$\nabla \times B = \varepsilon_0 \mu_0 \frac{\partial E}{\partial t} + \mu_0 j(t, x)$$

where ∇ is the del operator, E is the electric field intensity and B is the magnetic flux density. Using these equations, one can derive 23 symmetries/conserved quantities from Maxwell's original equations. However, there are only ten well-known conserved quantities and only a few of these are commercially used. Historically if Maxwell's equations where kept in their original quaternion forms, it would have been easier to see the symmetries/conserved quantities, but when they were modified to their present vectorial form by Heaviside, it became more difficult to see such inherent symmetries in Maxwell's equations.

Maxwell's linear theory is of U(1) symmetry with Abelian commutation relations. They can be extended to higher symmetry group SU(2) form with non-Abelian commutation relations that address global (non-local in space) properties. The Wu-Yang and Harmuth interpretation of Maxwell's theory implicates the existence of magnetic monopoles and magnetic charges. As far as the classical fields are concerned, these theoretical constructs are pseudo-particle, or instanton. The interpretation of Maxwell's work actually departs in a significant ways from Maxwell's original intention. In Maxwell's original formulation, Faraday's electrotronic states (the Aμ field) was central making them compatible with Yang-Mills theory (prior to Heaviside). The mathematical dynamic entities called solitons can be either classical or quantum, linear or non-linear and describe EM waves. However, solitons are of SU(2) symmetry forms. In order for conventional interpreted classical Maxwell's theory of U(1) symmetry to describe such entities, the theory must be extended to SU(2) forms.

Besides the half dozen physical phenomena (that cannot be explained with conventional Maxwell's theory), the recently formulated Harmuth Ansatz also address the incompleteness of Maxwell's theory. Harmuth amended Maxwell's equations can be used to calculate EM signal velocities provided that a magnetic current density and magnetic charge are added which is consistent to Yang-Mills filed equations. Therefore, with the correct geometry and topology, the Aμ potentials always have physical meaning The conserved quantities and the electromagnetic field can be represented according to the conservation of system energy and the conservation of system linear momentum. Time symmetry, i.e. the conservation of system energy can be represented using Poynting's theorem according to the equations:

$$H = \sum_i m_i \gamma_i c^2 + \frac{\varepsilon_0}{2} \int d^3 x (|E|^2 + c^2 |B|^2) \quad \text{Hamiltonian (total energy)}$$

$$\frac{dU^{mech}}{dt} + \frac{dU^{em}}{dt} + \oint_{s'} d^2 x' \hat{n}' \cdot S = 0 \quad \text{conservation of energy}$$

The space symmetry, i.e., the conservation of system linear momentum representing the electromagnetic Doppler shift can be represented by the equations:

$$p = \sum_i m_i \gamma_i v_i + \varepsilon_0 \int d^3 x (E \times B) \quad \text{linear momentum}$$

$$\frac{dp^{mech}}{dt} + \frac{dp^{em}}{dt} + \oint_{s'} d^2 x' \hat{n}' \cdot T = 0 \quad \text{conservation of linear momentum}$$

The conservation of system center of energy is represented by the equation:

$$R = \frac{1}{H} \sum_i (x_i - x_0) m_i \gamma_i c^2 + \frac{\varepsilon_0}{2H} \int d^3 x (x - x_0)(|E|^2 + c^2 |B|^2)$$

Similarly, the conservation of system angular momentum, which gives rise to the azimuthal Doppler shift is represented by the equation:

$$\frac{dJ^{mech}}{dt} + \frac{dJ^{em}}{dt} + \oint_{s'} d^2 x' \hat{n}' \cdot M = 0 \quad \text{conservation of angular momentum}$$

For radiation beams in free space, the EM field angular momentum $J^{em}$ can be separated into two parts:

$$J^{em} = \varepsilon_0 \int_{V'} d^3 x' (E \times A) + \varepsilon_0 \int_{V'} d^3 x' E_i [(x' - x_0) \times \nabla] A_i$$

For each singular Fourier mode in real valued representation:

$$J^{em} = -i\frac{\varepsilon_0}{2\omega}\int_{V'} d^3x'(E^* \times E) - i\frac{\varepsilon_0}{2\omega}\int_{V'} d^3x' E_i[(x'-x_0)\times \nabla]E_i$$

The first part is the EM spin angular momentum Sem, its classical manifestation is wave polarization. And the second part is the EM orbital angular momentum Lem its classical manifestation is wave helicity. In general, both EM linear momentum Pem, and EM angular momentum Jem=Lem+Sem are radiated all the way to the far field.

By using Poynting theorem, the optical vorticity of the signals may be determined according to the optical velocity equation:

$$\frac{\partial U}{\partial t} + \nabla \cdot S = 0, \quad \text{continuity equation}$$

where S is the Poynting vector $$S = \frac{1}{4}(E \times H^* + E^* \times H),$$

and U is the energy density $$U = \frac{1}{4}(\varepsilon|E|^2 + \mu_0|H|^2),$$

with E and H comprising the electric field and the magnetic field, respectively, and $\varepsilon$ and $\mu_0$ being the permittivity and the permeability of the medium, respectively. The optical vorticity V may then be determined by the curl of the optical velocity according to the equation:

$$V = \nabla \times v_{opt} = \nabla \times \left(\frac{E \times H^* + E^* \times H}{\varepsilon|E|^2 + \mu_0|H|^2}\right)$$

Figure 17A:
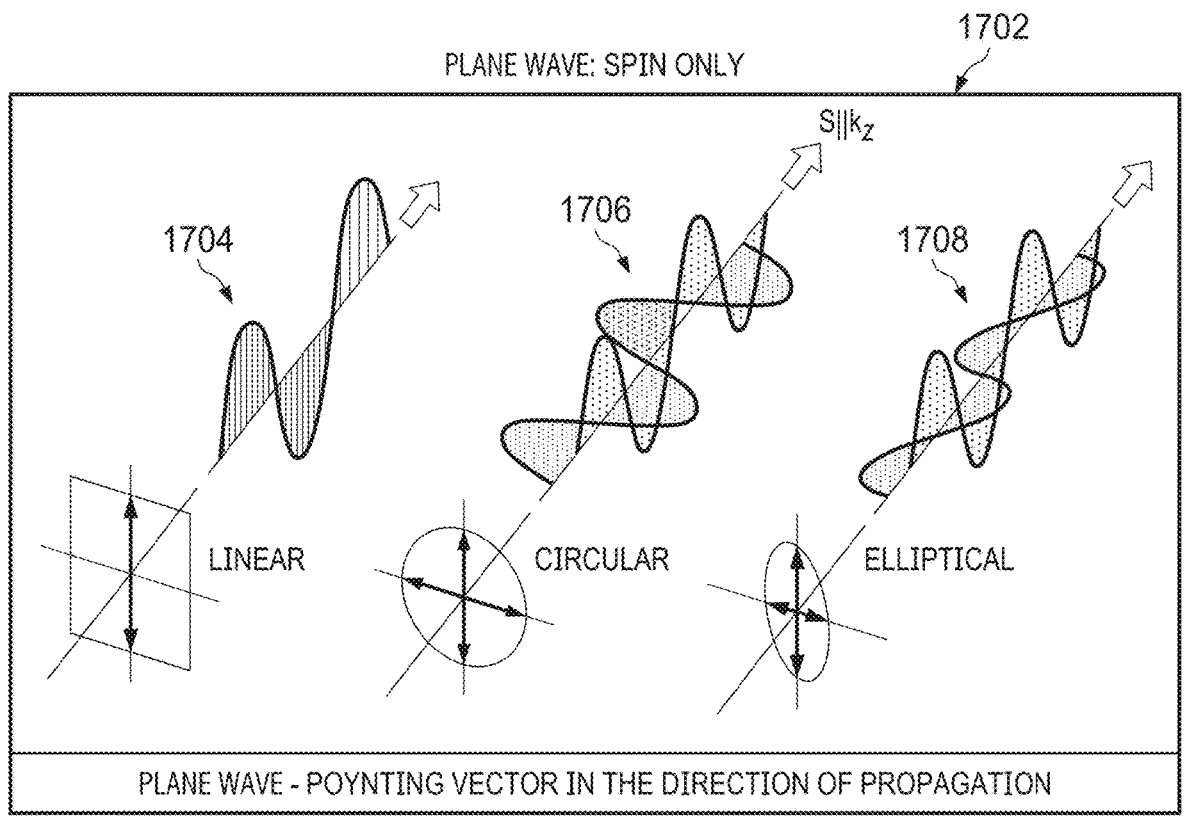
FIG. 17A illustrates a plane wave having only variations in the spin angular momentum.
Figure 17B:
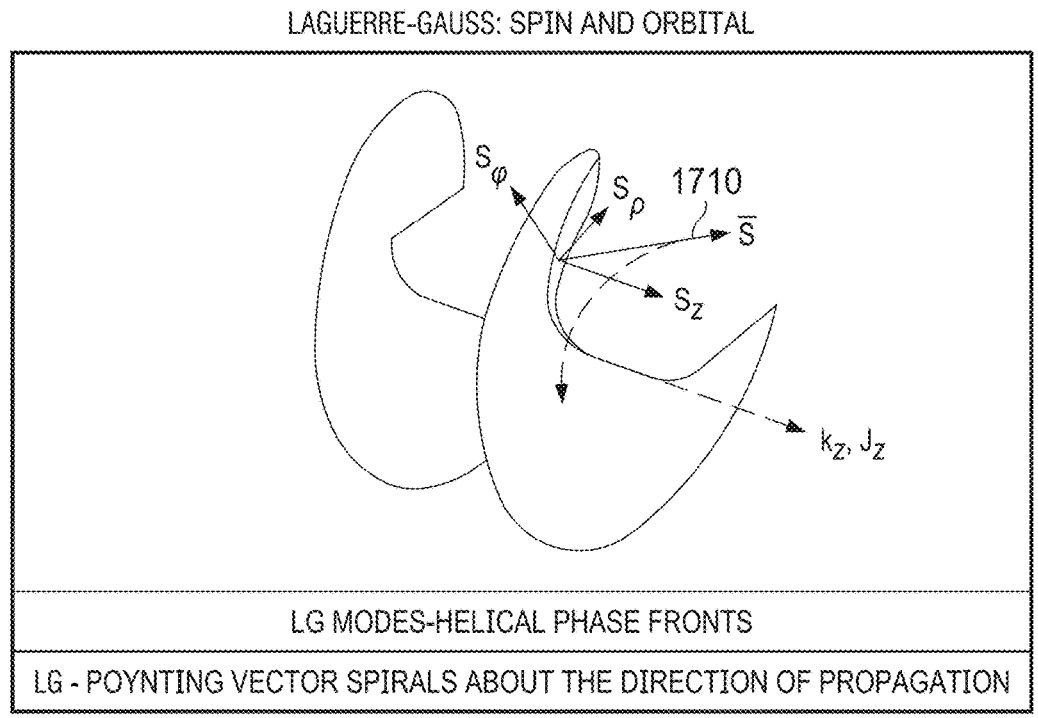
FIG. 17B illustrates a signal having both spin and orbital angular momentum applied thereto.

Referring now to FIGS. 17A and 17B, there is illustrated the manner in which a signal and its associated Poynting vector in a plane wave situation. In the plane wave situation illustrated generally at 1702, the transmitted signal may take one of three configurations. When the electric field vectors are in the same direction, a linear signal is provided, as illustrated generally at 1704. Within a circular polarization 1706, the electric field vectors rotate with the same magnitude. Within the elliptical polarization 1708, the electric field vectors rotate but have differing magnitudes. The Poynting vector remains in a constant direction for the signal configuration to FIG. 17A and always perpendicular to the electric and magnetic fields. Referring now to FIG. 17B, when a unique orbital angular momentum is applied to a signal as described here and above, the Poynting vector S 1710 will spiral about the direction of propagation of the signal. This spiral may be varied in order to enable signals to be transmitted on the same frequency as described herein.

Figure 18A:
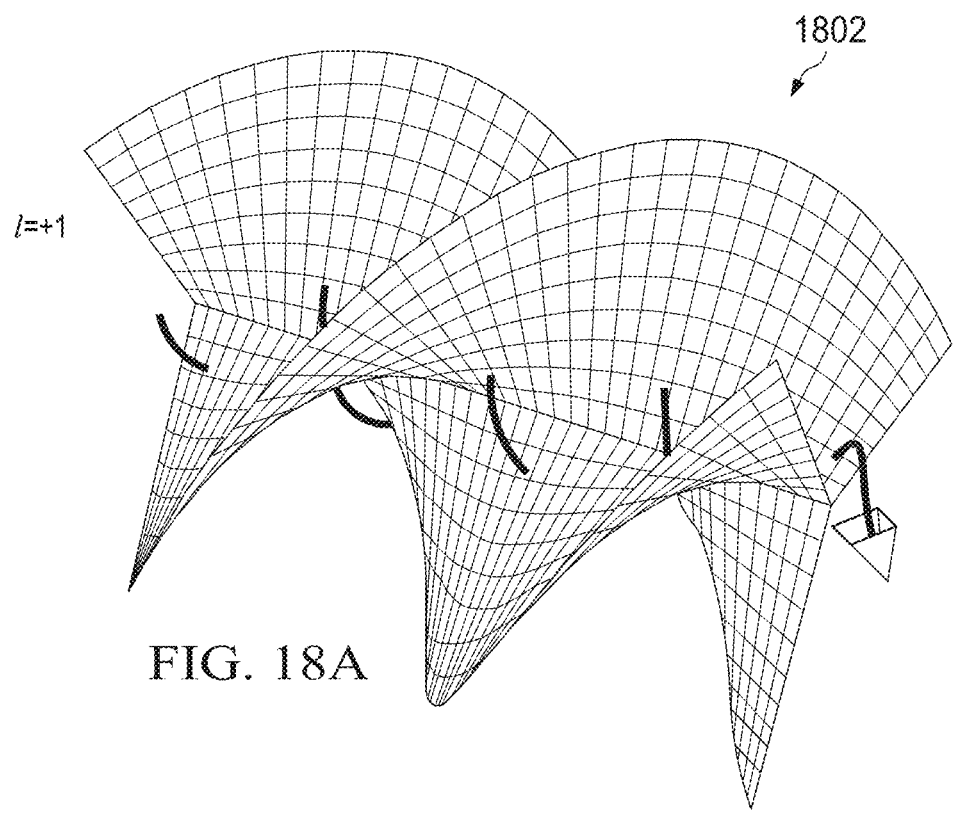
FIGS. 18A-18C illustrate various signals having different orbital angular momentum applied thereto.
Figure 18B:
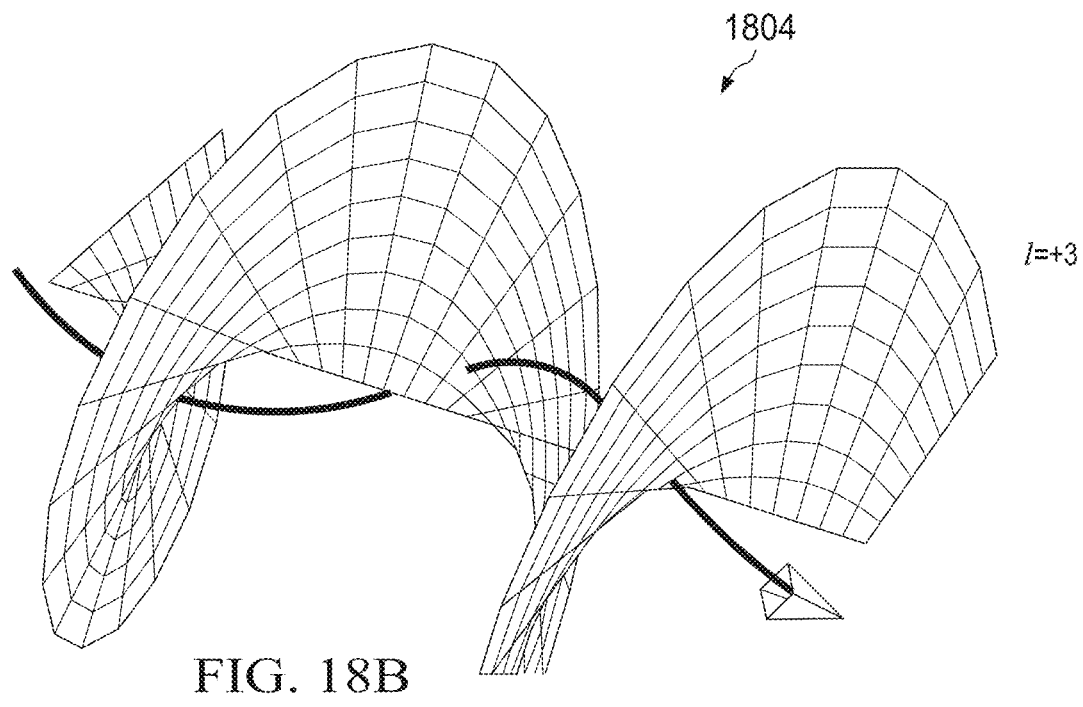
Figure 18C:
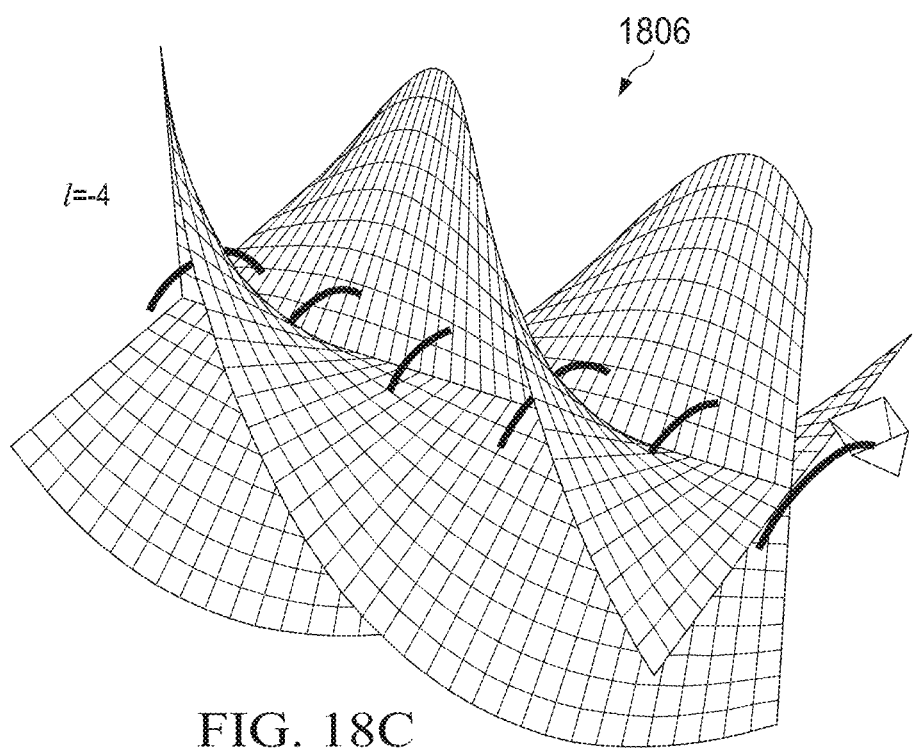

FIGS. 18A through 18C illustrate the differences in signals having different helicity (i.e., orbital angular momentums). Each of the spiraling Poynting vectors associated with the signals 1802, 1804, and 1806 provide a different shaped signal. Signal 1802 has an orbital angular momentum of +1, signal 1804 has an orbital angular momentum of +3, and signal 1806 has an orbital angular momentum of −4. Each signal has a distinct angular momentum and associated Poynting vector enabling the signal to be distinguished from other signals within a same frequency. This allows differing type of information to be transmitted on the same frequency, since these signals are separately detectable and do not interfere with each other (Eigen channels).

Figure 18D:
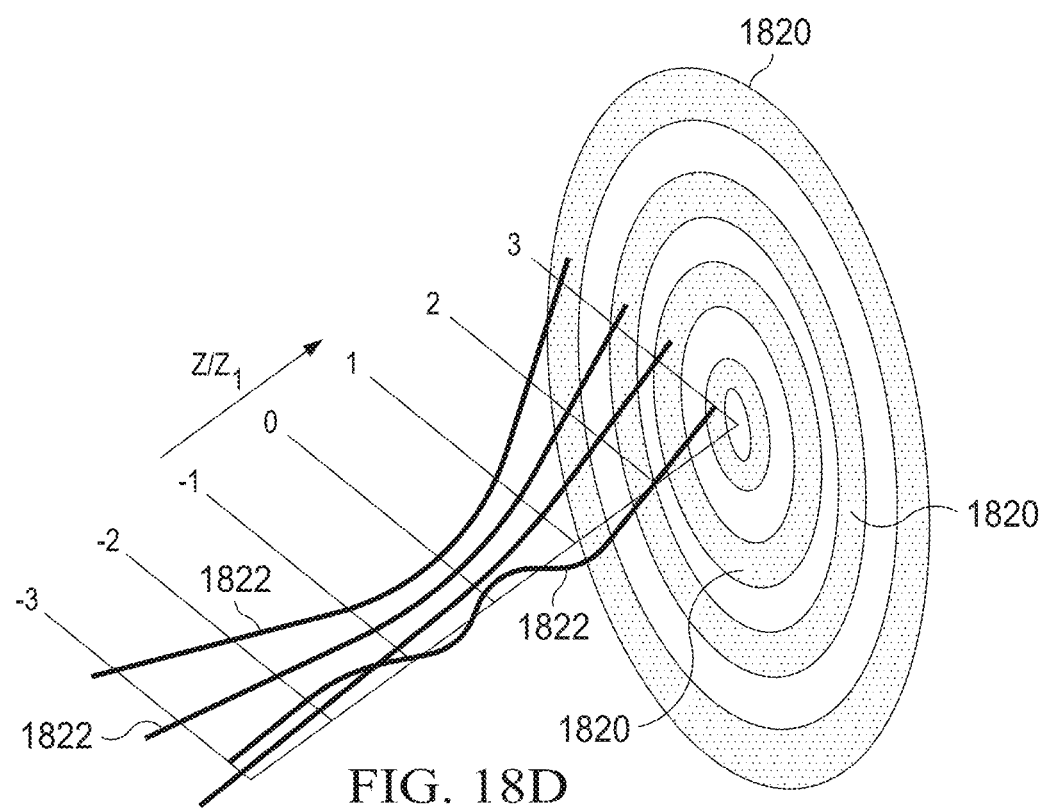
FIG. 18D illustrates a propagation of Poynting vectors for various Eigen modes.

FIG. 18D illustrates the propagation of Poynting vectors for various Eigen modes. Each of the rings 1820 represents a different Eigen mode or twist representing a different orbital angular momentum within the same frequency. Each of these rings 1820 represents a different orthogonal channel. Each of the Eigen modes has a Poynting vector 1822 associated therewith.

Topological charge may be multiplexed to the frequency for either linear or circular polarization. In case of linear polarizations, topological charge would be multiplexed on vertical and horizontal polarization. In case of circular polarization, topological charge would multiplex on left hand and right hand circular polarizations. The topological charge is another name for the helicity index "l" or the amount of twist or OAM applied to the signal. The helicity index may be positive or negative. In RF, different topological charges can be created and muxed together and de-muxed to separate the topological charges.

Figure 18E:
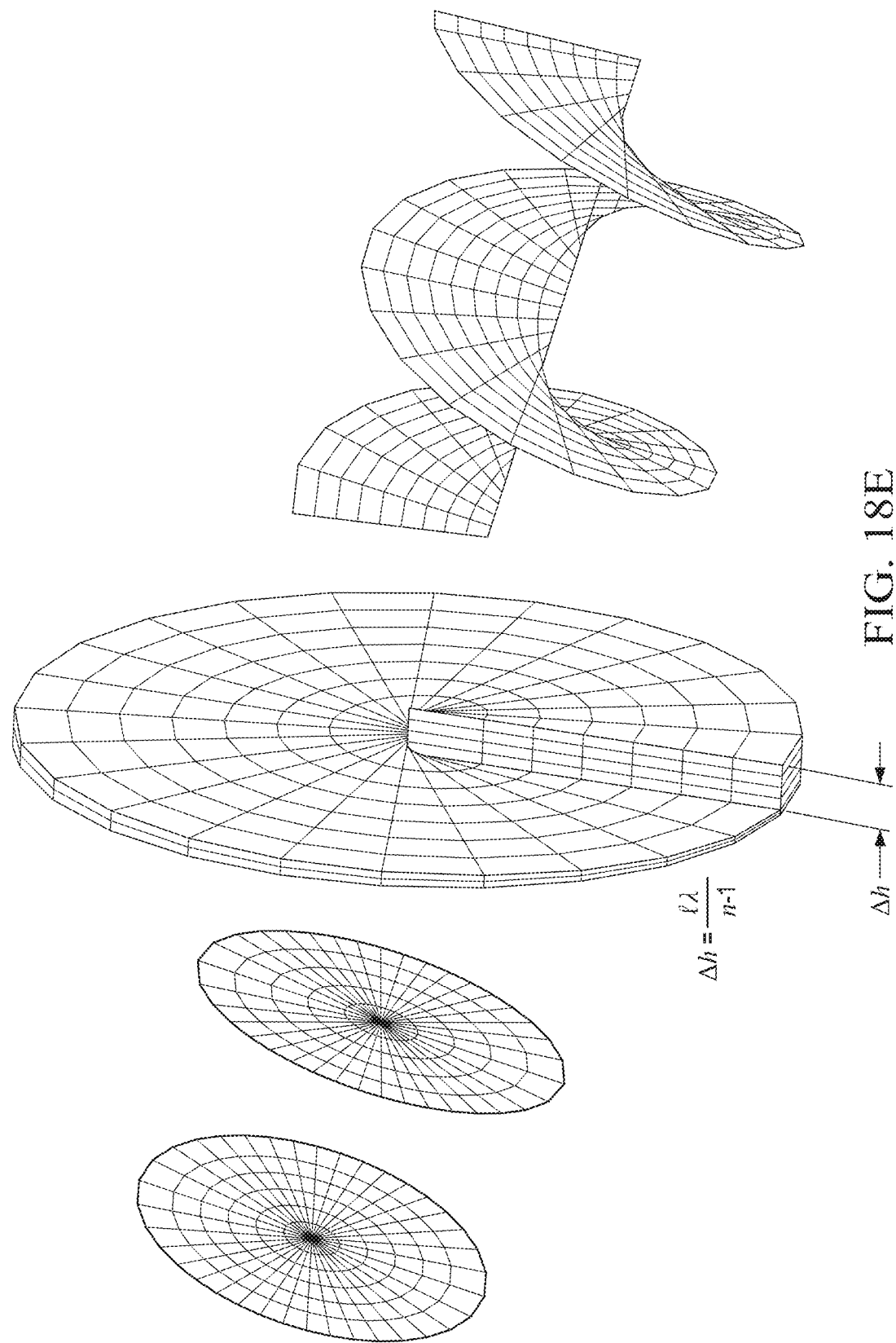
FIG. 18E illustrates a spiral phase plate.

The topological charges l s can be created using Spiral Phase Plates (SPPs) as shown in FIG. 18E using a proper material with specific index of refraction and ability to machine shop or phase mask, holograms created of new materials or a new technique to create an RF version of Spatial Light Modulator (SLM) that does the twist of the RF waves (as opposed to optical beams) by adjusting voltages on the device resulting in twisting of the RF waves with a specific topological charge. Spiral Phase plates can transform a RF plane wave (l=0) to a twisted RF wave of a specific helicity (i.e. l=+1).

Cross talk and multipath interference can be corrected using RF Multiple-Input-Multiple-Output (MIMO). Most of the channel impairments can be detected using a control or pilot channel and be corrected using algorithmic techniques (closed loop control system).

As described previously with respect to FIG. 13, each of the multiple data streams applied within the processing circuitry has a multiple layer overlay modulation scheme applied thereto.

Mode Conversion Approaches

Referring now to FIG. 19, among all external-cavity methods, perhaps the most straightforward one is to pass a Gaussian beam through a coaxially placed spiral phase plate (SPP) 1902. An SPP 1902 is an optical element with a helical surface, as shown in FIG. 18E. To produce an OAM beam with a state of l, the thickness profile of the plate should be machined as $l\lambda\theta/2\pi(n-1)$, where n is the refractive index of the medium. A limitation of using an SPP 1902 is that each OAM state requires a different specific plate. As an alternative, reconfigurable diffractive optical elements, e.g., a pixelated spatial light modulator (SLM) 1904, or a digital micro-mirror device can be programmed to function as any refractive element of choice at a given wavelength. As mentioned above, a helical phase profile $\exp(il\theta)$ converts a linearly polarized Gaussian laser beam into an OAM mode, whose wave front resembles an l-fold corkscrew 1906, as shown at 1904. Importantly, the generated OAM beam can be easily changed by simply updating the hologram loaded on the SLM 1904. To spatially separate the phase-modulated beam from the zeroth-order non-phase-modulated reflection from the SLM, a linear phase ramp is added to helical phase code (i.e., a "fork"-like phase pattern 1908 to produce a spatially distinct first-order diffracted OAM beam, carrying the desired charge. It should also be noted that the aforementioned methods produce OAM beams with only an azimuthal index control. To generate a pure LG_(l,p) mode, one must jointly control both the phase and the intensity of the wavefront. This could be achieved using a phase-only SLM with a more complex phase hologram.

Figure 20A:
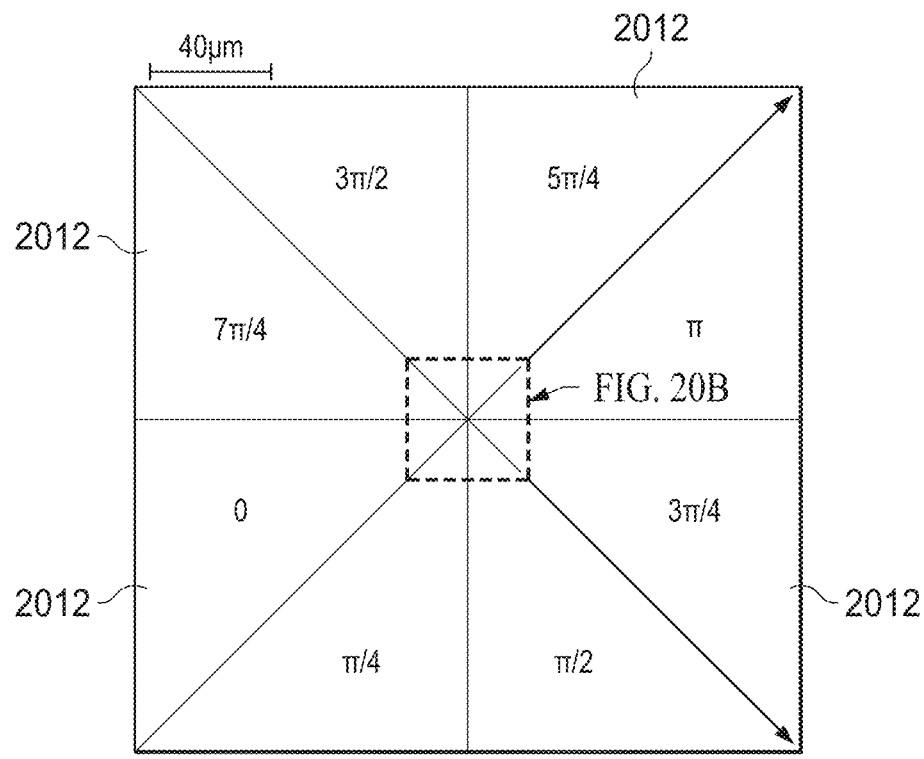
FIG. 20A illustrates a fabricated metasurface phase plate.
Figure 20B:
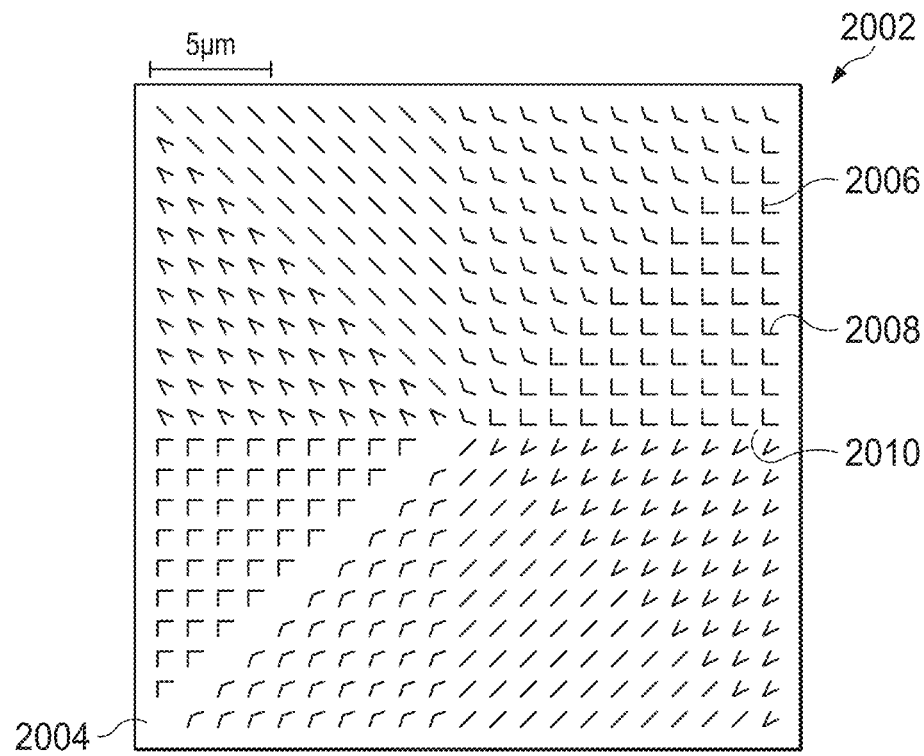
FIG. 20B illustrates a magnified structure of the metasurface phase plate.

Some novel material structures, such as metal-surface, can also be used for OAM generation. A compact metal-surface could be made into a phase plate by manipulation of the structure caused spatial phase response. As shown in FIGS. 20A and 20B, a V-shaped antenna array 2002 is fabricated on the metal surface 2004, each of which is composed of two arms 2006, 2008 connected at one end 2010. A light reflected by this plate would experience a phase change ranging from 0 to $2\pi$, determined by the length of the arms and angle between two arms. To generate an OAM beam, the surface is divided into 8 sectors 2012, each of which introduces a phase shift from 0 to $7\pi/4$ with a step of $\pi/4$. The OAM beam with l=+1 is obtained after the reflection, as shown in FIG. 20C.

A following experiment doubled the spectral efficiency by adding the polarization multiplexing into the OAM-multiplexed free-space data link. Four different OAM beams (l=+4, +8, −8, +16) on each of two orthogonal polarizations (eight channels in total) were used to achieve a Terabit/s transmission link. The eight OAM beams were multiplexed and demultiplexed using the same approach as mentioned above. The measured crosstalk among channels carried by the eight OAM beams is shown in Table 1, with the largest crosstalk being ~−18.5 dB. Each of the beams was encoded with a 42.8 Gbaud 16-QAM signal, allowing a total capacity of ~1.4 (42.8×4×4×2) Tbit/s.

TABLE 1

| Measured Crosstalk | $OAM_{+4}$ | | $OAM_{+8}$ | | $OAM_{-8}$ | | $OAM_{+16}$ | |
|---|---|---|---|---|---|---|---|---|
| | X- | Y- | X- | Y- | X- | Y- | X- | Y- |
| $OAM_{+4}$ X-Pol (dB) | | | −23.2 | −26.7 | −30.8 | −30.5 | −27.7 | −24.6 | −30.1 |
| Y-Pol | −25.7 | | | | | | | |
| $OAM_{+8}$ X-Pol (dB) | −26.6 | −23.5 | | | −21.6 | −18.9 | −25.4 | −23.9 | −28.8 |
| Y-Pol | | | −25.0 | | | | | |
| $OAM_{-8}$ X-Pol (dB) | −27.5 | −33.9 | −27.6 | −30.8 | | | −20.5 | −26.5 | −21.6 |
| Y-Pol | | | | | −26.8 | | | |
| $OAM_{+16}$ X-Pol (dB) | −24.5 | −31.2 | −23.7 | −23.3 | −25.8 | −26.1 | | −30.2 |
| Y-Pol | | | | | | | −24.0 | |
| Total from other OAMs * | −21.8 | −21.0 | −21.2 | −21.4 | −18.5 | −21.2 | −22.2 | −20.7 |

Figure 21A:
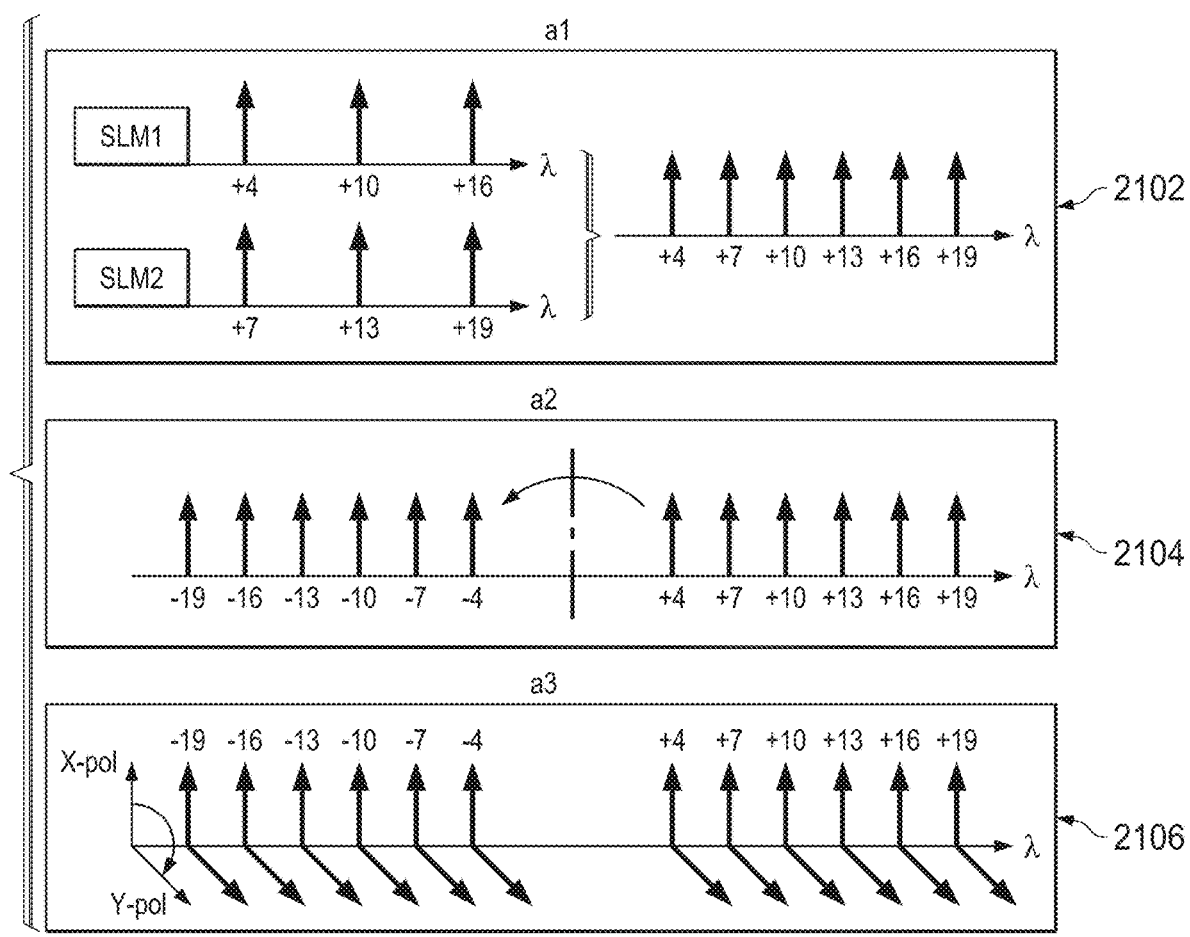
FIG. 21A illustrates the steps to produce 24 multiplex OAM beams.
Figure 21B:
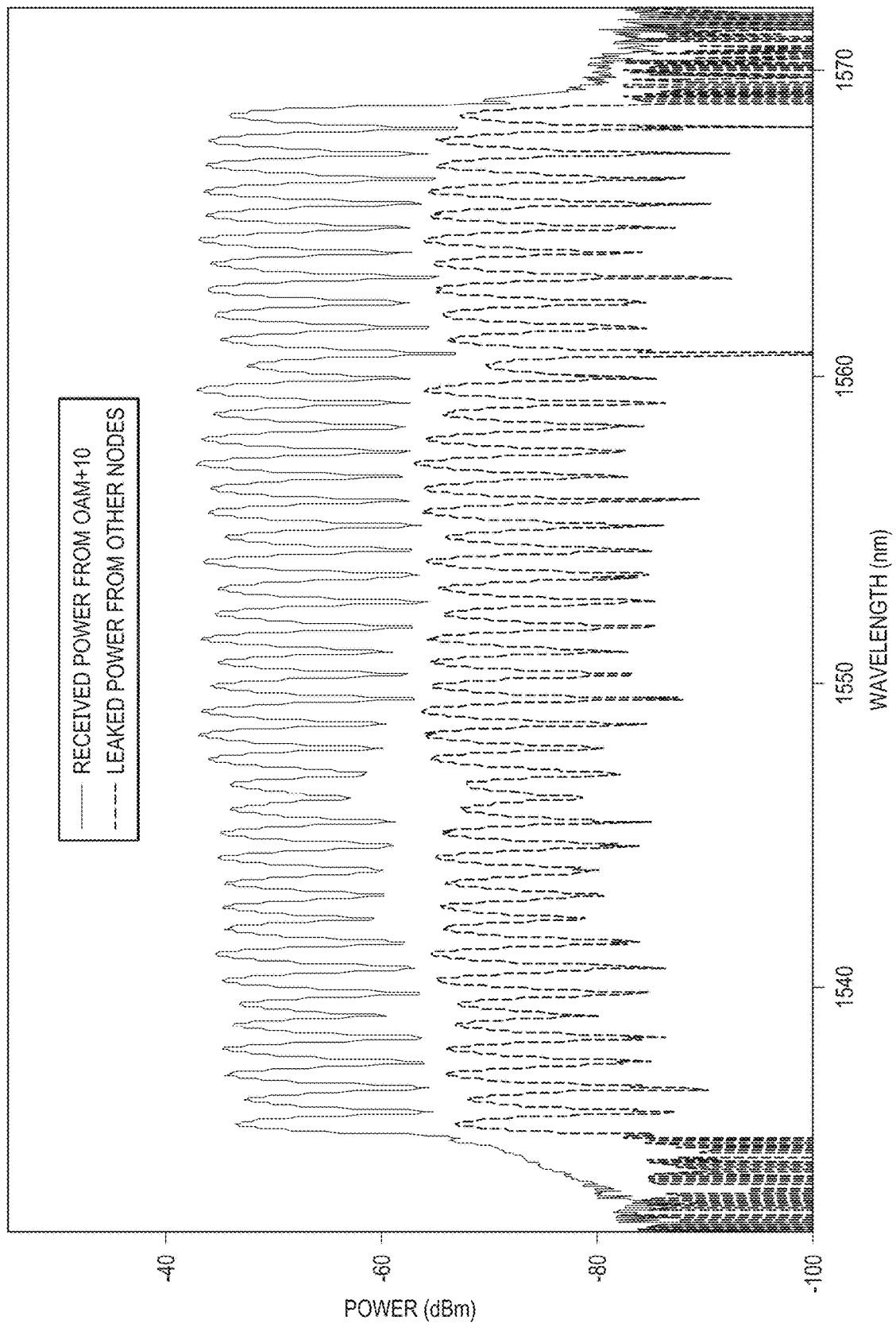
FIG. 21B illustrates the optical spectrum of a WDM signal carrier on an OAM beam.

The capacity of the free-space data link was further increased to 100 Tbit/s by combining OAM multiplexing with PDM (phase division multiplexing) and WDM (wave division multiplexing). In this experiment, 24 OAM beams (l=±4, ±7, ±10, ±13, ±16, and ±19, each with two polarizations) were prepared using 2 SLMs, the procedures for which are shown in FIG. 21A at 2102-2106. Specifically, one SLM generated a superposition of OAM beams with l=+4, +10, and +16, while the other SLM generated another set of three OAM beams with l=+7, +13, and +19 (FIG. 21A). These two outputs were multiplexed together using a beam splitter, thereby multiplexing six OAM beams: l=+4, +7, +10, +13, +16, and +19 (FIG. 21A). Secondly, the six multiplexed OAM beams were split into two copies. One copy was reflected five times by three mirrors and two beam splitters, to create another six OAM beams with inverse charges (FIG. 21B). There was a differential delay between the two light paths to de-correlate the data. These two copies were then combined again to achieve 12 multiplexed OAM beams with l=±4, +7, +10, +13, +16, and +19 (FIG. 21B). These 12 OAM beams were split again via a beam splitter. One of these was polarization-rotated by 90 degrees, delayed by ~33 symbols, and then recombined with the other copy using a polarization beam splitter (PBS), finally multiplexing 24 OAM beams (with l=±4, +7, +10, +13, +16, and +19 on two polarizations). Each of the beam carried a WDM signal comprising 100 GHz-spaced 42 wavelengths (1,536.34-1,568.5 nm), each of which was modulated with 100 Gbit/s QPSK data. The observed optical spectrum of the WDM signal carried on one of the demultiplexed OAM beams (l=+10).

Atmospheric Turbulence Effects on OAM Beams

One of the critical challenges for a practical free-space optical communication system using OAM multiplexing is atmospheric turbulence. It is known that inhomogeneities in the temperature and pressure of the atmosphere lead to random variations in the refractive index along the transmission path, and can easily distort the phase front of a light beam. This could be particularly important for OAM communications, since the separation of multiplexed OAM beams relies on the helical phase-front. As predicted by simulations in the literature, these refractive index inhomogeneities may cause inter-modal crosstalk among data channels with different OAM states.

Figure 22A:
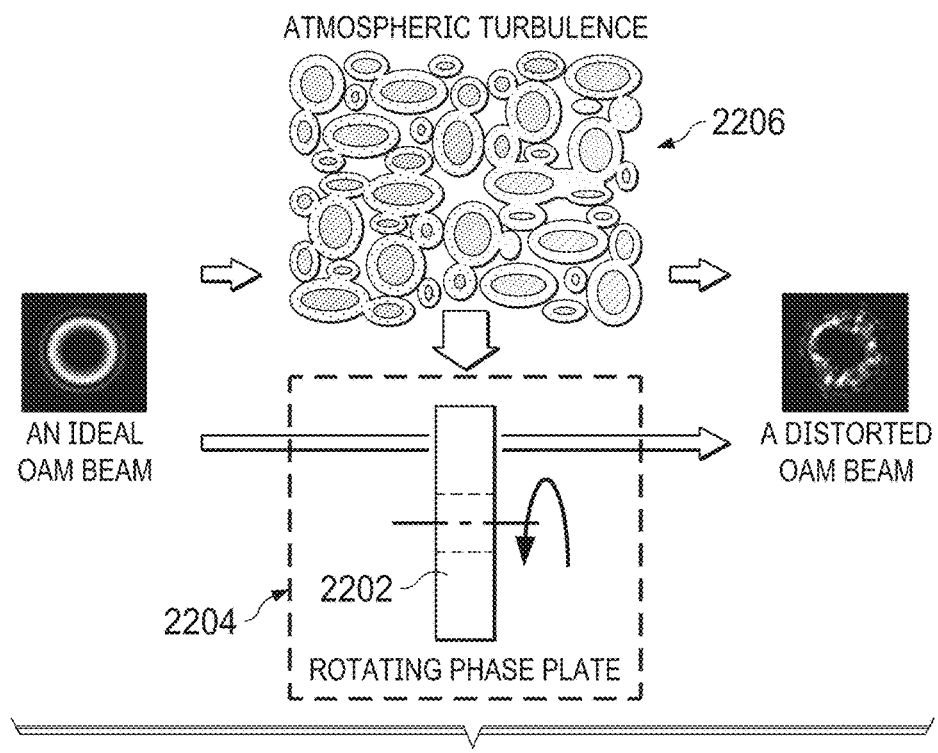
FIG. 22A illustrates a turbulence emulator.
Figure 22B:
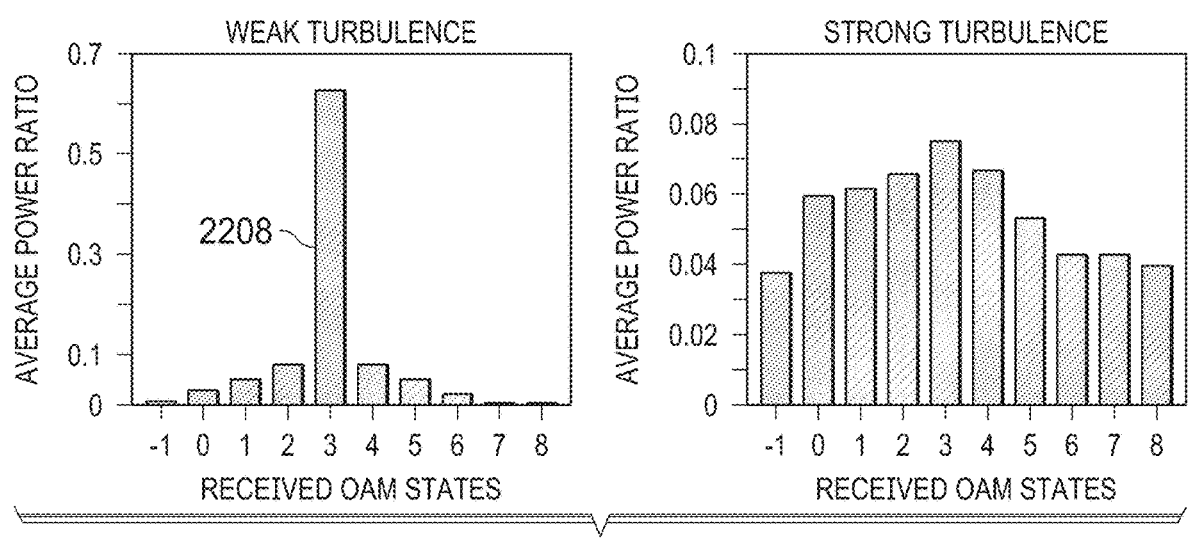
FIG. 22B illustrates the measured power distribution of an OAM beam after passing through turbulence with a different strength.

The effect of atmospheric turbulence is also experimentally evaluated. For the convenience of estimating the turbulence strength, one approach is to emulate the turbulence in the lab using an SLM or a rotating phase plate. FIG. 22A illustrates an emulator built using a thin phase screen plate 2202 that is mounted on a rotation stage 2204 and placed in the middle of the optical path. The pseudo-random phase distribution machined on the plate 2202 obeys Kolmogorov spectrum statistics, which are usually characterized by a specific effective Fried coherence length r0. The strength of the simulated turbulence 4906 can be varied either by changing to a plate 2202 with a different r0, or by adjusting the size of the beam that is incident on the plate. The resultant turbulence effect is mainly evaluated by measuring the power of the distorted beam distributed to each OAM mode using an OAM mode sorter. It was found that, as the turbulence strength increases, the power of the transmitted OAM mode would leak to neighboring modes and tend to be equally distributed among modes for stronger turbulence. As an example, FIG. 22B shows the measured average power (normalized) l=3 beam under different emulated turbulence conditions. It can be seen that the majority of the power is still in the transmitted OAM mode 2208 under weak turbulence, but it spreads to neighboring modes as the turbulence strength increases.

Turbulence Effects Mitigation Techniques

Figure 23A:
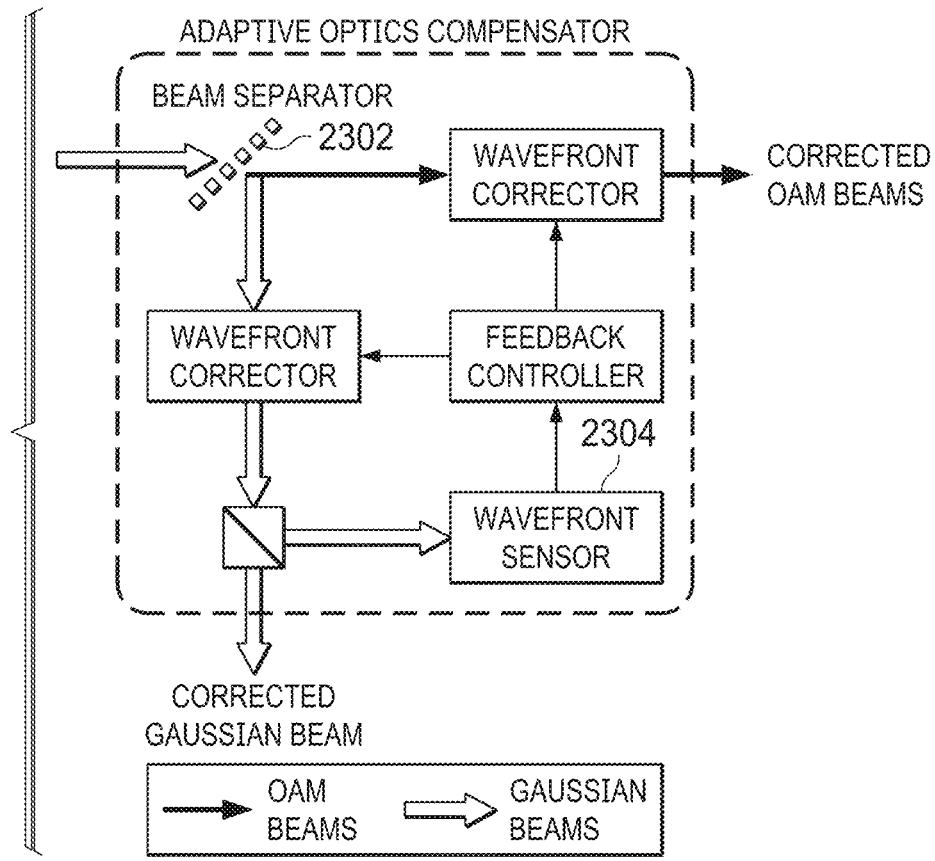
FIG. 23A illustrates how turbulence effects mitigation using adaptive optics.
Figure 23B:
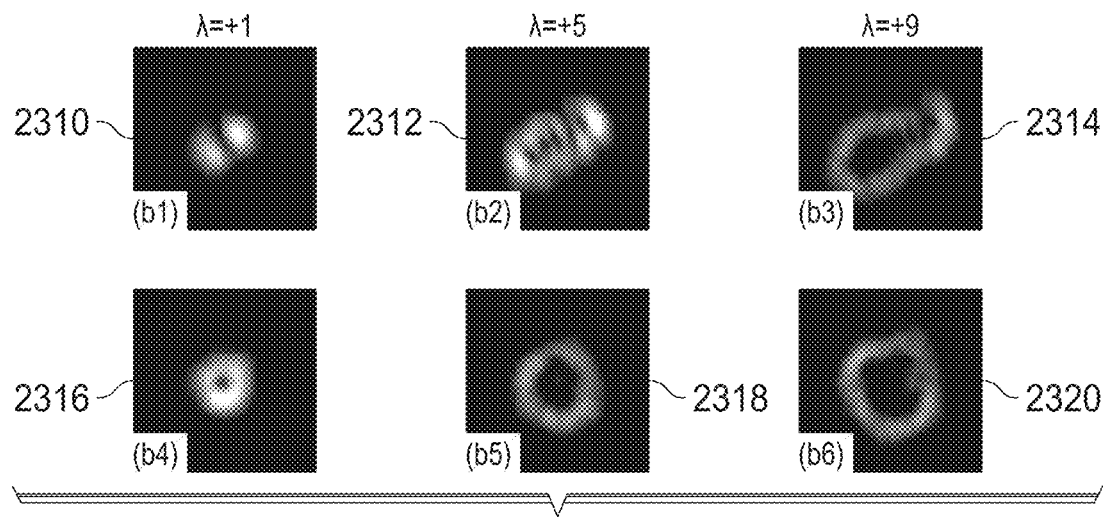
FIG. 23B illustrates experimental results of distortion mitigation using adaptive optics.

One approach to mitigate the effects of atmospheric turbulence on OAM beams is to use an adaptive optical (AO) system. The general idea of an AO system is to measure the phase front of the distorted beam first, based on which an error correction pattern can be produced and can be applied onto the beam transmitter to undo the distortion. As for OAM beams with helical phase fronts, it is challenging to directly measure the phase front using typical wavefront sensors due to the phase singularity. A modified AO system can overcome this problem by sending a Gaussian beam as a probe beam to sense the distortion, as shown in FIG. 23A. Due to the fact that turbulence is almost independent of the light polarization, the probe beam is orthogonally polarized as compared to all other beams for the sake of convenient separation at beam separator 2302. The correction phase pattern can be derived based on the probe beam distortion that is directly measured by a wavefront sensor 2304. It is noted that this phase correction pattern can be used to simultaneously compensate multiple coaxially propagating OAM beams. FIG. 23B at 2310-2320 illustrate the intensity profiles of OAM beams with l=1, 5 and 9, respectively, for a random turbulence realization with and without mitigation. From the far-field images, one can see that the distorted OAM beams (upper), up to l=9, were partially corrected, and the measured power distribution also indicates that the channel crosstalk can be reduced.

Another approach for combating turbulence effects is to partially move the complexity of optical setup into the electrical domain, and use digital signal processing (DSP) to mitigate the channel crosstalk. A typical DSP method is the multiple-input-multiple-output (MIMO) equalization, which is able to blindly estimate the channel crosstalk and cancel the interference. The implementation of a 4×4 adaptive MIMO equalizer in a four-channel OAM multiplexed free space optical link using heterodyne detection may be used. Four OAM beams (l=+2, +4, +6 and +8), each carrying 20 Gbit/s QPSK data, were collinearly multiplexed and propagated through a weak turbulence emulated by the rotating phase plate under laboratory condition to introduce distortions. After demultiplexing, four channels were coherently detected and recorded simultaneously. The standard constant modulus algorithm is employed in addition to the standard procedures of coherent detection to equalize the channel interference. Results indicate that MIMO equalization could be helpful to mitigate the crosstalk caused by either turbulence or imperfect mode generation/detection, and improve both error vector magnitude (EVM) and the bit-error-rate (BER) of the signal in an OAM-multiplexed communication link. MIMO DSP may not be universally useful as outage could happen in some scenarios involving free space data links. For example, the majority power of the transmitted OAM beams may be transferred to other OAM states under a strong turbulence without being detected, in which case MIMO would not help to improve the system performance.

Figure 24:
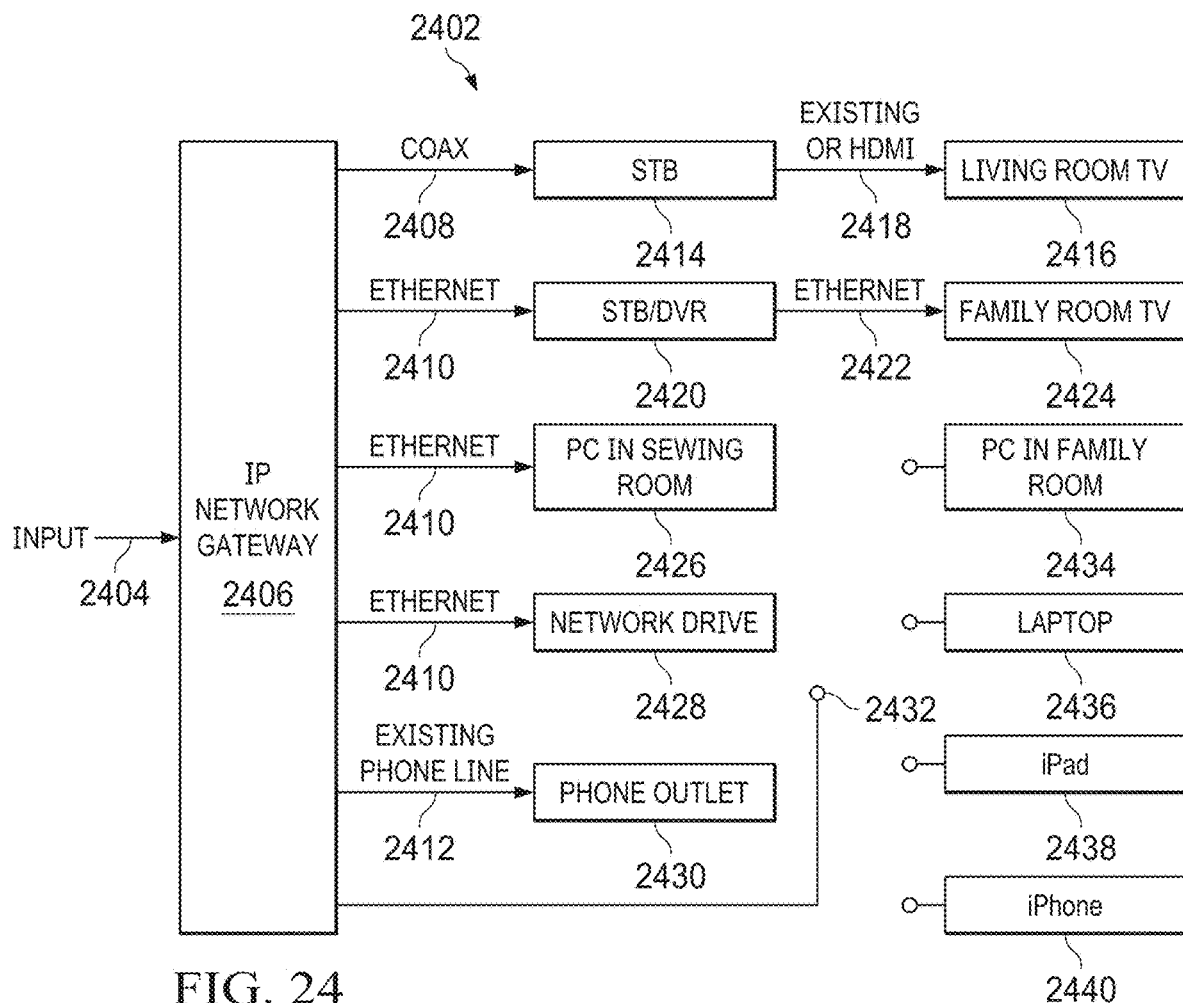
FIG. 24 is a functional block diagram of a residential TP network system.

FIG. 24 illustrates a functional block diagram of a residential IP network system 2402. An input 2404 from a millimeter wave transmission system that enables the transmission of millimeter waves from an exterior transmission unit to the interior of the structure provides broadband signals to a residential IP network gateway 2406. The residential IP network gateway 2406 determines where the signal coming from the input 2404 needs to be routed and provides the output on one of a plurality of possible outputs to the appropriate destination IP address associated with the device requesting the broadband information. The output lines may comprise a coaxial cable 2408, an ethernet cable 2410 or existing phone line 2412. The coaxial cables 2408 may provide inputs to a set top box 2414 that then provides an output to a living room TV 2416 through for example an HDMI connection 2418. A first ethernet connection 2410 may connect to a set top box/DVR 2420. A further ethernet connection 2422 provides data to a second television 2424. Ethernet connections 2410 may also provide data to a PC 2426 or a network drive 2428. The existing phone line connection 2412 would be provided to a phone outlet 2430 for connection of a telephone. Finally, a Wi-Fi antenna 2432 provides the ability for the residential IP network Gateway 2462 to provide a Wi-Fi network connection within a structure. The Wi-Fi network connection enables devices such as a PC 2434, laptop 2436, iPad 2438 or iPhone 2440 to wirelessly connect to the residential IP network Gateway 2406 to receive broadband data.

Figure 25:
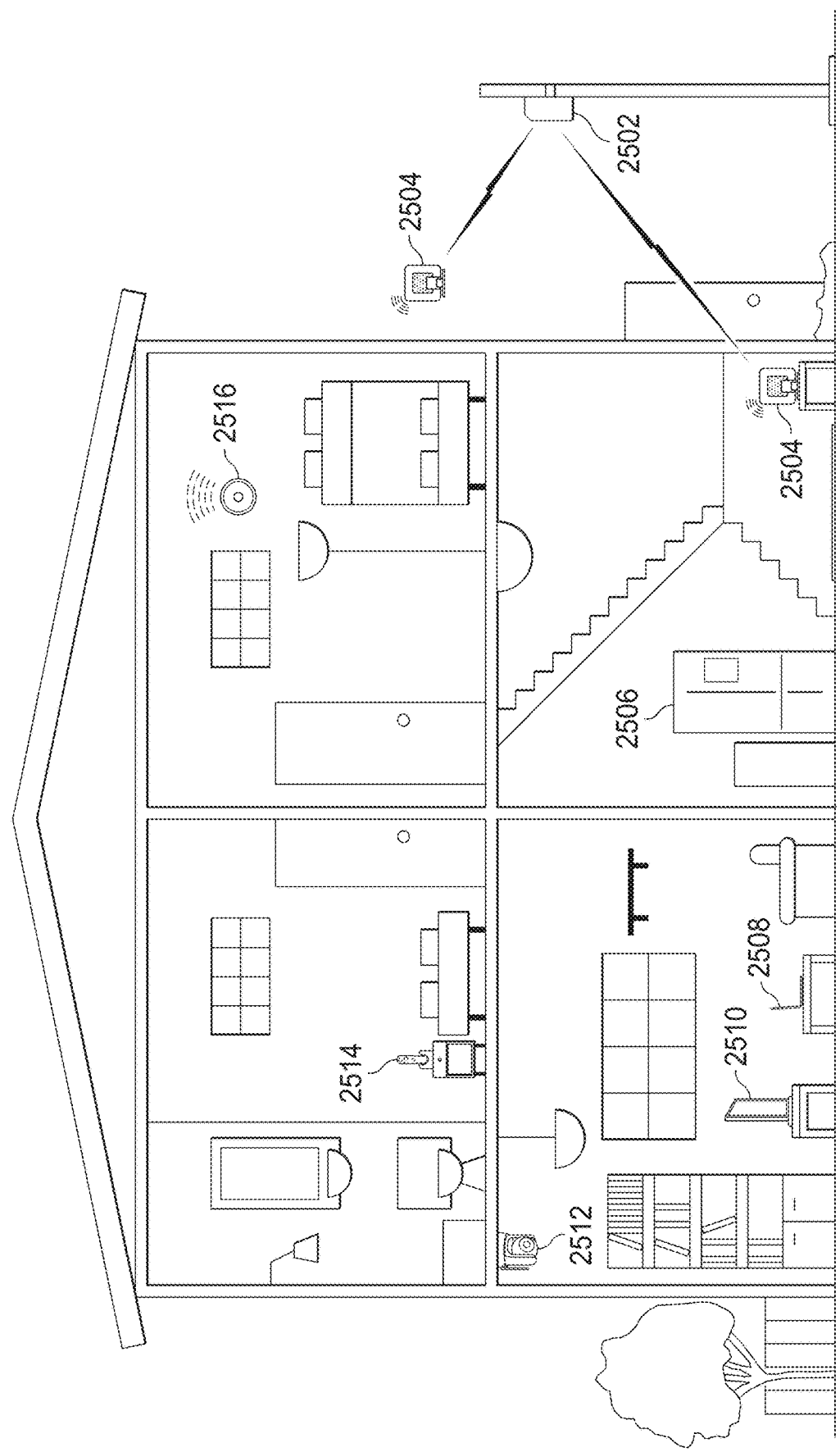
FIG. 25 illustrates the manner in which a mmwave system may be utilized to transmit information to a residential IP network system.

FIG. 25 illustrates the manner in which a millimeter wave system may be utilized to transmit information to a residential IP network system. An access unit 2502 located on the outside of a structure wirelessly transmits broadband data to CPE (customer premises equipment) units 2504 located within one or more structures associated with the residential IP network system. The access unit 2502 may receive the broadband data for transmission to the CPE units 2504 via wireless transmissions or a hardwired connection. The wireless access provided between the access unit 2502 and the CPE units 2504 may be provided in any of a number of frequency bands including, but not limited to millimeter bands 24 GHz, 28 GHz, 39 GHz, 60 GHz as well as 2.5 GHz, the CBRS band 3.5 GHz, Wi-Fi bands at 2.4 and 5 GHz. The signals are transmitted from outside the structure to inside the structure using any of the above described transmission techniques for transmitting signals through a wall or window. Within the structure the CPE unit 2504 uses Wi-Fi or other unlicensed bands within the premises to transmit signals to Internet of things (IOT) devices 2506, PCs 2508, IP TVs 2510, closed circuit televisions 2512, IP telephones 2514 and Wi-Fi extenders 2516. These are only some examples of IP-based devices and any type of Wi-Fi connectable device may be utilized within the structure for communications with the CPE 2504. The manner in which broadband data may be transmitted from the exterior of the structure to the interior of the structure may be configured utilizing the above described millimeter wave transmission systems in a number of fashions.

Figure 26:
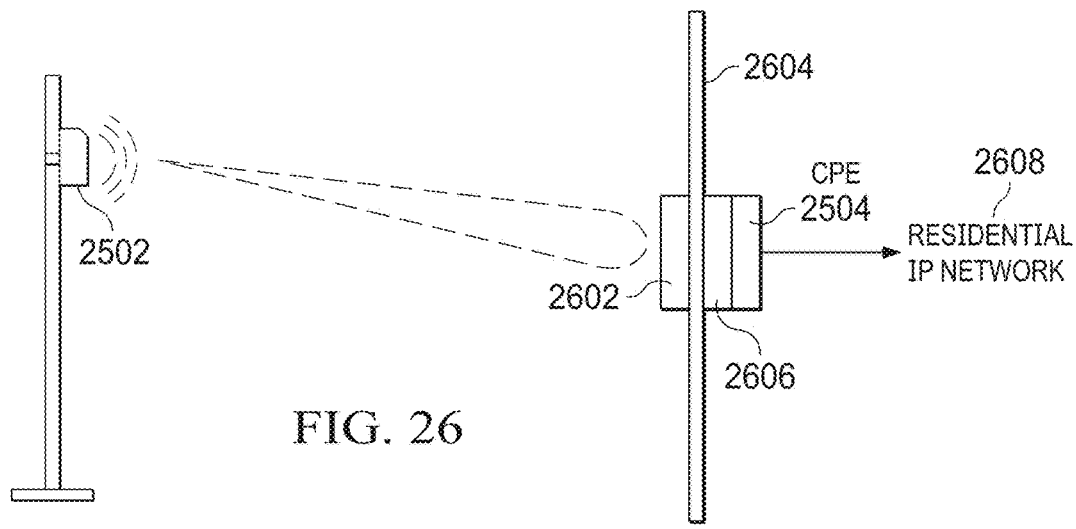
FIG. 26 illustrates a first embodiment for wireless transmission of broadband data to a residential IP network system.

FIG. 26 illustrates a first embodiment wherein the access unit 2502 wirelessly transmits the broadband data to a millimeter wave system transceiver 2602 located on an external side of a window or wall 2604. The system is consumer installed with the repeater (transceiver 2602) outside of the building and a transceiver 2606 on the inside of the building. This configuration uses millimeter wave transmitters on both sides of the glass or wall enabling tunneling of radio waves using either optical signals or RF signals. The broadband signals are connected directly to the CPE device 2504 via electronic integration at an integrated window unit to provide access to the residential IP network 2608. The wireless transmissions to the millimeter wave transceiver 2602 may be within any frequency band including, but not limited to, millimeter wave bands such as to 24 GHz, 28 GHz, 39 GHz, 60 GHz and 2.5 GHz; CBRS bands such as 3.5 GHz; and Wi-Fi bands such as 2.4 and 5 GHz. Millimeter wave transceiver 2602 transmits the signals through the window or wall 2604 to a second millimeter wave transceiver 2606 located on the interior of the structure. The composition of the millimeter wave transceivers 2602 and 2606 may be any of those discussed herein above with respect to systems for transmitting signals through a window or wall 2604. The interior millimeter wave transceiver 2606 outputs received data to (or receives data from) a customer premises equipment 2504 associated with the residential network IP 2608. The millimeter wave transceiver 2606 and CPE 2504 may comprise integrated equipment within a same box or device for receiving the signals from the millimeter wave transceiver 2602 located on the external of the structure and providing the data to the residential IP network 2608 and associated devices.

Figure 27:
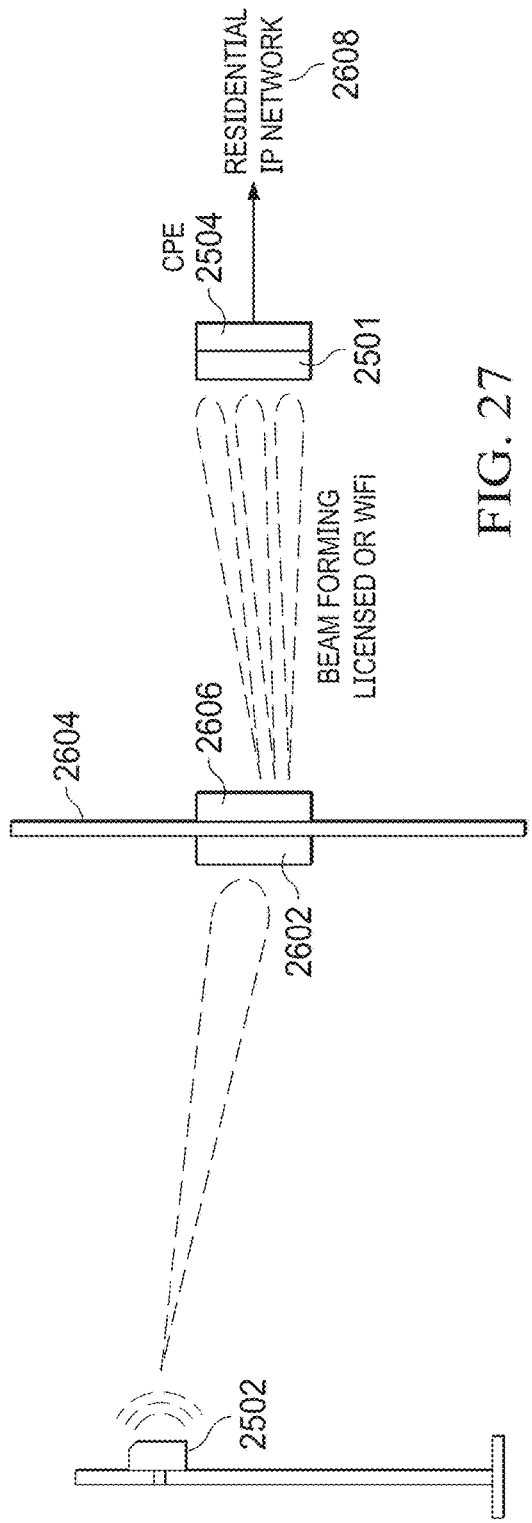
FIG. 27 illustrates a second embodiment for wireless transmission of broadband data to a residential IP network system.

FIG. 27 illustrates an alternative embodiment wherein the access unit 2502 wirelessly transmits the broadband data signals to the external millimeter wave transceiver 2602 as described previously with respect to FIG. 26. In this embodiment, millimeter wave transceivers are provided on sides of the window or wall 2604 enabling tunneling of radio waves using either optical signals or RF signals. The signals transmitted through the window or wall 2604 are then wirelessly connected to the CPE 2504 using either an unlicensed band or unlicensed Wi-Fi with beamforming. The external millimeter wave transceiver 2602 transmits the data through the window or wall 2604 as described herein to an internal millimeter wave transceiver 2606. The internal millimeter wave transceiver 2606 incorporates a beamforming device or Wi-Fi router that allows for transmission of the received signals using beam forming license or Wi-Fi to an integrated millimeter wave transceiver 2501 and CPE 2504. The CPE 2504 transmits the data to the residential IP network 2608 and associated devices.

Figure 28:
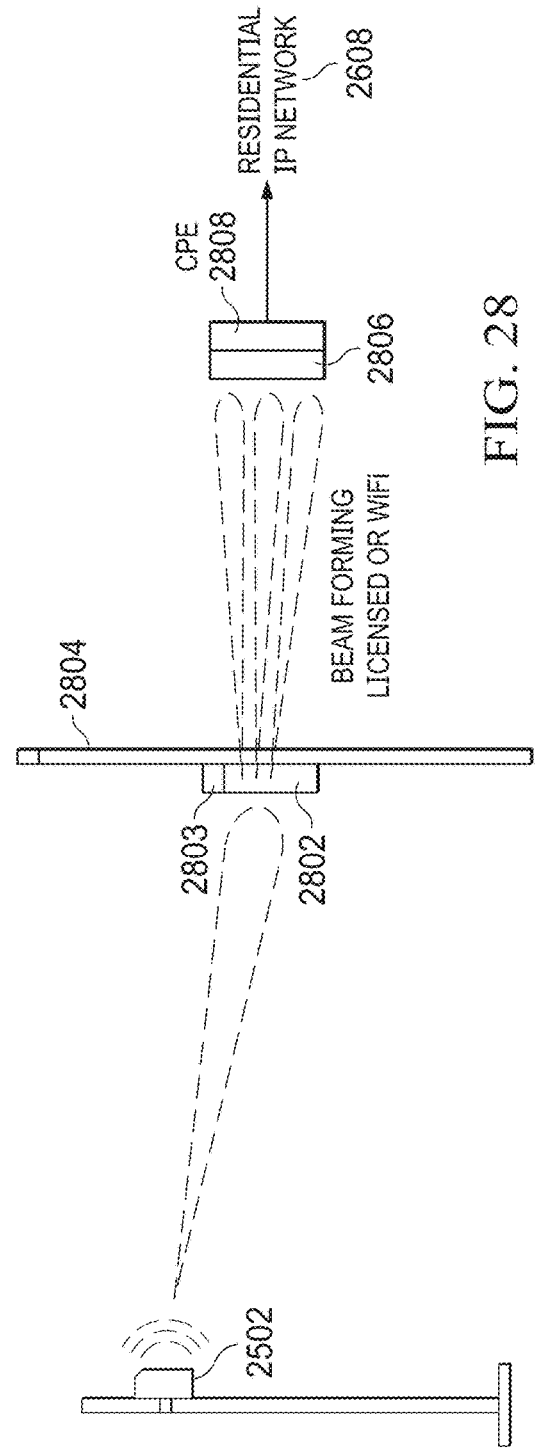
FIG. 28 illustrates a third embodiment for wireless transmission of broadband data to a residential IP network system.

Referring now to FIG. 28 there is illustrated a further embodiment of a system for transmitting the broadband signals to a residential IP network 2608 wherein the access unit 2402 wirelessly transmits the signals to a millimeter wave transceiver 2802 located on an external side of a window 2804 of a building or structure. A millimeter wave transceiver 2802 is located on the outside of a window glass and uses high power phased array and beamforming circuitry 2803 to enable tunneling of radio waves to wirelessly connect to the CPE 2808 located a distance from the window 2804 using either a licensed band or unlicensed Wi-Fi. The millimeter wave transceiver 2802 includes a high-powered phased array 2803 providing beamforming or Wi-Fi router capabilities for transmitting signals wirelessly through the window 2804 to a millimeter wave transceiver 2806 located on an interior of the structure but placed at a location that is not directly on the opposite side of the window 2804. The millimeter wave transceiver 2806 is integrated with the CPE 2808 that transmits the broadband data to the residential IP network 2608 and associated devices.

The described system provides an optical or RF tunnel that allows signals to be transmitted from outside a building to devices within the building. Once the broadband access is delivered into the premises (residential or commercial), other unlicensed bands can be used inside the premises. The optical or RF tunnel can also be used to allow signals from the Internet of Things devices located within the building to go from inside to outside. In addition to the techniques described herein above, other near field techniques can be used for transmitting the information through the window or wall.

Millimeter Wave with Optical Networks

Figure 29:
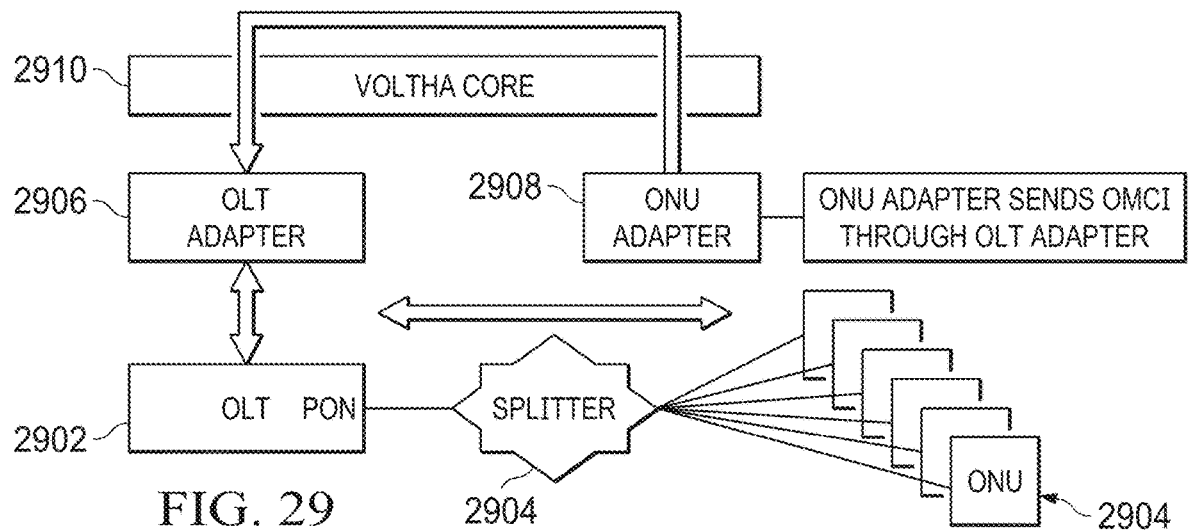
FIG. 29 illustrates an implementation of vOLTHA on an OLT and ONU link.

Each access technology brings its own protocols and concepts which means control and management of legacy access devices can be a problem. vOLTHA confines the differences of access technology to the locality of access and hides them from the upper layers of the OSS stack. Referring now to FIG. 29 there is illustrated the implementation of vOLTHA with an OLT 2902 and ONU 2904 link. The OLT 2902 communicates with multiple ONUs 2904 through a splitter 2905. vOLTHA containers communicate over gRPC. The main container publishes events to Kafka and persists data in Consul for service discovery. Southbound OLT adapters 2906 and ONU adapters 2908 will be their own containers as well. OLT adapter 2906 and ONU adapter 2908 enables OLT-ONU interoperability through the vOLTHA core 29310. The ONU adapter 2908 sends OMCI (ONT management control interface) to the OLT 2902 through the OLT adapter 2906.

Figure 30:
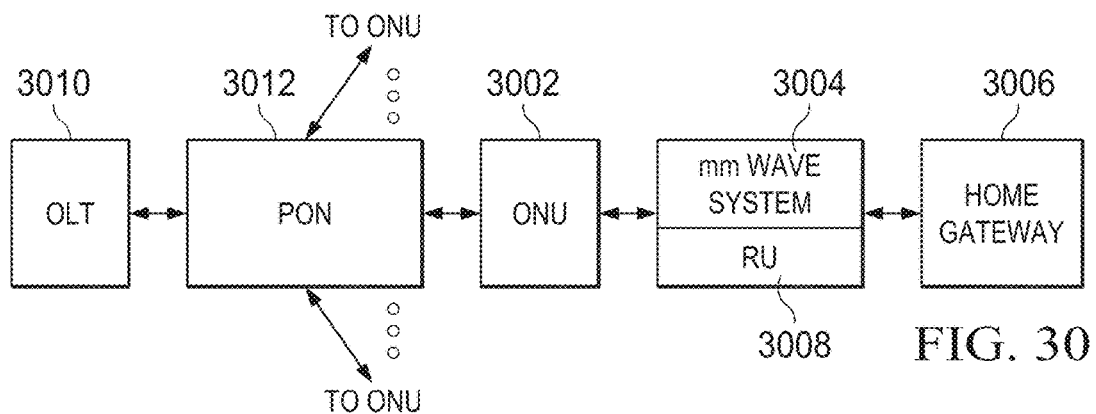
FIG. 30 illustrates a broadband link between an OLT and home gateway.

Using vOLTHA to create hardware abstraction layers for Wave Agility enables integration to a residential network IP gateway over mmWave Fixed Wireless Access (gigabit rate access with Dynamic QoS-Application & Network slicing support). One of the challenges faced in the next generation broadband access at gigabit rates is the need for running fiber to the home or business. Referring now to FIG. 30, with fixed mmWave 5G wireless access technology ONUs 12402 (PON end points) can be utilized for the aggregation of self-installed fixed wireless access points.

Almost all recent FTTH (fiber to the home) deployments, as well as those currently being planned, use passive optical networking. The concept of a Passive Optical Network (PON) 3012, involves the use of passive fiber splitters which allow multiple customers (typically 32-128) to share a single fiber pair. GPON has also seen trials and initial deployments by several large Telco's, but these are largely used as a basis for transmitting Ethernet via encapsulation within GEM frames (GPON Encapsulation Method) 15926 (FIG. 159). GPON was designed with very strict timing requirements. Both EPON and GPON therefore use Time Division Multiple Access (TDMA), informally known as "time-sharing." Time is divided into slots, of either fixed or variable length or long enough to contain one or more data frames (usually around 100-1000 msec). During a given slot, one ONU 3002 is permitted to transmit and all others must have turned off their lasers. The OLT 3010 is responsible for determining a transmission schedule and sending that to the ONUs 3002 (this is sometimes considered to be a form of batch polling by the OLT) and the ONUs must maintain an accurate clock which is synchronized to that of the OLT in order to transmit at exactly the right time.

The number of time slots allocated to each ONU 3002 need not remain fixed. Both EPON and GPON provide flexible mechanisms to allow the OLT 3010 to dynamically allocate bandwidth to ONUs according to demand and the network operator's policy. These mechanisms are nonspecific as to the algorithms employed, particularly in the case of EPON where the extremely simple request-based protocol leaves a lot of scope for interesting dynamic bandwidth allocation algorithms. Extending bandwidth assignments to the mmWave technology is desirable with PON technology, a channel is broadcast to all ONUs 3002, and each frame is labelled with the address of its target ONU. That ONU 3002 will forward the frame onto its end user's LAN through the home gateway 3006, and all other ONUs will discard the frame. This is a form of TDMA, with the OLT 3010 determining its own transmission schedule and each time slot lasting the duration of a frame.

A mmWave system 3004 can also take advantage of mmWave beam forming and beam steering technologies to ensure QoS to the home applications accessed via a home gateway 3006 in the dynamically changing network conditions. Given the current Residential Gateway (RGW) devices 3006 do not have the ability to directly and dynamically trigger or adjust the service flow operations based on the network conditions, the hybrid ONU 3002 and mmWave Remote Units (RUs) 3008 can be designed with innovative SDN enabled beam steering mechanisms to achieve high quality user experience with dynamic network slicing mechanisms and optimized OLT-ONU (gPON) signaling frameworks. Millimeter wave frequencies implemented by the mmWave system 3004 are roughly defined as bands in 24, 28, 39 and 60 GHz. However, such an approach is also applicable to 3.5 GHz CBRS. The mmWave system 3004 provides much potential for use as wireless broadband services with beam steering under control of SDN towards the self-installed mmWave home modems. As mentioned previously, the SDN beam steering mechanisms and dynamic network slicing mechanisms may use those techniques describe in U.S. patent application Ser. No. 15/664, 764, which is incorporated herein by reference.

In the vOLTHA scenario, home gateways 3006 can connect to ONUs 3002 via mmWave technologies within the mmWave System 3004 in the last drop (100s of meters) where wireless access points are directly connected to ONUs 3002 via mmWave RUs 3008. Hybrid virtual OLT (vOLTHA) 3010 and mmWave Fixed Broadband Wireless technology through the mmWave system 3004 can provide self-installed access opportunities to homes and businesses. In addition, the synchronous nature of vOLTHA based on gPON can extend itself to map to beam steering control technology for mapping/distribution of ONU traffic among multiple mmWave modems 3008 with support for slicing control at home networks. In this scenario, a single PON 3012 will be seen by an Ethernet switch as a collection of point-to-point links, one per Hybrid ONU 3002+mmWave Radio Unit 3008. The PON 3012 will typically connect up to 128 ONUs 3002 to each OLT 3010, and hybrid ONU-RU will connect to multiple mm-wave modems utilizing beam steering control plans. The mmWave Modems 3008 are self-installed and reduce the need for a fiber connection to the home/apartments as well as further provide for additional statistical gain and aggregation points at the ONU+RU at the Ethernet layer, customers served by these PONs 3012 will be on a single large Ethernet. Furthermore, if delay and cost is not a factor, the ONU+RU's are integrated and can be treated as IP routers with load balancing and slicing capabilities, provide statistical gain and an aggregation point.

Thus, from the operator's perspective, by bridging together all of a central office's PONs 3012 and serving ONU+RU 3002/3008 at the Ethernet layer, customers served by these PONs 3012 will be on a single large Ethernet. Furthermore, if delay and cost is not a factor we can threat the ONU+RUs 3002/3008 as IP routers with opportunities for load balancing and additional slicing capabilities. The system may also be designed wherein where transmit is done at higher 60 GHz band channel from outside to inside and a and lower 60 GHz band channel from inside to outside.

The current ONUs 3002 in vOLTHA will be complemented with mmWave RUs 3008 which will perform beam steering functions with modems installed at each home. In practical scenarios, small cells deployed with each ONU 3002 in urban outdoor environments are regularly affected by trees and passing objects. In millimeter wave beamforming systems, the environmental issues such as wind-induced movement, blockage by trees, may be resolved by beam steering technologies under control of SDN where each wavelength uses a very narrow beam pattern. The practical impairments of a lamppost deployment scenario need be incorporated into the beamforming system and system design.

Almost all modern PONs 3012 run on Ethernet at some level either used as the native protocol on an EPON, or encapsulated in GEM on a GPON, with physical and logical topology of a simple Ethernet PON deployment shown as follows. Ethernet is now predominantly used as a basis for the data link layer and Internet Protocol (IP) as ubiquitous network layer protocol. Some networks still use separate fibers for transmission in each direction (1310 nm and 1490 nm—for bidirectional use). The Ethernet PHY is responsible for providing a serialized bit stream facility (only) to the Medium Access Control (MAC) layer. The MAC is responsible for dividing the bit stream into frames. Frames are labelled with a header containing, source and destination MAC addresses. This enables the statistical multiplexing of multiple hosts' frames on a single link.

Figure 31:
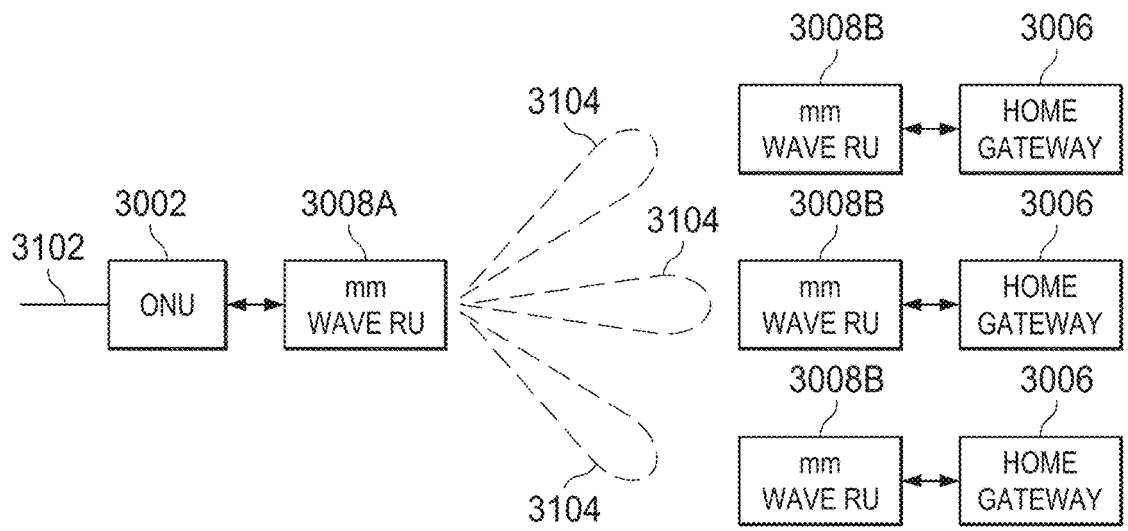
FIG. 31 illustrates the interface between and ONU and the plurality of home gateways.

FIG. 31 illustrates the interface between the ONU 3002 and the plurality of home gateways 3006. A single optical fiber pair 3102 provides data to and from the ONU 3002. The ONU 3002 interfaces with a millimeter wave remote unit 3008, having the ability to generate RF beams 3104 that may be directed toward one or more millimeter wave radio units 3008B associated with a home or business. The interface between the millimeter wave remote units 3008A and 3008B may include one or more of the building penetration techniques described herein. The millimeter wave radio units 3008 provide beam steering techniques and slice control techniques enabling the control of the transmission of data bidirectionally between the ONU 3002 and home gateways 3006. The millimeter wave remote units 3008B associated with the home or business interface with the home gateways 3006 to provide broadband data connections to the associated home or business structure.

Figure 32:
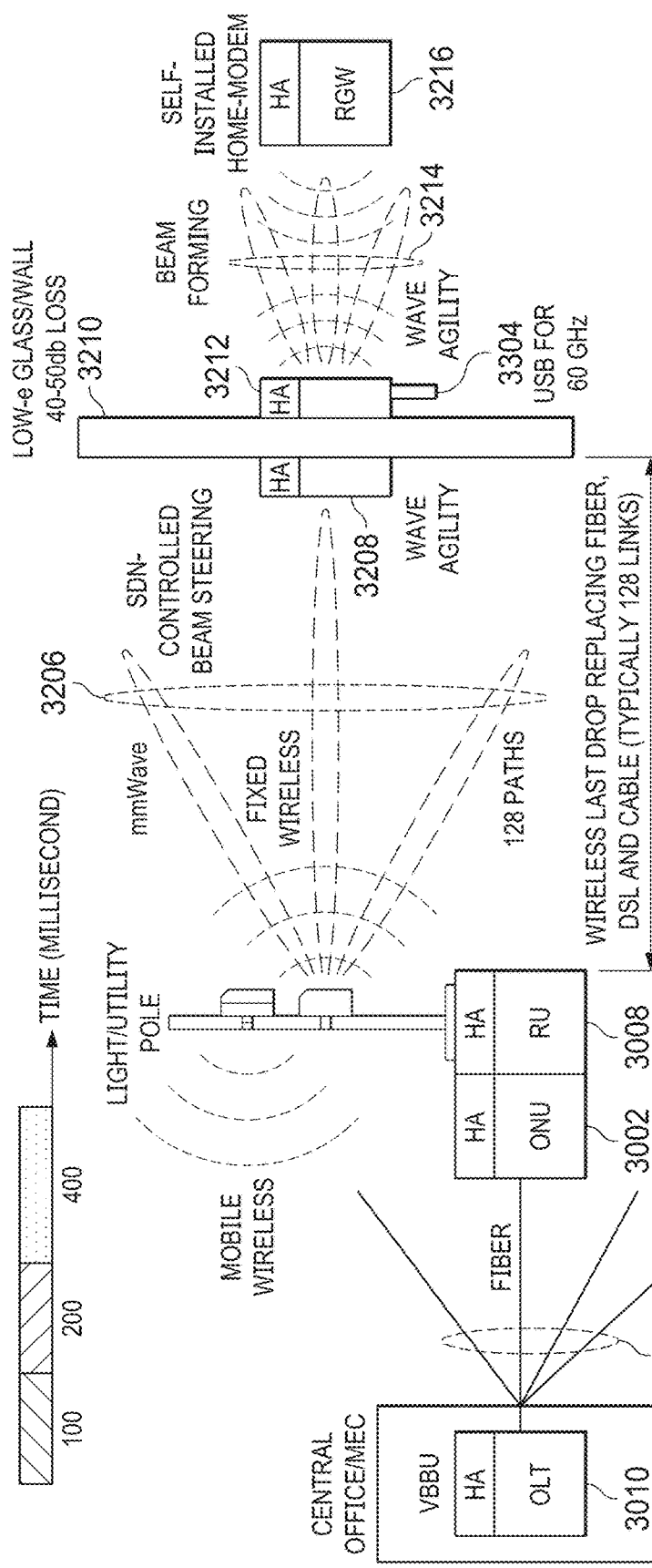
FIG. 32 illustrates a first embodiment of a broadband data communications link between an OLT and home gateway.

Referring now to FIGS. 32 and 166, there are more particularly illustrated embodiments for broadband data communications between an OLT 3010 and devices located within a structure. With respect to FIG. 32, the OLT 3010 is located at a central office/MEC 3202 that may be part of a virtual base band unit (VBBU). The OLT 3010 schedules transmissions over the fiber 3204 to the ONU's 3002. The OLT 3010 connects to a number of ONU's 3002 through optical fiber pairs 3204. The ONU 3002 maintains an accurate clock to sync with the OLT 3010. Associated with the ONU 3002 is a remote unit 3008. The remote unit 3008 is part of the millimeter wave system 3004 described hereinabove. The combined ONU/RV is treated as an IP router providing load-balancing and slicing and further providing statistical gain for signal transmission and acts as an aggregation point for received data. The combined ONV/RV also provides for wireless communications with remote units associated with structures. The remote unit 3008 is located on a light pole or tower located near a structure and provides the wireless last drop connection to a home or business that replaces fiber DSL and cable.

The remote unit 3008 utilizes controlled beamforming and slice control techniques to generate radio beams 3206 that are transmitted to an exterior millimeter wave transceiver 3208 located on an exterior of the structure. The exterior millimeter wave transceiver 3208 repeats signals receive from the exterior hub and allows the signal to penetrate through the glass or building. The exterior millimeter wave transceiver 3208 transmits the broadband data signals through a window or wall 3202 and internal millimeter wave transceiver 3212 using one of the above described techniques for transmitting through a wall or window. The interior millimeter wave transceiver 3212 also utilizes beamforming and slicing techniques as described herein to transmit wireless beams 3214 within the structure to a residential gateway 3216. The residential gateway 3216 comprises a self-installed home modem that provides an interconnection between the broadband data received from the interior millimeter wave transceiver 3212 and devices located within the structure that communicate with the residential gateway 3216 via wired or wireless connections.

The OLT 3010, ONU 3002, RU 3008, millimeter wave transceivers 3208/3212 and residential gateway 3216 all include a hardware abstraction layer from vOLTHA as previously described enable a SDN to control the entire end-to-end configuration of the components to access the last drop connection.

Figure 33:
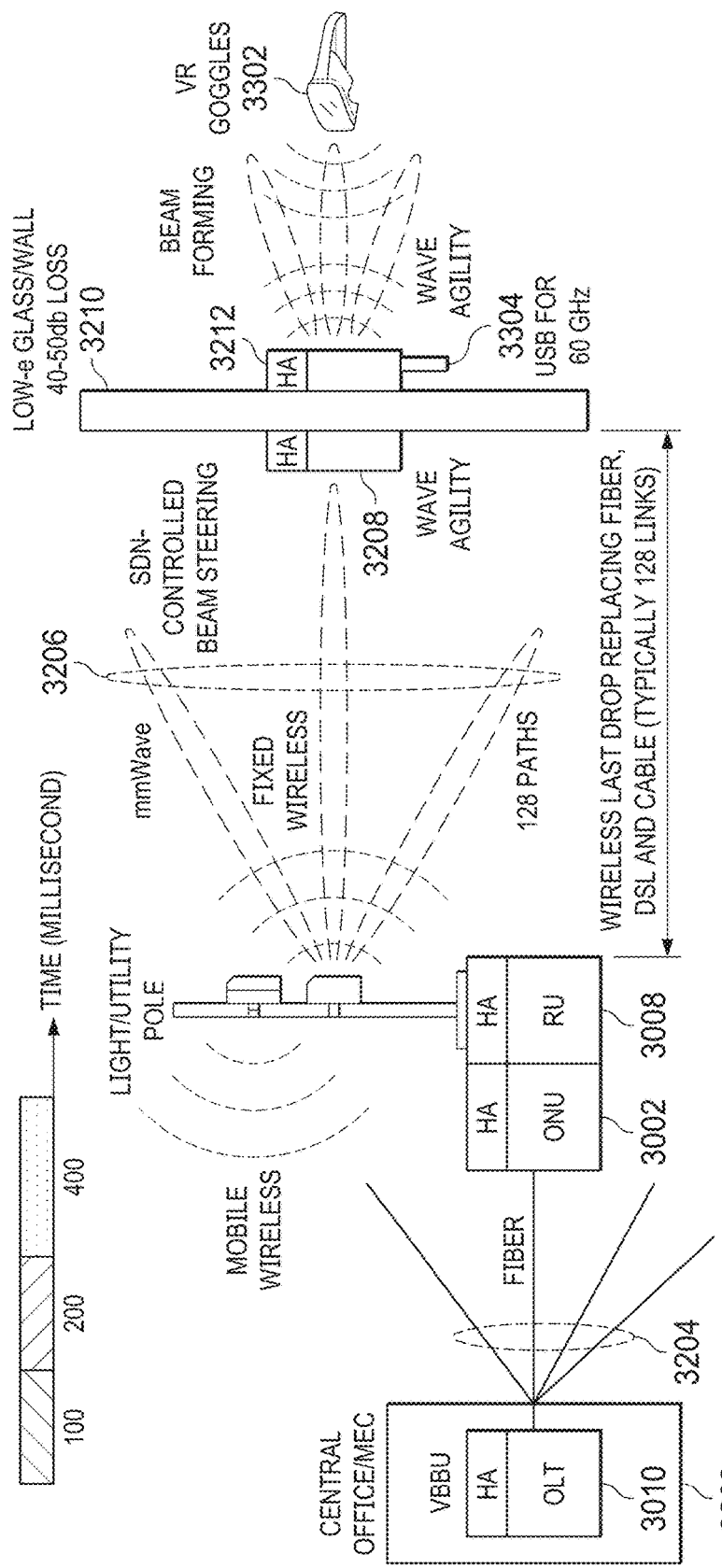
FIG. 33 illustrates a second embodiment of a broadband data communications link between an OLT and virtual reality goggles.

FIG. 33 illustrates the same structure described with respect to FIG. 32 for broadband data transmissions between the OLT 3010 and the interior millimeter wave transceiver 3212. Rather than illustrating a connection to a residential gateway 3216, which the system may still do, a 60 GHz wireless connection to a pair of virtual reality (VR) goggles 3302 is illustrated. A 60 GHz transceiver dongle 3304, as will be more fully described herein below, is inserted into a USB port of the interior millimeter wave transceiver 3212. This provides the ability for the interior millimeter wave transceiver 3212 to bidirectionally communicate through the 60 GHz transceiver dongle 3304 with the VR goggles 3302 located on the interior of the structure. The VR goggles 3302 may then be used wirelessly with any interior computer or with a central office without the need for a local computer. While FIG. 33 illustrates a 60 GHz wireless link to VR goggles 3302, other types of devices may also wirelessly connected to the 60 GHz transceiver dongle 3304 in order to enable broadband data transmissions thereto. The control of data transmissions between the optical data transmission portions and that the RF data transmission portions using SDN slicing as mentioned hereinabove are applicable to each of the embodiments in FIGS. 32 and 33. The OLT 3010, ONU 3002, RU 3008, millimeter wave transceivers 3208/3212 and VR goggles 3302 all include a hardware abstraction layer from vOLTHA as previously described enable a SDN to control the entire end-to-end configuration of the components to access the last drop connection.

Figure 34:
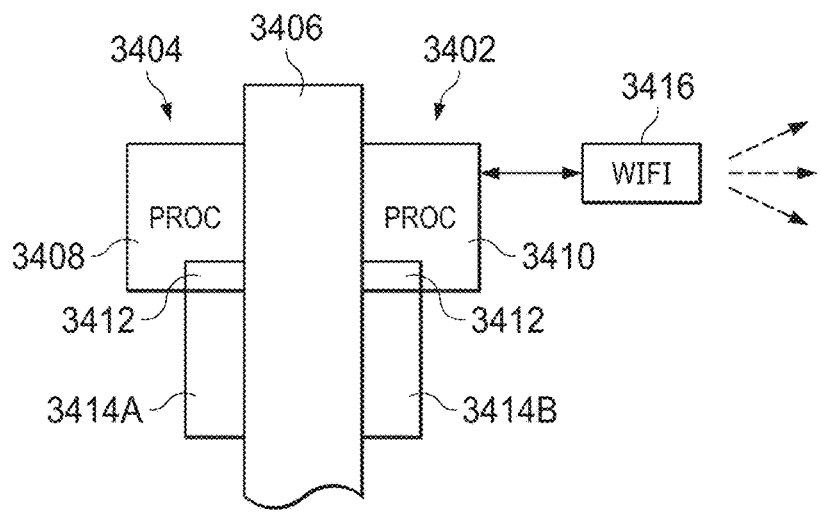
FIG. 34 illustrates the structure for communication through a window or wall using transceiver dongles.

Referring now to FIG. 34, there is illustrated a further embodiment of a means for wirelessly transmitting signals between an interior of a building 3402 and an exterior of the building 3404 through a window or wall 3406. An external transceiver processing unit 3408 is located on an exterior side 3404 of the window or wall 3406. The transceiver processing unit 3408 provides transmissions to/from the external environment rather than transmissions from the interior of the building using for example the techniques described herein above and provides processing of the received signals before they are transmitted to the building interior. Similarly, an internal transceiver processing unit 3410 is located on the interior side 3402 of the window or wall 3406. The transceiver processing unit 3410 provides transmissions to/from the interior environment of the building rather than transmissions from the exterior of the building using for example the techniques described herein above and provides processing of the received interior signal before they are transmitted to the building exterior. Inserted within a USB interface 3412 of each of the internal transceiver processing unit 3410 and external transceiver processing unit 3408 is a transceiver dongle 3414. A dongle 3414 as described herein comprises a hardware interface for wirelessly communicating signals between an interior and an exterior of a structure and/or other functionalities. The dongle 3414 may comprise a circuit, peripheral device, ect. that connects with a processor on the interior and the exterior of the structure to enable communication between the interior and the exterior of the structure and/or the other functionalities.

The transceiver dongle 3414A located with the external transceiver processor 3408 is responsible for the transmission and reception of signals to/from the interior 3402 of the building through the window or wall 3406. The transceiver dongle 3414B located with the internal transceiver processor 3410 transmits and receives signals to/from the exterior 3404 of the building through the window or wall 3406. The transceiver dongles 3414 enable the transmission of signals between the interior and an exterior of the building in a similar manner to that described herein above with respect to other embodiments. The transceiver dongles 3414 consume approximately 2 W of power in each dongle. The signals from the interior of the building are transmitted from or received at a Wi-Fi transceiver 3416. While one embodiment envisions the use of a Wi-Fi transceiver, other transmission protocols can be used for the transmissions within the building. This solution is applicable to all types of access at any frequency band such as LTE bands including new NR radio; 3.5 GHz CBRS; 5 GHz WiFi; 24, 28 and 39 Ghz licensed bands; and 60 GHz bands as well as 70/80 GHz E-band, ect.

Figure 35A:
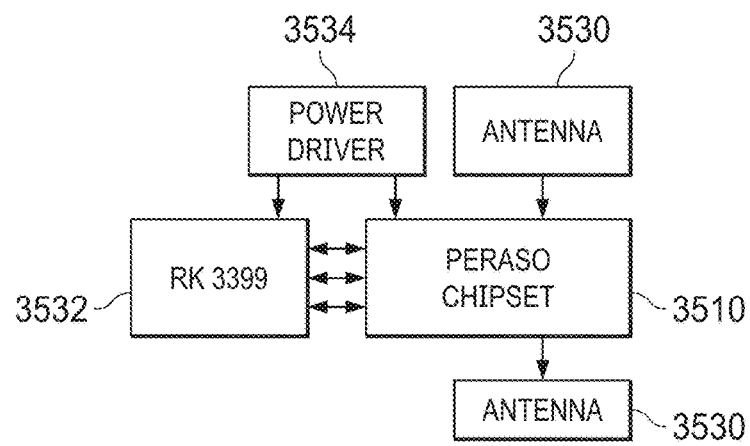
FIG. 35A illustrates a functional block diagram of a RK 3399 processor and a Peraso chipset.
Figure 92:
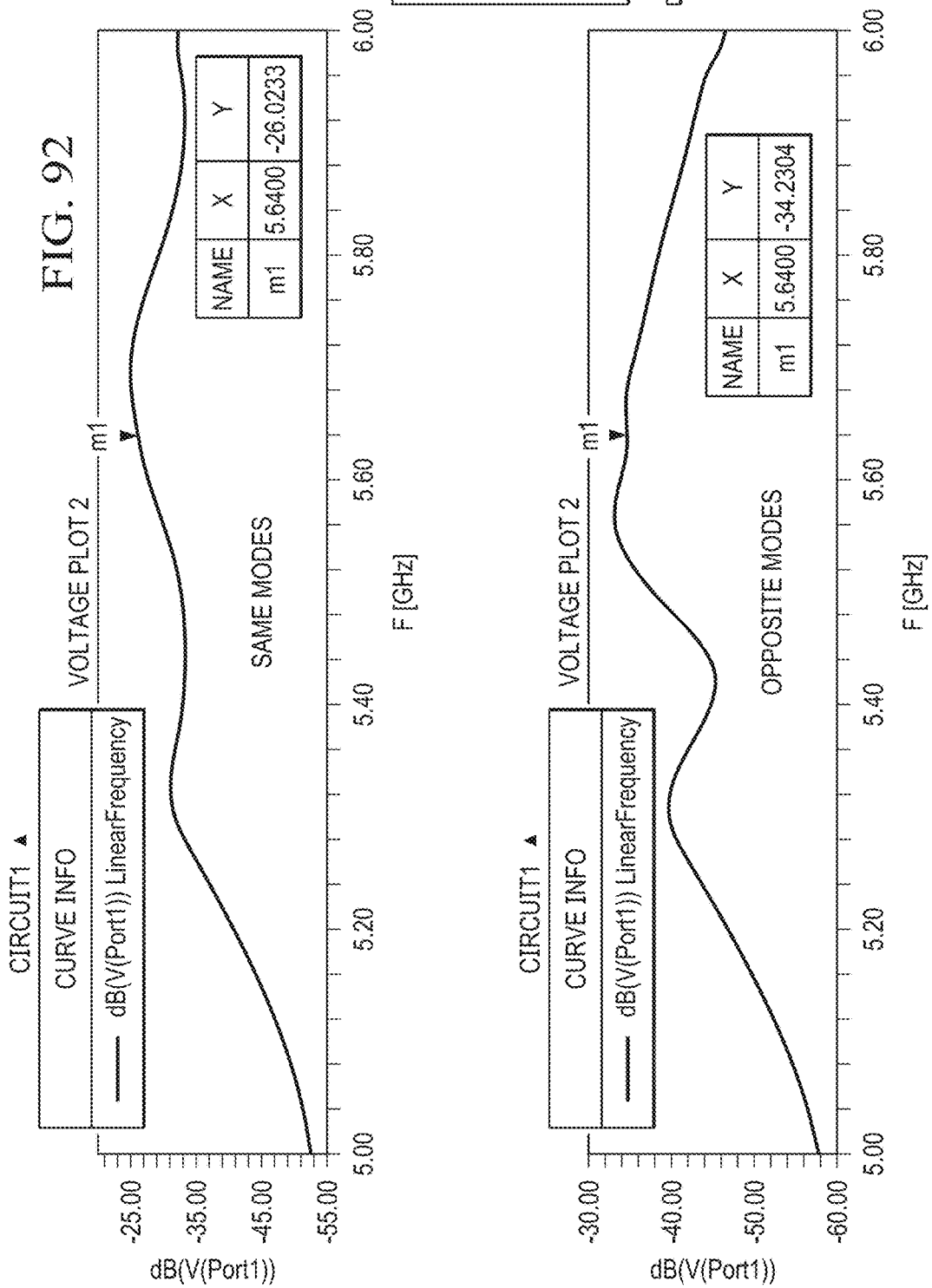
Figure 93:
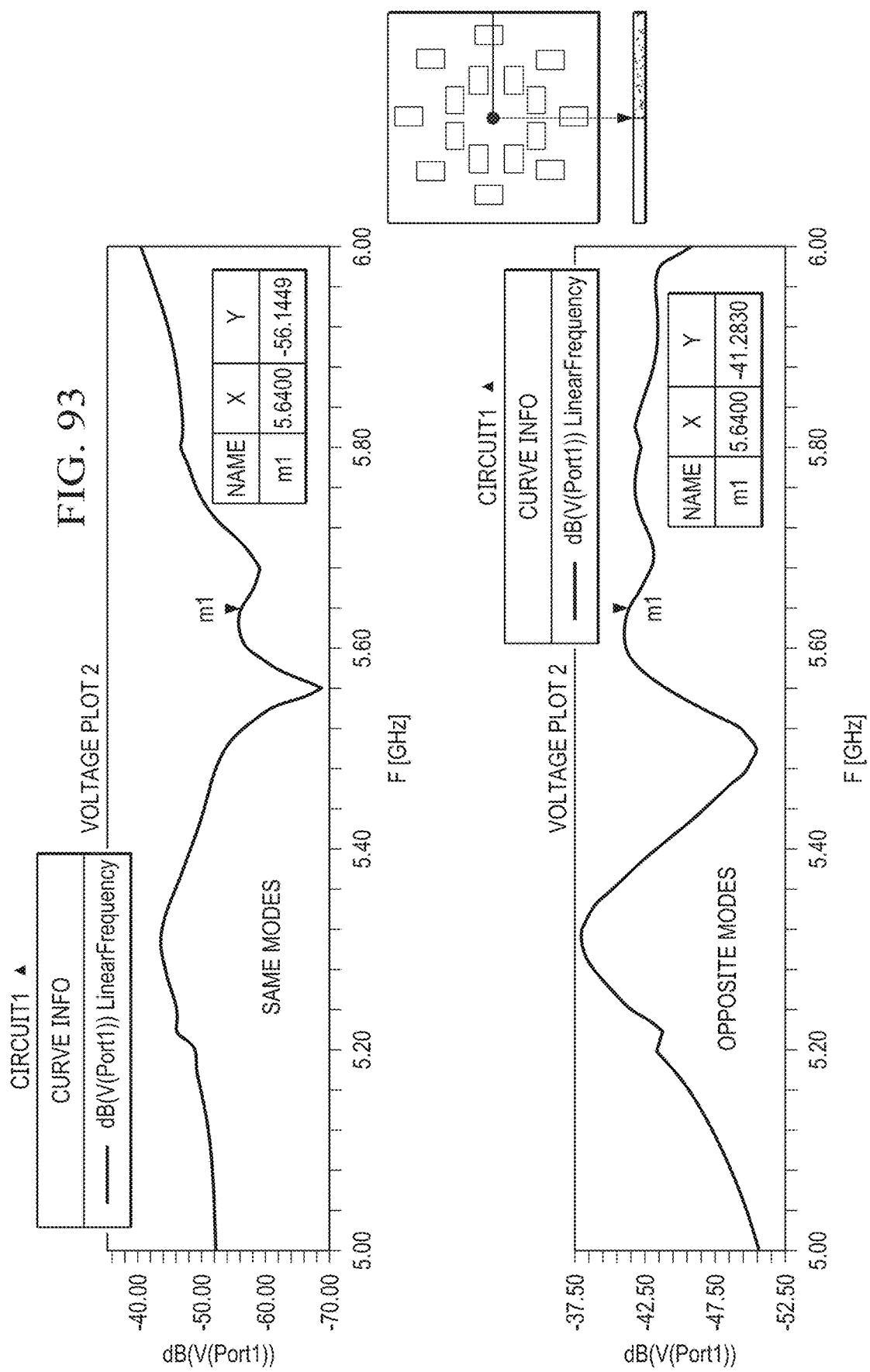
Figure 94:
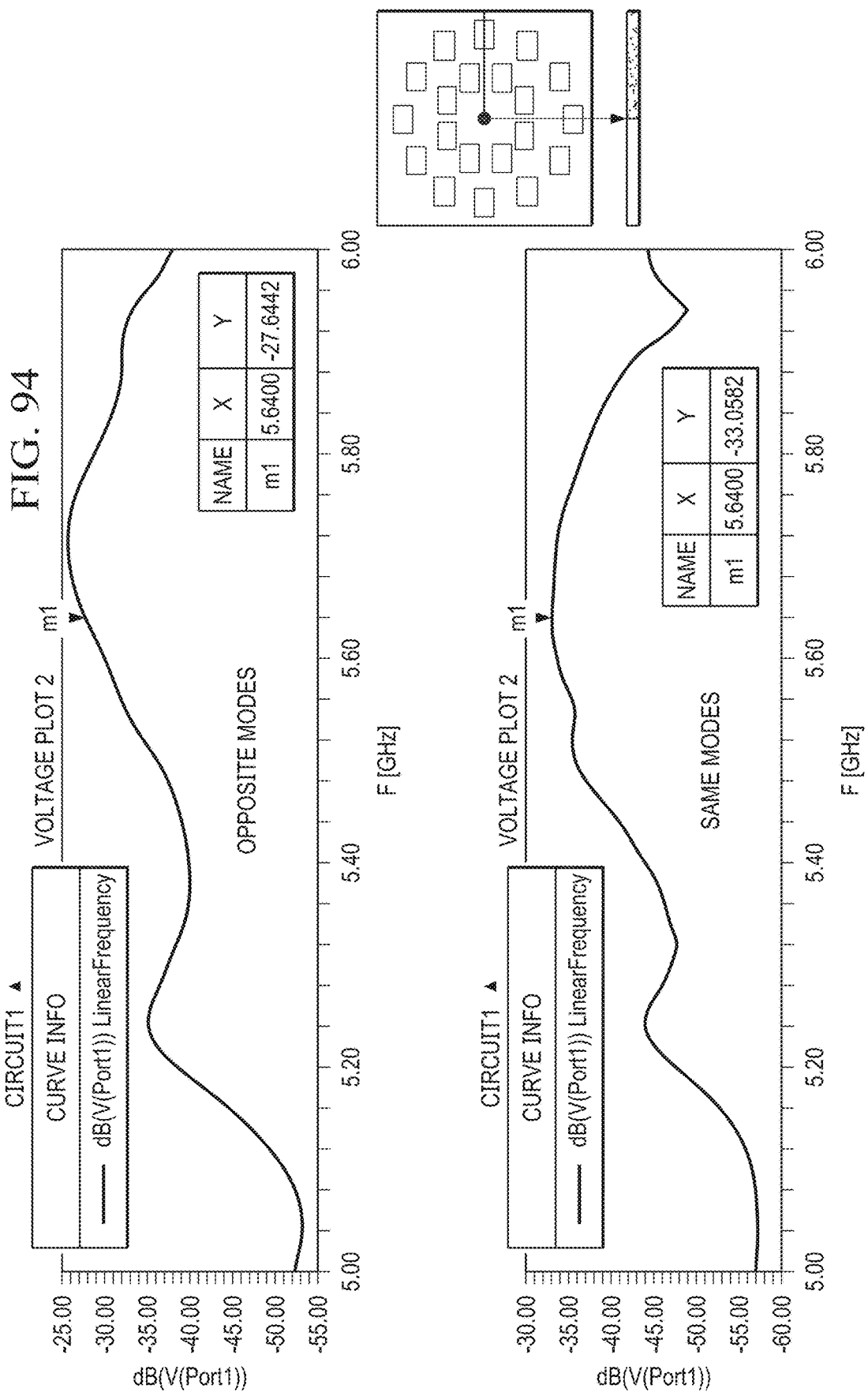
Figure 96:
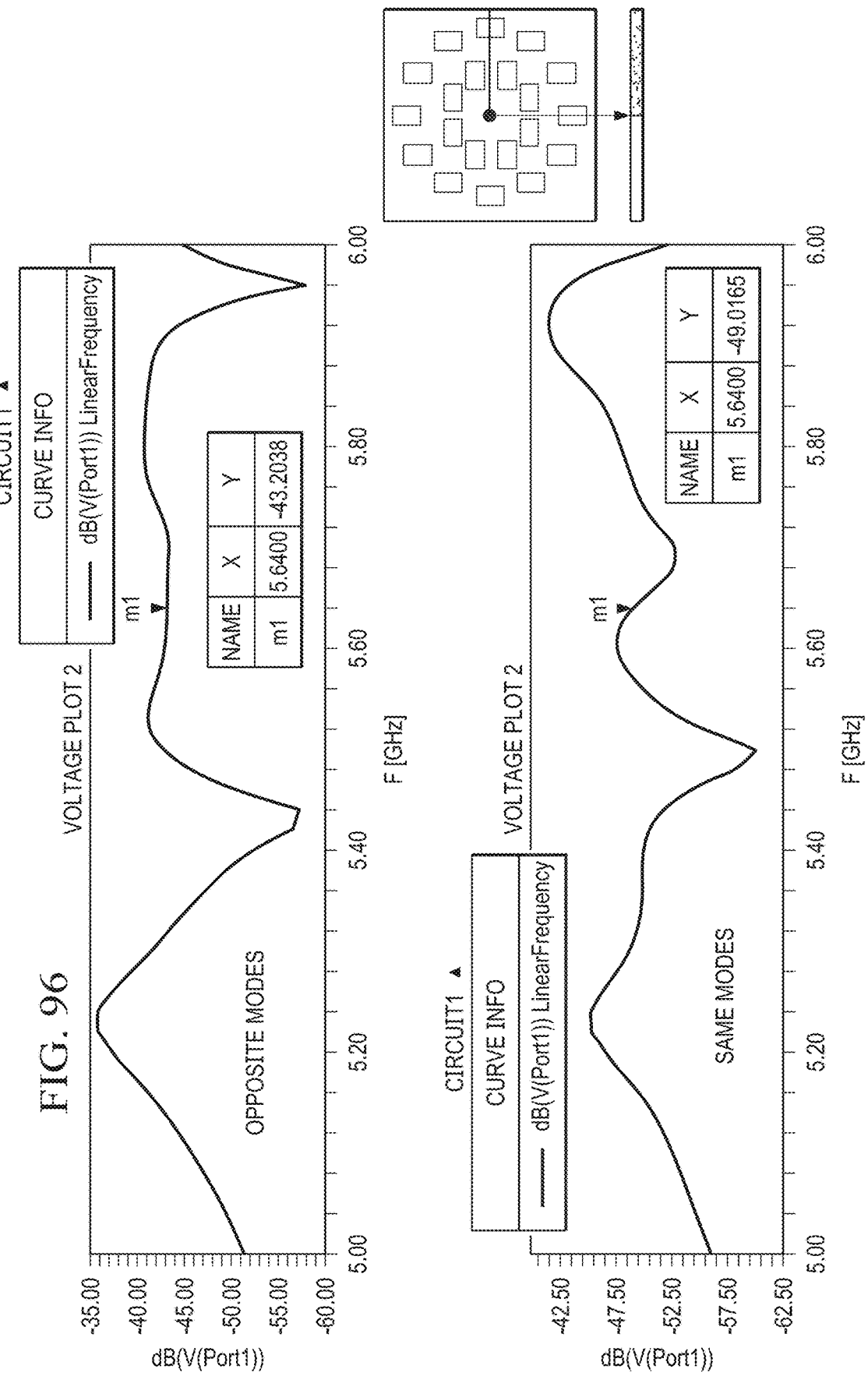
Figure 97:
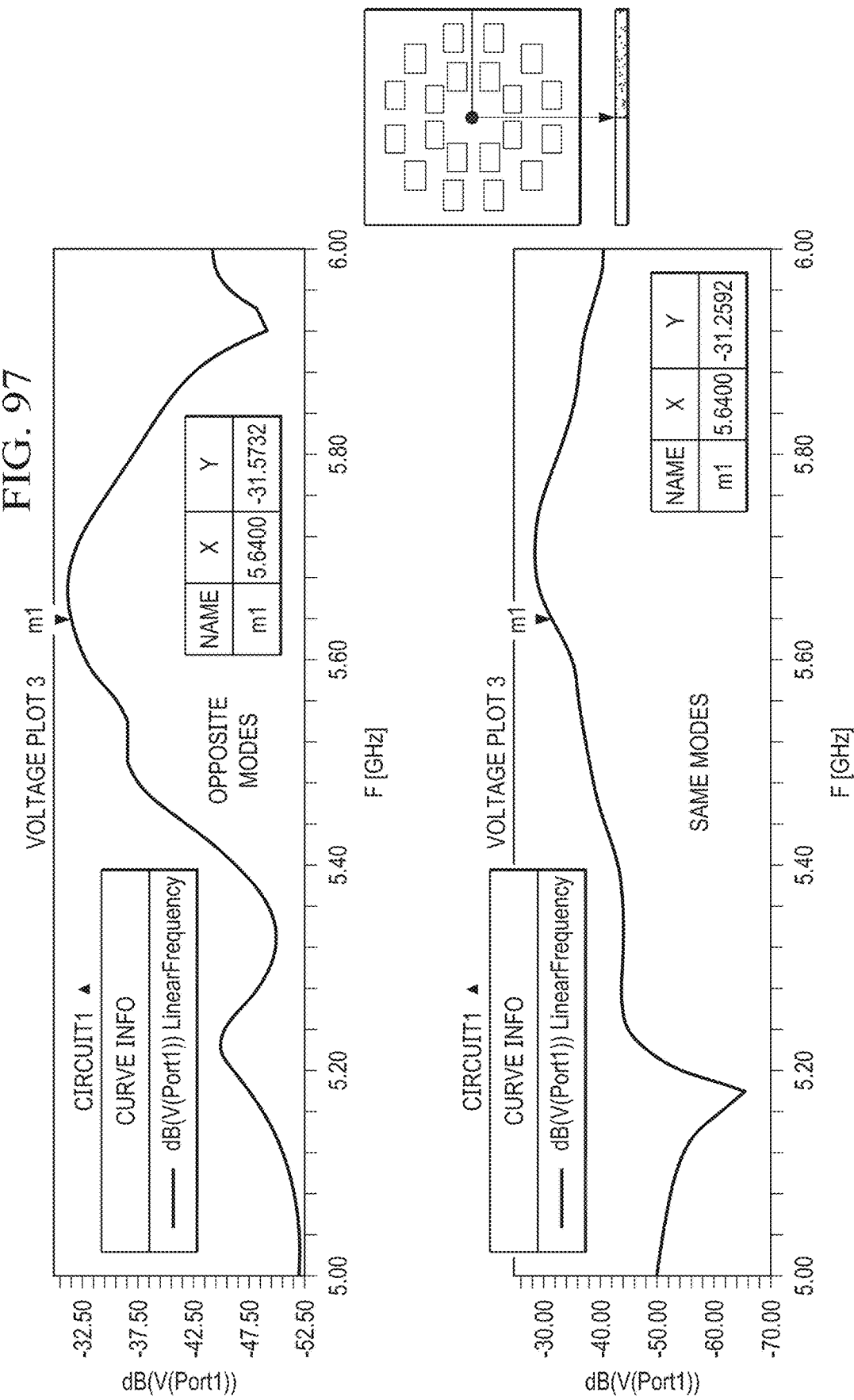
Figure 98:
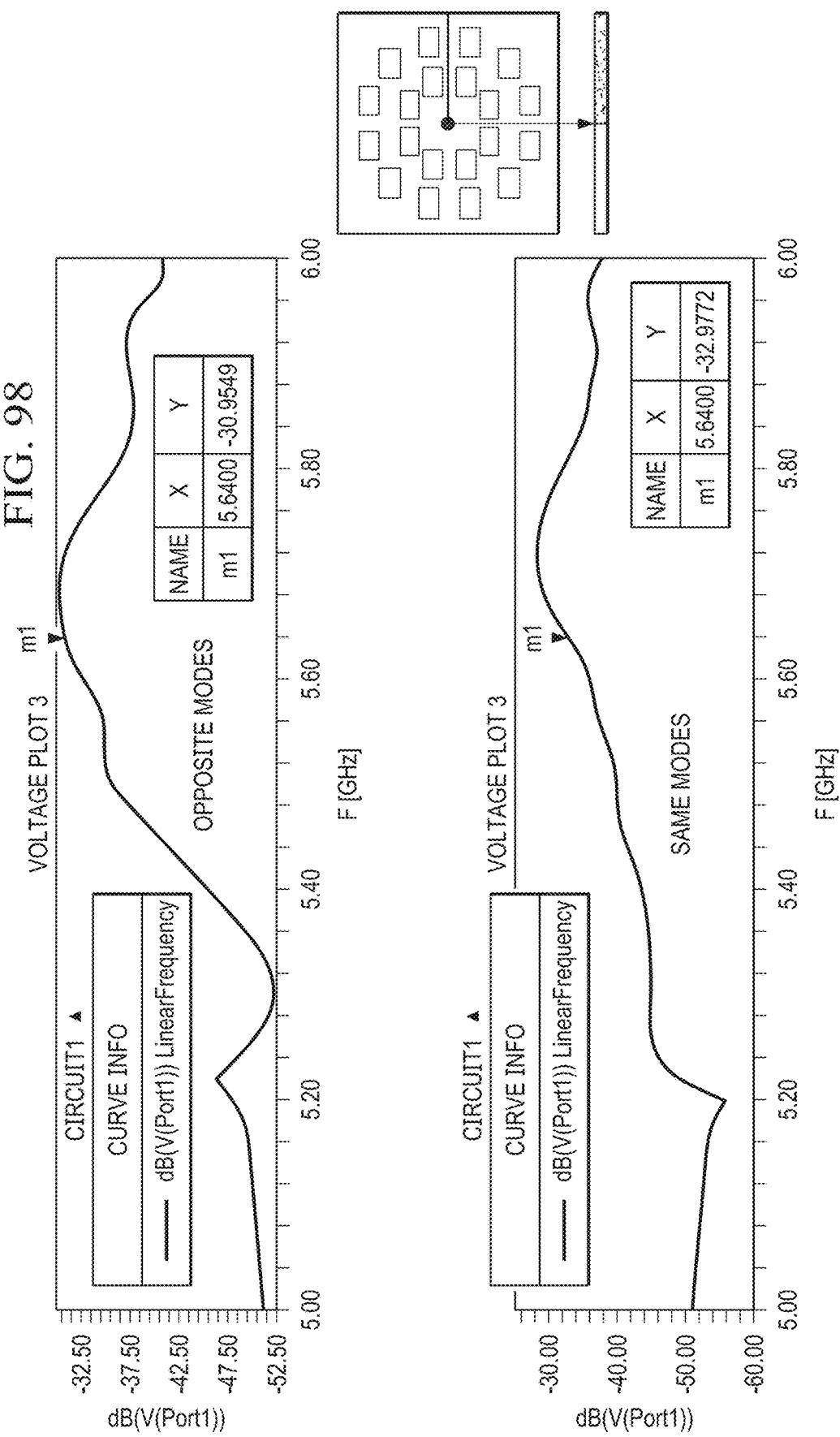
Figure 99:
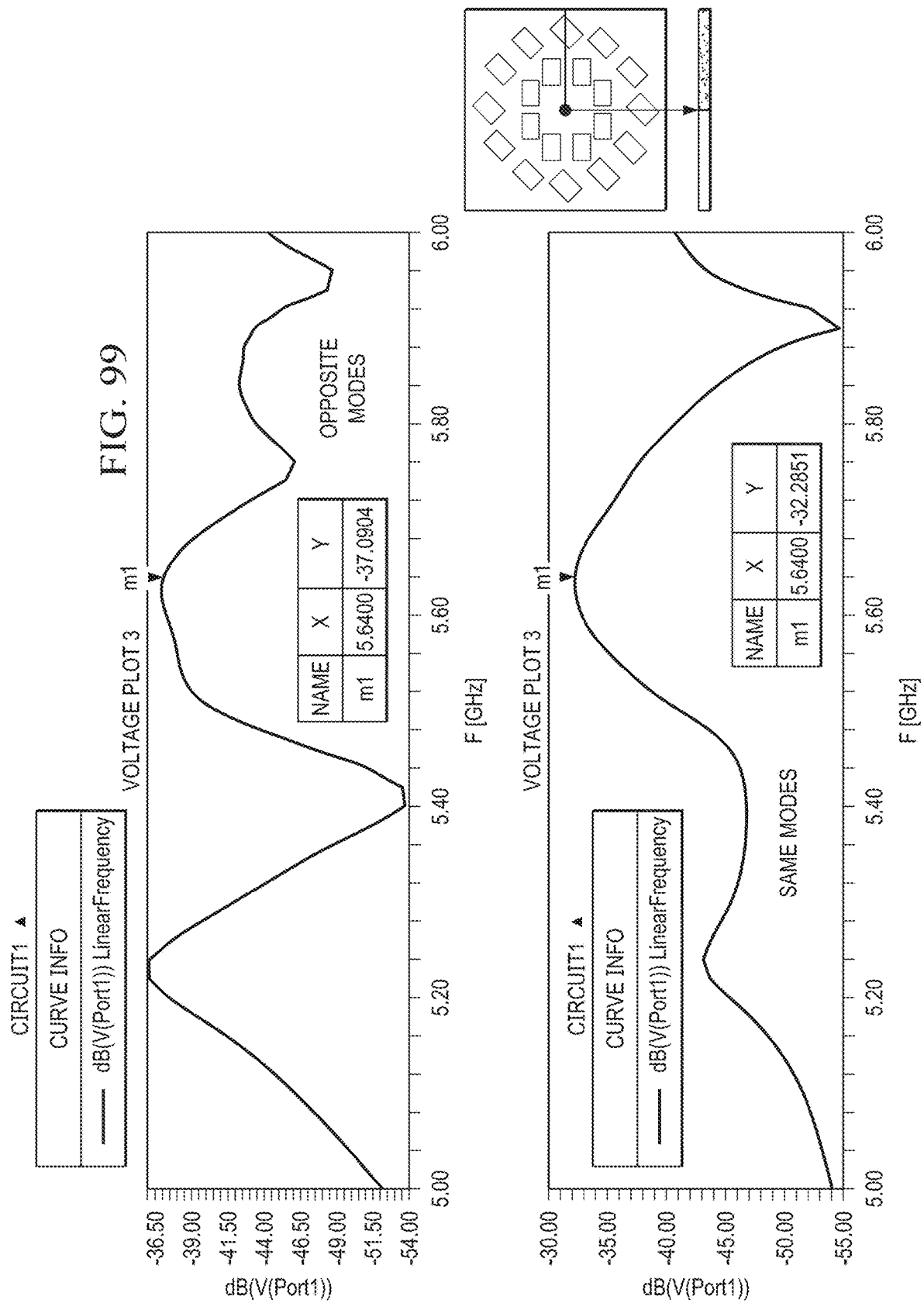
Figure 101:
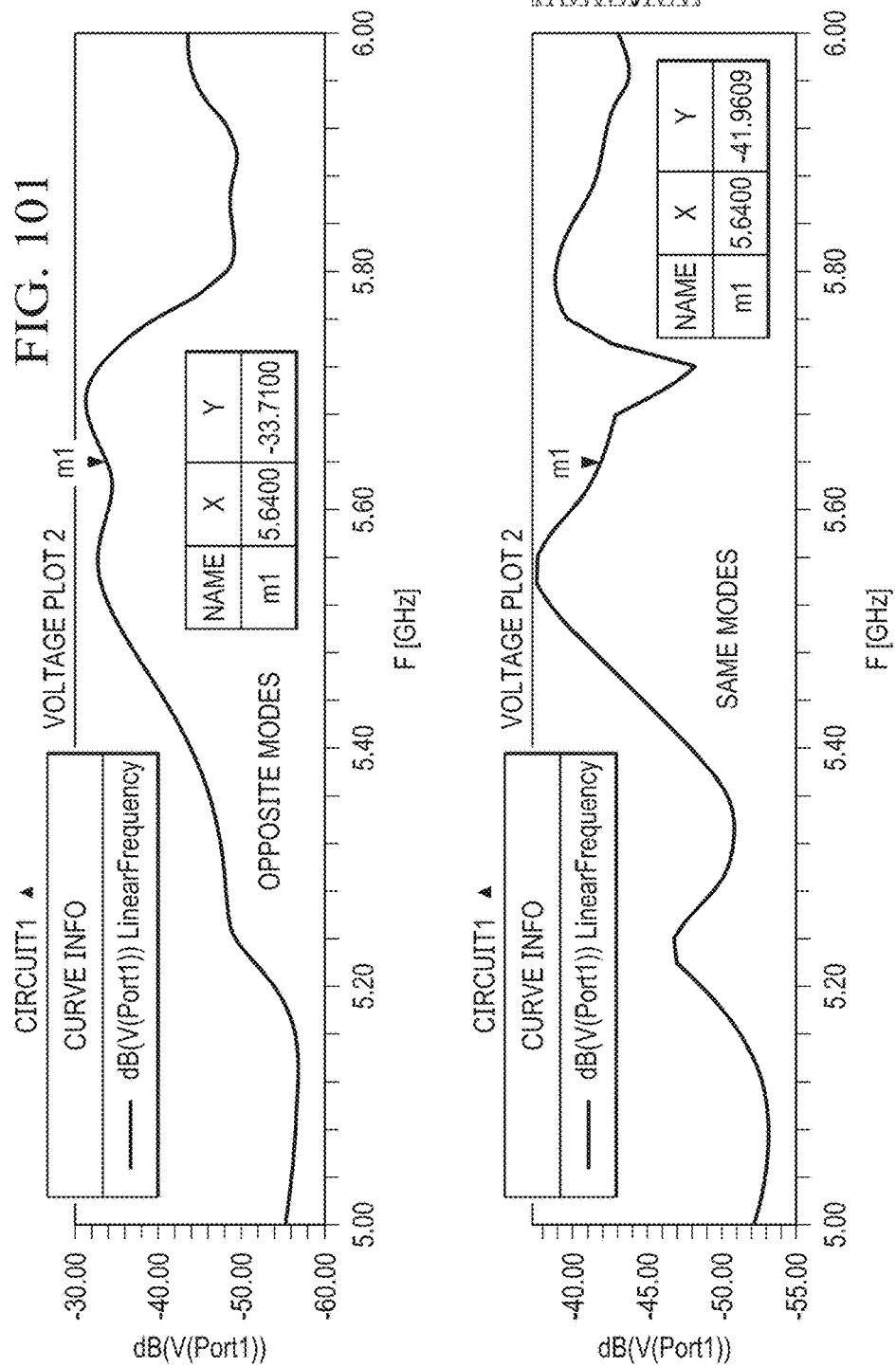

Referring now to FIG. 35A, there is illustrated a top level block diagram of the embodiment of FIG. 34. The Peraso chipset 3510 is implemented on a transceiver dongle as will be more fully described herein below. The Peraso chipset 3510 is used for generating signals that can be transmitted through a window or wall between transceiver dongles 3414 located on the interior and exterior of a building. The signals are transmitted from antennas 3530 that comprise a patch antenna array as described above and as will be more fully described herein below. In one embodiment, the transceiver processor circuitry 3408/3410 would be at least partially implemented using the RK 3399 processor 3532. The RK 3399 processor 3532 comprises a low power, high performance processor for computing, personal mobile Internet devices and other smart device applications. The RK 3399 processor 3532 and the Peraso chipset 3510 are powered by a power driver 3534. The power driver 3534 may comprise any of the power circuitry configurations described herein such as those described in FIGS. 92-94. The power driver 3534 may comprise a single circuit that provides power to both the internal and external components of the communication system. Alternatively, each of the internal and external components may have separate power drivers 3534 to power the components.

Figure 35C:
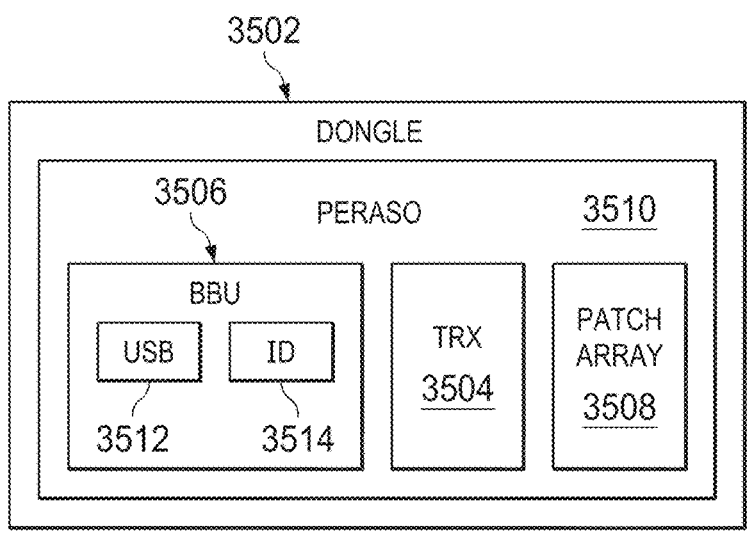
FIG. 35C illustrates a block diagram of a transceiver dongle for providing full-duplex communications.
Figure 35B:
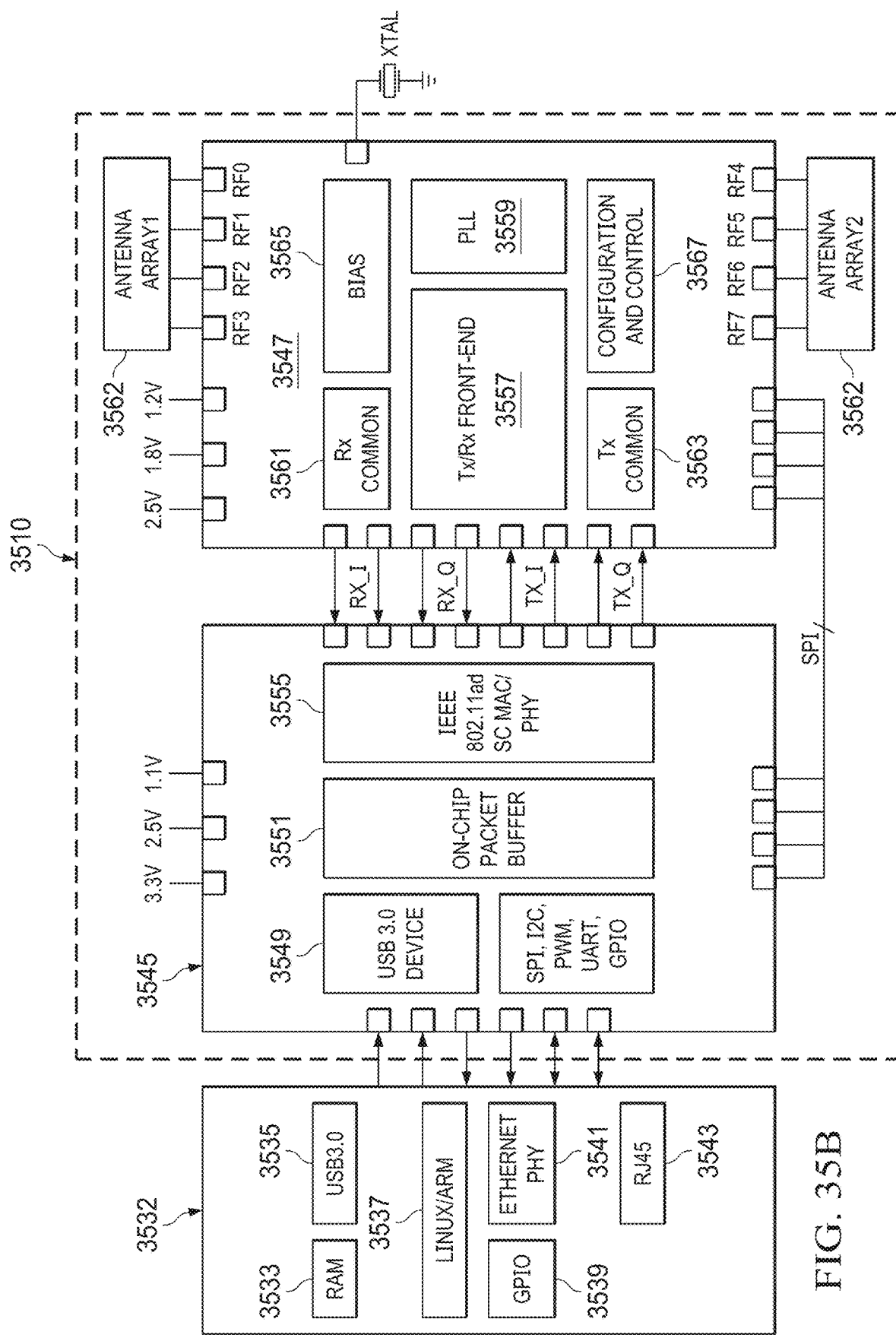
FIG. 35B illustrates a more detailed block diagram of a RK 3399 processor and a Peraso chipset.

FIG. 35B more particularly illustrates a block diagram of the RK 3399 processor 3532 and the Peraso chipset 3510. The RK 3399 processor 3532, which will be more fully described herein below includes a RAM memory 3533, a USB 3.0 interface 3535 for interfacing with the Peraso chipset 3510, a Linux/ARM 3537 port is used for connecting and ARM processor, a GPIO connection 3539, an Ethernet PHY connection 3541 and an RJ45 connection 3543.

The Peraso chipset 3510 is implemented on a pair of processing devices 3545 and 3547. Processing device 3545 includes a USB 3.0 interface 3549, an on-chip packet buffer 3551, connection circuitry 3553 including a SPI, I2C, PWM, UART and GPIO, and an interface 3555 comprising an IEEE 802.11ad SC MAC/PHY. The second processing device 3547 includes a TX/RX front-end, phase locked loop 3559, RX common 3561, TX common 3563, bias circuit 3565 and configuration and control 3567. Connected to the second processing 3547 are first and second antenna arrays 3562.

Referring now to FIG. 35C, there is illustrated a functional block diagram of a further implementation of a transceiver dongle that may be used for transmitting signals through a window or wall of a structure as described hereinabove. The transceivers may be implemented in the form of a dongle 3502 that may be inserted for example into a USB port of a transceiver processor located internally or externally of a building for implementing the transmission through the window or wall. However, other types of connection ports may also be utilized. The dongle 3502 would include transceiver circuitry 3504, BBU circuitry 3506 and a patch antenna array 3508. The transceiver circuitry 3504 in combination with the BBU circuitry 3506 is responsible for processing received data signals for transmission and processing received data signals into their individual signals as has been described hereinabove in a number of places with respect to the transmission of data using OAM or other types of signal processing.

The BBU 3506 implements PRS4601 WiGig baseband that is compliant with IEEE 802.11ad. The BBU 3506 includes a USB 2.0 and 3.0 device/host system interface 3512 supporting link speeds of up to 2.0 Gb/s, but it is possible to configure the PRS4601 as a multi-gigabit WiGig. The BBU 3506 can modulate/demodulate all control and carrier signals up to 16-QAM WiGig coding schemes (MCS0 to MCS12) up to a maximum rate of 4.62 Gb/s. The BBU 3506 also includes programmable IO subsystem 3514 consisting of GPIO, UART, SPI, TWI, PWM and JTAG.

The transceiver circuitry 3504 implements PRS 1126 which is a highly integrated, low power, single-chip mm-wave radio transceiver compliant with the IEEE 802.1 lad specification. The high performance allows the dongle 3502 to support all WiGig protocol application layers. The patch antenna array 3508 may in one embodiment comprises a PRA613-A1 which is a 4×4 concentric patch antenna in a single level array. The patch antenna array 3508 is a high efficiency, high bandwidth device with gain greater than 8 dB across all four channels. As a stand-alone antenna, it enables independent product design when used with Peraso radio transceiver PRS 1126. In further embodiments, the patch antenna array 3508 may utilize the multilevel arrays described herein for the transmission of data. The patch antennas making up the patch antenna array 3508 operate in the unlicensed 57 to 66 GHz frequency band. The patch antennas have a gain of 8.5 dBi with plus/minus 0.5 dB gain variation over the entire frequency band. The overall size of the patch antennas are 7.5 mm×6.5 mm×0.95 mm. The patch antenna array 3508 generates beams in the H-plane having a beam width of 95° plus or minus 5° and in the E-plane of 90° plus or minus 10°. The patch antennas are designed to work with an amplifier dish or lens and as a stand-alone antenna.

The BBU 3506, TRX 3504 and Patch Antenna Array 3508 of are each implemented using the Peraso chip set 3510. As described previously, FIG. 84A illustrates a top level block diagram of a Peraso transceiver that may be used for transmissions as described hereinabove on the transceiver dongle. FIGS. 84B and 84C as described previously provide a more detailed application diagram of the Peraso chipset implemented on the transceiver dongle.

Figure 35D:
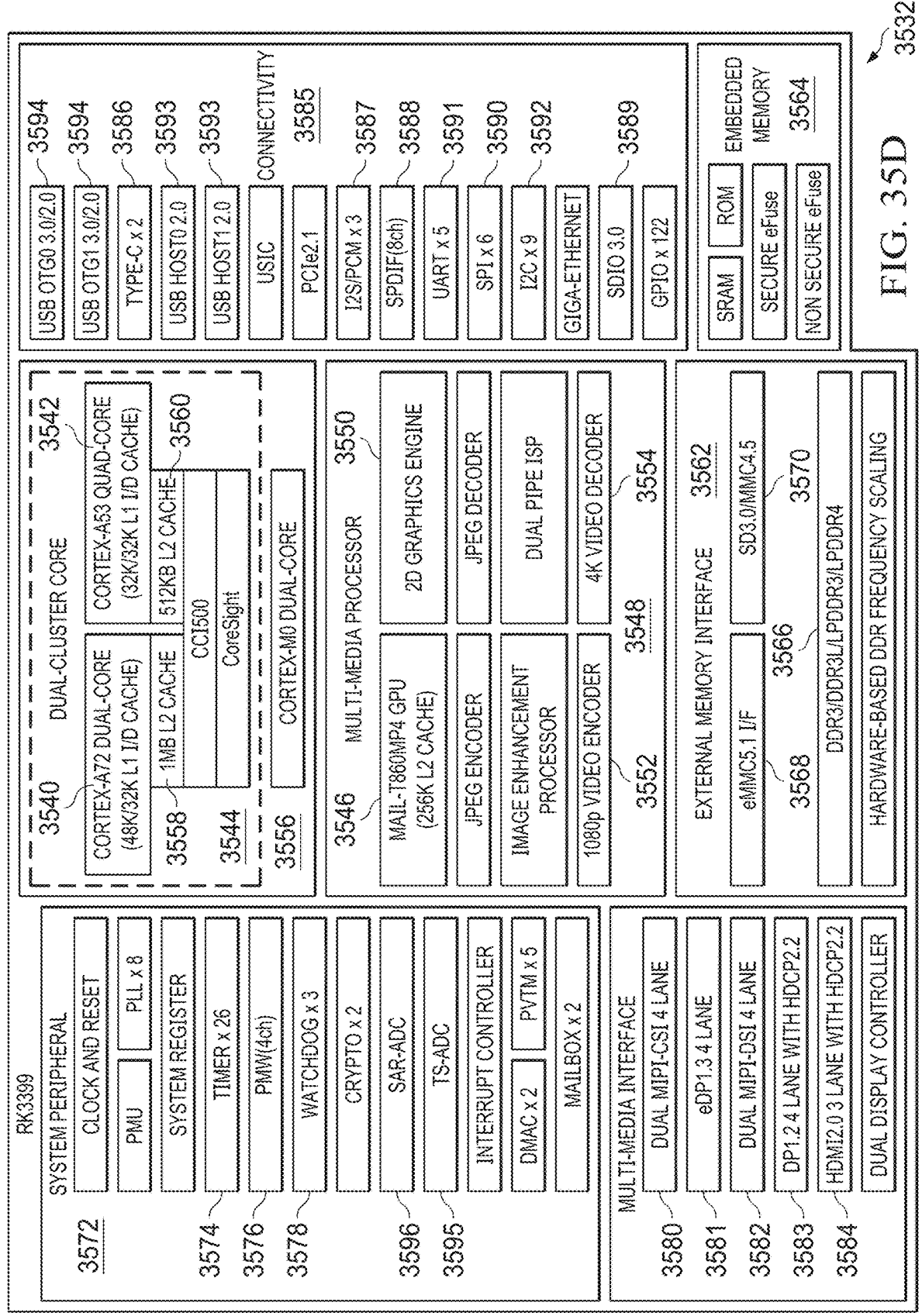
FIG. 35D illustrates a block diagram a device implementing a Peraso chipset.

FIG. 35D illustrates a block diagram of the RK 3399 processor 3532. The RK 3399 processor 3532 integrates dual core Coretex-A723540 and quad-core Cortex-A533542 with separate NEON coprocessor within a dual cluster core 3544. The RK 3399 processor 3532 also integrates a Mali T860 MP4 GPU (graphics processing unit) 3546 within a multi-media processor 3548. The RK 3399 processor 3532 includes a good Linux support including U-Boot, kernel, graphics 3550, video decoder 3552 and encoder 3554 within the multi-media processor 3548. The RK 3399 processor 3532 includes a CPU 3556 having a dualcore ARM Cortex-A72 MPCore processor 12340 and a Quad-core ARM Cortex-A53 MPCore processor 3542. Both processors are high-performance, low-power and cached application processor. The two CPU clusters comprise big clusters with the dual-core Cortex-A72 3540 being optimized for high-performance and little cluster quad-core Cortex-A53 3542 being optimized for low power. The CPU 3556 provides full implementation of the ARM architecture v8-A instruction set. An ARM Neon Advanced SIMD (single instruction, multiple data) provides support for accelerating media and signal processing. CCI500 ensures the memory coherency between the two clusters 3540 and 3542. Each Cortex-A72 3540 integrates 48 KB L1 instruction cache and 32 KB L1 data cache with 4-way set associative. Each Cortex A53 3542 integrates 32 KB L1 instruction cache and 32 kB L1 data cache separately with 4-way set associative. The CPU 3556 further includes a 1 MB unified L2 cache 3558 for the big cluster 3540 and a 512 KB unified L2 cache 3560 for the little cluster 3542. The CPU 3556 further provides Trustzone technology support.

The multi-media processor 3548 comprises an ARM Mali-T860MP4 GPU 3546 that supports OpenGL ES1.1/2.0/3.0, OpenCL1.2, DirectX11.1 etc. The GPU of the multi-media processor 3548 further comprises embedded 4 shader cores with shared hierarchical tiler.

The systems memory comprises external memory interface 3562 and embedded memory components 3564. The external memory interface 3562 includes a dynamic memory interface (DDR3/DDR3L/LPDDR3/LPDDR4) 3566 that is compatible with JEDEC standard DDR3-1866/DDR3L-1866/LPDDR3-1866/LPDDR4 SDRAM. The dynamic memory interface 3566 supports two channels, wherein each channel has 16 or 32 bits data width. The dynamic memory interface also supports up to two ranks (chip selects) for each channel totaling 4 GB(max) address space. Maximum address space of one rank in a channel is also 4 GB, which is software-configurable. The eMMC Interface 3568 is fully compliant with JEDEC eMMC 5.1 and eMMC 5.0 specification. The interface 3568 supports HS400, HS200, DDR50 and legacy operating modes. SD/MMC Interface 3570 includes two MMC interfaces which can be configured as SD/MMC or SDIO. The SD/MMC interface 3570 is compatible with SD3.0. MMC ver4.51.

System peripherals 3572 include but are not limited to timers 3574 including 14 on-chip 64 bits timers in SoC with interrupt-based operation for non-secure application and 12 on-chip 64 bits Timers in SoC with interrupt-based operation for secure applications. PWM 3576 include four on-chip PWMs with interrupt-based operation. A WatchDog 3578 includes three Watchdogs in SoC with 32 bits counter widths.

The multi-media processor 3548 comprises an ARM Mali-T860MP4 GPU 3546 that supports OpenGL ES1.1/2.0/3.0, OpenCL1.2, DirectX11.1 etc. The GPU of the multi-media processor 3548 further comprises embedded 4 shader cores with shared hierarchical tiler.

Video components of the RK3399 processor 3532 include real-time video decoder of MPEG-1, MPEG-2, MPEG-4, H.263, H.264, H.265, VC-1, VP9, VP8, MVC; H.264 10 bit up to HP level 5.1: 2160p@60 fps (4096×2304); VP9: 2160p@60 fps(4096×2304); H.265/HEVC 10 bit: 2160p@60 fps(4096×2304); MPEG-4 up to ASP level 5: 1080p@60 fps (1920×1088); MPEG-2 up to MP: 1080p@60 fps (1920×1088); MPEG-1 up to MP: 1080p@60 fps (1920×1088); H.263: 576p@60 fps (720×576); VC-1 up to AP level 3: 1080p@30 fps (1920×1088); VP8: 1080p@60 fps (1920×1088); MVC: 1080p@60 fps (1920×1088); support video encoders for H.264, MVC and VP8.

The system display components include embedded two VOP, outputs from the following display interface: one or two MIPI-CSI port 3580, one eDP port 3581, one DPI port 3582, and one HDMI port 3583. The ports support AFBC function co-operation with the GPU. The HDMI interface 3584 comprises a single physical layer PHY with support for HDMI 1.4 and 2.0 operation as well as support HDCP 1.4/2.2. The MIPI interface includes embedded 3 MIPI PHY, MIPI0 only for DSI, MIPI1 for DSI or CSI, MIPI2 only for CSI. Each port has 4 data lanes that provide up to 6.0 Gbps data rate. The eDP interface is compliant with eDPTM specification, version 1.3 for up to 4 physical lanes of 2.7/1.62 Gbps/lane. A display port interface is compliant with display port specification, version 1.2 and is compliant with HDCP2.2 (and back compatible with HDCP1.3). There is only one display port controller built-in RK3399 which is shared by 2 Type-C.

Connectivity components 3585 include a camera interface and image processor that include one or two MIPI-CSI input interfaces and two embedded ISP (Image Sensor Processors). A maximum input resolution of one ISP is 13M pixels. Connectivity components include an embedded 2 Type-C PHY 3586. The connectivity components 3585 are compliant with USB Type-C Specification, revision 1.1 and with USB Power Delivery Specification, revision 2.0. Connection components 3585 have attach/detach detection and signaling as DFP, UFP and DRP as well as plug orientation/cable twist detection. The connections support USB3.0 Type-C and DisplayPort 1.2 Alt Mode on USB Type-C, two PMA TX-only lanes and two PMA half-duplex TX/RX lanes (can be configured as TX-only or RX-only). The connectivity components provide up to 5 Gbps data rate for USB3.0, up to 5.4 Gbps (HBR2) data rate for DP1.2, can support 1/2/4 lane modes.

Audio components of the RK 3399 processor 3532 include three I2S/PCM in SoC 3587. 2S0/I2S2 supports up to eight channels TX and eight channels RX. I2S1 supports up to two channels TX and two channels RX. I2S2 is connected to an HDMI and DisplayPort internally. I2S0 and I2S1 are exposed for peripherals. Audio components further include SPDIF 3588 that supports two 16-bit audio data store together in one 32-bit wide location. SPDIF 3588 also supports bi-phase format stereo audio data output and 16 to 31 bit audio data that is left or right justified in 32-bit wide sample data buffer. Finally, SPDIF 3588 supports 16, 20, 24 bits audio data transfer in a linear PCM mode.

Connectivity 3585 further includes an SDIO interface 3589 that is compatible with SDIO 3.0 protocol. A GMAC 10/100/1000M Ethernet controller supports 10/100/1000-Mbps data transfer rates with the RGMII interfaces and supports 10/100-Mbps data transfer rates with the RMII interfaces. A SPI controller 3590 includes six on-chip SPI controllers. A UART Controller 3591 includes five on-chip UART controllers. A I2C controller includes nine on-chip I2C controllers.

Connectivity components 3585 further include two embedded USB 2.0 Host interfaces 3594, two embedded USB OTG3.0 interfaces and one PCIe port compatible with PCI Express Base Specification Revision 2.1.

Other RK 3399 components include an embedded two channel TS-ADC temperature sensor 3595, 6-channel single-ended 10-bit successive approximation register analog-to-digital converter (SAR-ADC) 3596 that provides a conversion speed range up to 1 MS/s sampling rate and two 1024 bits(32×32) high-density electrical fuses (eFuse) that are integrated.

Figure 36:
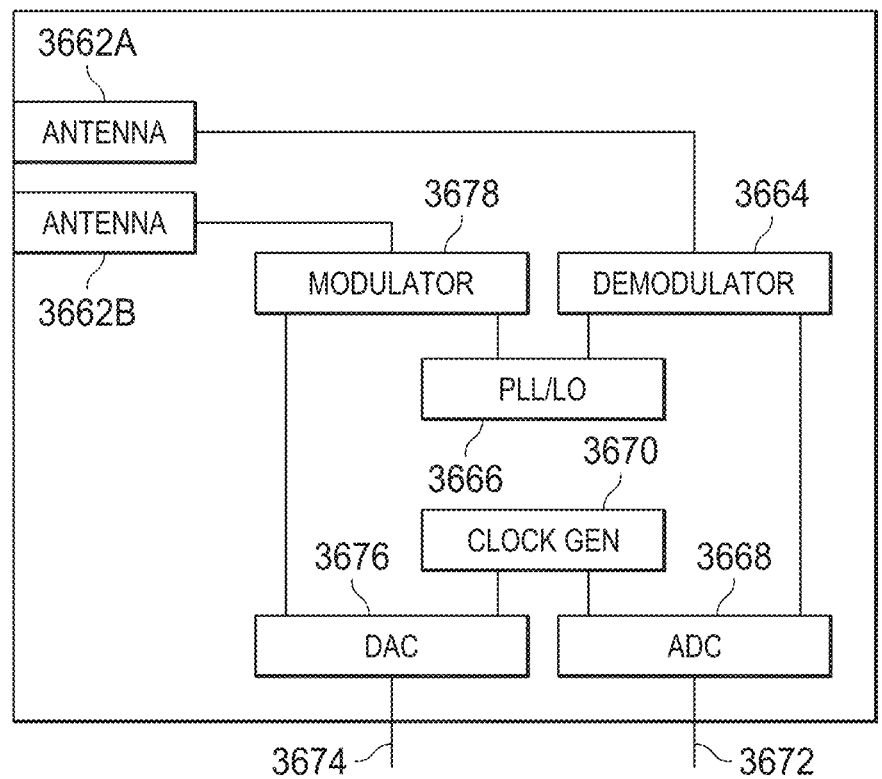
FIG. 36 is a top-level block diagram of a Peraso transceiver.

Referring now to FIG. 36 there is illustrated a block diagram of the modulation system. Signals to be transmitted are provided at input 3674 in a digital format and converted from digital to analog format at the digital to analog converter 3676 responsive to a clock signal from clock generator 3670. The analog signal is modulated within modulator 3678 responsive to the analog signal and control signals from the phase locked loop/local oscillator block 3666. The modulated signals are transmitted from antenna 3662B in one of the configurations described hereinbelow from the Peraso transceiver 3660. The Peraso chipset is more particularly described in the Peraso Wi 10 WiGig Chipset Product Brief dated Dec. 18, 2015 which is incorporated herein by reference.

Figure 37A:
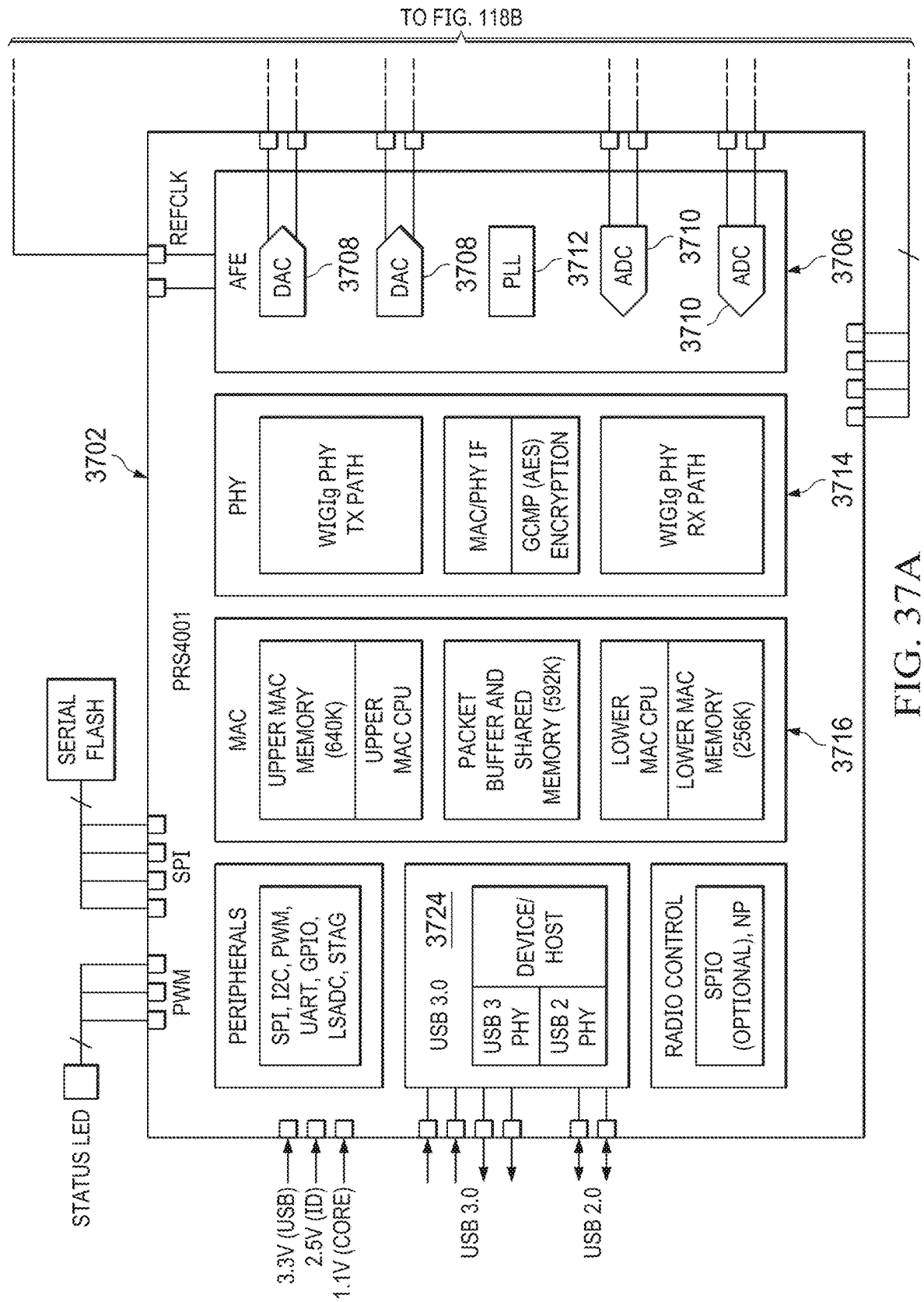
FIGS. 37A and 37B illustrate a detailed application diagram of a Peraso chipset.
Figure 37B:
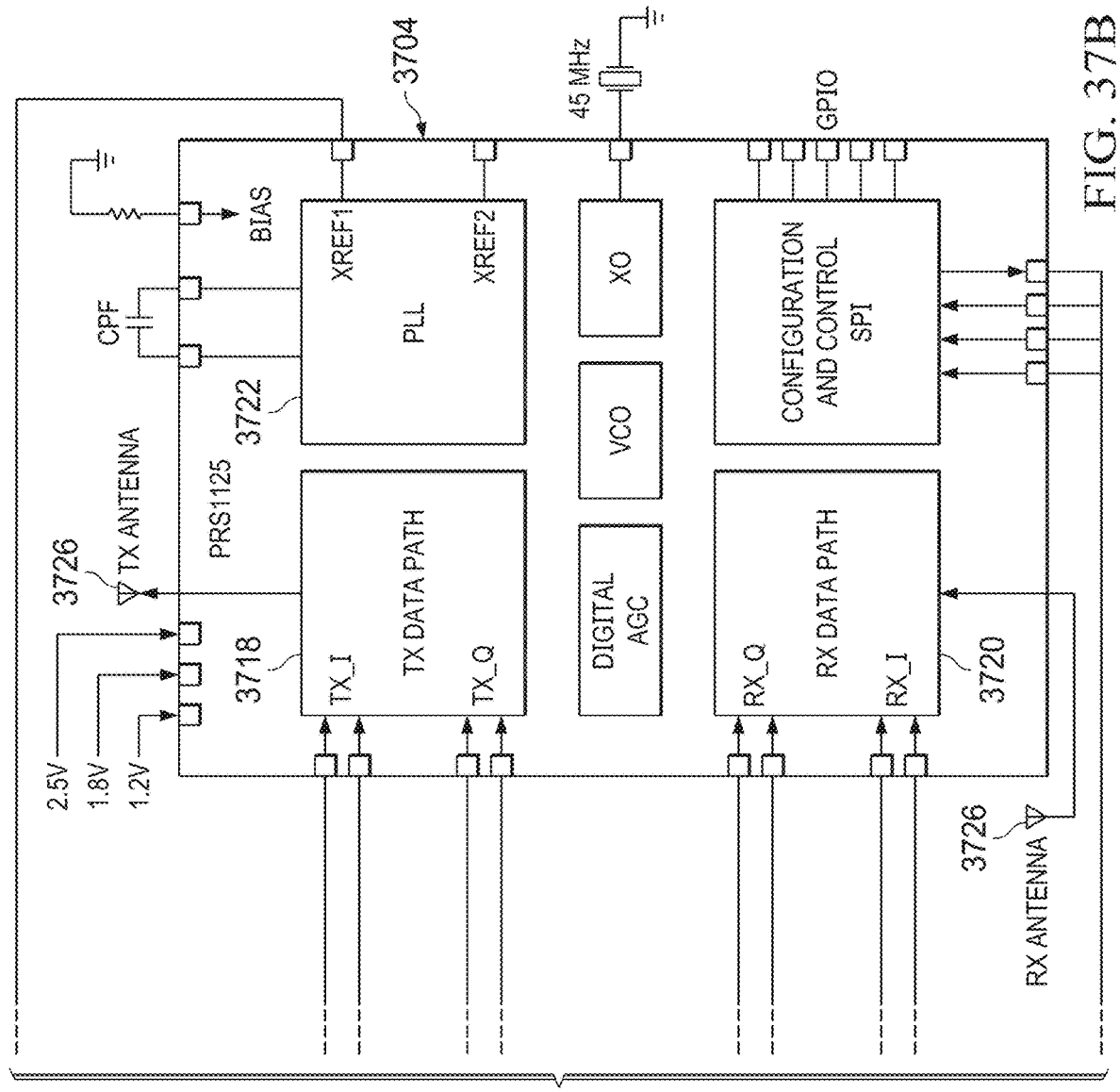

Referring now to FIGS. 37A and 37B, there is illustrated a more detailed application diagram of the Peraso chipset. While the Peraso chipset in the 60 GHz band has been described, it will be realized by one skilled in the art that the chipset may utilize any frequency where the repeater enables extension of signal transmission capabilities. Examples include, but are not limited to, millimeter bands, 28 GHz band, 39 GHz band, 2.5 GHz band, CBRS band (3.5 GHz) and Wi-Fi band (5 GHz). The Peraso chipset comprises the Wi 10 chipset that is targeted for use with WiGig applications. The Peraso chipset employs a PRS 1125 integrated circuit 3702 and PRS 4001 integrated circuit 3704 to implement the IEEE 802.1 lad functionality. The Peraso chipset implements a complete superspeed USB 3.0 to WiGig solution. The PRS 4001 low power WiGig baseband integrated circuit 3702 incorporates the analog front end 3706 including digital to analogue converters 3708, analog-to-digital converters 3710 and a phase locked loop 3712. The PRS 4001 circuit 3702 further includes the baseband physical layer 3714, Mac layer 3716 and two RISC CPU cores. The PRS 4001 circuit 3702 is IEEE 802.11ad compliant. A USB 2.0 and 3.0 interfaces 3724 enable USB communications. The PRS 4001 circuit 3702 supports seamless connection to all Peraso radios.

The PRS 1125 integrated circuit 3704 is a single chip direct conversion RF transceiver providing 60 GHz single ended receiver and transmit interfaces. The PRS 1125 circuit 3704 provides a transmit output power of up to 14 dBm, better than −21 dB transmit EVM (16-QAM), receiver noise less than 5 dB and a receiver conversion gain of greater than 70 dB. Integrated single ended 60 GHz antenna interfaces include a transmit data path 3718 and a received data path 3720. A phase locked loop 3722 tunes to all channels of IEEE 802.1 lad using an integrated controller. The Peraso chipset provides for wireless storage, wireless display and multi-gigabyte mobile wireless applications. The antennas 3726 comprise NA graded patch antennas with 8.5 dBi gain across the entire 60 GHz band.

Figure 38:
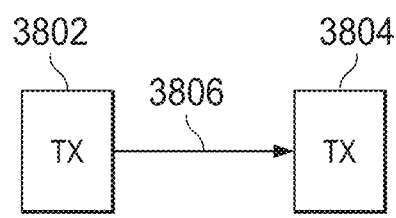
FIG. 38 illustrates serial transmissions between Peraso transceivers.

Full-duplex communications between Peraso chipset transceivers may be carried out in a number of fashions in order to control throughput therebetween. As illustrated in FIG. 38, communications between the first Peraso transceiver 8502 and a second Peraso transceiver 8504 may be carried out in series over a single communications channel 3806. In this case, the data is transmitted serially one item after the other over the single communications channel 3806. FIG. 37 illustrates a parallel full-duplex transmission configuration. In this configuration, transmissions between transceiver 3702 and transceiver 3704 occur over multiple channels 3708 operating in parallel. In this configuration, different data streams may be transmitted at the same time over the parallel communication channels 3708 in order to increase data throughput. In the parallel configuration, a data stream is petitioned in two multiple sub-streams and sent on the separate parallel channels 3708. The results may then be combined together at the receiver 3704.

Figure 39:
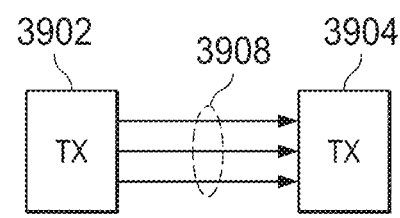
FIG. 39 illustrates parallel transmissions between Peraso transceivers.

Communications between Peraso chipset transceivers may be carried out in a number of fashions in order to control throughput therebetween. As illustrated in FIG. 38, communications between the first Peraso transceiver 8502 and a second Peraso transceiver 8504 may be carried out in series over a single full-duplex communications channel 3806. In this case, the data is transmitted serially one item after the other over the single communications channel 3806. FIG. 39 illustrates a parallel transmission configuration. In this configuration, full-duplex transmissions between transceiver 3902 and transceiver 3904 occur over multiple channels 3908 operating in parallel. In this configuration, different data streams may be transmitted at the same time over the parallel communication channels 3908 in order to increase data throughput. In the parallel configuration, a data stream is partitioned into multiple sub streams and sent on the separate parallel channels 3908. The results may then be combined together at the receiver 3904.

Figure 40:
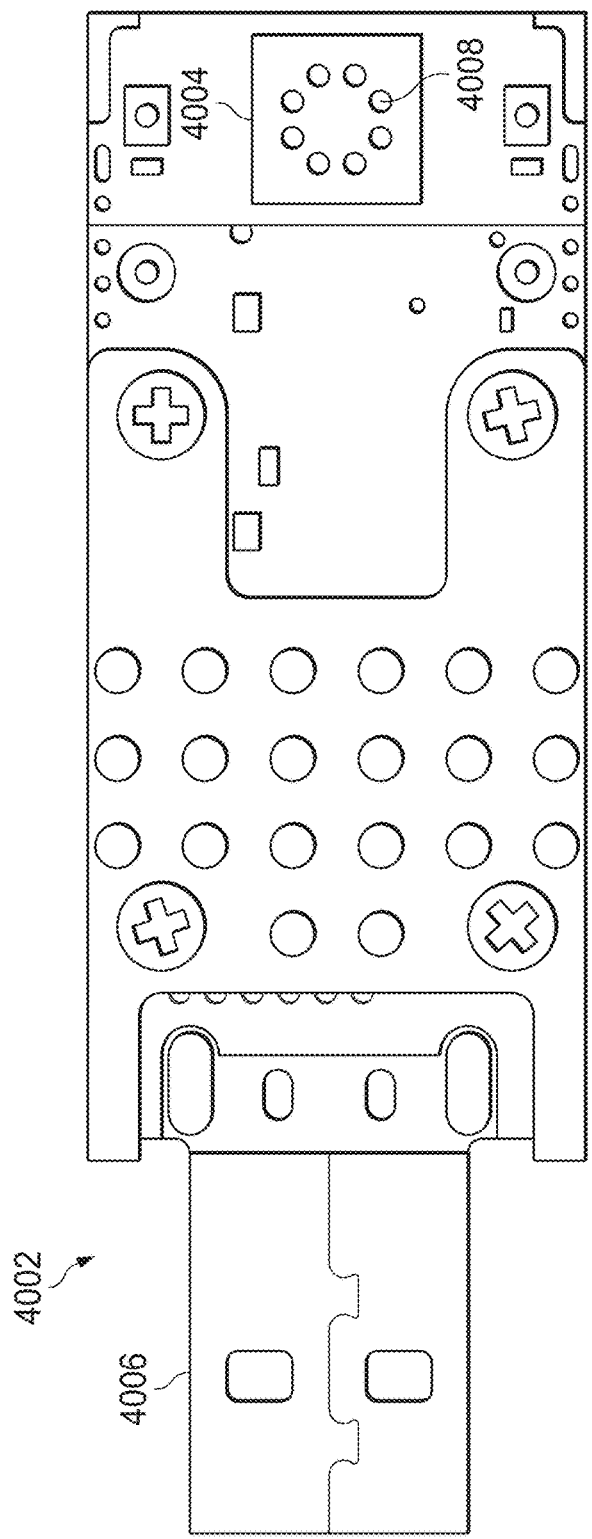
FIG. 40 illustrates a transceiver dongle and a multilevel patch antenna array for transmitting and receiving OAM signals.

FIG. 40 more particularly illustrates a transceiver dongle 4002 and the multilevel patch antenna array 4004 for transmitting and receiving OAM signals. The transceiver dongle 4002 interfaces with other devices using a USB connector 4006. The transceiver dongle 4002 also includes the patch antenna array 4004 which includes a first layer of patch antennas 4008 in a circular array. The patch antennas 4008 would provide for the transmission of signals across a window or wall to a second transceiver dongle. In an alternative embodiment, a second layer of patch antennas in a circular array within the first array of patch antennas may be combined with the first layer of patch antennas to enable the transmission of multiple signals. The first layer of patch antennas 4008 would transmit, for example, signals having an OAM function including an l=+1 helical beam and the second layer of patch antennas would receive signals having an OAM function including an l=−1 helical beam. Each of the first layer patch antennas 4008 and the second layer of patch antennas are at different level layers as described herein above with respect to FIGS. 105-114 to enable the transmission and reception of OAM signals between the interior and the exterior of the building.

Figure 41:
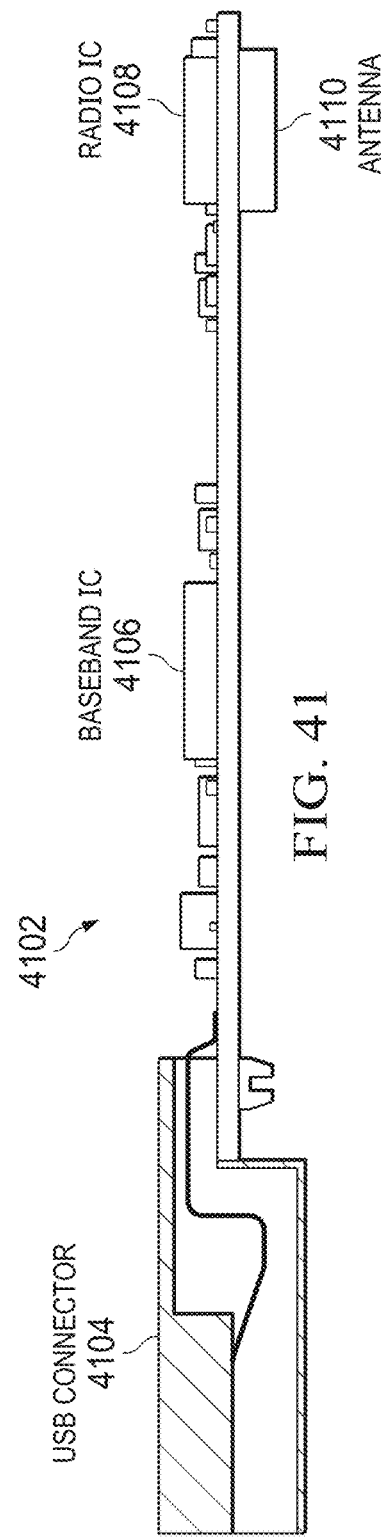
FIG. 41 illustrates a side view of the transceiver dongle.

FIG. 41 illustrates a side view of the transceiver dongle 4102. The side view illustrates the USB connector 4104 that is used for interconnecting the transceiver dongle 4102 with the processing units described with respect to FIG. 170. A baseband IC 4106 up/down converts signals between baseband levels and RF levels. The radio IC 4108 transmits and receives the RF signals received by antenna 4110. The antenna 4110 in a preferred embodiment comprises the multilevel patch antenna described herein above.

The operation of the transceiver dongles have been tested at various distances. When two transceiver dongles are spaced at a distance of 25 cm (approximately 10 inches), the transceiver dongles have been determined to have a throughput of approximately 1.53 Gb per second without glass in the open air and with a throughput of 734 Mb per second through glass. When two transceiver dongles are spaced at a distance of 15 cm (approximately 6 inches), the transceiver dongles have been determined to have a throughput of approximately 1.29 Gb per second without glass in the open air. When the transceiver dongles are placed upon opposite sides of window glass at a distance of approximately 2 cm (1 inch), the throughput is 1.5 Gb per second.

Figure 42:
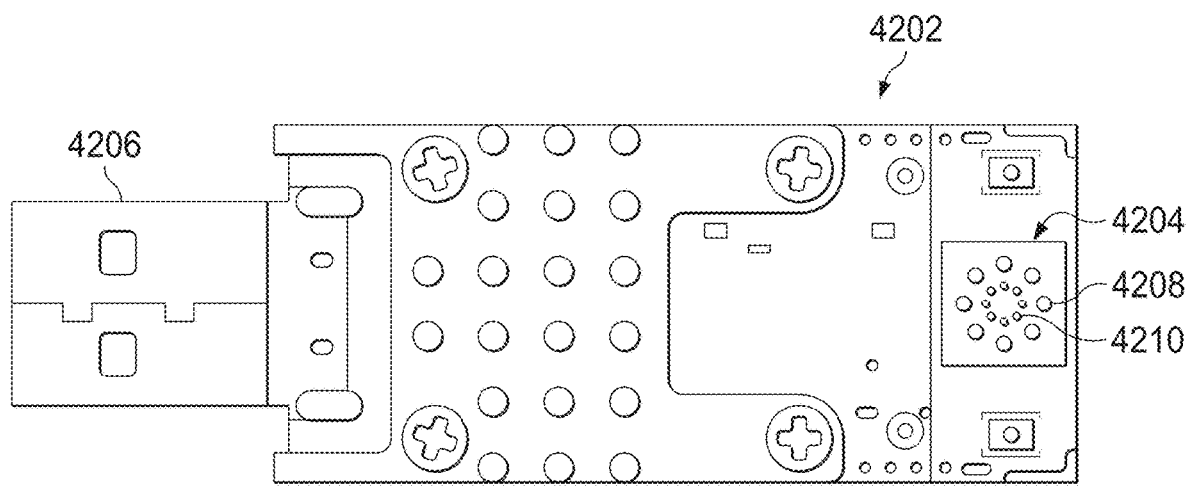
FIG. 42 illustrates a transceiver dongle and a multilevel patch antenna array for transmitting and receiving OAM signals.

FIG. 42 more particularly illustrates a transceiver dongle 4202 and the multilevel patch antenna array 4204 for transmitting and receiving OAM signals. The transceiver dongle 4202 interfaces with other devices using a USB connector 4206. The transceiver dongle 4202 also includes the patch antenna array 13404 which includes a first layer of patch antennas 4208 in a circular array and a second level of patch antennas 4210 within a circular array. The first layer of patch antennas 4208 would transmit, for example, signals having an OAM function including an l=+1 helical beam and the second layer of patch antennas 4210 would receive signals having an OAM function including an l=−1 helical beam. Each of the first layer patch antennas 4208 and the second layer of patch antennas 4210 are at different level layers as described herein above to enable the full-duplex transmissions using OAM signals.

Figure 43:
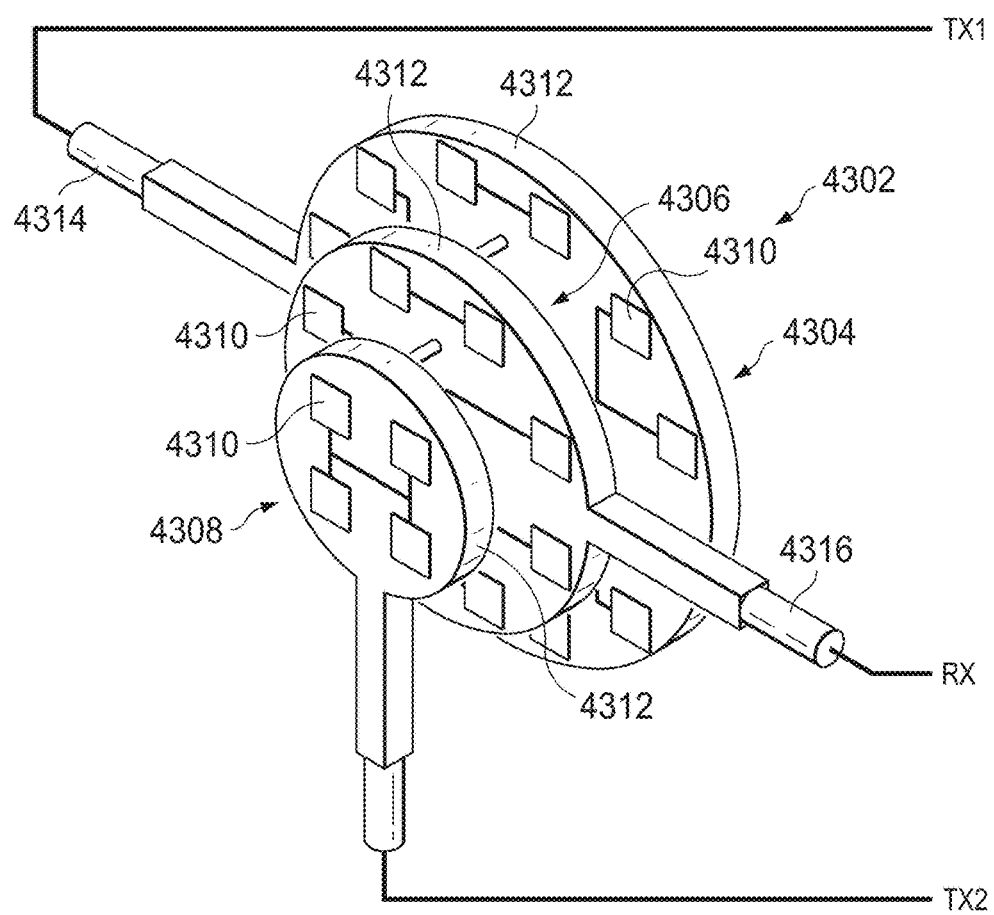
FIG. 43 illustrates a view of a three layer patch antenna.

Referring now to FIG. 43, there is illustrated the three level patch antenna array 4302 including a first level of a substantially circular patch antenna array 4304, a second level of a substantially circular patch antenna array 4306 and a third level of a substantially circular patch antenna array 4308. Each of the levels of patch antenna arrays comprise a plurality of patch antennas 4310 that are located on a substrate 4312. Each of the levels include a separate input or output depending on whether the array comprises a transmitting or receiving array. Antenna array 4304 comprises a transmit array having an input 4314 for receiving a signal to be transmitted by the array 4304. Antenna array 4306 comprises a receive patch antenna array having an output 4316 for outputting a received signal received by the patch antenna array. Antenna array 4308 also comprises a transmit array having an input 4318 for receiving a signal to be transmitted by the array 4308. By transmitting the same signals from the patch antenna array 4304 and patch antenna array 4308, destructive interference will enable cancellation of any of the transmitted signals received by the receive patch antenna array 4306 as will be more fully described hereinbelow. The improvement of signal interference between the transmitted and received signals may also be improved by the selection of a substrate 4312 for containing the patch antennas 4310 that has characteristics for limiting signal interference between antenna layers.

Figure 44:
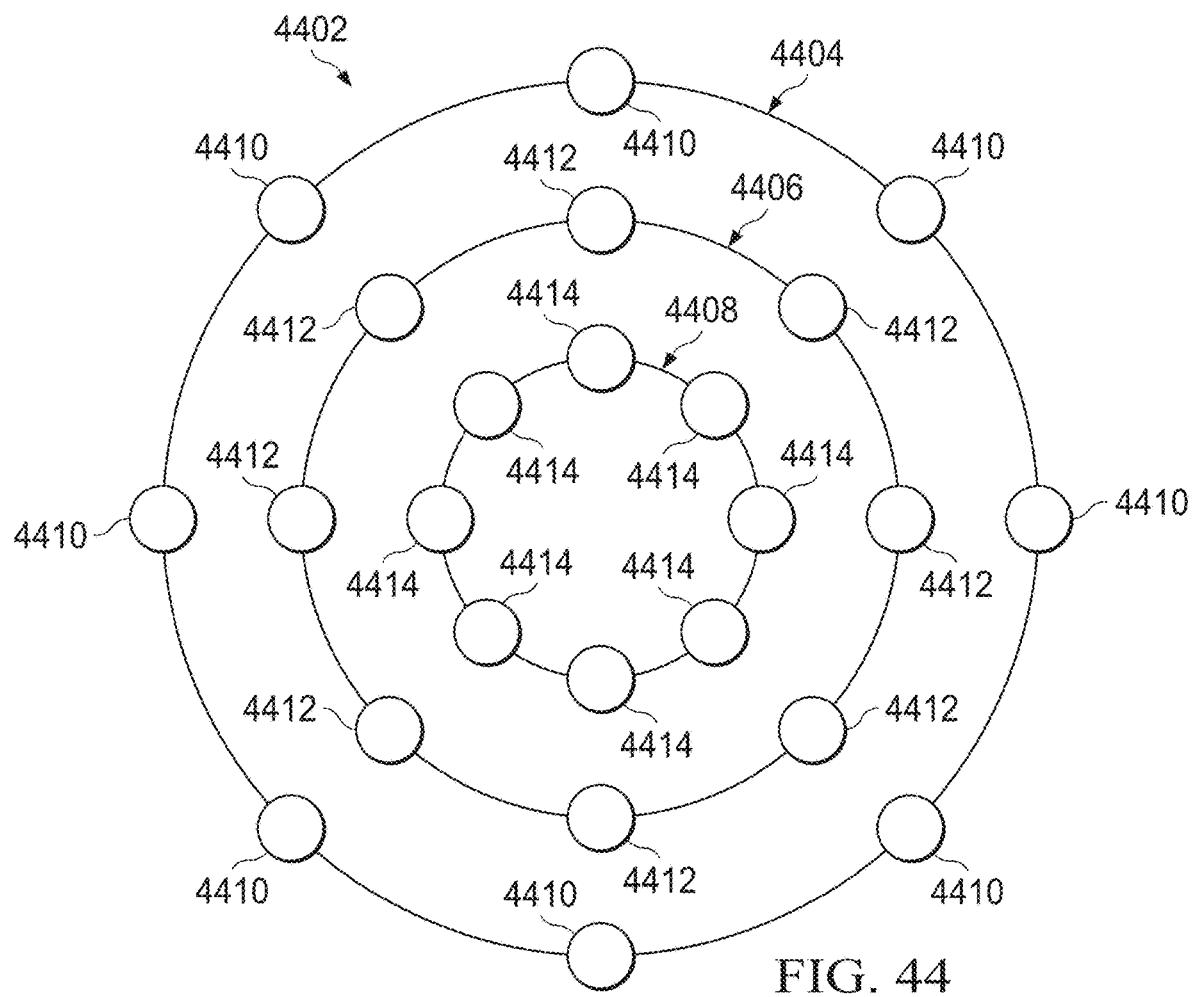
FIG. 44 illustrates a top view of the three layer patch antenna.

Referring now to FIG. 44 there is illustrated a top view of the multilevel patch antenna array 4402 comprising the bottom layer 4404, the mid-layer 4406 and the top layer 4408. The bottom layer 4404 includes a first circular array of patch antennas 4410. The mid-layer 4406 includes a second circular array of patch antennas 4412. The top layer 4408 includes a third circular array of patch antennas 4414. Each of the layers are concentric with the mid-layer 4406 and top layer 4408 being within the area of the bottom layer 4404, and the top layer 4408 being within the area of the mid-layer 4406. This enables unimpeded transmission and reception of signals by the associated patch antennas in each layer.

Figure 45:
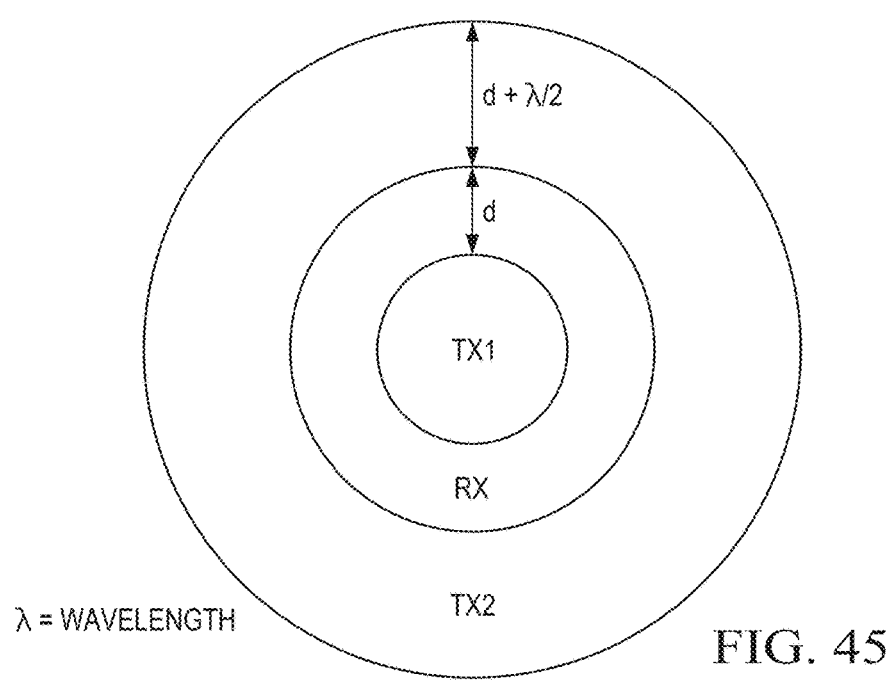
FIG. 45 illustrates the separation between antenna layer of the three layer patch antenna.

Referring now also to FIG. 45, there is provided a top-level view more fully illustrating the size of the bottom layer 4404, mid-layer 4406 and top layer 4408. The distance between the edge of the top layer 4408 and the mid-layer 4406 will have an established value equal to d. The distance between the edge of the mid-layer 4406 and the bottom layer 4404 is defined in accordance with the distance d to have a distance of d+λ/2. This configuration of the distances between bottom layer 4404, mid-layer 4406 and top layer 4408 causes the signal from the two transmit layers on the bottom layer 4404 and the top layer 4408 to add destructively causing significant attenuation in the signal received at the receive antenna on the mid-layer 4406 from the bottom layer and the top layer.

Figure 46:
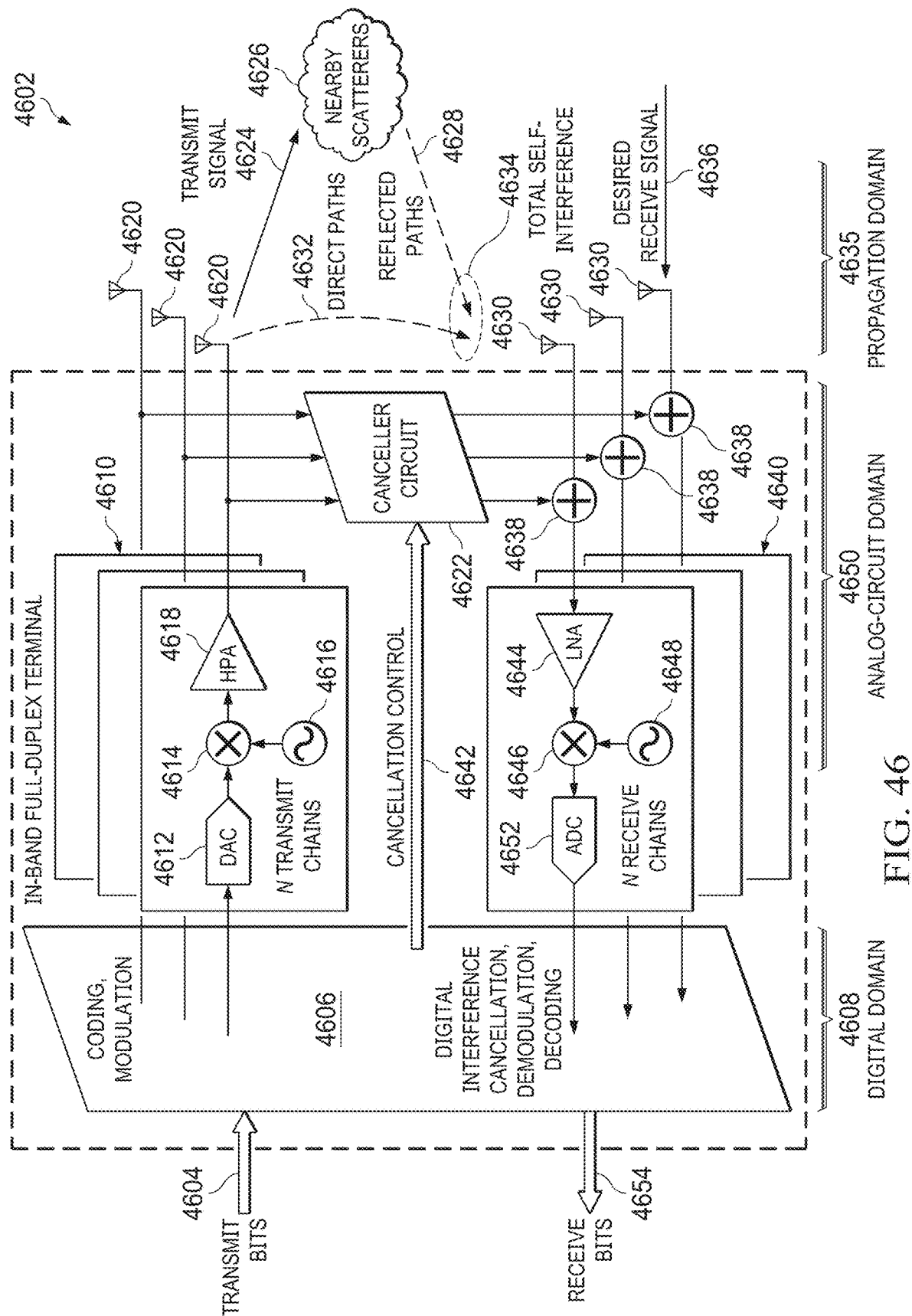
FIG. 46 illustrates the analog and digital cancellation for multiple transmit and receive chains.

FIG. 46 provides an illustration of the analog and digital cancellation process provided by the processing circuitry of a full-duplex system. Within the in-band full-duplex terminal 4602, there is an input for receiving the transmit bits 4604. The transmit bits 4604 are applied to coding and modulation circuitry 4606 within the digital domain 4608 to apply digital coding and modulation to the transmit bits 4604. The coded and modulated bits are passed on to N transmit chains 4610 for further processing. Each of the N transmit chains 4610 include a digital-to-analog (DAC) converter 4612 for converting the signal from the digital domain to the analog domain. The analog signal from the DAC 4612 is applied to one input of a mixer circuit 4614 that is mixed with a signal from an oscillator 4616 for up-conversion. The up-converted signal from the mixer circuit 4614 is applied to a high power amplifier 4618 for amplification. The amplified signal is transmitted from an associated antenna 4620 and to a canceller circuit 4622. The transmitted signals 4624 may be reflected from nearby scatterers 4626 as a reflected path signal 4628 to the receive antenna 4630. The transmitted signal 4624 may also create a direct path signal 4632 to the receive antenna 4630. The direct path signal 4632 and that the reflected path signals 4628 comprise the combined total self-interference 4634 that interferes with the desired received signal 4636 at the receive antennas 4630. The transmit antenna 4620 and receive antennas 4630 comprise part of the propagation domain 4635. The total self-interference 4634 may be canceled from the signals received at the receive antennas 4630 using the canceller circuit 4622.

The canceller circuit 4622 generates a cancellation signal that is applied at an adder circuit 4638 on each of the N receive chains 4640 to remove the total interference signal 4634 from the received signal 4636. The canceller circuit 4622 generates the cancellation signal for the adder circuit 4638 responsive to cancellation control signals 4642 applied from the digital domain 4608, and the transmit signals 4624 from each of the N transmit chains 4610. Each of the N receive chains 4640 include a low noise amplifier (LNA) 4644 for amplifying the received signal that has analog cancellation applied thereto. The output of the LNA 4644 is applied to a mixing circuit 4646 along with an oscillation signal from oscillator 4648 to down-convert the receive signal. The canceller circuit 4622, adders 4638, LNA 4644, mixer circuit 4646 and oscillator 4648 are all part of the analog circuit domain 4650.

The down converted signal from the mixer circuit 4646 is applied to an input of an analog to digital converter (ADC) 4652 to convert the signal from the analog domain to the digital domain in each of the N receive chains 4640. The digital received signals have digital interference cancellation, demodulation and decoding applied to them within the digital domain 4608. The processed signals are output as receive bits 4654.

Figure 47:
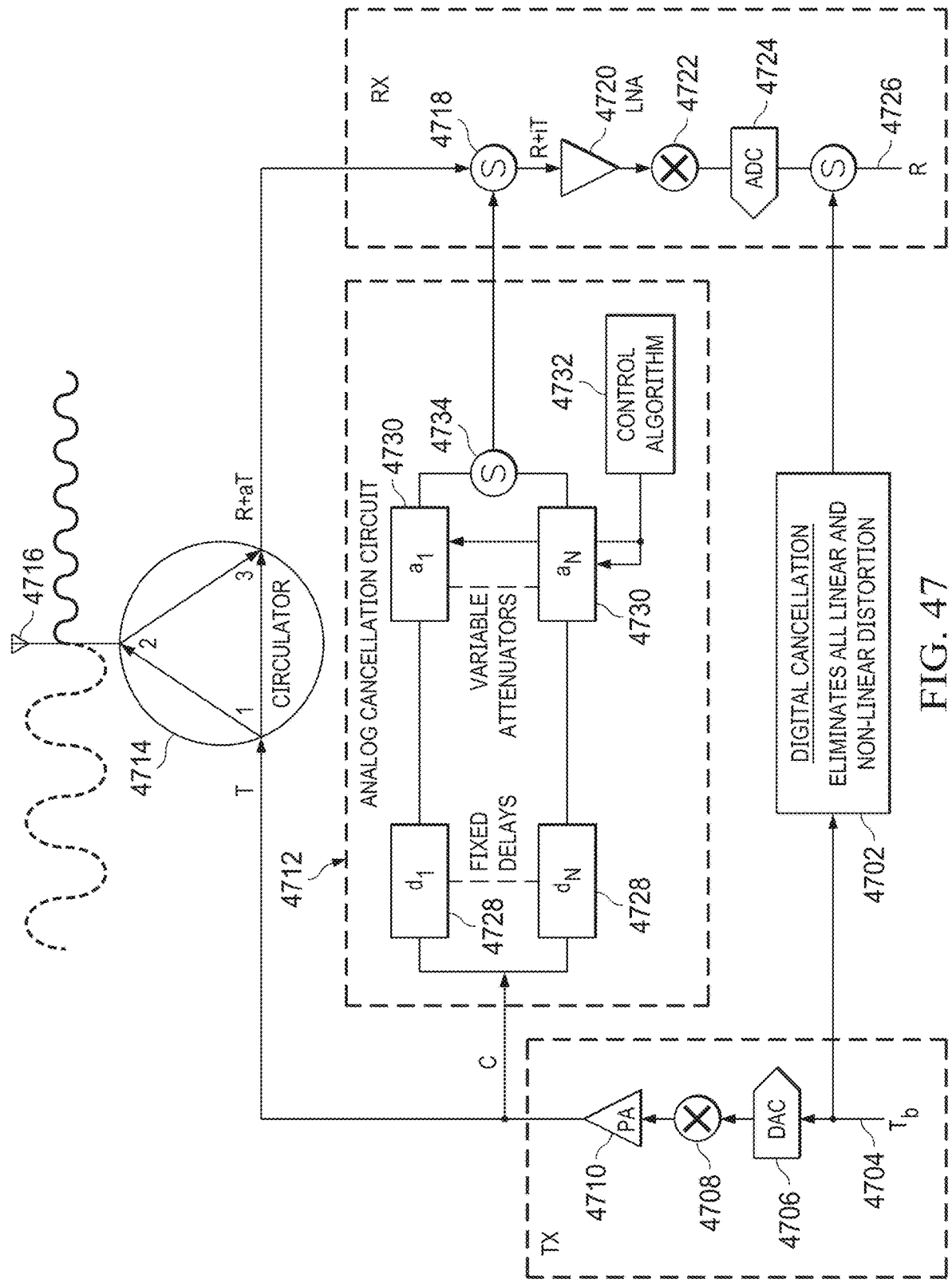
FIG. 47 illustrates a block diagram of the transmitter and receiver circuit.

Referring now to FIG. 47, there is illustrated a block diagram of the analog and digital cancellation circuitry. The digital cancellation circuitry 4702 limits all linear and non-linear distortion within the receive signal responsive to digital inputs of the transmitted bits Tb 4704. The transmitted bits 4704 are provided to a digital to analog converter 4706 followed by a mixing circuit 4708 before being amplified by a power amplifier 4710 on the transmitter side of the circuit. The transmitted signal from the output of the power amplifier 4710 is applied as an input to analog cancellation circuit 4712 and to a first input of the circulator 4714 that applies the transmitted signal to an antenna 4716. The antenna 4716 also receives signals that are provided to the circulator 47144 output at a third port of the circulator that are received by the antenna 4716 at a second port. The receive signal includes the desired received signal and any interference caused by the transmitted signals and reflected transmitted signals (R+aT). The receive signal is applied to the receiver circuitry including a summation circuit 4718 that receives a cancellation signal from the analog cancellation circuit 4712. The summation circuit 4718 cancels the analog interference portion of the received signal that is applied to a low noise amplifier 4720. The amplified received signal from the low noise amplifier 4720 is applied to a mixing circuit 4722 for down conversion. The down-converted signal is applied to the digital converter 4724 for conversion from the analog-to-digital domain. The digital signal is applied to a summation circuit 4726 for combination with a digital cancellation signal received from the digital cancellation circuitry 4702. This process removes linear and nonlinear distortion from the digital signal to output the received signal 4726.

The analog cancellation circuit 4712 receives an input from the output of the power amplifier 4710 of the transmitter. From the signal, a fixed delay $d_N$ is determined at 4728 for each transmission chain 4610. Next, the analog cancellation circuit 4712 determines a variable attenuator $a_N$ 4730 for each transmission chain 4610 responsive to the signal from the power amplifier 4710 processed by the fixed delays 4728 and a control input from control algorithm 4732. The outputs from each of the variable attenuators 4730 are summed at a summation circuit 4734 before being output to the summation circuit 4718 of the receiver.

Figure 48:
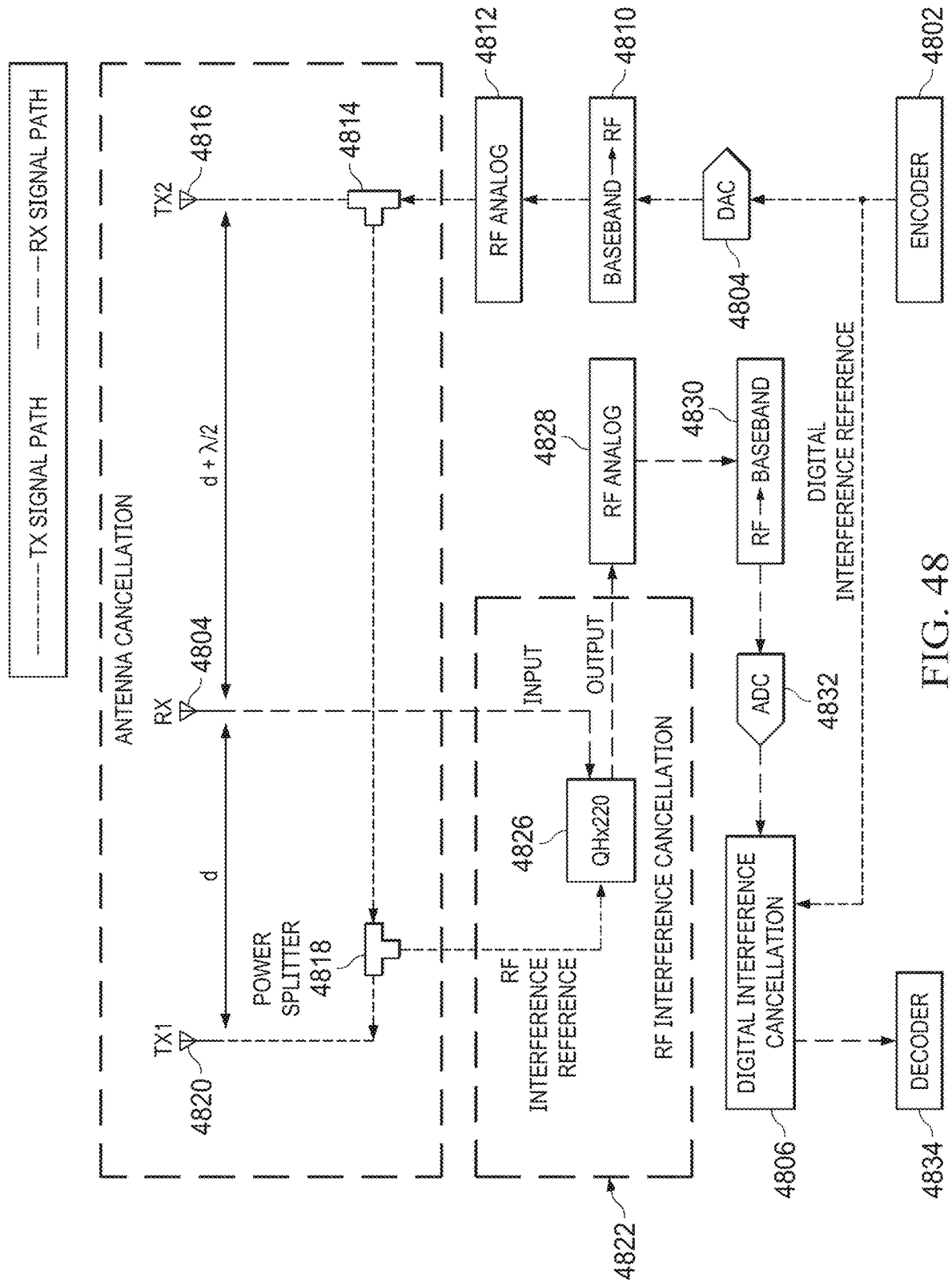
FIG. 48 illustrates transmit and receive paths for the analog and digital cancellation processes.

Referring now to FIG. 48, there is provided a functional illustration of the transmit and receive signal paths for the analog and digital cancellation process. Beginning with the transfer, the encoder 4802 provides the transmitted signal to a digital to analog converter (DAC) 4804 and to digital interference cancellation circuitry 4806. The signal provided to the digital interference cancellation circuit 4806 is referred to as a digital interference reference signal and is used for cancellation. The analog converted signal from the DAC 4804 is provided to a baseband to RF conversion circuit 4810 and to RF analog transmission circuitry 4812. The transmitted signal passes through a first power splitter 4814 that splits the signal for transmission over antenna TX2 4806 or to a second power splitter 4818 that splits the transmitted signal for provision to antenna TX1 4820 and to RF interference cancellation 4822.

The receive signal path receives signals at receiving antenna RX 4824. In order to improve destructive interference cancellation by the antennas. The receive antenna RX 4824 is spaced from antenna TX1 4820 a distance d and is spaced from antenna TX2 4816 a distance $d+\lambda/2$. The placement of the transmit and receive antennas in the manner described reduces self-interference based upon antenna cancellation. The antenna cancellation evaluates limits with respect to bandwidth of the signal being transmitted and the sensitivity of antenna cancellation to engineering errors. Antenna cancellation can potentially achieve 20 dB reduction in self-interference. The effects of using two transmit antennas for antenna cancellation can be postulated as follows. If the wavelength of transmission is $\lambda$, and the distance of the receive antenna 4824 is d from one transmit antenna 4820, the other transmit antenna 4816 is placed at $d+\lambda/2$ away from the receive antenna. This causes the signal from the two transmit antennas to add destructively, thus causing significant attenuation in the signal received, at the receive antenna.

The receive signal is input to the RF interference cancellation 4822 to an OHx220 cancellor 4826. Also input to the OHx220 cancellor 4826 is the transmitted signal provided to antenna TX 14807. The signal is referred to as the RF interference reference signal. The OHx220 cancellor 4826 is output to an RF analog receiver 4828. The signal is next forwarded for RF to baseband down conversion at RF to baseband down converter 4830. The down converted signal is provided to analog to digital converter 4832 before being provided to the digital interference cancellation 4806 for digital signal cancellations responsive to the previously discussed digital interference reference signal. The receive signal is decoded by the decoder 4834.

With respect to the digital interference cancellation circuit 4806, there is extensive existing work that describes various digital cancellation techniques. Traditionally, digital cancellation is used by a receiver to extract a packet from a desired transmitter after the packet has collided with a packet from an unwanted transmitter. To do this, the receiver first decodes the unwanted packet, re-modulates it and then subtracts the packet from the originally received collided signal. In case of canceling self-interference for full-duplex, the transmitted symbols are already known, and thus decoding is not necessary in order to reconstruct a clean signal. Instead of decoding, coherent detection is used to detect the self-interfering signal. The detector correlates the incoming received signal with the clean transmitted signal, which is available at the output of the transmitter. The main challenge in subtracting the known signal is in estimating the delay and phase shift between the transmitted and the received signals. As the detector has the complete knowledge of originally transmitted signal, the detector uses this signal to correlate with the incoming signal to detect where the correlation peaks occur. The correlation peak technique gives both the delay and the phase shift needed to subtract the known signal from the received signal. Thus, this technique, unlike some of the digital interference techniques, does not require any special preamble or postamble and is backwards compatible. Moreover, this technique is modulation-independent as long as the clean signal can be constructed from the transmitted signal. Coherent detection can detect the self-interference signal even when the self-interference signal is weaker than the received signal. Therefore, digital interference cancellation can improve the SNR level even when the received signal is stronger than self-interference. This property is useful when operating with variable data rates to allow using higher data rates for high SNR links.

Typical interference cancellation also requires compensating for clock drift between the transmitter and receiver. Since the transmitter and receiver daughterboards in a full-duplex node share the same clock, there is no clock drift. However, since the daughterboards use separate PLL logic, there can be a jitter introduced into the transmissions.

Full Duplex

Figure 49:
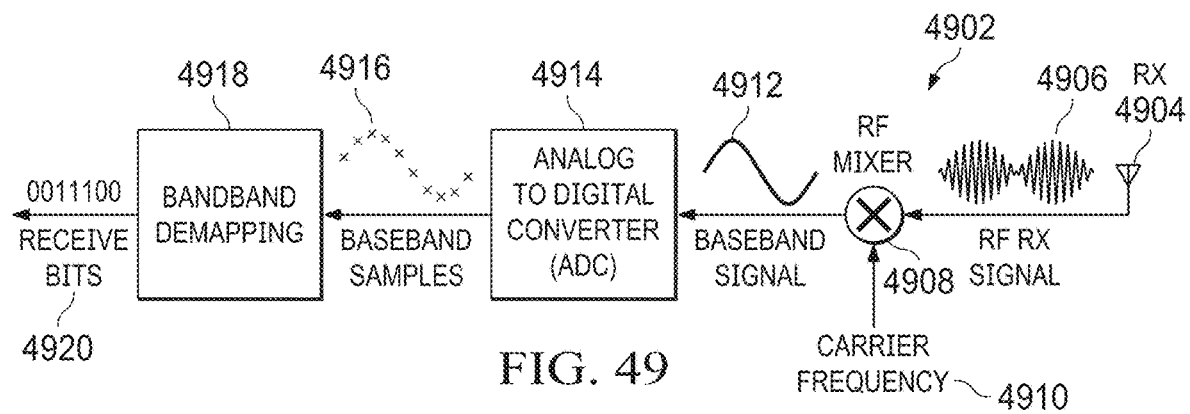
FIG. 49 illustrates a simplified block diagram of an RF receiver.

FIG. 49 illustrates a simplified block diagram of an RF receiver. The receiver antenna 4904 receives the RF signal 4906. The RF signal 4906 is provided to an RF mixer 4908 where the signal is mixed with a carrier frequency 4910 to generate the baseband signal 4912. The baseband signal is provided to an analog to digital converter 4914 to generate baseband signal 4916. A baseband demapper 4918 demaps the baseband signal 4916 into the received bits 4920. Interference between the received RF signal 4906 and an RF signal from a transmitting antenna can interfere each other causing distortion of the received bits 4920. Thus, the ability to overcome this interference using full-duplex transmission techniques can improve signal reception. As discussed above, existing techniques of overcoming interference in full-duplex systems have a variety of limitations.

Figure 50:
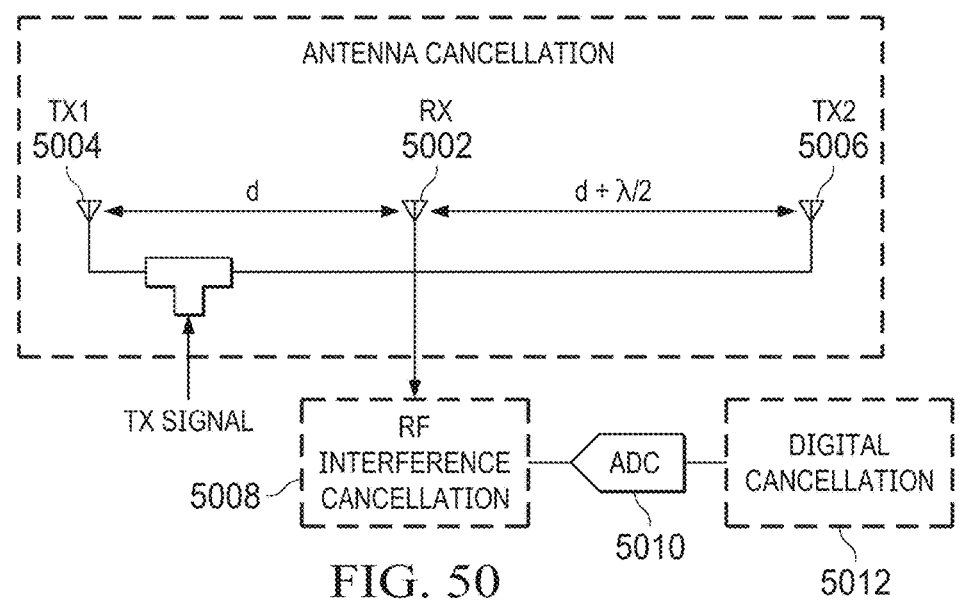
FIG. 50 illustrates a block diagram of a full-duplex design with three cancellation techniques.

Motivated by these limitations, recent work has proposed antenna placement techniques. The state of the art in full duplex operates on narrowband 5 MHz signals with a transmit power of 0 dBm (1 mW). The design achieves this result by augmenting the digital and analog cancellation schemes described above with a novel form of cancellation called "antenna" cancellation as shown in FIG. 50. The separation between the receive antenna 5002 and the transmit antennas 5004 attenuates the self-interference signal, but the separation is not enough. A second transmit antenna 5006 placed in such a way that the two transmit signals interfere destructively at the receive antenna. This is achieved by having one-half wavelength distance offset between the two transmit antennas. The receive antenna 5010 utilizes RF interference cancellation 5008 to attempt to overcome the transmission signal interference and processes the signal using analog to digital conversion at ADC 5010 and further digital cancellation techniques at digital canceler 5012. This design thus uses multiple cancellation techniques including the antenna cancellation, RF interference cancellation and digital cancellation.

This design still has limitations. The first limitation relates to the bandwidth of the transmitted signal. Only the signal at the center frequency is perfectly inverted in phase at the receiver 5002 so it is fully cancelled. However, the further away a signal is from the center frequency, the further the signal shifts away from perfect inversion and does not cancel completely. Cancellation performance also degrades as the bandwidth of the signal to cancel increases.

The cancellation is highly frequency selective and modulation approaches such as OFDM which break a bandwidth into many smaller parallel channels will perform even more poorly. Due to frequency selectivity, different subcarriers will experience drastically different self-interference. Another limitation is the need for three antennas. Full duplex can at most double throughput, but a 3×3 MIMO array can theoretically triple throughput which suggests that it may be better to use MIMO. The third limitation is that the full duplex radio requires manually tuning the phase and amplitude of the second transmit antenna to maximize cancellation at the receive antenna.

Figure 51:
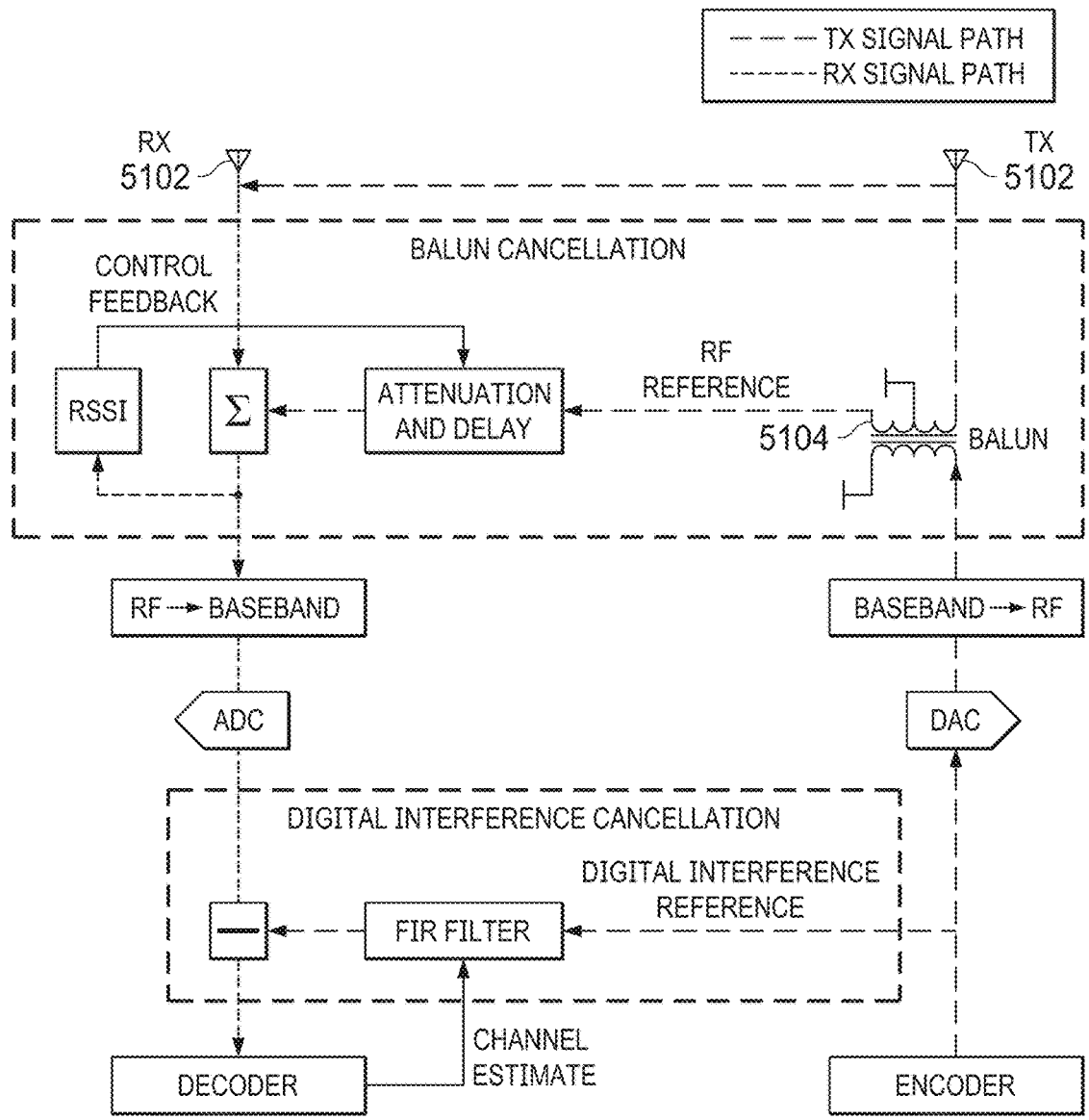
FIG. 51 illustrates a block diagram of a full-duplex system.

FIG. 51 illustrates a block diagram of a full-duplex system. A full duplex system radio can be created that requires only two antennas 5102, has no bandwidth constraint, and automatically tunes its self-interference cancellation. To achieve this, a radio needs to have the perfect inverse of a signal so that it can be fully cancelled out. A balun transformer 5104 can be used to obtain the inverse of a self-interference signal then use the inverted signal to cancel the interference. This technique is called balun passive cancellation and uses high precision passive components to realize the variable attenuation and delay in the cancellation path.

There are practical limitations to this technique, for example, the transmitted signal on the air experiences attenuation and delay. To obtain perfect cancellation the radio must apply identical attenuation and delay to the inverted signal, which may be hard to achieve in practice. The balun transformer 5104 may also have engineering imperfections such as leakage or a non-flat frequency response.

Figure 52:
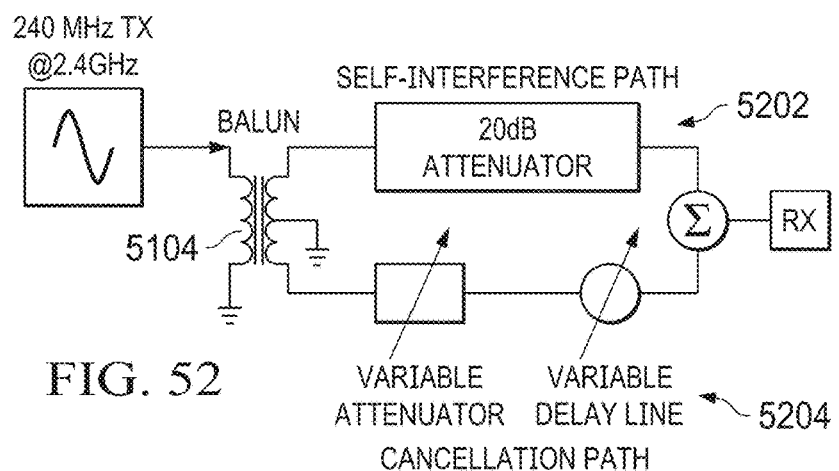
FIG. 52 illustrates a circuit for measuring the cancellation performance of signal inversion versus offset.
Figure 53:
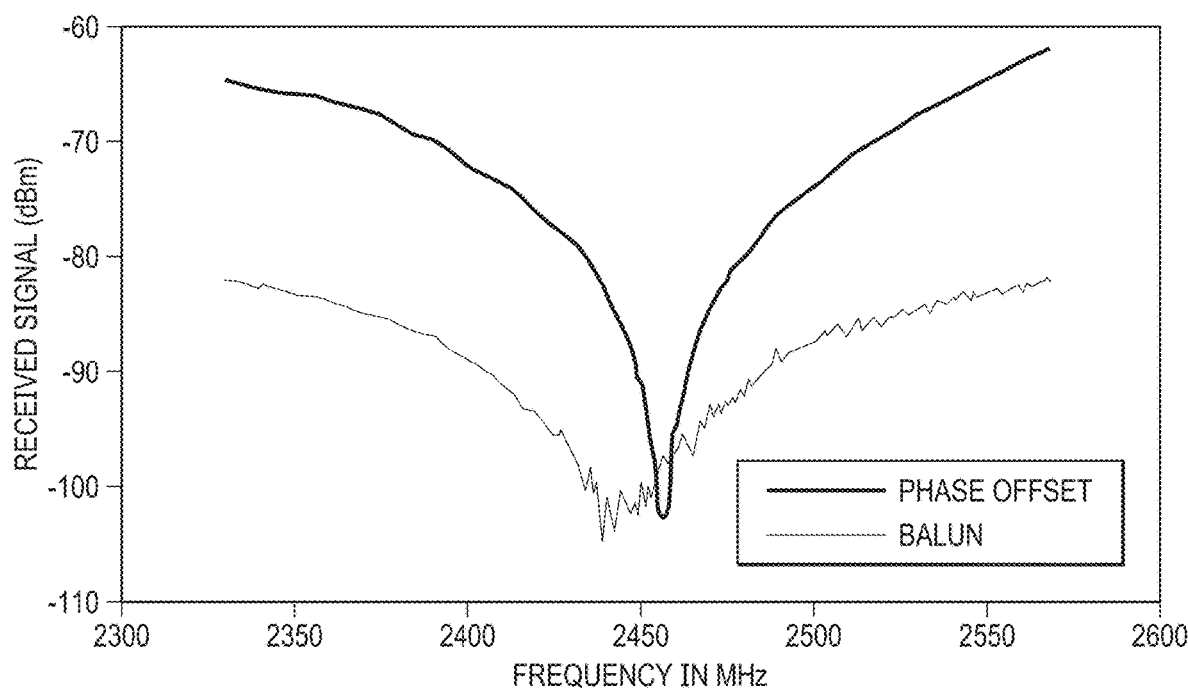
FIG. 53 illustrates the cancellation of a self-interference signal with balun versus with phase offset.
Figure 54:
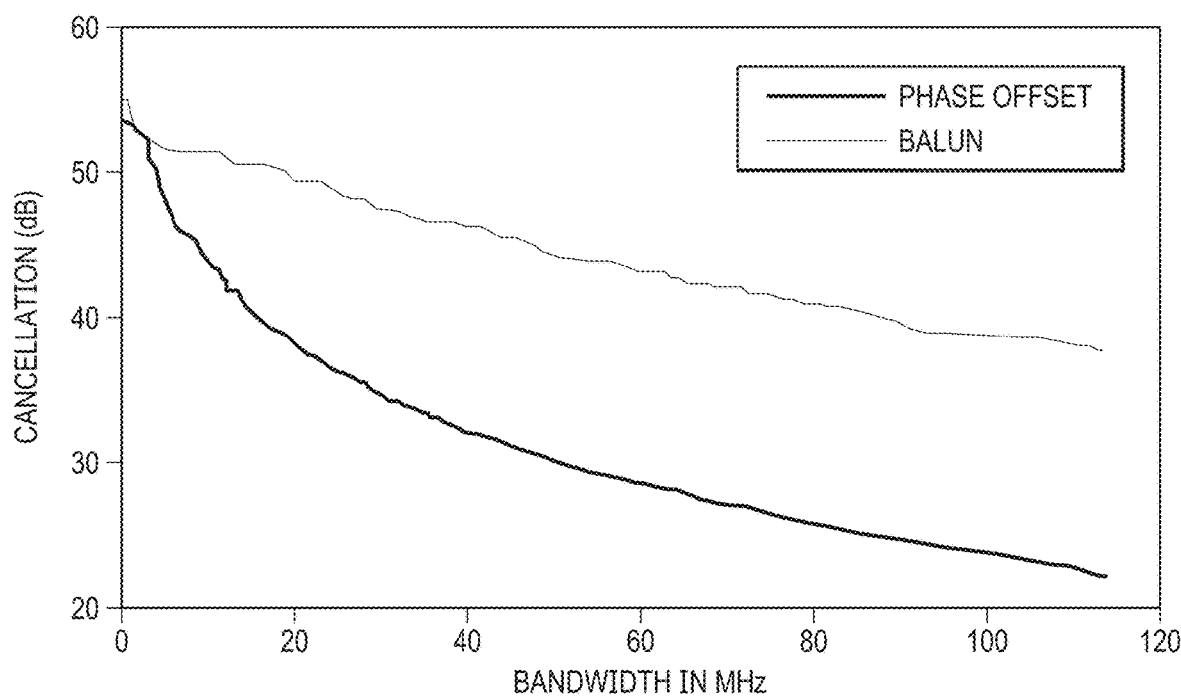
FIG. 54 illustrates cancellation performance with increasing signal bandwidth using a balun method versus using a phase offset cancellation.

Referring now also to FIG. 52, the balun transformer 5104 splits the transmit signal and uses wires of the same length for the self-interference path 5202 and the cancellation path 5204. The passive delay line and attenuator provide finegrained control to match phase and amplitude for the interference and cancellation paths 5202, 5204 to maximize cancellation. Balun cancellation is not perfect across the entire band, and this is because the balun circuit is not frequency flat. Based on FIG. 53, the best possible cancellation can be obtained with the balun transformer 5104 and phase-offset cancellation for a given signal bandwidth. FIG. 54 shows the best cancellation achieved using each method.

FIG. 54 shows that if the phase and amplitude of the inverted signal are set correctly, the balun cancellation can be very effective. If one can estimate the attenuation and delay of the self-interference signal and match the inverse signal appropriately, then one can self-tune a cancellation circuit. The auto-tuning algorithm would adjust the attenuation and delay such that the residual energy after balun cancellation would be minimized. Let g and τ be the variable attenuation and delay factors respectively, and s(t) be the signal received at the input of the programmable delay and attenuation circuit. The delay over the air relative to the programmable delay is $\tau_a$. The attenuation over the wireless channel is $g_a$. The energy of the residual signal after balun cancellation is:

$$E = \int_{T_o} (g_a s(t - \tau_a) - g s(t - \tau))^2 dt$$

where $T_o$ is the baseband symbol duration. The goal of the algorithm is to adjust the parameters g and τ to minimize the energy of the residual signal.

FIG. 52 shows the balun cancellation circuit, but it only handles the dominant self-interference component. A node's self-interference may have other multipath components which are strong enough to interfere with reception. The balun circuit may also distort the cancellation signal slightly which introduces some leakage. A full duplex radio uses digital cancellation to prevent the loss of packets which a half-duplex radio could receive.

The digital cancellation has three novel achievements compared to existing software radio implementations. It is the first real-time cancellation implementation that runs in hardware. The second achievement is that it is the first cancellation implementation that can operate on 10 MHz signals. Finally, it is the first digital cancellation technique that operates on OFDM signals.

Digital cancellation has two components: estimating the self-interference channel, and using the channel estimate on the known transmit signal to generate digital samples to subtract from the received signal. The radio uses training symbols at the start of a transmitted OFDM packet to estimate the channel. Digital cancellation models the combination of the wireless channel and cancellation circuitry effects together as a single self-interference channel. Due to its low complexity, the least squares algorithm is used in the estimation. The least squares algorithm estimates the channel frequency response of each subcarrier:

$$\hat{H}_s[k] = \frac{1}{M} \left[ \frac{1}{X[k]} \left( \sum_{m=1}^{M} Y^{(m)}[k] \right) \right]$$

The radio applies the inverse fast Fourier transform to the frequency response to obtain the time domain response of the channel. This method of estimating the frequency response uses the least squares algorithm to find the best fit that minimizes overall residual error. The radio applies the estimated time domain channel response to the known transmitted baseband signal and subtracts it from the received digital samples. To generate these samples, the hardware convolves with the FIR filter. The output i[n] of the filter:

$$i[n] = \sum_{k=0}^{N-1} \hat{h}_s[k] s[n-k]$$

The radio subtracts the estimates of the transmit signal from the received samples r[n]:

$$\hat{r}[n] = r[n] - i[n] = \sum_{k=0}^{N-1} h_d[k] d[n-k] + \sum_{k=0}^{N-1} (h_s[k] - \hat{h}_s[k]) s[n-k] + z[n]$$

Where d[n] and $h_d$[n] are transmitted signal and channel impulse response from the intended receiver, and z[n] is additive white Gaussian noise.

As described above, full duplex communication involves simultaneous transmission and reception of signals over an available bandwidth between transmission sites. The various details of full-duplex communications and other full-duplex wireless transmission techniques are more fully described in "Practical, Real-time, Full Duplex Wireless," Jain et al., MobiCom '11, Sep. 19-23, 2011, Las Vegas, Nev., USA, 2011, which is incorporated herein by reference in its entirety.

Figure 55:
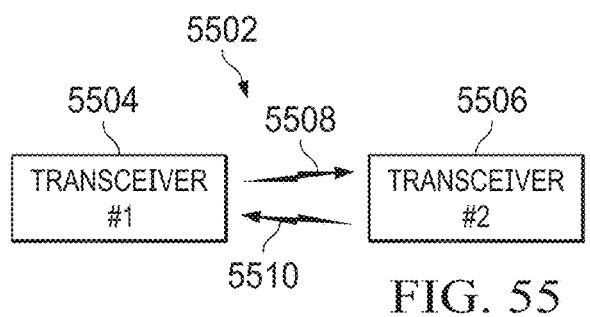
FIG. 55 illustrates full-duplex transmissions between first and second transceivers.

Referring now to FIG. 55, as referenced above, a communication system 5502 including a first transceiver 5504 and a second transceiver 5506 communicate with each other over communication channel 5508 from the first transceiver to the second transceiver and communication channel 5510 from the second transceiver to the first transceiver. The first communication channel 5508 and the second communication channel 5510 will interfere with each other if transmitted using the same frequency or channel. Thus, some manner for overcoming the interference between the channels is necessary in order to enable the transmissions from the first transceiver 5504 to the second transceiver 5506 to occur at a same time. One manner for achieving this is the use of full-duplex communications. Some embodiments for full-duplex communication have been described hereinabove.

Figure 56:
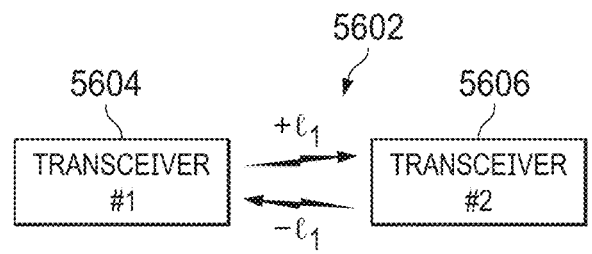
FIG. 56 illustrates full-duplex transmissions using orbital angular momentum between first and second transceivers.

FIG. 56 illustrates a full duplex communication system 5602 wherein a first transceiver 5604 is an communication with the second transceiver 5606. In the implementation of the communications channel from transceiver 5604 to transceiver 5606 has incorporated therein an orbital angular (OAM) of $+l_1$, and the communication channel from transceiver 5606 to transceiver 5604 has incorporated therein an OAM of $-l_1$. The transceiver 5604 transmits signals having the OAM+$l_1$ function applied thereto, and the transceiver 5604 transmits signals having the OAM −$l_1$ signal applied thereto to prevent interference therebetween. The OAM signals each comprise orthogonal functions that are orthogonal to each other. Since the signals are orthogonal to each other, they do not interfere with each other even when being transmitted over the same frequency or channel. This achieves isolation between the transmitting and the receiving channels. This allows the full-duplex communications with transmissions from transceiver 5604 to transceiver 5606 and from transceiver 5606 to transceiver 5604 to occur at the same time without interfering with each other. For longer distances within optical transmissions systems, lenses may be used to focus the beams transmitted between transmitters 5604 and 5606. This enables beams to be transmitted over a further distance. The applied orthogonal functions can be orbital angular momentum, Laguerre-Gaussian functions or others in a cylindrical coordinate system for transmitting and receiving.

Figure 57:
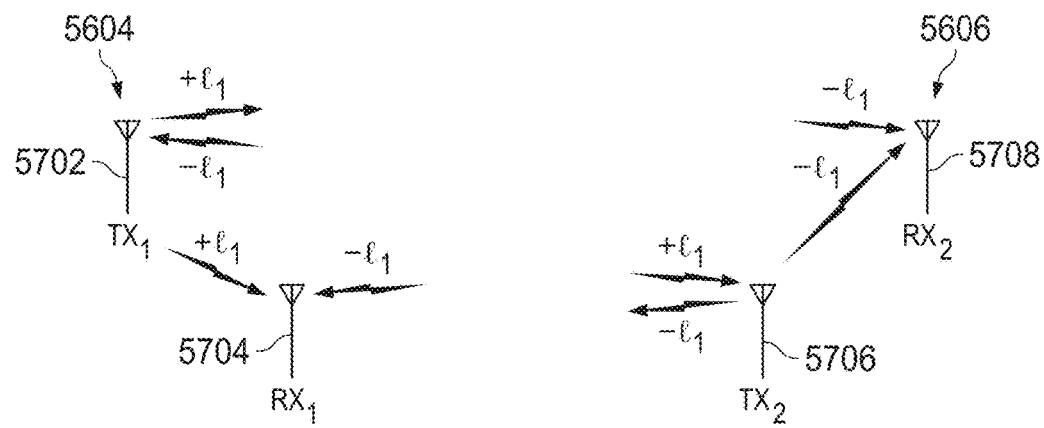
FIG. 57 illustrates signals received by antennas in full-duplex with OAM communications.

The full-duplex communications capability and potential interference issues are more fully illustrated with respect to FIG. 57. In FIG. 57, the transceiver 5604 includes a transmitting antenna 5702 and a receiving antenna 5704. The second transceiver 5606 consist of a transmitting antenna 5706 and receiving antenna 5708. The transmitting antenna 5702 transmits a signal having a $+l_1$ OAM function applied thereto. The $+l_1$ signal is received by the receiving antenna 5708, by the transmitting antenna 5706 and by the receiving antenna 5704. Similarly, the transmitting antenna 5706 transmits a signal having a $-l_1$ OAM function applied thereto. The transmitted $-l_1$ OAM processed signal is received at the receiving antenna 5708, the receiving antenna 5704 and the transmitting antenna 5702. In this manner, both the $+l_1$ signals and the $-l_1$ signals are received at each antenna. By applying the orthogonal OAM functions to the transmitted signals, each of the receivers associated with the antennas 5702-5708 may process the signals in such a manner as to only look for transmitted signals having a particular OAM value applied thereto. Signals having another OAM value applied thereto are ignored. Thus, antennas 5702 and 5706 would only concentrate on transmitting the $+l_1$ signals and the $-l_1$ signals, respectively. The receiver antenna 5704 would be configured to only pay attention to received $-l_1$ signals and the receiver antenna 5708 would only pay attention to received $+l_1$ signals. Thus, by utilizing different orthogonal functions, the receiver $RX_1$ may be configured to only process signals having the orthogonal function $-l_1$ applied thereto. The received signals including the orthogonal function $+l_1$ are ignored. The receiver $RX_2$ functions in a similar manner in only processes the received signals having the orthogonal function $+l_1$ applied thereto while ignoring the orthogonal function $-l_1$. In this manner, interference between the simultaneously transmitting full-duplex transmit and receive channels may be managed. Other types of orthogonal functions other than OAM may also be used.

Figure 58:
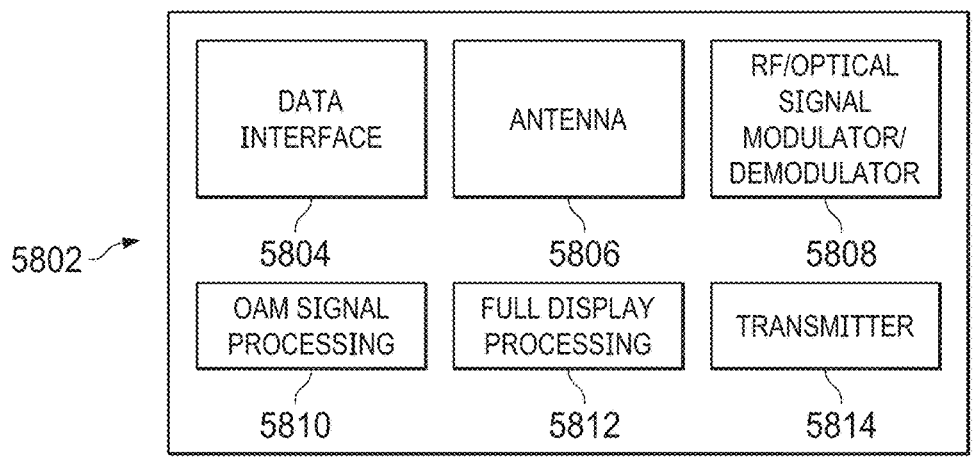
FIG. 58 illustrates a block diagram of a transceiver implementing full-duplex communications.

FIG. 58 illustrates a functional block diagram of a transceiver that may be utilized for each of the transceivers 5604 and 5606 that are illustrated with respect to FIGS. 56 and 57. The transceiver 5802 includes a data interface 5804 enabling the transceiver to receive one or more data streams for transmission from the transceiver 5802 via an antenna 5806. Information received over the data interface 5804 is processed via an RF/optical signal modulator/demodulator 5808 that modulates signals to be transmitted from the transceiver 5802 using the applicable RF or optical data transmission protocol, and for demodulating received RF/optical signals using the applicable protocol. The OAM signal processing circuitry 5810 is used for applying the orbital angular momentum or other orthogonal function to the modulated data signal that is to be transmitted from the antenna 5806. Additionally, the OAM signal processing circuitry 5810 may be used for removing of the OAM or orthogonal function that is applied to received signals prior to their demodulation by the demodulator 5808. The full-duplex processing circuitry 5812 is used for controlling the received signals that are to be processed by the transceiver 5802. As described earlier with respect to FIG. 10, when two signals are received at $RX_1$ 1004 having the OAM value $+l_1$ applied thereto and the other having the OAM value $-l_1$ applied thereto, the full-duplex processing circuitry 5812 will control which of the received signals are to be processed by the receiver. This will require the full-duplex processing circuitry 5812 to identify the OAM value or orthogonal function value that has been applied to the receive signal in order to determine whether the received signal should be processed. Finally, the transmitter 5814 is used for outputting the generated signals from the antenna 5806 of the transceiver 5802.

The RF/optical modulator/demodulator 5808 and OAM signal processing circuitry 5810 may utilize configuration similar to those described within U.S. patent application Ser. No. 14/882,085, entitled Application of Orbital Angular Momentum to Fiber, F30 and RF, filed Oct. 13, 2015 which is incorporated herein by reference in its entirety. These various implementations are more fully described hereinbelow. This technique may be implemented into the full duplex communications system described above.

Figure 59:
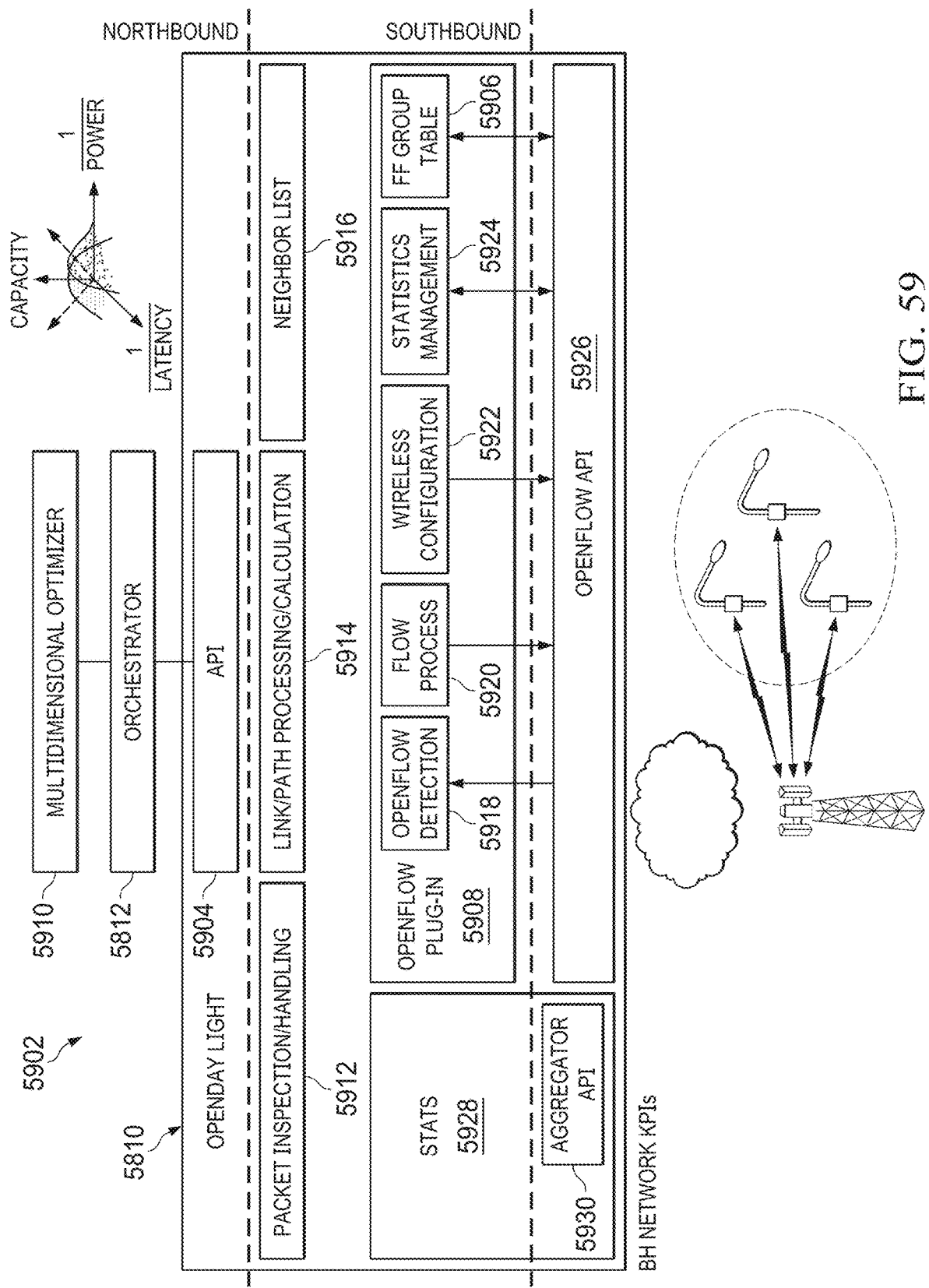
FIG. 59 illustrates a block diagram of a Backhaul Network Key Performance Indicator.

Referring now also to FIG. 59, there is illustrated a more detailed description of a small cell network KPI (key performance indicator) 5902. The small cell network KPI 5902 is implemented within the SDN controller 30902 to enable communications between the SDN controller and small cells within the small cell network. As mentioned previously, the OpenDaylight controller 5911 provides routing infrastructure for the small cell operation. The OpenDaylight controller 5911 utilizes an application program interface 5904 for enabling communications between the controller 5911 and an orchestrator 5913. The orchestrator 5913 dynamically optimizes the small cell network by minimizing power and latency while maximizing the capacity of the network. The network KPI 5902 must maintain a communication channel 5907 with the SDN controller 5904 in order to be able to exchange control plane messages with the small cell nodes 5909. This communication channel 5907 can be established in the same network interface as the one used for the data plane (in-band connectivity) or in a different interface (out-of-band). With in-band connectivity, the infrastructure costs are reduced, but if link failure occurs, the node loses the connection with the controller 5911. Out-of-band control plane connectivity requires an additional NIC (network interface controller) in the managed devices. An LTE interface 5911 is used on each SDN enabled small cell backhaul node 5910 for SDN control plane connectivity, in order to provide a robust channel and reduce SDN control latency while the data plane is using the multi-hop backhaul connectivity over a multiband (mmWave, sub 6 GHz and FSO) network.

Small cell wireless links may have dynamic link outages, especially when operating at mmWave band. A link can temporarily go from non-line of sight to outage (e.g. due to blockage), leading to changes in the topology and consequently, in the available capacity. When such events happen, the SDN controller 5903 can perform path recalculation between the small cell nodes 5909 but the process may take a significant amount of time. The network KPI 5902 as illustrated in FIG. 59 uses fast failover (FF) group tables 5906 from the OpenFlow plug-in 5908 to rapidly repair link failures locally.

The orchestrator 5913 communicates with the multidimensional optimizer 5910. The Application Program Interface 5904 is used to communicate with the orchestrator 5913 in order to perform the reconfiguration of the small cell network. Also, this configuration can be triggered by the orchestrator 5913 through this REST API. The new configurations are pushed to the wireless communications services (WCS) and new paths are requested to the Path Calculator. The multidimensional optimizer 5910 finds a maximum value based upon latency, capacity and 1/power using Euler-Lagrange multipliers. The network KPI 5902 further includes a packet inspection/handling module 5912. The packet inspection/handling module 5912 inspects and controls the data packets that are transmitted over the communications channels 5903 to the small cell nodes 30908. The packet inspection/handling module 5912 parses packets sent to the SDN controller 5903 (e.g. for new flows when no rules are installed at the small cell nodes 5909). The extracted information is sent to the path calculator 5914, which replies with a primary path from the source to the destination node according to a given path calculation strategy. The original packet is then sent back to the destination node.

The path calculator 5914 is responsible for calculating alternate paths to the small cell nodes 5909 when existing links fail. The path calculator 5914 computes paths between the powered on small cell nodes 5909 and instructs the installation of new forwarding rules. The path calculator 5914 uses a network graph that contains only the active nodes. If the fast failover (FF) strategy is active, a maximum disjoint path is also calculated from each intermediate node, and the required forwarding rules are installed in combination with the usage of the FF group table 5906 feature from OpenFlow. The link/path processing calculation module 5914 uses information from the neighbor list 5916 to make the new path calculations. The neighborhood mapper 5916 is a database list of small cell nodes and their associated neighboring nodes. The neighborhood mapper 5916 infers the neighborhood and interference graph for each node/link from the existing topology. Small cell nodes 5909 send out periodic beacons to neighbors. The collected information statistics are sent to the SDN controller 5903 and used to augment existing data from the network links.

The OpenFlow plug-in 5908 includes an OpenFlow detection module 5918 for detecting OpenFlow messages. The flow process module 5920 calculates the message routing. The wireless configuration service 5922 sends wireless specific configuration requests to the managed small cell nodes 5909 through an OpenFlow protocol extension. The Wireless Statistics Manager 5928 collects wireless related statistics from the managed small cell nodes 5909 over an aggregator API 5930 through an extension of the statistics manager component 5924 from the OpenFlow Plugin 5908. The statistical information is fed to the statistics module 5924 from the small cell nodes 5909. The requests and statistics can have different types, which are specified by a bit mask field in the request body. Each of the modules within the OpenFlow plugin 5908 communicates with the small cell nodes 5909 through an OpenFlow API 5926. A metrics collector 5928 is responsible for obtaining network performance metrics that cannot be directly retrieved through OpenFlow plug-in 5908. The metrics are obtained through the aggregator API 5930. The calculated data is merged into the available statistics and can be used by every other SDN controller 5903 component.

Figure 60:
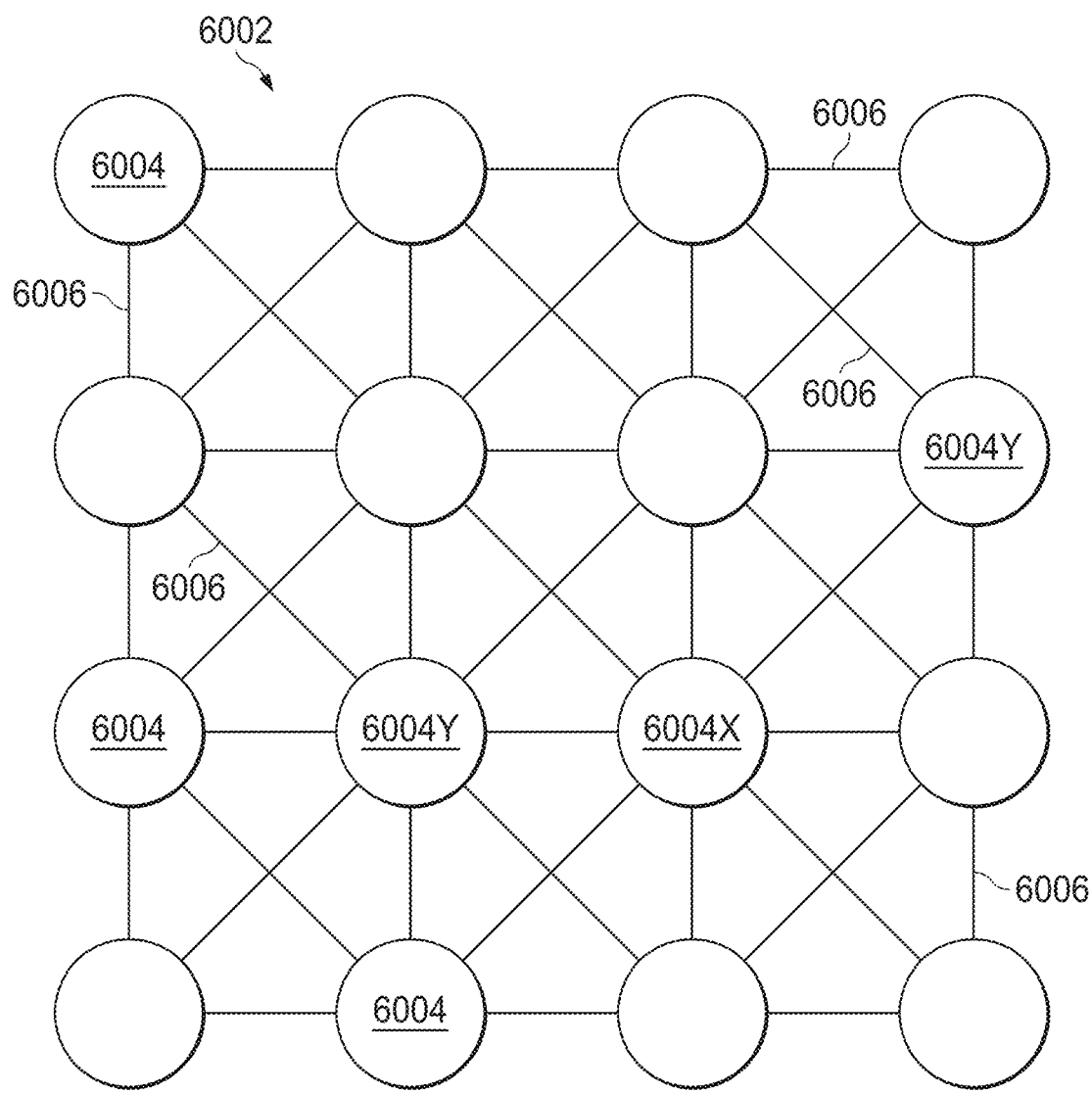
FIG. 60 illustrates a small cell private network.

Due to the increasing traffic demand, existing mobile access and private networks face a capacity problem. In order to increase the capacity, it is customary to deploy many small cells which may be dynamically controlled based upon traffic demand as illustrated in FIG. 60. The private small cell network 6002, as described previously, consist of a plurality of individual small cell nodes 6004 that are interconnected via communication links 6006. Each of the small cell nodes 6004 are interconnected with each of the small cell nodes within its vicinity via one of the communication links. Thus, for example, as illustrated in FIG. 60, node 6004x is interconnected with each of the surrounding nodes 6004y (in this case eight nodes) through an associated communication link 6006. Thus, node 6004x can communicate over the small cell network 6002 through any of the adjacent small cell network nodes 6004y.

As a consequence, the fabric for small cell networks 6002 needs to cope with the massive increase in user demands since the laying of fiber to each small cell node 6004 is not economically feasible. It is possible to have mmWave based private mobile networks due to the large chunk of spectrum that is available both in unlicensed bands (the 60 GHz and 70/80 GHz bands) as well as licensed bands of 24, 28 and 39 GHz. However, due to the specific propagation characteristics of the mmWave spectrum, communications links 6006 between small cell nodes 6004 may face challenging network outages. Additionally, a more flexible design of the network 6002 is desired in order to cope with the diversification of service requirements.

Figure 61:
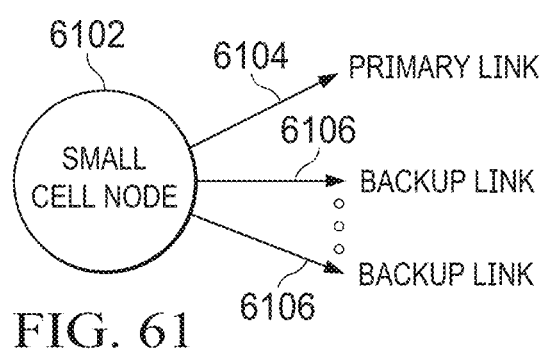
FIG. 61 illustrates a small cell node having a primary link and one or more backup links.

A private small cell network architecture based on the concept of software defined networking will be able to address these issues and provide a mmWave or MulteFire based mobile network or private network. Referring now to FIG. 61, in order to cope with the dynamics of the network, the SDN control plane calculates for each small cell node 6102 a primary link 6104 and a set of backup links 6106. The set of backup links 6106 include at least one backup link which may be utilized if the primary link 6104 goes out. Using OpenFlow Fast Failover groups such as those described herein above, a fast local repair of a link 6106 can be achieved leading to a resilient mesh network architecture. The proposed architecture leads to a lower packet loss and consequently higher throughput data rate and better private network reliability.

Figure 62:
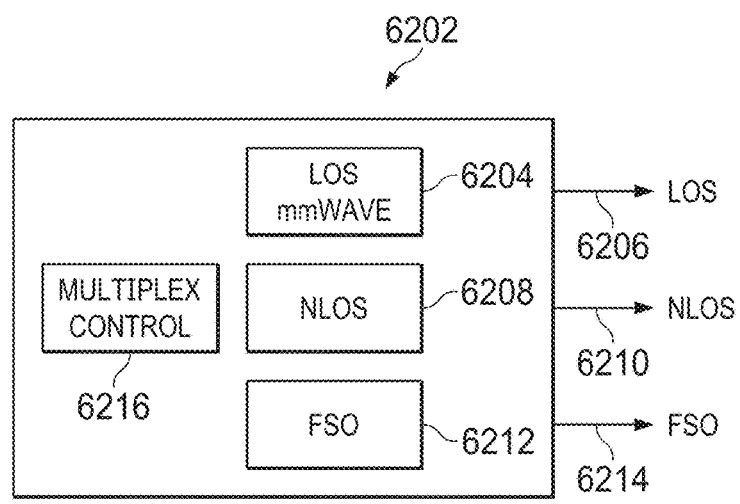
FIG. 62 illustrates a small cell node including means for multiplexing between multiple transceiver types.

Referring now to FIG. 62, network reliability may also be improved utilizing an architecture wherein each node 6202 uses SDN-based channel estimation to multiplex between line of sight (LOS) mmWaves, non-line of sight (NLOS) sub-6 GHz and free space optics (FSO) transmissions. This is achieved using a LOS mmWave transceiver 6204 for transmitting line of sight millimeter waves 6206, an NLOS transceiver 6208 for transmitting non-line of sight sub-6 GHz signals 6210 and a FSO transceiver 6212 for transmitting FSO signals 6214. Multiplexing control circuitry 6216 multiplexes between the LOS mmWave transceiver 6204, an NLOS transceiver 6208 and an FSO transceiver 6212 based upon the environmental and system operating conditions. When the atmospheric conditions are good, the network relies upon the FSO transceiver 6212. When atmospheric conditions become foggy or rainy, the system adaptively switches to RF LOS transceiver 6208 or the LOS transceiver 6204 using the multiplexer control 6216. If the operating environment has many physical obstacles between the transmitter and the receiver, the system would select the NLOS transceiver 6208.

Despite introducing new technologies at lower layers of the protocol such as better modulation and coding schemes or coordinating multipoint transmissions, the predicted demand is much higher than what can be supported with new physical layer only technologies in the short term. A common assumption to provide increased capacity at scale is to use a higher frequency band were more spectrum is available and to reduce the cell size in order to increase spatial reuse. Network operation is often dominated by proprietary solutions which hinder innovation. An important challenge to solve for small cell backhaul links is an efficient but flexible forwarding architecture which relays user data over a multi-hop wireless backhaul between a plurality of small cell nodes.

Figure 63:
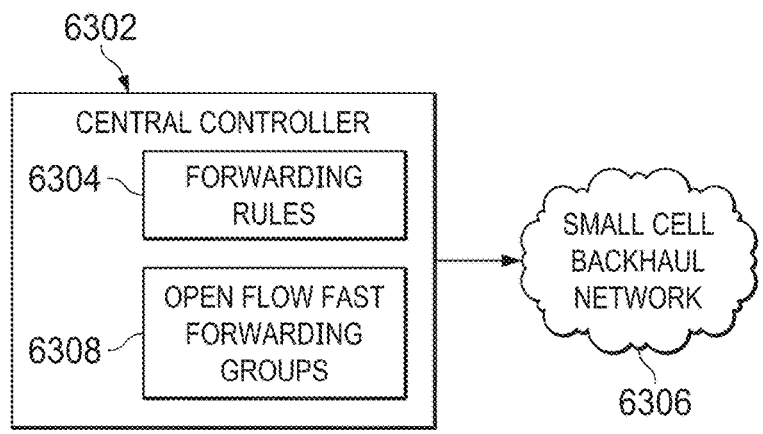
FIG. 63 illustrates an SDN-based architecture for link generation.

Referring now to FIG. 63, in a typical SDN-based architecture, a centralized controller 6302 installs within small cell nodes flexible rules 6304 that determine the forwarding behavior within the data plane. However, a forwarding configuration addressing the inherent resiliency challenges to cope with unstable backhaul links using a combined RF LOS, NLOS and FSO has not been previously addressed. A resilient forwarding configuration of an SDN-based small cell private wireless network 6306 that focuses on SDN-based resiliency mechanisms and uses the concept of Open-Flow fast failover groups 6308 as described hereinabove. The controller 6302 calculates each link 3306 for each small cell node 3302 backup links toward the Gateway. The main link and the backup link are both placed into a fast failover group 6308. The small cell node 3302 uses rapid link monitoring to locally detect if a link is in the outage stage, in which case, the OpenFlow-based fast failover locally switches from a main link to a backup link.

The traditional SDN concept relies on a centralized control plane, which exercises control on forwarding decisions in the data plane. Consequently, the control and data planes are decoupled which allows a very flexible forwarding control. However, using SDN for small cell links present several challenges. This is because the performance and reliability of mesh-based networks such as that illustrated in FIG. 60 depends on fast local reactions to topology changes where a centralized control plane is typically too slow to react. Therefore, there been attempts to use proprietary routing and forwarding decisions based on distributed protocols were SDN is used to steer traffic.

Figure 64:
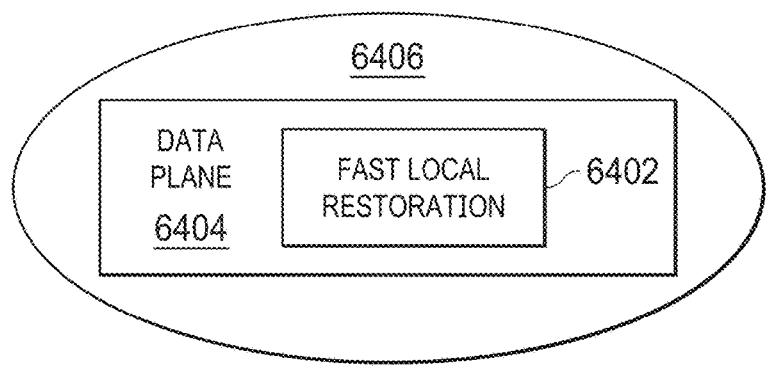
FIG. 64 illustrates a small cell node implementing fast local restoration within its data plane layer.

In an alternative approach as illustrated in FIG. 64, the forwarding decisions inside the small cell network may be configured by the SDN control plane. SDN-based resiliency using fast local restorations 6402 (e.g. implemented inside the data plane 6404 of the cell small nodes 6406) may be used whenever local problems such as link outage transitions of the millimeter wave links are detected. This local repair mechanism, which can be preinstalled, avoids the need to ask the controller how to react in a case when a neighbor node cannot be reached anymore and leads to a more robust data plane behavior.

Figure 65:
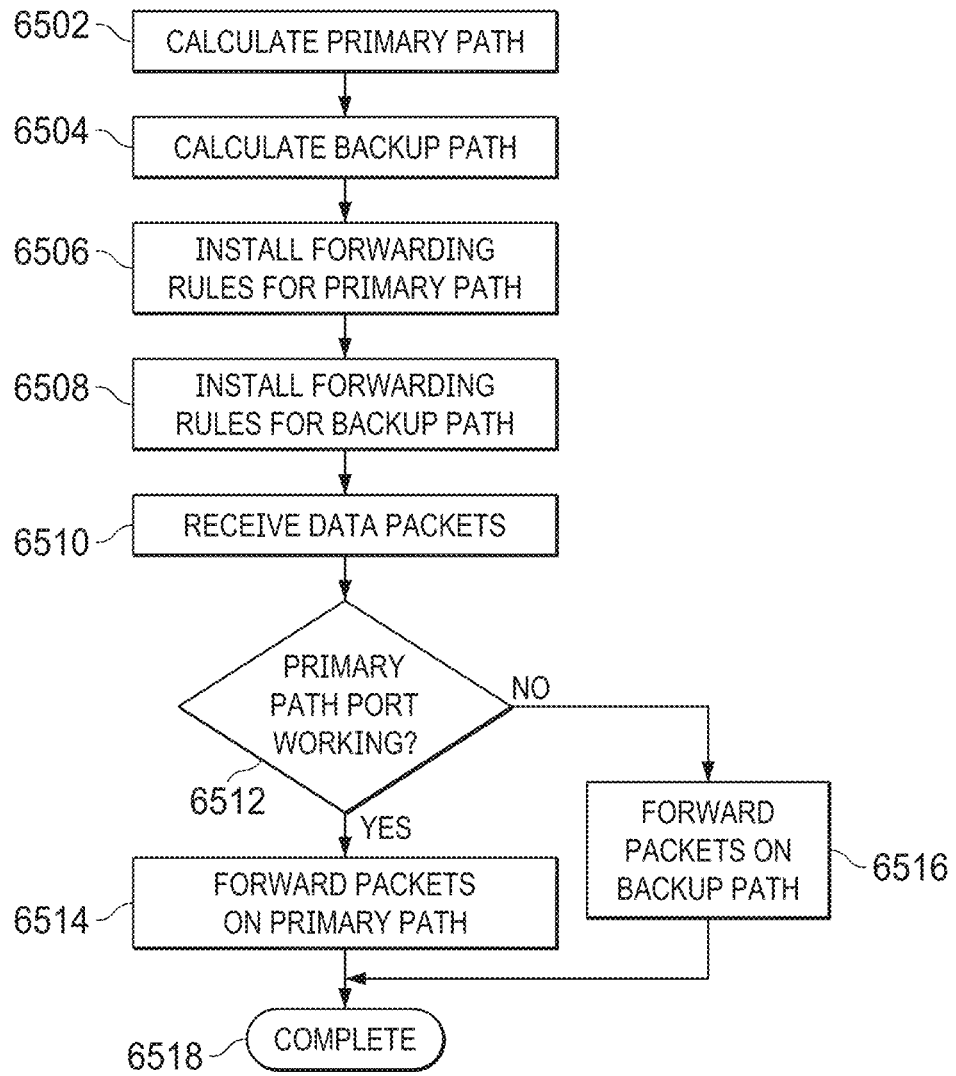
FIG. 65 illustrates a flow diagram describing the process for implementing SDN-based local repair.

Referring now to FIG. 65 there is illustrated the process for implementing SDN-based local repair. The process uses SDN to calculate a primary and a secondary path for private small cell network nodes. SDN-based local repair is implemented using fast failover groups 6308 (FIG. 63). A primary and a secondary action are put into the same group. Consequently, the SDN controller calculates for each small cell a primary path at step 6502 towards the gateway. Additionally, the SDN controller calculates a backup path towards the gateway at step 6504. Based upon the path calculations, the SDN controller installs forwarding rules for the primary path at step 6506 into the fast failover group 6308 and will additionally install forwarding rules at step 6508 for the backup path into the fast failover group.

Once data packets arrive at a small cell node at step 6510 which should be forwarded to a neighboring small cell node using mmWave or MulteFire links, the data packets will be forwarded according to the first port in the fast failover group table whose port state is active. This requires an OpenFlow data path implementation which uses for each neighbor a dedicated OpenFlow port. Once the primary port is detected to be down, the data packets are automatically forwarded using the next active port, i.e. towards a different neighbor where there is an active backup link. Thus, a determination is made at inquiry step 6502 if the primary path is working. If so, control passes on to step 6514, and the packet is forwarded on the primary path. If inquiry step 6512 determines that the primary path is not working, the packet is forwarded on the backup path at step 6516. The process is then completed at step 6518. This process allows the small cell node to perform a local failover instead of the SDN controller performing a centralized failover. This significantly reduces the reaction time to failures in the mesh forwarding structure.

Figure 66:
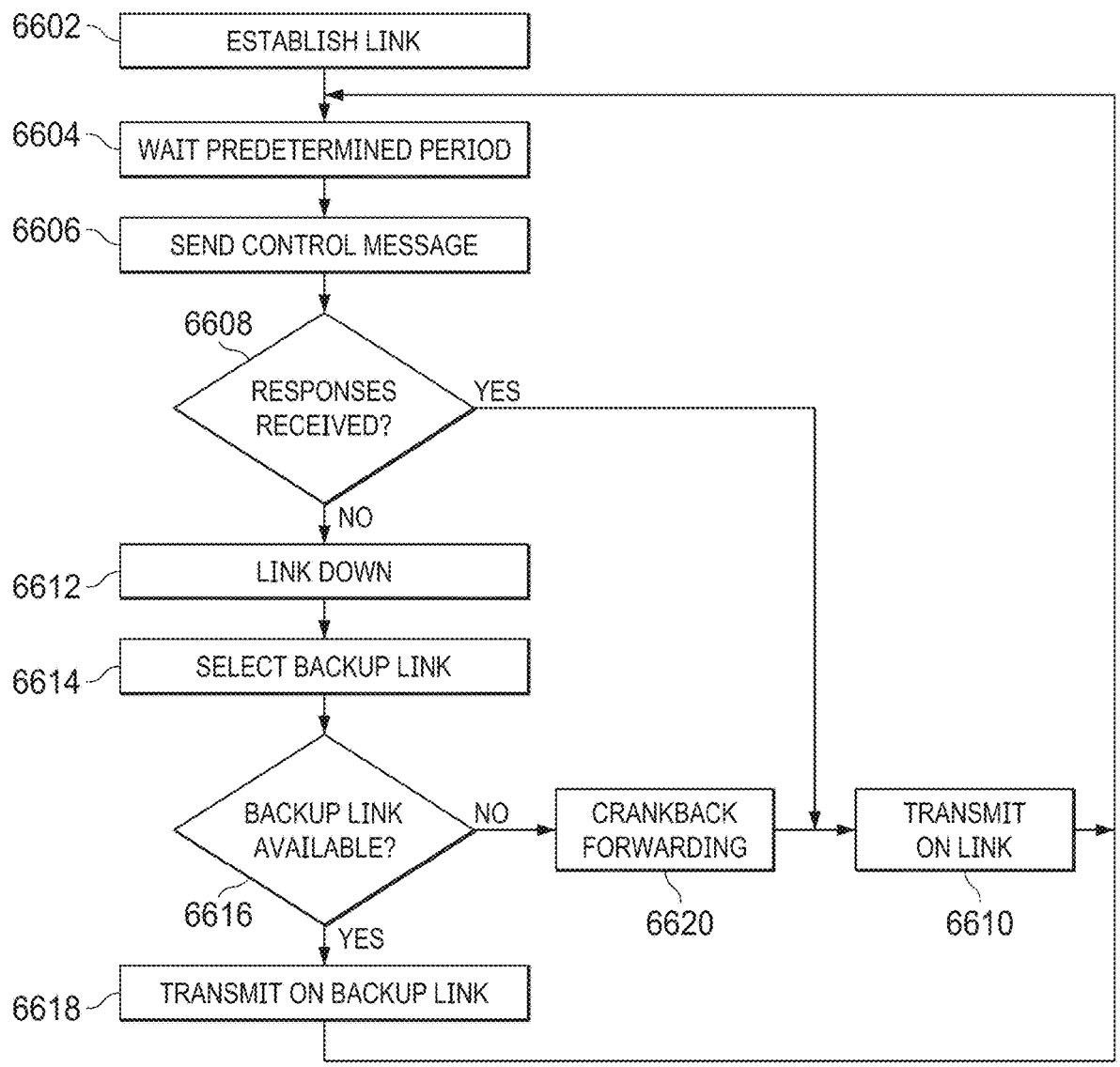
FIG. 66 illustrates a flow diagram describing the process for detecting link state and for the transmission on primary and backup links.

Referring now to FIG. 66, there is illustrated the process for detecting link state and transmitting on primary and backup links. In order to detect the link state, bidirectional forwarding detection (BFD) is a commonly used technology. BFD determines the state of the port by establishing a connection at step 6602 using a three-way handshake routine. BFD next waits a predetermined period of time at step 6604 and transmits a periodic control message at step 6606. Inquiry step 6608 determines if a response to the control message has been received. The timeout period is determined by the control messages between the BFD messages. If a response to the control message is received, transmissions are carried out on the link at step 6610 and control passes back to step 6604 to await an additional predetermined period. If no response to the control message is received within a specified time interval, the link is considered down at step 6612. In this manner, link failures may be rapidly detected and reacted to. Consequently, small cell backhaul nodes would send periodic BFD messages to each neighboring node over the connection links to detect link states. Once BFD detects a link down event at inquiry step 6608, the link state is set to down at step 6612. This triggers the OpenFlow datapath to start transmitting to a different neighbor small cell. This is achieved by selecting a backup link at step 6614.

Alternatively, MAC layer protocol messages can be used in order to infer the state of the communications links, which could be integrated into the OpenFlow data path. The media access control (MAC) layer is a lower sublayer of the data link layer of the seven-layer OSI model. The Open Systems Interconnection model (OSI model) is a conceptual model that characterizes and standardizes the communication functions of a telecommunication or computing system without regard to their underlying internal structure and technology. Its goal is the interoperability of diverse communication systems with standard protocols. The model partitions a communication system into abstraction layers. The original version of the model defined seven layers.

A layer serves the layer above it and is served by the layer below it. For example, a layer that provides error-free communications across a network provides the path needed by applications above it, while it calls the next lower layer to send and receive packets that comprise the contents of that path. Two instances at the same layer are visualized as connected by a horizontal connection in that layer.

The MAC sublayer provides addressing in channel access control mechanisms that make it possible for several terminals or network nodes to communicate with a multiple access network and incorporates a shared medium, e.g. an ethernet network. The hardware that implements the MAC is referred to as the media access controller. The MAC sublayer acts as the logical link controller (LLC) sublayer and the networks physical layer. The MAC layer emulates a full-duplex logical communication channel in a multipoint network. The channel may provide unicast, multicast or broadcast communication service.

A weakness with fast failover is that it can only perform local failover. If no alternative local path is available, e.g. all neighbors are not reachable anymore, then crankback routing must be performed. This requires that the packet be sent backwards toward the source to a small cell node which has an alternative active path towards the destination. Thus, crankback forwarding can potentially have large impacts on the latency. Such latency can be reduced significantly by introducing stateful forwarding in the data plane using OpenState. OpenState is a research effort focused in the development of a stateful data plane API for Software-Defined Networking. OpenState is more particularly described in the OpenState v1.0 specification. If packets arrive at a small cell forwarding node which does not have a next hop towards the destination node because the link is down, the node tags the packet and the packet is sent back towards the source. When the message reaches the small cell node having a backup path, the state of the forwarding rules change in such a way that the coming packet traverse the backup path already at the node. Therefore, once a backup link is selected at step 6614, inquiry step 6616 determines if the backup link is operating and available. If so, transmissions are carried out on the backup link at step 6618 and control passes back to step 6604. If the backup link is not available as determined at inquiry step 6616, the crankback forwarding process is carried out at step 6620 and transmissions carried out on allocated available link.

Figure 67:
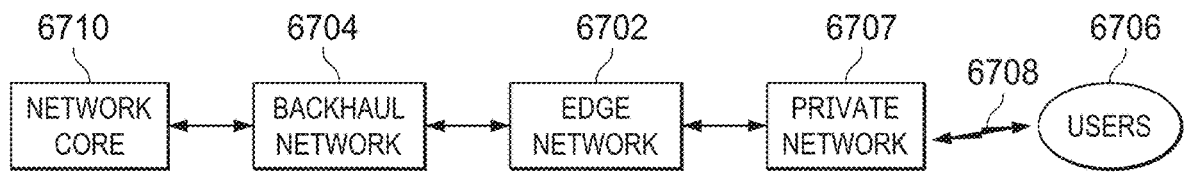
FIG. 67 illustrates a private network wirelessly connecting to users to provide a connection to the network core.

Referring now to FIG. 67, the use of SDN and NFV within the edge/access network 6702 connected to a backhaul network 6704 in addition to being useful as described herein above, may also be used for providing a high capacity last drop access connections to users 6706 that lowers costs and guarantees flexibility. Last drop connection comprises a wireless access 6702 from the edge/access network 6704 to the user 6706. The last drop connection 6708 is the access connection to a network by user 6706. Data from a user 6706 may be provided over the wireless last drop connection 6708 to a private network 6707 and then on to the edge network 6702 and forwarded onward to the backhaul network 6704 and network core 6710. These last drop connections 6708 can be provided between the private network 6707 and users 6706 in a number of fashions. A last drop connection 6708 provided in the described manner provides a high-capacity access solution that lowers cost and guarantees flexibility and scalability for both residential and enterprise customers with 60 GHz access in both backhaul and fronthaul.

Figure 68:
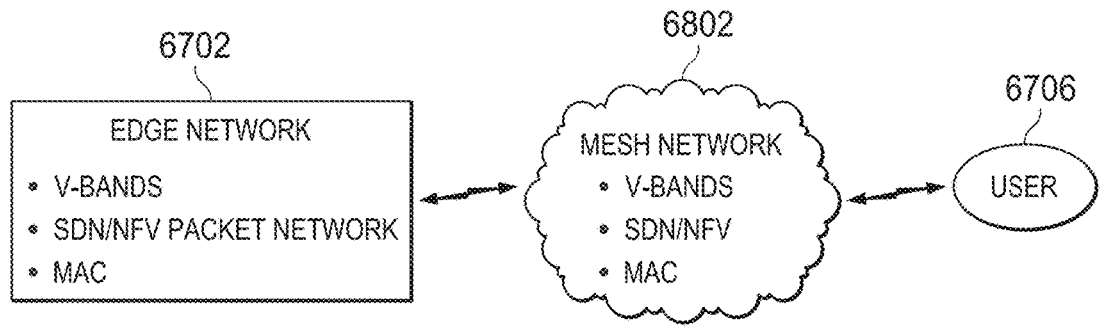
FIG. 68 illustrates a mesh network for interconnecting an edge network with users.
Figure 69:
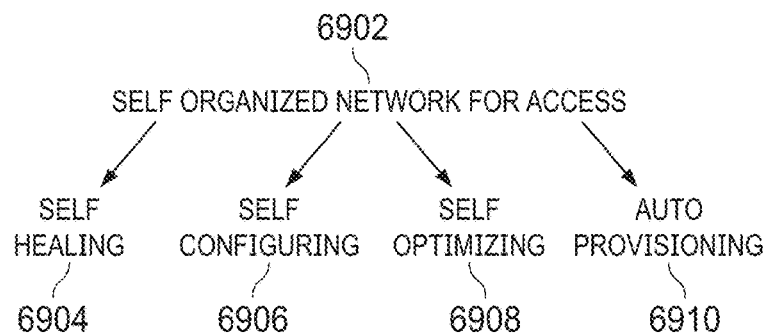
FIG. 69 illustrates the components of a self-organized network for access.

Mesh networks can be applied to both access networks 6702, 6707 (from base to end users) and backhaul networks 6704 (from base to network core). A mesh network means that each node is connected to at least two or more sites, so that when a link is broken, the mesh network can self-heal itself, by finding another path to keep the network connections active. FIG. 68 illustrates the use of a mesh network 6802 for the last drop connections 6708 between the user 6706 and the edge network 6702. While the following description is made with respect to using a mesh network to provide the access network 6702 connections, the mesh network could be applied in a similar manner as part of the backhaul network 6704. The last drop connection 6708 comprises what may be termed as a self-organized network for access 6902 as illustrated in FIG. 69. The mesh network 6802 may comprise one or both of an indoor or outdoor network. The mesh network 6802 uses an SDR based indoor and outdoor MulteFire system to allow a private network to provide scalable coverage, capacity and control that is not available in public networks. The self-organized network for access 6902 includes a number of characteristics enabling the communications. The self-organized network 6902 includes a number of characteristics including that the network is self-healing 6904, self-configuring 6906, self-optimizing 6908 and provides auto provisioning 6910. The network 6902 is self-healing 6904 in that when a communications link within the network 6904 breaks down, the network may self-correct the problem in order to cure the failed link. The network 6902 is self-configuring 6906 in that the network software may reconfigure the links automatically without any external inputs from a network manager in order to correct failed communication links. The network 6902 is self-optimizing 30908 in that decisions for placement of nodes within the network 6902 are made in order to optimize the closeness to the various end-users and to further minimize backhaul cost in order to reduce overall network costs. Finally, the auto provisioning functionalities 6910 of the network 6902 enable the network to automatically establish new communication links that are generated based upon failed existing communication links.

Various optimization techniques may be utilized. An effective hybrid technique may be used for optimizing multimodal functions in large scale global optimization (LSGO) that will pair the first search space exploration performed initially by standard techniques with more efficient local search techniques. Large scale global optimization (LSGO) is as important technique in large scale traffic networks. As dimensionality increases, the performance of most optimization algorithms quickly goes down. There are two major reasons for this decrease in performance. These are an increase of the complexity and an exponential increase of the search space volume. Due to the increase in complexity, unimodal functions may become multimodal in large dimensions. Due to the exponential increase of the search space volume, optimization algorithms need to increase their efficiency when exploring large search spaces. The efficiency can be measure by the number of function evaluations required to converge to a given optimum. In practice, many large-scale problems are multimodal.

In addition to the exponential increase in the number of candidate solutions, the cost of converging to any local optimum also increases. In high dimensional search spaces, we must focus almost exclusively on gradient exploitation in order to guarantee convergence to any local optima. However, disregarding exploration may lead to poor results in multimodal problems. In multimodal problems, it is critical to explore the search space to find the most promising regions before converging toward a local optima. Even in LSGO some exploration is necessary to achieve good performance on multimodal problems. There is a need to focus on minimum Population Search. The key idea behind the approach is to focus on multi-modal functions and to consider from the beginning the issues when scaling to large scale global optimization. This is done via an efficient use of function evaluations and an unbiased exploration.

In the current approach, search techniques focus more and more on gradient exploitation as dimensionality increases. So the primary focus is on hybrid techniques which will pair the full search space exploration performed initially by standard techniques with more efficient local search techniques. Therefore, an effective hybrid technique is used for optimizing multimodal functions in LSGO.

Minimum Population Search focuses on multi-modal functions. Originally the ideas were developed for two dimensional problems, later generalized for standard dimensions and scaled towards large scale problems. Standard techniques perform a methodical and unbiased exploration based on the Threshold Convergence (TC) technique. Threshold Convergence is designed to avoid a biased exploration by preventing global and local search steps from happening at the same time. This is achieved by fixing a minimum search step (threshold) which decays as the search progresses. Convergence is thus "held" back until the last stages of the search process.

An iterative optimization procedures built around the concept of self-adaptation called Covariance Matrix Adaptation (CMA) with (μ, A) selection considers the best p solutions out of a population with A solutions for recombination. It is an iterative optimization procedures built around the concept of self-adaptation. The parameters of the search strategy evolve together with the solutions. CMA is an evolution strategy with (μ, A) selection considers the best p solutions out of a population with A solutions for recombination. Recombination operators then create a (single) parent representation from the μ selected solutions, and A new children are produced through the use of a probabilistic mutation distribution. CMA-ES (Evolutionary Strategy) uses parameterized multivariate normal distribution for the representation of the mutation distribution.

A hybrid method is used for the optimization of multi-modal problems by identifying promising attraction basins and finding the local optima in these basins. The optimization of multi-modal problems involves two tasks including the identifying promising attraction basins and finding the local optima in these basins. To effectively perform each of these tasks, different search strategies may be used. The hybrid technique of standard MPS takes care of this issue by assigning a different heuristics to each task. MPS's ability to efficiently explore the search space is used during the early stages to identify promising attraction basins.

Referring now to FIG. 70, there is illustrated a portion of a mesh network 7002 used for implementing the self-organized network for access 6902 described with respect to FIG. 69. The mesh network 7002 includes a plurality of nodes 7004. Each of the nodes 7004 include at least two links 7006 providing a pathway from the node to at least two other nodes. This is done to provide a backup link should a primary link fail. This use of the backup and primary link utilizes SDN and NFV processes such as those described hereinabove. The wireless communication links 7006 between nodes are provided using standard-based unlicensed V-band (60 GHz) or MulteFire frequencies (3.5-5 GHz) to provide SDN/NFV based packet network communications between the nodes 7004. This provides for a 1 Gbps access to users. The use of SDN and NFV processes are used for maintaining the communication links 7006 between nodes 7004. The described system provides solutions to support existing and future traffic demands using a system that leverages existing technologies, new processes, topologies and architectures.

FIG. 71 illustrates a mesh network 7102 that may be used for interconnecting with a number of users. The mesh network 7102 comprises a number of nodes 7104 that communicate with each other using V-band (60 GHz) or MulteFire (3.5-5 GHz) communications transceiver. The 60 GHz V-band has been standardize under the WiGig standards. The 60 GHz V-band currently provides 7 GHz of spectrum. However, the US is planning to expand the V-band spectrum to include an additional 7 GHz to provide a total of 14 GHz of spectrum. The 60 GHz V-band spectrum provides a communications between nodes at a distance of approximately 200 m to 250 m from each other as indicated generally at 7106. Thus, the transmission distance between nodes 7104 within the 60 GHz system is somewhat limited. The MulteFire frequencies are in the 3.5-5 GHz frequency range. The mesh network 7102 implements a number of phase array antennas at the nodes 7104 to retain the highly directional signal required for 60 GHz or 3.5-5 GHz, but makes the communication links steerable to communicate over a wide area. The use of the 60 GHz V-band or 3.5-5 GHz band enables transmitted signals to be routed and steered around interference typically found in dense urban environments, such as tall buildings or internet congestion due to high user traffic. Thus, as illustrated generally at 7108 by the dashed line, an interfering structure or phenomena, such as a building, may prevent signals from being easily transmitted from nodes positioned at locations 7104A. Thus, when transmitting from node 7104B to node 7104C, system controllers would utilize nodes 7104D rather than nodes 7104A to route signals to steer around the interference structure 7108.

Figure 72:
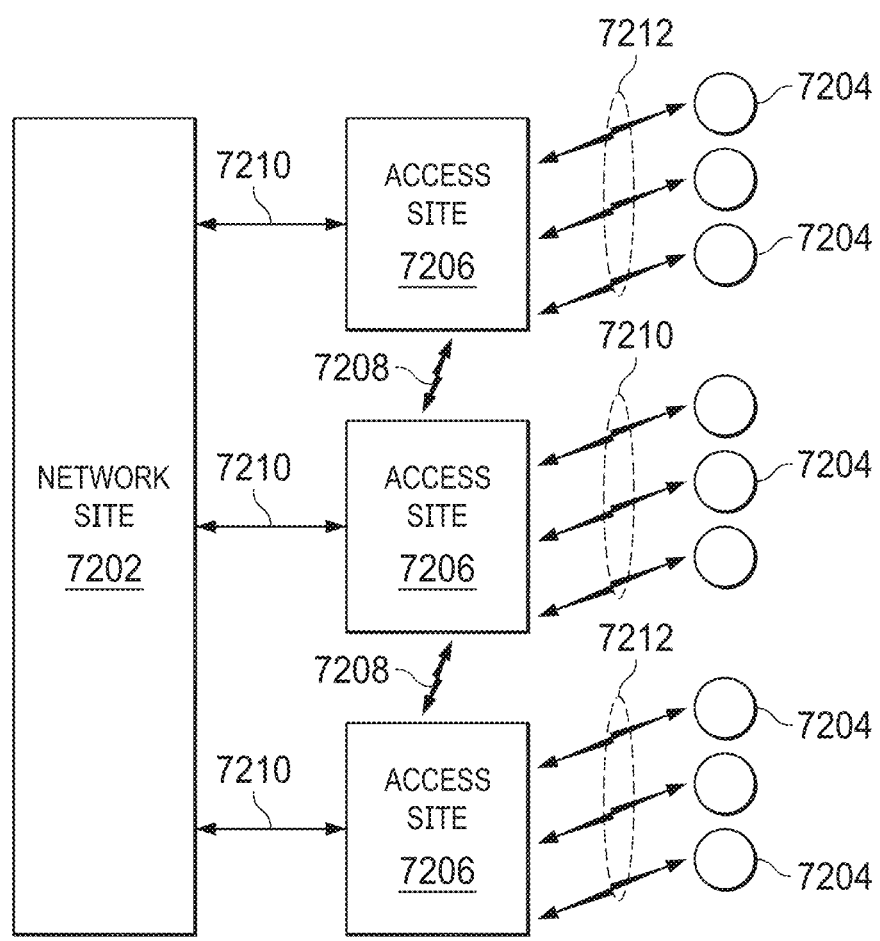
FIG. 72 illustrates a mesh network of access sites connected to multiple users.

Thus, as shown in FIG. 72 a mesh network would enable an interconnection between a network site 7202 and a number of residential or enterprise users 7204. In this case, each of the access sites 7206 comprises nodes within an associated mesh network. The access sites 7206 wirelessly communicate with each other over communication links 7208 and communicate with the network sites over communication links 7210 which may be wireline or wireless. The access sites 7206 communicate with the residential or enterprise users 7204 over a 60 GHz or 3.5-5 GHz wireless link 7212.

The communications over the wireless communications link 7212 between the access sites 7206 and in the users 7204 may be implemented using MAC layer protocols and TCP-IP protocols. Normally, MAC layer protocols and TCP-IP protocols are used for packet data transmissions over wireline networks. However, modified, high performance MAC layer protocols (TDMA-TDD MAC) and TCP-IP protocols may be used for communicating over a wireless communications link such as that utilize between the access sites 7206 and users 7204 that overcome the shortcomings of TCP-IP over a wireless link. This can provide up to a 6× improvement in network efficiency and make the TCP-IP protocol more predictable on a wireless link as compared to the existing Wi-Fi/WiGig standard. One example of a modified MAC layer protocol and TCP-IP protocol that may be utilized for wireless communications has been implemented by Facebook. Facebook is implemented using IPv6-only nodes and an SDN-like cloud compute controller and a new modular routing protocol for fast root convergence and failure detection. The Facebook system has re-architected the MAC layer protocol to solve the shortcomings of TCP-IP over a wireless communications link. The modified MAC layer protocol called TDMA-TDD MAC improves wireless network efficiency by 6×. By using concepts derived from LTE-TDD in a 60 GHz WiGi protocol network efficiency may be improved. These same MAC layer implementations may be used for controlling communication in the mesh network wireless communications.

The Facebook system implements a base station having 96 antennas that can support up to 24 different data streams simultaneously over the available bandwidth. The system has demonstrated a 71 bps/Hz data rate which will soon be increased to 100+ bps/Hz. The system comprises a massive MIMO system providing spatial multiplexing that achieves 1.05 Gbps bidirectional data throughput (2.1 Gb per second total throughput or distribution node) in the point to point transmission mode for nodes up to 250 m away. This enables up to 8.4 Gbps of total traffic per installation point assuming four sectors.

Figure 73:
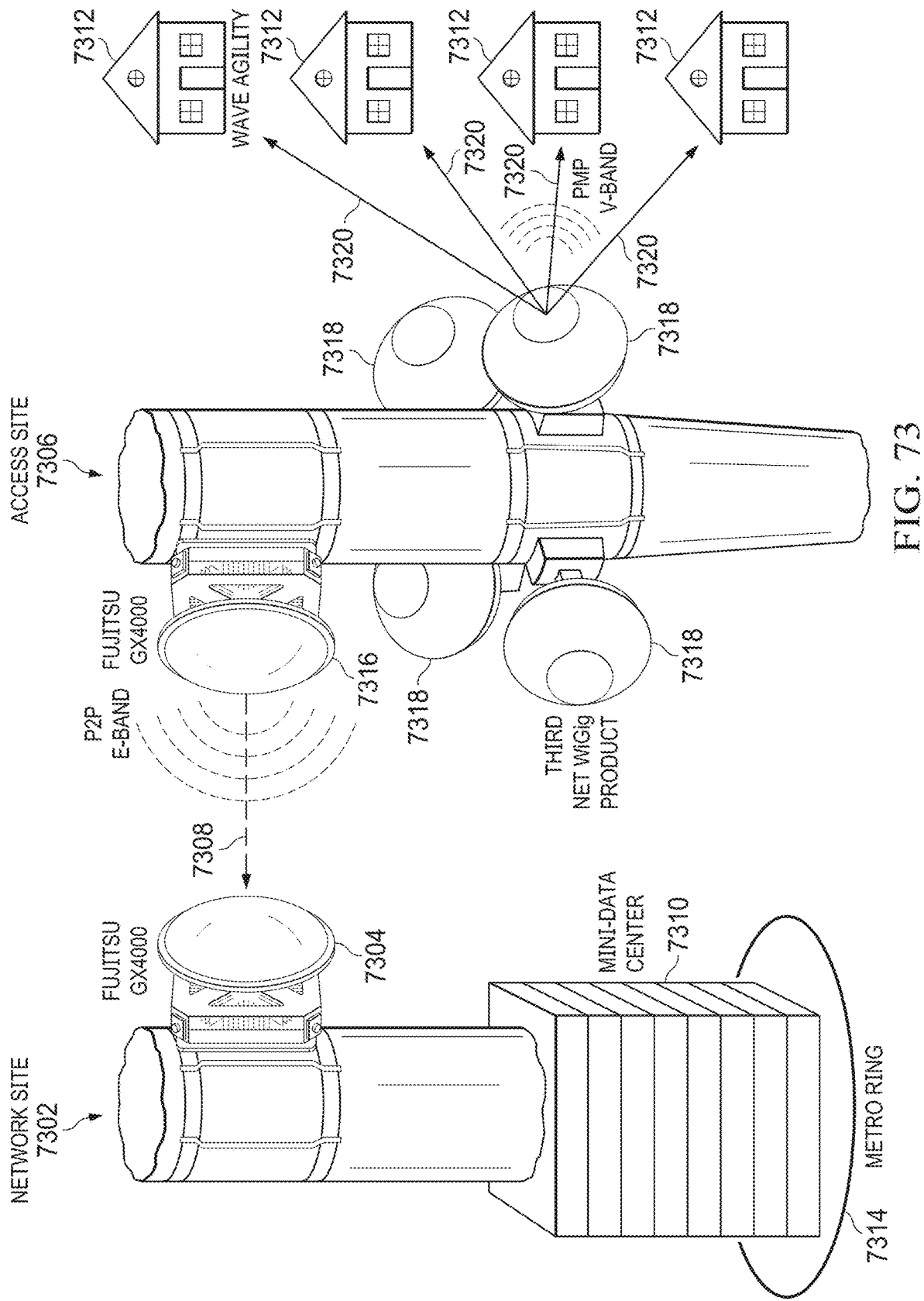
FIG. 73 illustrates the wireless connections between an optimally located access site and an associated network site and resident are enterprise users.

Referring now to FIG. 73, there is illustrated a configuration of the access and network sites that are used for providing the self-organized network for providing access to a number of user locations. The network site 7302 comprises an antenna 7304 communicating with the access site 7306 over a point-to-point E-Band link 7308. The antenna array 7304 may in one embodiment utilize Fujitsu GX 4000 antennas. The point-to-point E-band link 7308 comprises a 70 GHz backhaul link for interconnecting the network site 7302 with the access site 7306. The network site 7302 also includes a mini data center 7310 for storing data that may be accessed by users 7312. Data may be uploaded to or downloaded from the many data centers 7310 over an associated fiber ring 7314 interconnecting the network site 7302 to other network sites.

The access site 7306 also includes an antenna 7316 for providing the point-to-multipoint E-band and link 7308 with the network site 7302. The access site antenna 7316 may also comprise in one embodiment a Fujitsu GX 4000 antenna. The access site 7306 additionally includes a phased array of antennas 7318 for providing a point-to-multipoint V-band connection 7320. The phased array antennas 7316 provide point-to-multipoint transmissions to a plurality of residential or enterprise users 7312. Placement of each of the access site 7306 and network site 7302 are achieved using the Optima System that optimally locates access and network sites that is closest to the end-user but minimizes backhaul cost. At the access sites, specially constructed mini-towers provide a high-capacity, last drop access solution that lowers cost and guarantees flexibility. Placement of the access sites 7306 in this manner using the Optima System maximizes operation of the network. The Optima system determines the optimal longitude and latitude for the access site and additionally includes the Z value (height) of the antennas 7318 and 7316 in order to best locate the antennas on an access site poll. While the illustration of FIG. 73 illustrates a single access site 7306, it will be appreciated that the mesh network system will comprise a plurality of access sites 7306 each comprising a specially structured mini-tower.

The access sites 7306 and network sites 7302 may be configured to enable enhanced fixed broadband (eFBB), ultra-reliable low latency communications (uRLLC) with massive MIMO transmissions. The massive MIMO transmissions are provided from antenna arrays at access sites 7306 and network sites 7302 that provide for multiple input/multiple output transmissions. The antenna arrays from the access sites 7306 and the network sites 7302 provide for multipoint-to-multipoint and point-to-point transmissions. Enhanced fixed broadband is a fixed broadband that is enhanced with new advances (i.e., New Radio (NR) technology that uses new 3GPP advances in spectral mask that are more localized) as well as higher order modulation and new spectrum with carrier aggregation. Ultra-reliable low latency communications comprises a service category designed to meet delay-sensitive services such as the tactile Internet, vehicular to vehicular communication, autonomous driving and remote control. uRLLC has a time-to-transmit latency time (the time required to transmit a packet) of not greater than 0.5 ms. The performance level of a uRLLC system should provide a block error rate of at least $10^5$.

Figure 74:
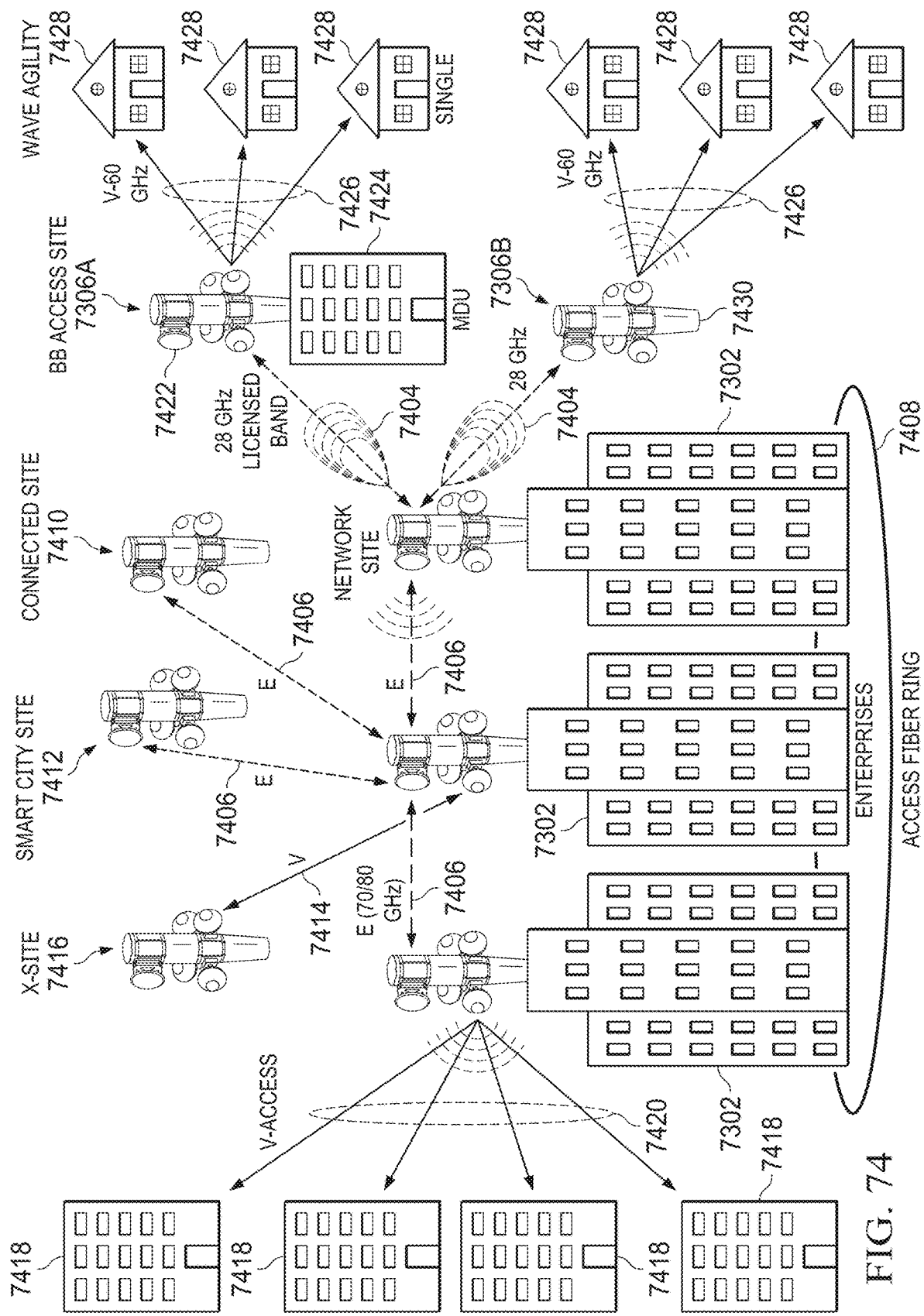
FIG. 74 illustrates a network of a plurality of optimally located access sites and network sites using both licensed and unlicensed data bands.

Referring now to FIG. 74, there is provided a broader level network illustration of a plurality of optimally located access sites 7306 and network sites 7302 using both licensed and unlicensed data bands comprising a private MulteFire network. In this case, the network sites 7302 comprise mini-towers with associated antennas located on MDUs (multiple dwelling units). Each of the mini-towers 7402 can either communicate via both the 28 GHz licensed band point-to-point link 7404 to access sites 7306, to other network sites 7302 via point-to-point e-band connections 7406 or 3.5-5 GHz band. The network site 7302 communicates with the access sites 7306 via the 28 GHz licensed band point-to-point links 7404. The network sites 7302 can communicate with other network sites 7302 by either a fiber link 7408 or with other network sites 7302 through a 70-80 GHz e-band point-to-point link 7406. In addition to communicating with other network sites 7302 through e-band point-to-point links 7406, a network site may utilize the e-Band and point to point links 7406 to communicate with connected sites 7410 and smart city sites 7412.

Smart city sites 7412 comprise data collection sensors for supplying information used to manage assets and resources efficiently within an urban area. The data collected is processed and analyzed to perform a variety of functions including monitoring and managing traffic and transportation systems, power plants, water supply networks, waste management, law enforcement, information systems, schools, hospitals and other community services. The connected sites 7410 comprise other network data transmission or collection sites that may be utilized by network site 7404. The network sites 7302 may also connect via a point-to-point V-band connection link 7414 to X-sites 7416. An X-site comprises other sites that may have surveillance cameras or sensors for different applications such as detection of gas for emergencies, ect. Finally, the network sites 7202 may connect to other MDUs 7418 using a point-to-multipoint V-band access link 7420.

Access site 7206A comprises a BB (broadband) access site from a mini-tower 7422 located on an MDU 7424. A BB access sites are for connecting the end user to the access point (base station). These sites are differentiated from aggregation sites and their associated backhaul (from an aggregation point towards the core of the network rather than towards the end users). The access site 7206 provides point to multipoint 60 GHz V-band or 3.5-5 GHz band links 7426 to multiple user locations 7428. Access site 7206B comprises a mini-tower 7430 providing point-to-multipoint 60 GHz V-band or 3.5-5 GHz band links 7426 to multiple users 7428.

Figure 75:
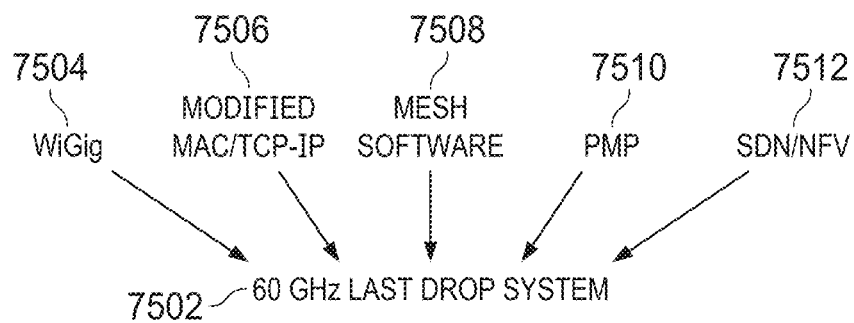
FIG. 75 illustrates the software components of a 60 GHz last drop system.

Referring now to FIG. 75, the private system 7502 described herein builds upon existing technologies in a unique combination along with new techniques in order to provide the unique last drop system. The WiGig protocol 7504 implemented within the Peraso chipset provides for wireless packet data transmissions. The modified MAC/TCP-IP protocol 7506 that has been developed by Facebook is utilized for providing improved wireless packet data transmissions. Communications between the access sites and network sites of the mesh network are controlled utilizing mesh software 7508. The mesh software 7508 is responsible for automatically detecting when a link goes down between nodes within the mesh network and reconfiguring and reestablishing a connection using a new link path. Connections between access nodes of the mesh network and users are provided using point to multipoint transmission techniques 7510 from the access nodes to the users. The control of the mesh network node connections are carried out using SDN/NFV software control techniques 7512 as described herein.

Figure 76:
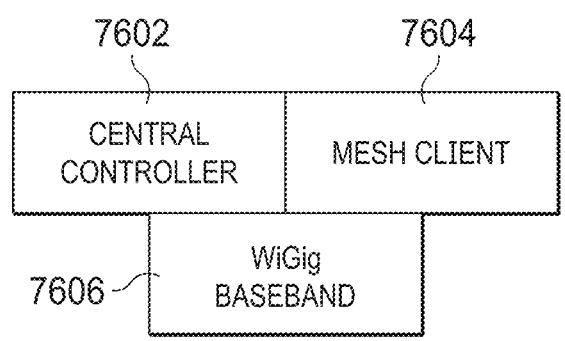
FIG. 76 illustrates the manner in which a central controller and mesh client operate on top of a WiGig baseband layer.

FIG. 76 illustrates the functional blocks of a mesh network used for providing the last drop services to users. The mesh network structure utilizes a central controller 7602 and a mesh client 7604 that operate on top of a WiGig baseband layer 7606. The central controller 7602 provides for the establishment of links between mesh network nodes and controls the reestablishment of failed links when necessary. The mesh client 7604 is located at each mesh network node and provides the interactions with the central controller 7606 in order to control link establishment at the nodes. Each of the central controller 7602 and mesh clients 7604 within the network nodes utilize the WiGig baseband communication control protocol 7606 in order to carry instructions between the central controller 7602 and mesh clients 7604. The combined use of the central controller 7602 and mesh clients 7604 with the WiGig protocol 7606 enables the use of a multi-hop topology for providing links that travel from one point to another through multiple mesh network nodes. The combination additionally provides for quality of signal support for the links between mesh nodes and failover management for failed mesh node links to provide a high reliability system. The platform for initiating these control layers include a phased antenna array associated with the mesh network nodes, WiGig SoC (system-on-a-chip) located on each mesh network node. Mesh software controls the node interactions using the phased antenna array and WiGig SoC.

Figure 77:
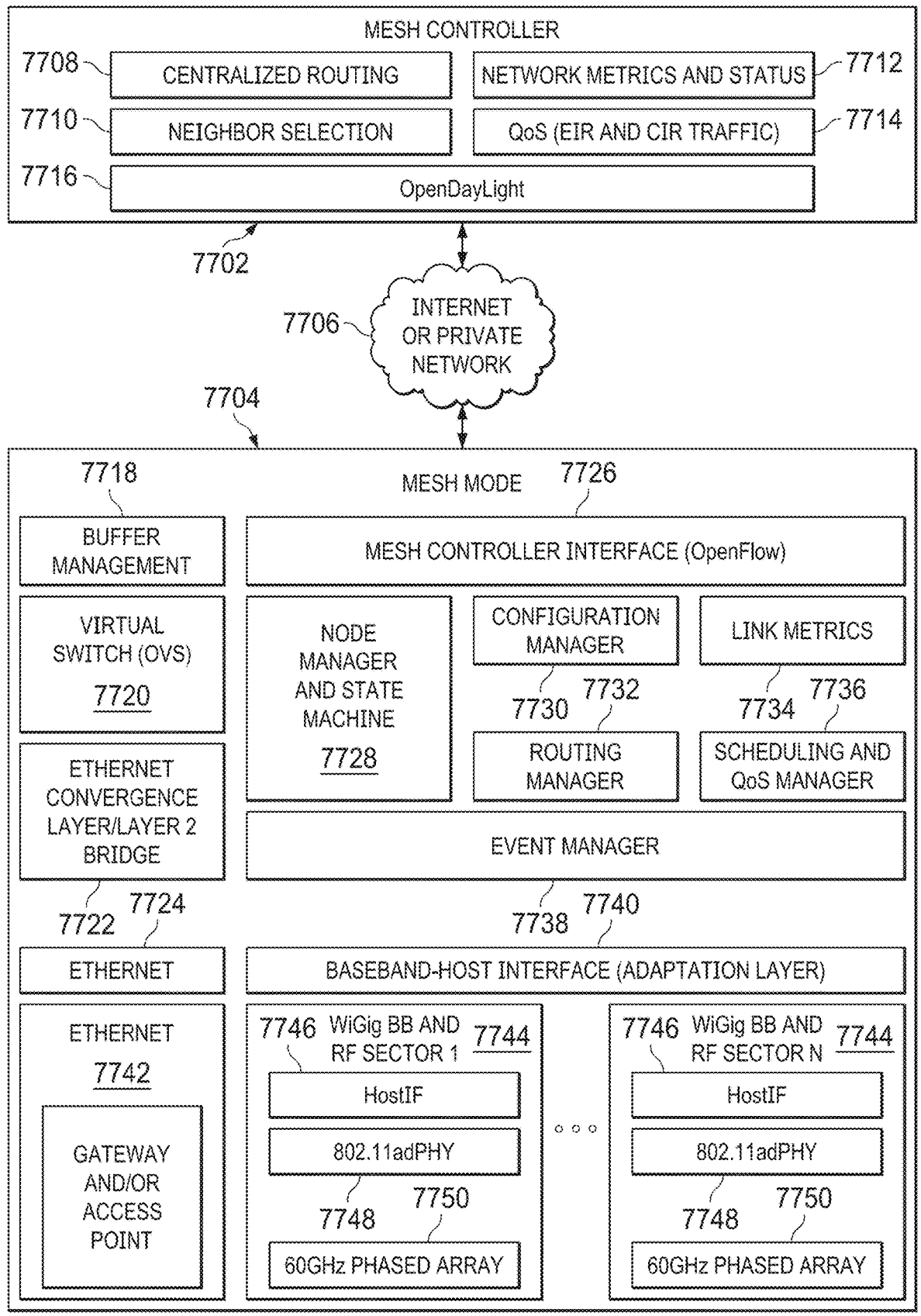
FIG. 77 illustrates the various mesh software functions for the mesh controller and mesh node.

The mesh software as illustrated in FIG. 77, includes a number of functionalities within the mesh controller 7702 and the mesh node 7704. The system uses big data analytics for targeted decision-making, network awareness, advanced processing with multi-core radios, dynamic porting, open source standards and network slicing. The mesh controller 7702 software and mesh node 7704 software may be updated via the Internet or a private network 7706. The mesh controller 7702 provides centralized routing functionalities 7708. The centralized routing functionalities enable for centralized control of the routing of data packets over communication links that have been established within the system. The neighbor selection functionalities 7710 provide for the selection of neighboring nodes that will be used for reestablishing failed communication links when a primary communication link fails. The network metrics and status functionalities 7712 tracks network status parameters and maintains these to assist in rerouting decisions of other mesh controller 7702 functionalities. The quality of service (QOS) functionalities 7714 monitor EIR (excess information rate) and CIR (committed information rate) traffic in order to assist in maintaining quality of service of signals being transmitted over the wireless connection between nodes of the mesh network for high reliability. The OpenDayLight functionalities 7716 provide for network management and data switching within the mesh network. OpenDaylight is a collaborative open source project hosted by the Linux foundation. OpenDaylight promotes software defined networking (SDN) and network function virtualization (NFV).

The mesh node 7704 functionalities provide for maintenance of the network of mesh nodes and providing for communications therebetween. The buffer management functionalities 7718 provide for buffering of data that is being transmitted between nodes of the mesh network. The open virtual switch (OVS) functionalities 7720 provide for switching between nodes of the mesh network. OVS is an open source implementation of a distributed virtual multi-layer switch. OVS provides a switching stack for hardware virtualization environments while some hoarding multiple protocols and standards used within computer networks. The ethernet convergence layer/layer 2 bridge 7722 provides for the aggregation of multiple networks into a single network. Ethernet functionalities 7724 provide for ethernet communications between network components over the mesh network nodes. The mesh controller interface 7726 uses OpenFlow to enable communication between the various nodes of the mesh network. The node manager and state machine 7728 monitors the nodes of the mesh network and manages and tracks their state for data packet transmission. The configuration manager 7730 is responsible for configuring the mesh node network when breakdowns in nodes occur requiring reconfigurations of links between nodes. The routing manager 7732 is responsible for generating routing information for packet data that is transmitted over active links within the mesh network. The link metric functionalities 7734 monitor and track the status of links between nodes of the mesh network. The scheduling and quality of service manager 7736 monitors the scheduling of packets between nodes and manages quality of service of links between nodes. The event manager 7738 is part of the mesh node that collects and manages all events in mesh control, node and state machine, configuration management, routing management, scheduling and QoS management, link status and metrics, ect. The baseband host interface 7740 provides for an interface with the application layer by the nodes of the mesh network.

The gateway and/or access point 7742 provides the access point address controls to the ethernet. A number of WiGig BB and RF sectors 7744 provide for interactions with the WiGig and RF network functionalities and provides for a host interface 7746, 802.11ad physical interface 7748 and 60 GHz phased array interface 7750.

Using these software functions within the mesh controller 7702 and mesh nodes 7704 the mesh software implemented within processor/server at the various nodes can perform a number of operations within the mesh network. The software enables the performance of network discovery and autonomous neighbor selection. This enables nodes to identify the mesh network and automatically determine neighboring nodes that are located in close proximity to the node. The system may also perform topology management using in-band signaling with the mesh network controller 7702. The functions allow for the configuration of the node processor/server for management of node and sector state machines within the mesh network. The mesh software may also be used for detecting link failures and switching the communication links to an alternative path when an existing link has failed. The mesh software may also be used for sector and node recovery when particular sectors or nodes within the mesh network are lost. The mesh software performs link metric collection through for example the link metrics functionalities 7734 to enable the decisions and handling of things such as link failure to be appropriately decision based. The virtual switches 7720 implement L2 transport. The mesh software can also provide simple network management protocol (SNMP) using MIBs (management information bases). SNMP is an Internet standard protocol for collecting and organizing information about managed IP devices on IP networks in for modifying that information to change device behavior. SNMP is widely used in network management for network monitoring. SNMP exposes management data in the forms of variables on the manage systems organized in a management information base which describe the system status and configuration. These variables can then be remotely queried by managing applications. Finally, the mesh software provides for ease of configurability via the use of text file configuration parameters.

Figure 78:
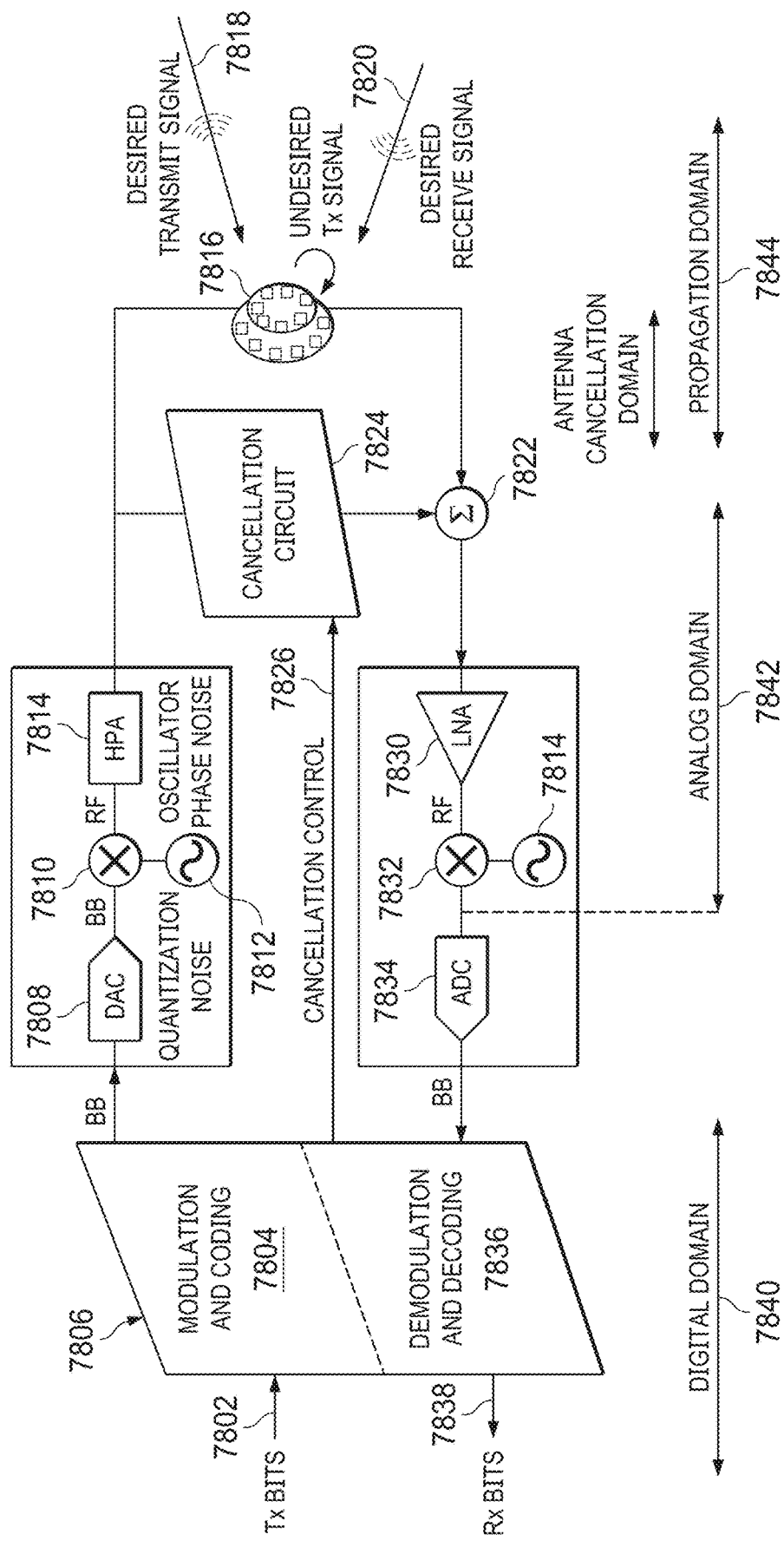
FIG. 78 illustrates a system providing full cancellation operation.

As discussed above, baseband RF transceiver and antenna arrays have been developed that generate plane waves at 60 GHz and are miniaturized on a USB dongle. These systems have been further improved using two layers of OAM energization on a same USB dongle to provide full duplex isolation. Referring now to FIG. 78, there is illustrated the manner for system operation in the full duplex cancellation domain. Transmit bit 7802 are provided to modulation and coding circuitry 7804 within a modulation/demodulation circuit 7806 to provide for modulation and coding thereof. The baseband signal from the modulation and coding circuitry 7804 is provided to a digital to analog controller converter 7808. The analog baseband signal from the digital to analog converter 7808 is provided to a mixing circuit 7810 to be mixed with a carrier signal provided by oscillator 7812. The mixing circuit 7810 provides an RF band signal to the high-pass amplifier 7814. The RF signal is transmitted from a multilevel patch antenna array 7816 as a transmitted signal 7818.

In addition to generating transmitted signals 7818, the multilevel patch antenna array 7816 also receives signals 7820. The receive signals 7820 are provided to a summation circuit 7822 that are combined with a cancellation signal from a cancellation circuit 7822. The cancellation circuit 7824 generates a cancellation signal responsive to the output of the high-pass filter 7814 that is being provided to the multilevel patch antenna array 7816 and a cancellation control signal 7826 provided from the modulator/demodulator 7806. The cancel signal from the summation circuit 7022 is provided to the input of a low noise amplifier 7830 that is down converted from the RF domain to the baseband domain using a mixing circuit 7832 that combines the output of the low noise amplifier 7830 within carrier signal from oscillator 7814. The output of the mixing circuit 7832 is provided to a analog-to-digital converter 7834 this digital signal is provided to the demodulation and decoding circuitry 7836 within the modulator/demodulator 7806. The demodulation and decoding circuitry 7836 outputs the received bits 7838. Signals within the modulator/demodulator 7806 up to the digital to analog converter 7808 and analog-to-digital converter 7834 comprise the digital domain 7840. The signals between the digital to analog converter 7808 and the analog-to-digital converter 7834 and the multilevel patch antenna array 7816 are within the analog domain 7842. Finally, the signals from the multilevel patch antenna array 78 and 16 outward are in the propagation domain 7844.

Figure 79:
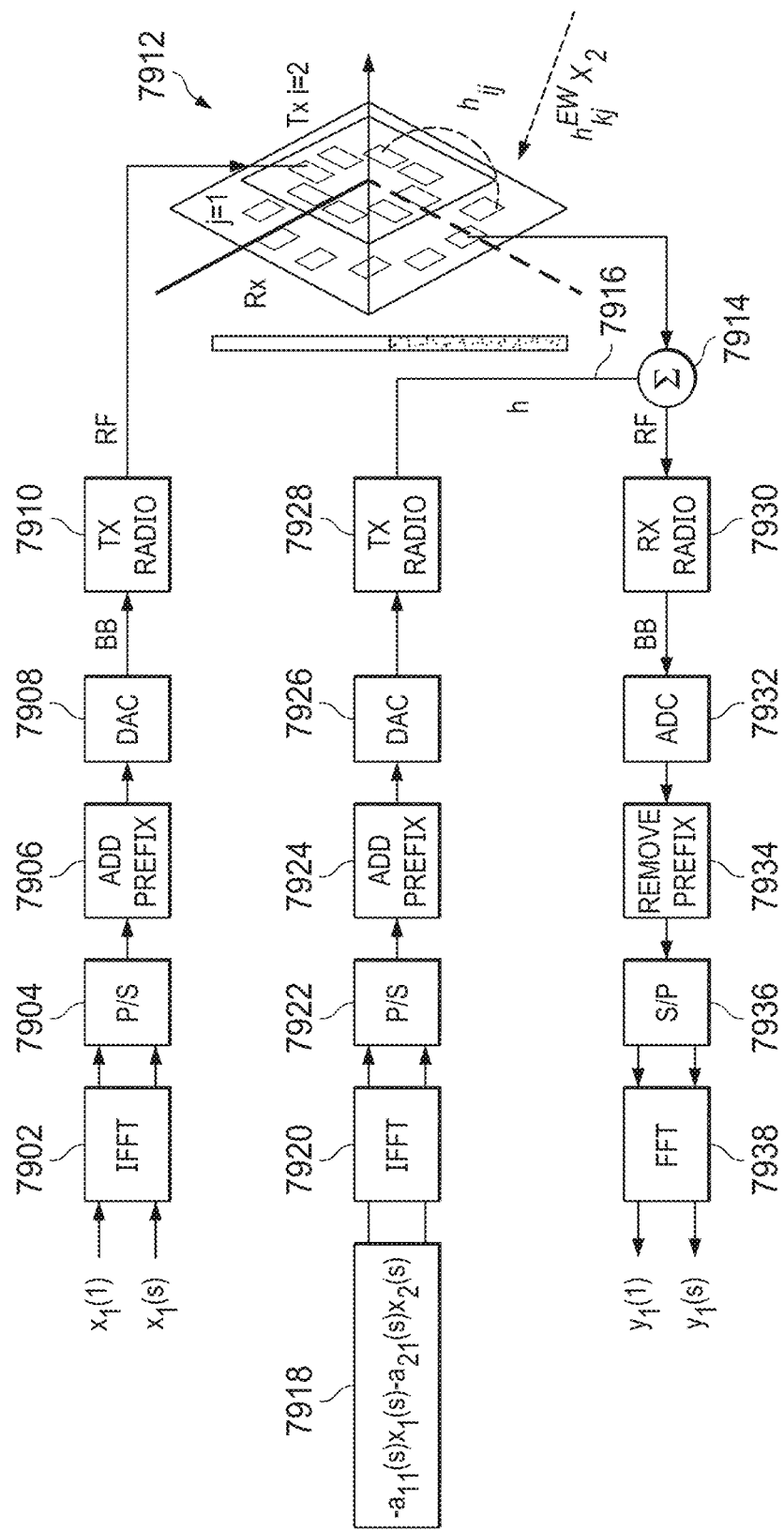
FIG. 79 illustrates a full-duplex cancellation technique.

Referring now to FIG. 79, there is more particularly illustrated full duplex cancellation techniques for canceling interference in full duplex transmissions. Input signals $x_1(1)$ and $x_1(s)$ are provided to and inverse Fast Fourier Transform (IFFT) 7902. The parallel outputs of the IFFT 7902 are provided to a parallel to serial converter (P/S) 7904. The P/S 7904 provides a serial output to an add prefix circuit 7906 that provides a prefix to the serial signal. The signal is provided to a digital to analog converter 7908 to convert the digital signal to an analog signal. The generated analog signal is transmitted by a transmitting radio 7910 using a multilevel patch antenna array 7912.

Signals received by the multilevel patch antenna array 7912 are provided to a summation circuit 7914 along with a cancellation signal 7916. The cancellation signal 7916 is generated from a cancellation control signal 7918 that is provided to an inverse Fast Fourier Transform (IFFT) 7920. The output of the IFFT 7920 is provided to a parallel to serial converter 7922 and the output of the parallel to serial converter is provided to an add prefix circuit 7924. The add prefix circuit 7924 adds a prefix to the serial signal and provides the signal to a digital to analog converter 7926. The digital signal passes through a transmit radio 7928 to provide the cancellation signal 7916.

The signals from the summation circuit 7914 are provided to a receive radio 7930. The output of the receive radio 7930 is provided to an analog-to-digital converter 7932. The digital output is provided to a remove prefix circuit 7934 to remove the prefix from the signal and forwarded to a serial to parallel converter 7936. The serial to parallel converter 7936 converts the serial signal from the remove prefix circuitry 7934 into parallel signals that are provided to the Fast Fourier Transform (FFT) 7938. The FFT 7938 generates the output signals $y_1(1)$ and $x_1(s)$ from the digital signals.

Figure 80:
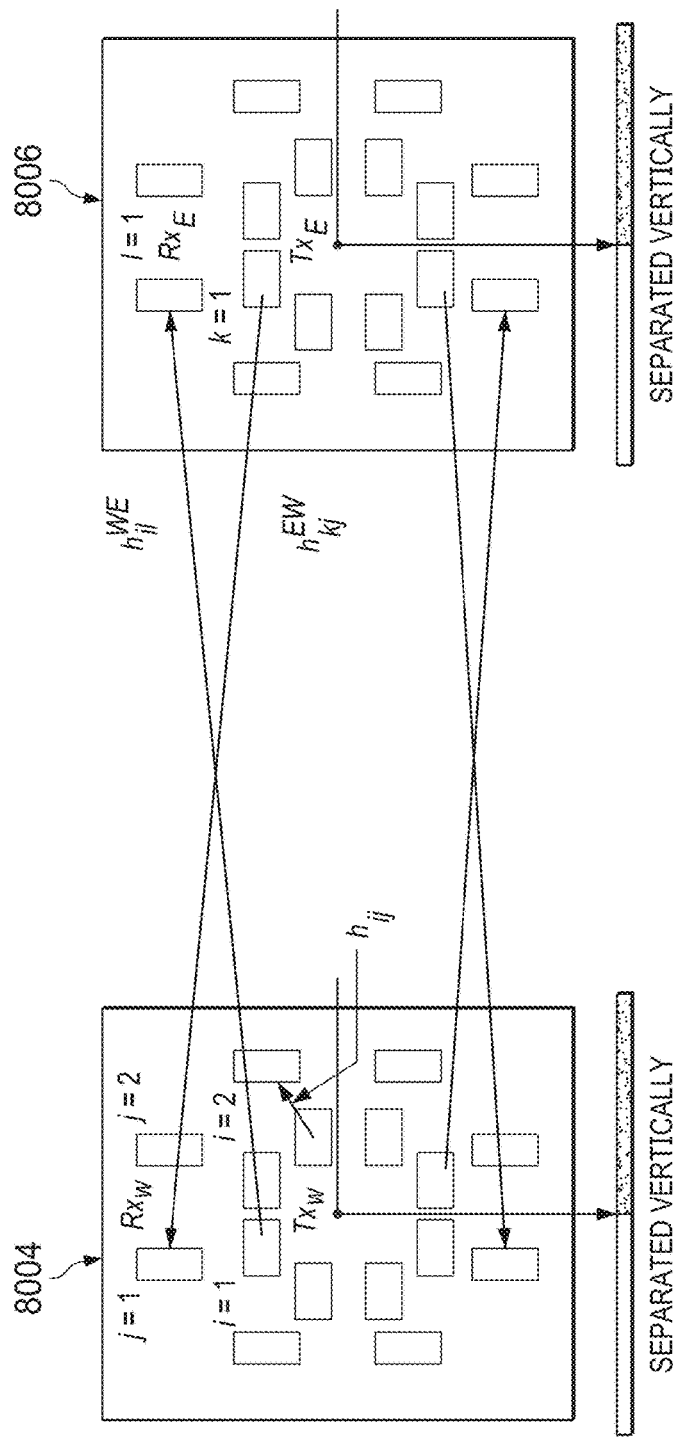
FIG. 80 illustrates vertically separated patch antennas.

Referring now to FIG. 80, there is illustrated the manner in which the patch antennas 8002 are vertically separated from each other to limit interference therebetween. The vertical separation can be seen both in the transmissions between a first patch antenna array 8004 and a second patch antenna array 8006.

There are number of issues with respect to full duplex transmissions in mmWaves. Propagation, absorption (oxygen) and penetration issues are a first group of problems associated with mmWaves. Some of these channel impairments can be combatted using beam-forming gains. Beam-forming requires antenna arrays with large number patch elements. However, mmWaves have short wavelengths, and therefore have no need for huge real estate. Thus, massive MIMO is needed for mmWave networks. However, the large number of signal with each antenna element increases the cost and power consumption of the antenna. Therefore, it is not a good idea to build a fully-digital beamforming system where an individual RF frequency chain is dedicated to each antenna. There is a need to reduce the overall hardware complexity by reducing the total number of RF chains in the mmWave transmission system. A hybrid analog-digital system is the best where an individual RF chain is associated with each sub-array of antennas rather than a single antenna of the array. A wideband precoding using principal component analysis can be used for the system.

As will be more fully described herein below, one manner for overcoming these mmWave issues is through the use of relays/repeaters. Millimeter Waves are sensitive to NLOS situations due to penetration loss caused by blockages. A relay-based mmWave system can fix the propagation range issue as well as quality, and reliability of transmissions. Relays have been proposed for variety of networks including cellular, device-to-device, and indoor applications. There are two types of relays regenerative relays and non-regenerative relays. Conventional relays work in half-duplex (HD) using separate frequencies or time slots. There are 2-way HD amplify-forward (AF) relay-based systems where the transceiver and relay filters are found by solving a sum-mean-square-error (SMSE) optimization problem for mmWave channel. One solution for overcoming the mmWave issues would be to have a combined precoder and relay filter matrices in HD for mmWave transmissions. An alternative solution would be to have a hybrid beamforming for HD relay-based mmWave system with multiple receivers.

Figure 81:
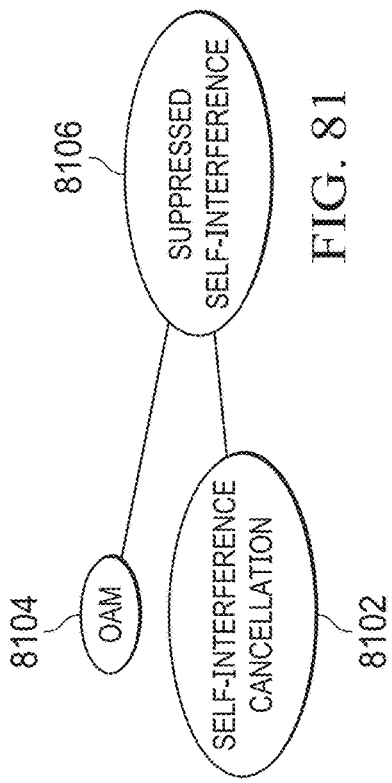
FIG. 81 illustrates combination of self interference cancellation techniques with OAM orthogonality techniques.

With a massive MIMO Full Duplex (FD) relay system, small distance between antenna patches in mmWave system creates higher self-interference within the patch antenna array. Though there have been improvements in FD cancelation techniques, the self-interference cancellation for mmWave does not completely cancel the self-interference and there are left some residue self-interference issues within the signal. Thus, as shown in FIG. 81, the self-interference cancellation techniques 8102 can be combined with the OAM orthogonality techniques 8104 as described above to further suppress the residual self-interference.

Using these techniques, a hybrid digital-analog transceiver and relay filter architecture for an in-band bi-directional relay-based FD with AF for mmWaves can be built. The MIMO techniques described in U.S. Pat. No. 10,757,576, entitled SDR-BASED MASSIVE MIMO WITH V-RAN CLOUD ARCHITECTURE AND SDN-BASED NETWORK SLICING, which is incorporated herein by reference can use imperfect channel state information (CSI) due to estimation error, feedback delays, quantization errors, pilot contamination and perform SVD. This will provide a robust system that is resilient to imperfect channel conditions. The impact of the CSI error is lessened by a proper precoder, receiver, and relay filter matrix Further improvements in relay system in cancellation may be achieved may be achieved using AI-based digital cancellation. With a massive MIMO Full Duplex (FD) relay, small distances between antenna patches in mmWave system creates higher self-interference. Analog cancellation is generally expensive due to the additional analog circuitry and a residual Self-Interference (SI) signal typically still remains at the receiver, which is then canceled in the digital domain. This requires modeling the non-linear effects of the different stages of the transceiver, such as digital-to-analog converter (DAC) and ADC non-linearities, IQ imbalance, phase-noise, and power amplifier (PA) non-linearities. Traditionally, this has been done using polynomial models, which have been shown to work well in practice. However, the polynomial models have a high implementation complexity as the number of estimated parameters grows rapidly with the maximum considered nonlinearity order. As an alternative to polynomial models, neural networks (NNs) or AI-based techniques can be used for SI cancellation where NNs can achieve similar SI cancellation performance with a polynomial model with significantly lower computational complexity. The AI techniques described herein above may be used for this process.

For an OFDM system, the self-interference signal received by receive path antennas on subcarrier(s) is:

$I$ = total # of $Tx$ patches $Tx$ antenna $i$ patches $J$ = total # of $Rx$ patches $Rx$ antenna $j$ patches $$y_j(s) = \sum_{i=1}^{I} h_{ij}(s)x_i(s)$$

$$z_j(s) = -h_j(s)\sum_{i=1}^{I} a_{ij}(s)x_i(s)$$

After analog cancellation, the self-interference at antenna j is:

$$y_j^{AC}(s) = y_j(s) - z_j(s) = \sum_{i=1}^{I} [h_{ij}(s) - h_j(s)a_{ij}(s)]x_i(s)$$

Perfect cancellation occurs when:

$$a_{ij}(s) = \frac{h_{ij}(s)}{h_j(s)} \approx \frac{\hat{h}_{ij}(s)}{\hat{h}_j(s)}$$

Figure 82:
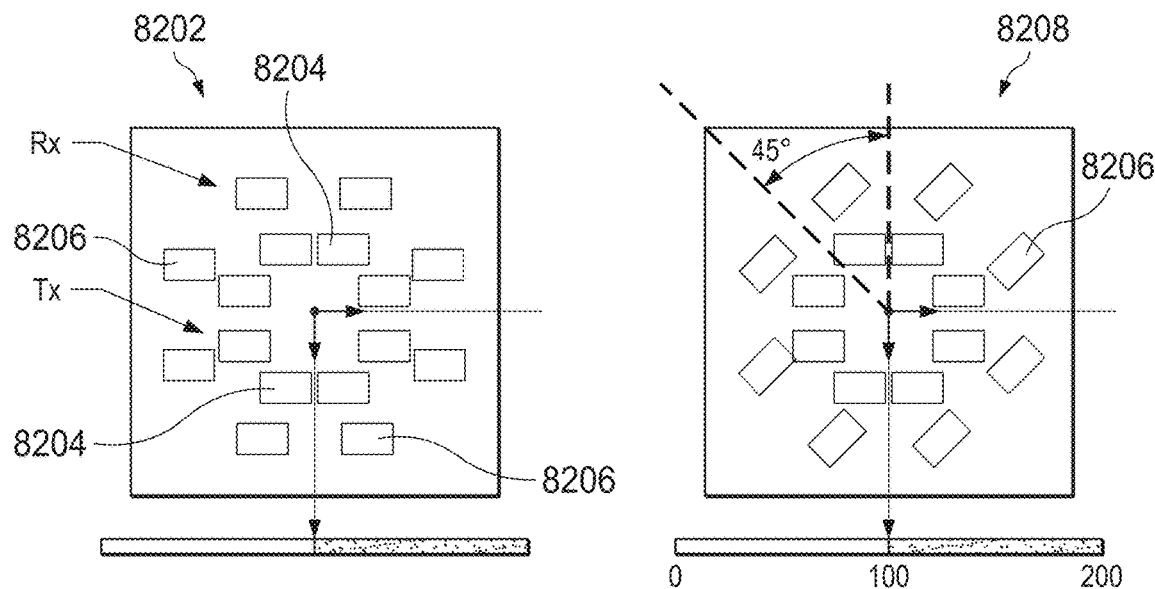
FIG. 82 illustrates a first manner for improving isolation using orthogonal Gaussian modes.
Figure 83:
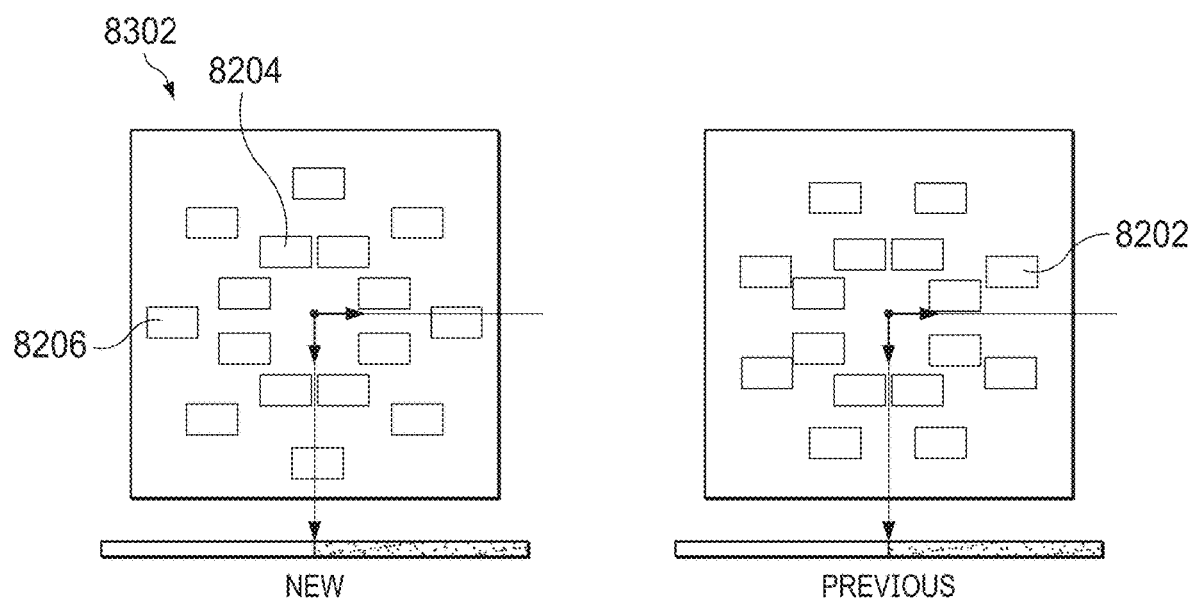
FIG. 83 illustrates a second matter for improving isolation using orthogonal Gaussian modes.

Referring now to FIGS. 82 and 83 there are illustrated manners for improving isolation using orthogonal Laguerre Gaussian (LG) modes. Previous array configurations 8202 provide a circular configuration of patch antennas in two concentric circles. The inner circular array comprises patch antennas 8204 that are used for transmitting signals. The outer circular array comprises patch antennas 8206 that are used for receiving signals. The inner transmission array has a radius of 32 mm and the outer reception array has a radius of 60 mm. FIGS. 82 and 83 illustrate different configurations with respect to rotation, orientation and offset of the arrays. In each case, the difference in the received voltage is determined due to modes of the arrays.

With respect to FIG. 82, there is illustrated the rotation of the receiver circular array at 8208. Within the array 8208, the outer circular receiver array comprised of patch antennas 8206 are rotated 45° about the Z axis (the axis coming directly out perpendicular to the figure) with respect to the inner circular patch antenna array consisting of patch antennas 8204. While FIG. 82 illustrates rotation of the outer receive array by 45°, other rotation angles such as 0°, 90°, etc. may also be utilized.

Referring now to FIG. 83, the orientation of the receiver array comprised of the circular array of patch antennas 8206 may also be changed in order to provide improved signal isolation between the transmit and receiver arrays. In the example illustrated generally at 8302, as compared with 8202, the receiver patch antennas 8206 are arranged differently while maintaining the radius and spacing the same as in the patch antenna array 8202. The array is then rotated as before. Thus, rather than having a pair of patch antennas 8206 at the top of the array as illustrated at 8202 only a single patch antenna 8206 is located at the top of the orientation illustrated at 8302.

Figures 84, 85:
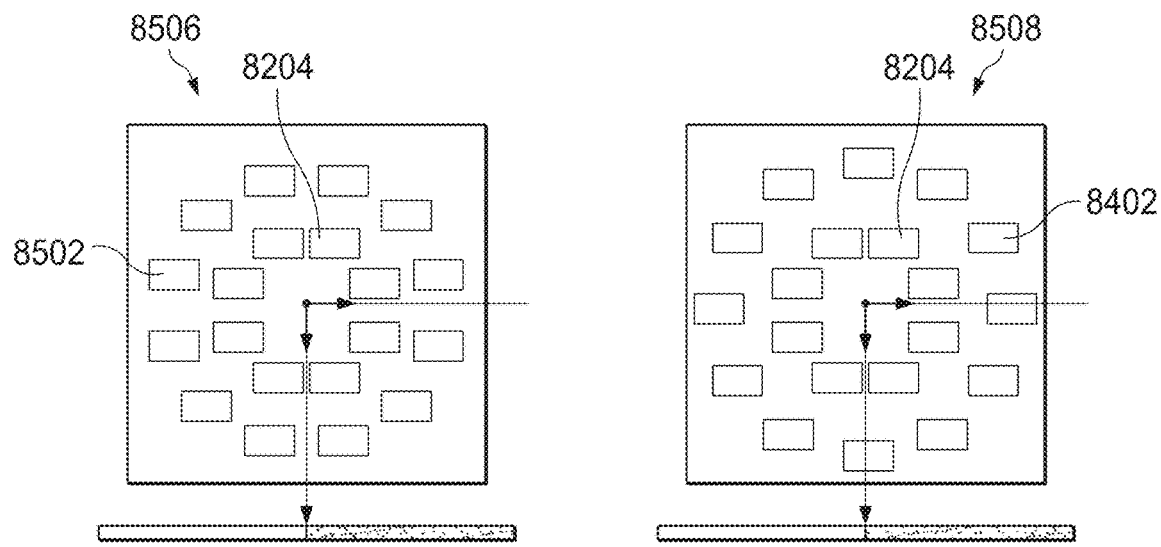
FIG. 84 illustrates a table of effects caused by rotation of a circular receiver array within a patch antenna.
FIG. 85 illustrates a patch antenna array having a 12 patch antenna circular receiver antenna array.

Referring now to FIG. 84, there is illustrated a table of various effects of rotating the circular receiver array as shown in FIG. 82 at various angles from 0° to 90° for two different orientations of the outer receiver circular array of patch antennas. As can be seen, the received voltage for OAM values of +1 and −1 changes to varying degrees based upon the rotation.

Figures 86, 87:
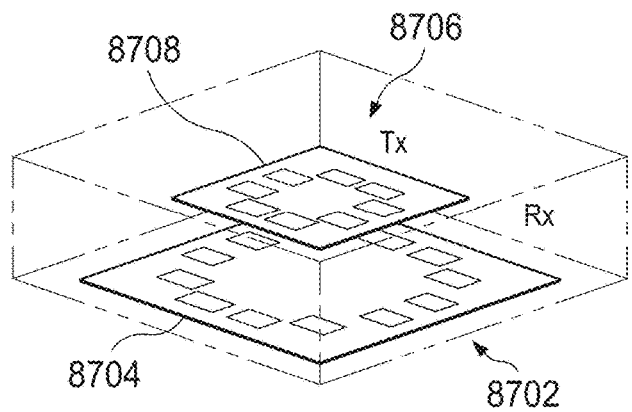
FIG. 86 illustrates a table of effects caused by rotation of a circular receiver of Ray including 12 patch antennas.
FIG. 87 illustrates vertically separated transmitter arrays and receiver arrays.
Figure 89:
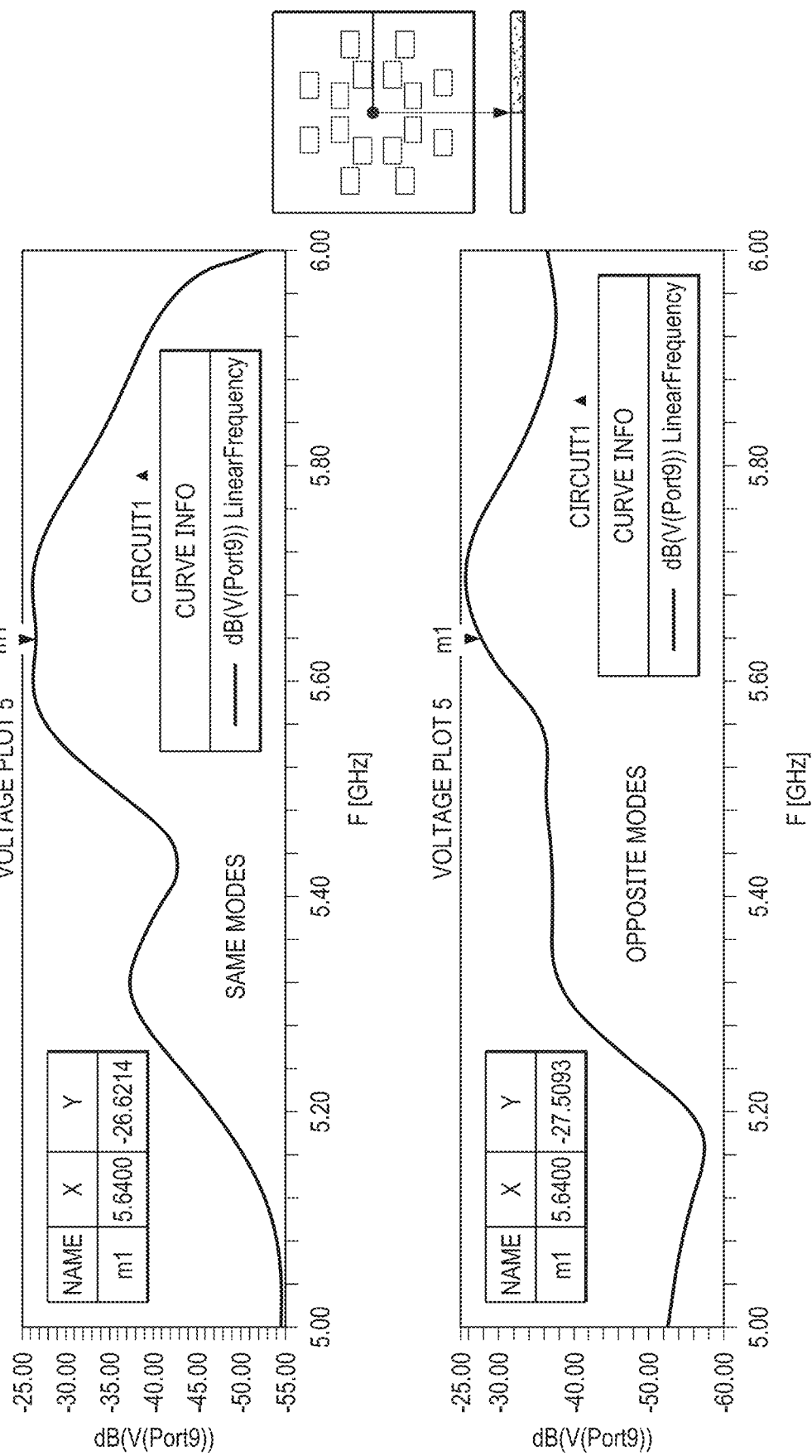
Figure 91:
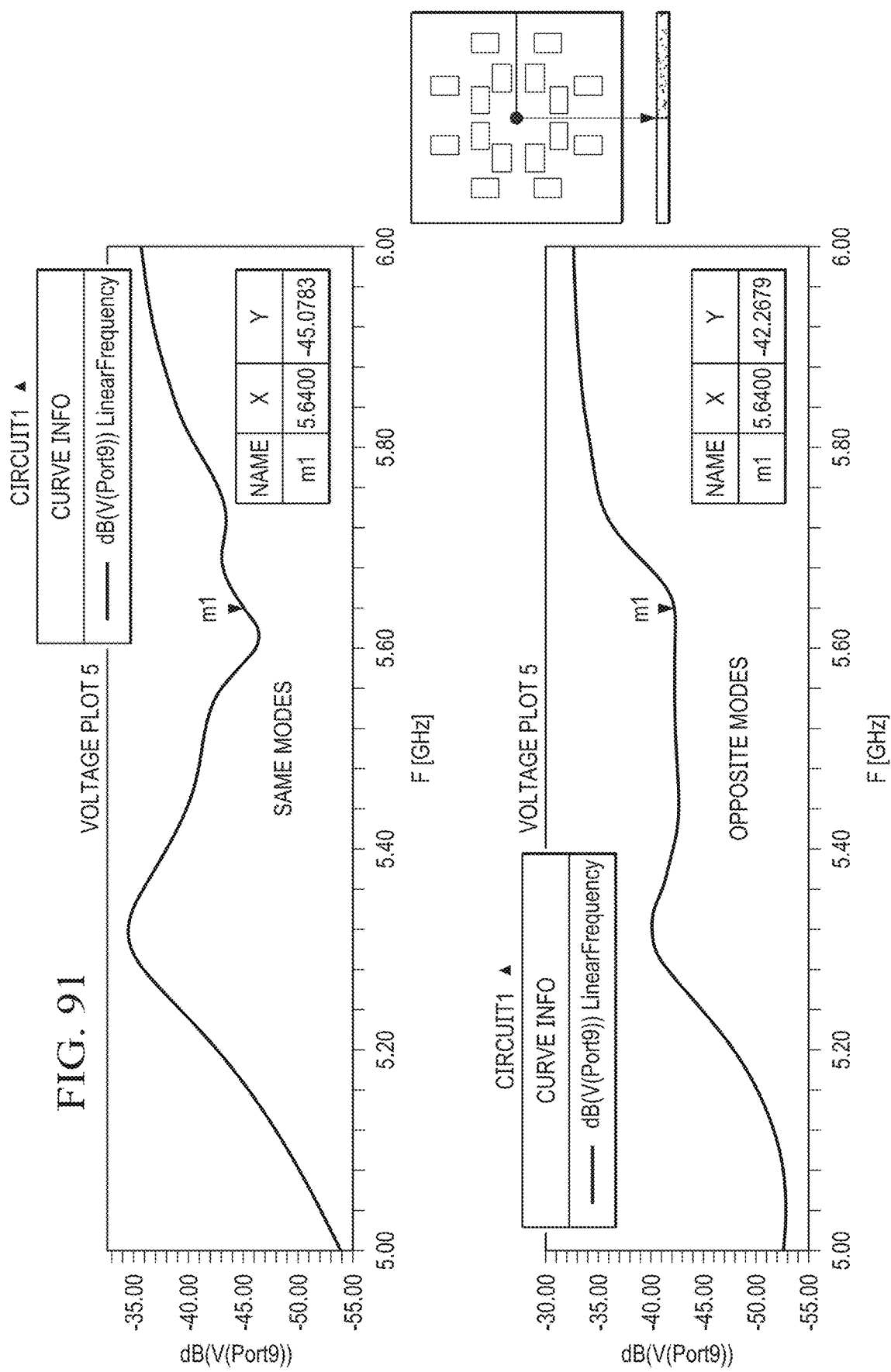

Referring now to FIG. 85, there is illustrated a further embodiment wherein the circular receiver array utilizes 12 patch antennas 8502 rather than the 8 patch antennas previously illustrated while keeping the same radius for the circular receive antenna array. Illustration 8506 illustrates the antenna with the circular receiver array rotated 0°, and illustration 8508 illustrates the circular antenna array rotated at 45°. It will be appreciated that rotation at any number of degrees and location of the antennas in various orientations in a similar manner to that previously discussed with respect to FIGS. 82 and 83 may be utilized. Referring now to FIG. 86, there is illustrated a table of various effects of rotating the circular receiver array including 12 patch antennas as shown in FIG. 85 at various angles from 0° to 90° for two different orientations of the outer receiver circular array of 12 patch antennas. As can be seen, the received voltage changes for OAM values of +1 and −1 to varying degrees based upon the rotation.

Referring now to FIG. 87, there is illustrated a further embodiment wherein the circular receiver array is placed on a separate substrate 8704 that is vertically separated from the circular transmission array 8706 located on a second substrate 8708. Each of the transmitter substrate 8708 and the receiver substrate 8704 include a number of patch antennas thereon. The transmitter substrate 8708 and the receiver substrate 8704 are separated at distances varying from 0 mm to 50 mm. FIG. 88 illustrates a chart of the received voltage for OAM values of +1 and −1 with respect to the circular receiver array, and the circular transmission array being separated by 0 mm (concentric) and at separation distances of 10, 20, 30, 40 and 50 mm. The table also illustrates the received voltage for OAM values of +1 and −1 when the transmit and receive arrays are separated by 10 mm and the receiver array has 900 of rotation.

FIGS. 89-106 illustrate voltage plots for various configurations of the circular transmitter array and the circular receiver array having different rotations, orientations, vertical separations and numbers of receiver array patch antennas. Each figure provides an illustration of the particular implementation of the combined circular transmitter array and circular receiver array along with a first voltage plot illustrating the voltage for the same OAM modes, and a second voltage plot indicating the voltage for opposite OAM modes. FIGS. 89-100 illustrate various orientations rotations and numbers of antennas wherein the circular transmitter array in the circular receiver array are concentric with the circular transmitter array located within the circular receiver array. FIGS. 101-105 illustrate voltage plots for configurations of circular transmitter arrays and circular receiver arrays separated by distances of 10 mm (FIG. 101), 30 mm (FIG. 102), 40 mm (FIG. 103), 50 mm (FIG. 104), 20 mm (FIG. 105). Finally, FIG. 106 illustrates plots with respect to the circular transmitter array and circular receiver array being separated by 10 mm and the circular receiver array having a 90° rotation.

A link budget involves an accounting of all of the power gains and losses that a communication signal experiences in a telecommunication link from point to point as passing from a transmitter, through a medium (free space, cable, waveguide, fiber, etc.) to the receiver. The link budget is defined by an equation giving the received power from the transmitter power, after the attenuation of the transmitted signal due to propagation, as well as the antenna gains and feedline and other losses, and amplification of the signal in the receiver or any repeaters it passes through. A link budget is a design aid, calculated during the design of a communication system to determine the received power, to ensure that the information is received intelligibly with an adequate signal-to-noise ratio. Randomly varying channel gains such as fading are taken into account by adding some margin depending on the anticipated severity of its effects. The amount of margin required can be reduced by the use of mitigating techniques such as antenna diversity or frequency hopping. A simple link budget equation looks involves:

Received power (dB) = transmitted power (dB) + gains (dB) − losses (dB)

Figure 107:
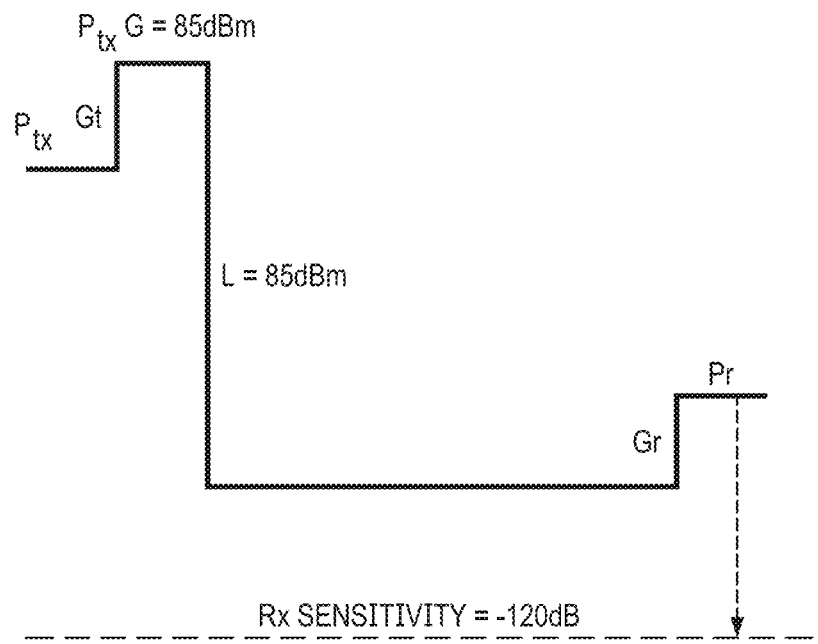
FIG. 107 illustrates a for transmitting and receiving system.

Referring now to FIG. 107 there is illustrated a link budget for a transmitting and receiving system. The transmission power $P_{tx}$ is multiplied by the transmission gain Gt to provide the total gain of the transmitted signal of 85 dBm. The signal will experience a gain loss L of 85 dBm in transmission. The received signal has a gain boost ($G_r$) applied at the receiver to provide the received power ($P_r$). The received power $P_r$ must be above the receiver sensitivity level of −120 dB.

At 1 km the $Pt+L=-85$ dBm (from graph)

$Gr$=Gain of dish=30 dB

The receiver sensitivity must be greater than the total power of the transmission from the receiver minus the transmission losses and the gain of the receiver as shown by:

$P_{tx}G-L+Gr>Rx$ Sensitivity $-85+30=-55$ dBm$>-120$ dBm

Figure 108:
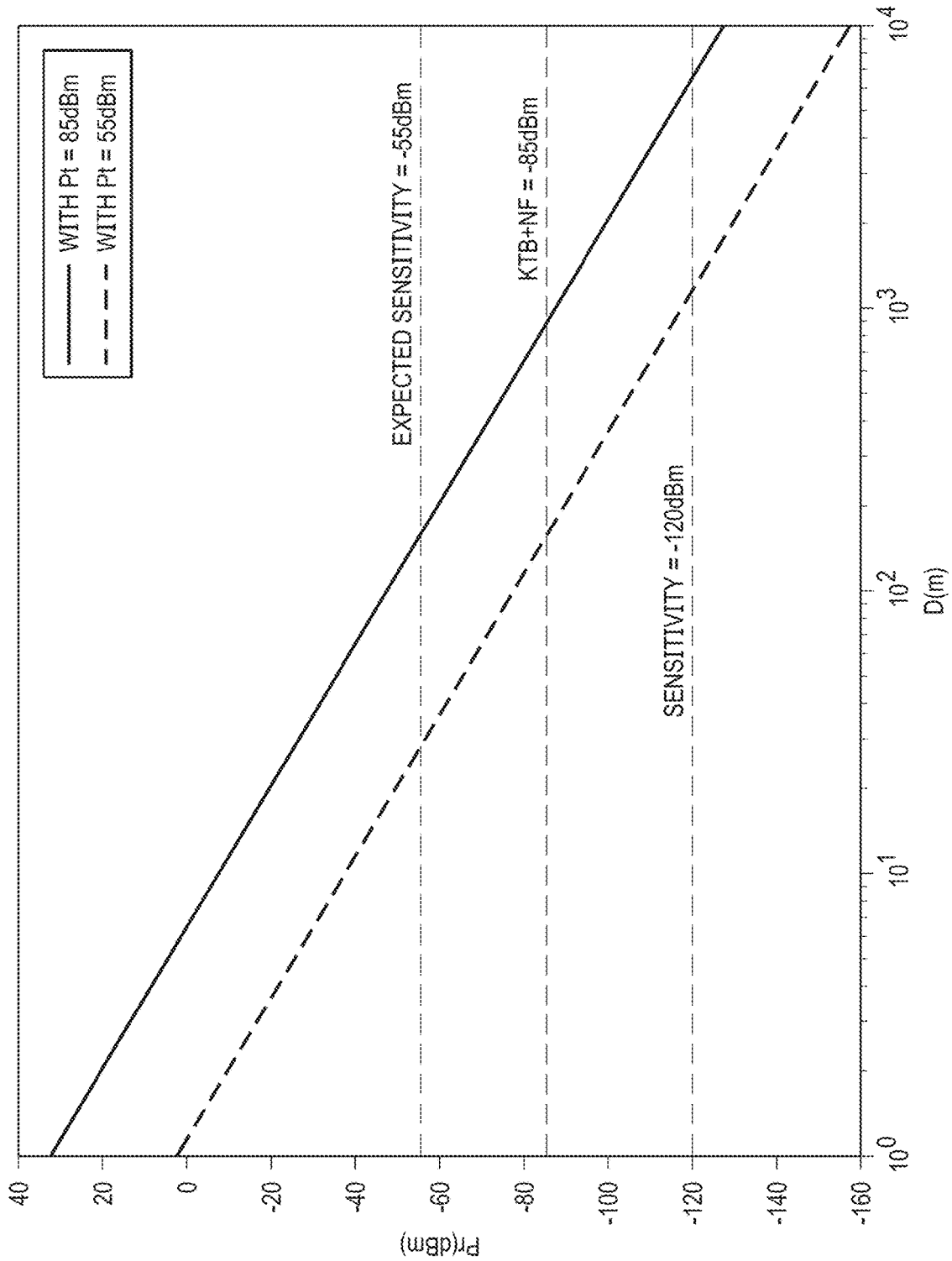
FIG. 108 illustrates various transmission towers for antenna.

Thus, the receiver must have a sensitivity of at least −120 dBm to detect the received signals. Examples of various transmission powers are shown in FIG. 108.

Figure 109:
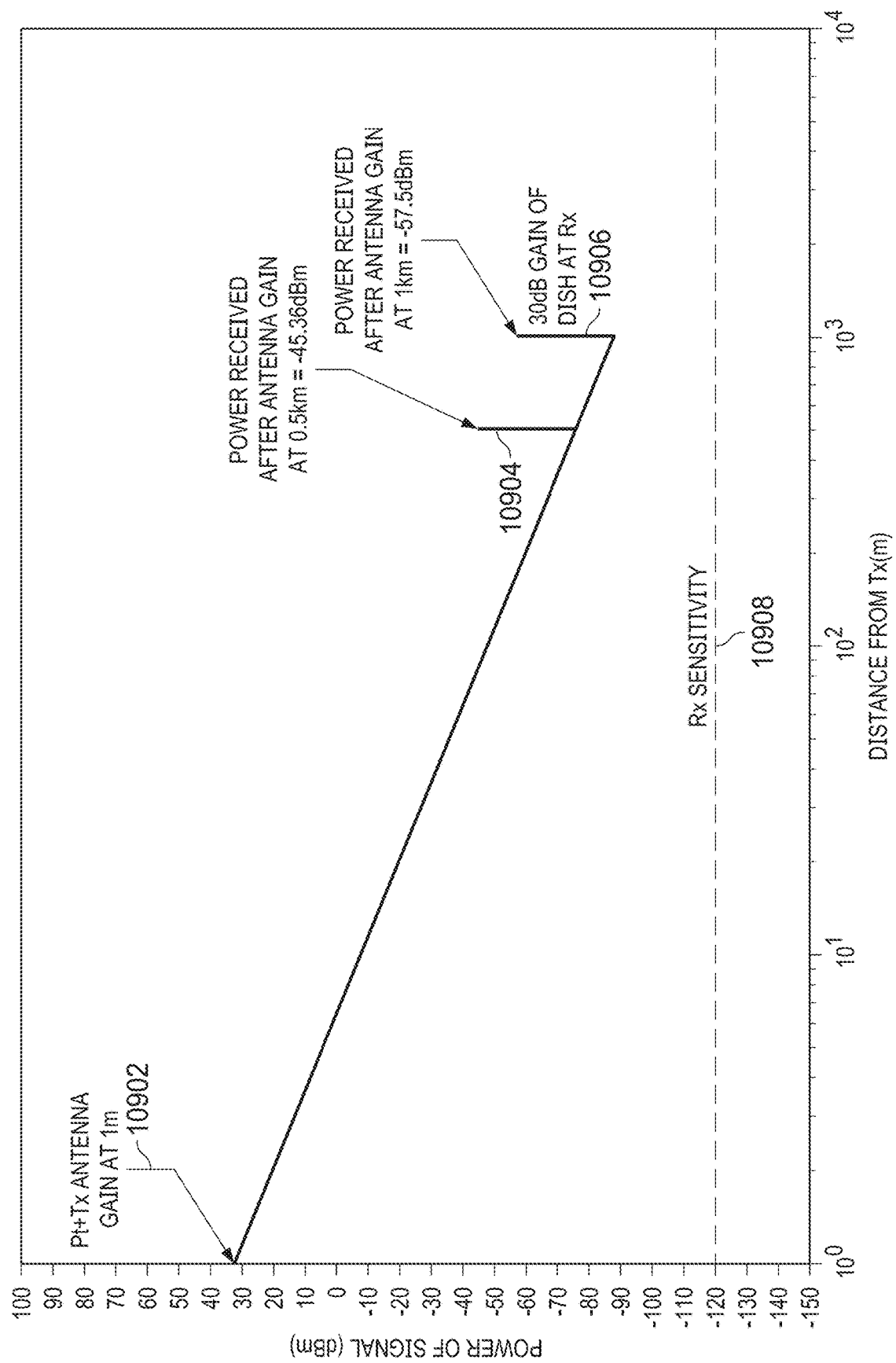
FIG. 109 illustrates a link budget plot for a patch antenna array.

The link budget equation can be further defined as follows. Transmission equation for non-zero mode orders $$\frac{P_r}{P_t}(l) = G_{t_{eq}}(l)G_{r_{eq}}(l)\frac{1}{L_{FS_{eq}}(l)}.$$

where $G_{teq}$ and $G_{req}$ are the equivalent antenna gains for the receiver and transmitter, and $L_{FSeq}$ is the equivalent free space loss.
With values substituted $$\frac{P_r}{P_t}(l) = \frac{Ng_t}{|l|!}\left(\frac{4\pi(\pi R_t^2)}{\lambda^2}\right)^{|l|}\frac{Ng_r}{|l|!}\left(\frac{4\pi(\pi R_r^2)}{\lambda^2}\right)^{|l|}\left(\frac{\lambda}{4\pi D}\right)^{2|l|+2}$$

where N is the number of array elements
$g_t$, $g_r$=gain of antennas
$R_t$, $R_r$ are the array radii
l is the mode order
$\lambda$ is the wavelength
D is the distance between the antennas FIG. 109 illustrates a link budget plot in accordance with these equations. The antenna gain Pt+Tx at 1 m from the antenna is indicated at 10902. The power received after the antenna gain at 0.5 km is indicated at 10904. The power received after the antenna gain at 1 km is indicated at 10906. The receiver sensitivity is indicated generally at 10908.

Figure 110:
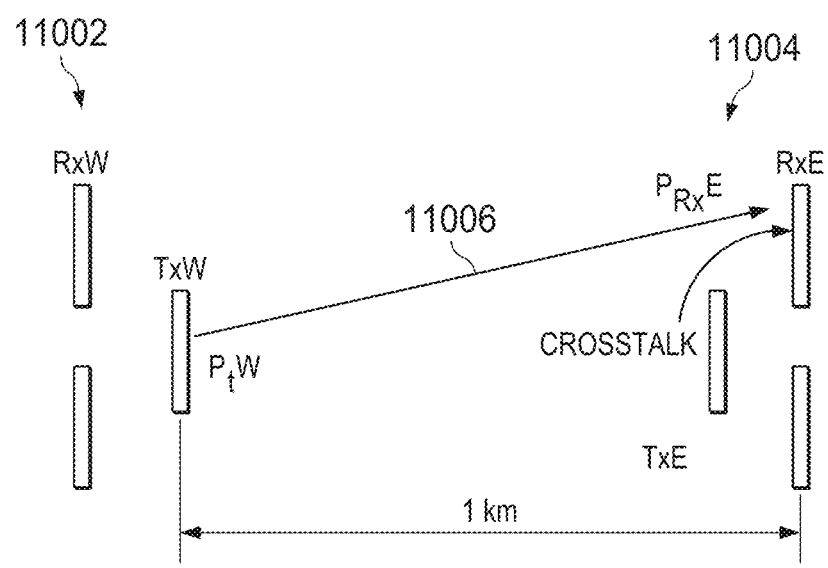
FIG. 110 a transmitting and receiving patch antenna arrays.

A further necessary consideration of the repeater system is the crosstalk efficiency. Crosstalk is a phenomenon by which a signal transmitted on one channel of a transmission system creates an undesired effect in another channel or in the current system between transmit and receive antennas. Crosstalk is usually caused by undesired capacitive, inductive, or conductive coupling from one channel to another. Crosstalk efficiency relates to the amount of crosstalk occurring between channels. Referring now to FIG. 110, there is illustrated two patch antenna arrays 11002 and 11004 consisting of receiver portions Rx and transmitter portions Tx. The arrays 11002 and 11004 are 1 km apart. Transmissions 11006 occur from a transmitter TxW to a receiver RxE and have a power of PrxE. Crosstalk may occur between the transmission antenna TxE and the reception antenna RxE or between any other transmitting and receiving patch antenna.

As shown in FIG. 88 with respect to the results of HPSS, the crosstalk efficiency is equal to the ΔRxV(dB) of the 10 mm separation with 90° of rotation of the receiver array. This provides a crosstalk efficiency of 29.1 dB. Crosstalk power is determined according to:

$$P_{crosstalk} = (P_t)\eta_{cross}\eta_{dsp} = (P_t)10^{-3}10^{-9}$$

Here $\eta_{cross}$ is the efficiency of crosstalk
This is an efficiency of (29.1 dB) as obtained from HFSS simulation.
$\eta_{dsp}$ is the coding improvement of signal processing
Pt is the power transmitted=55 dBm (Tx antenna gain (30 dB) not relevant)

$$P_{crosstalk} = (P_t)\eta_{cross}\eta_{dsp} = 55 - 29.1 - 90 = -64.1 dB$$

Figure 111:
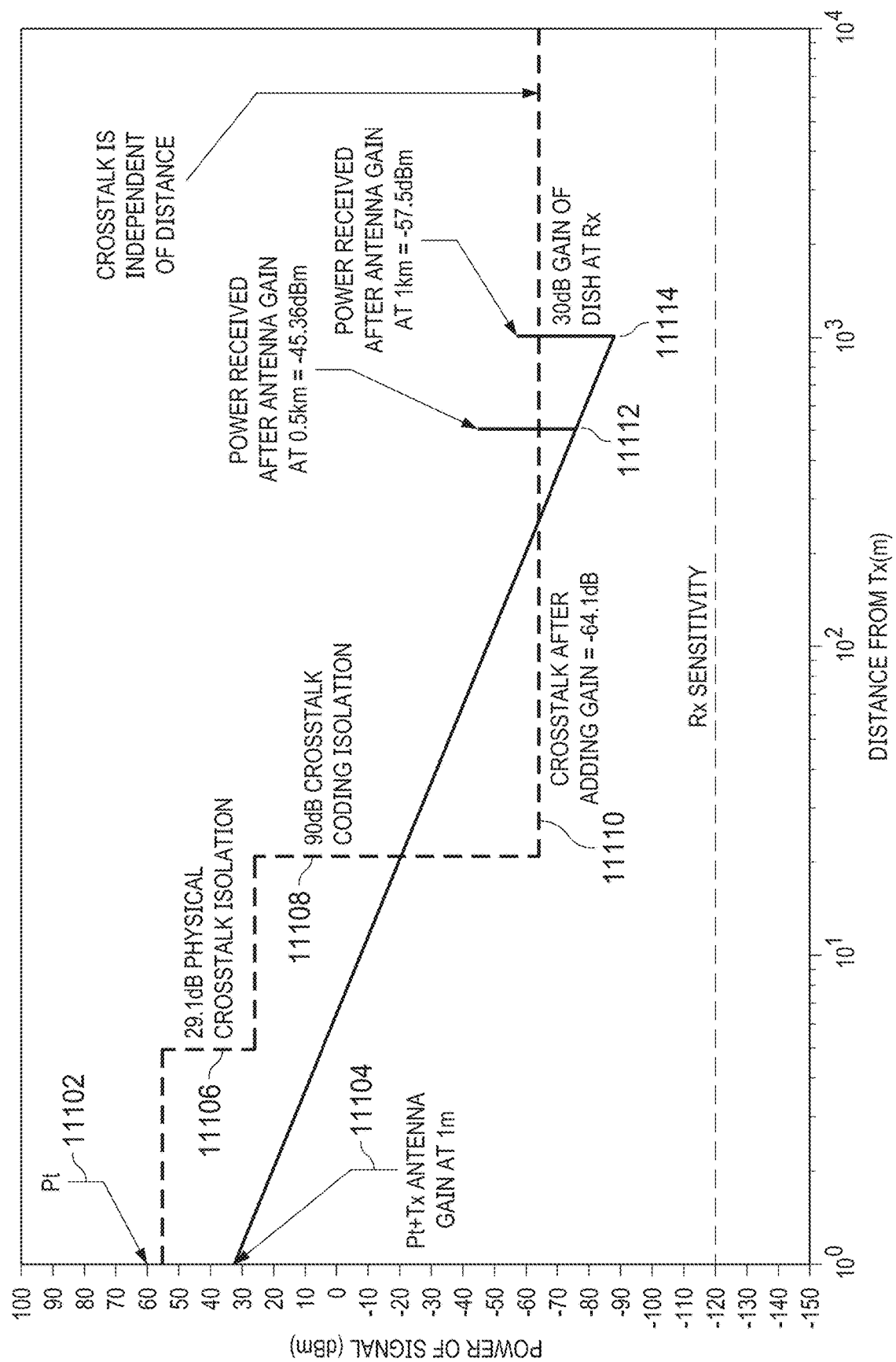
FIG. 111 illustrates a link budget for transmitting signals in cross issues for a transmitting and receiving array.

FIG. 111 illustrates a link budget for transmitted signals and crosstalk issues according to conservative estimates. Pt 11102 indicates the signal transmission power. Pt+Tx 11104 indicates the antenna gain at 1 m. There is 29.1 dB of physical crosstalk isolation 11106 between the transmitter and receiver. There is 90 dB of crosstalk coding isolation 11108. The crosstalk after adding in the gain equals −64.1 dB 11110. The crosstalk remains constant and is independent of distance between the transmitter and receiver. The power at the receiving antenna after antenna gain at 0.5 km is −45.360 dBm 11112. The power at the receiving antenna after gain at 1 km is −57.5 dBm 11114. The receiver sensitivity remains at approximately −120 dBm.

The current margins between the crosstalk power and the received power are illustrated generally in the table below. The table illustrates various sensitivities at 0.5 km and 1 km. For each of these distances the launch power (dBm), Rx sensitivity (dBm), crosstalk power (dBm), power received (dBm) and margin (dB) are disclosed.

| Distance from Tx (km) | 0.5 | 1 |
| --- | --- | --- |
| Launch power (dBm) | 85 | 85 |
| Rx sensitivity (dBm) | −120 | −120 |
| Crosstalk power (dBm) | −64.1 | −64.1 |
| Power Received (dBm) | −45.36 | −57.5 |
| Margin (dB) | 18.74 | 6.6 |

Figure 112:
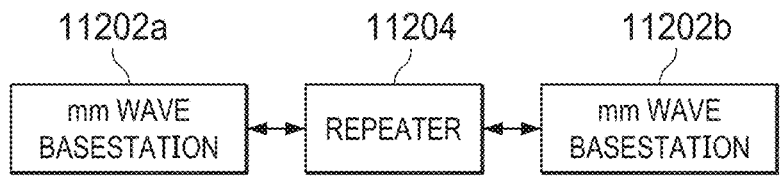
FIG. 112 illustrates a block diagram of a system for transmitting millimeter wave signals.

A referring now to FIG. 112, there is illustrated a block diagram of the manner for transmitting millimeter wave signals between mmWave base stations 11202 using a repeater 11204 implemented according to the embodiments described hereinabove. A first mmWave base station 11202a transmit signals between the base station and a repeater 11204. The transmitted signals may then be forwarded from the repeater 11204 to a second mmWave station base station 11202b. The millimeterwave repeater 11204 is compatible with existing millimeterwave radios utilized by the base stations 11202. They repeater 11202 utilizes the same frequency bands, the same normal channel plan and the same modulations from low to high QAM (quadrature amplitude modulation).

Figure 113:
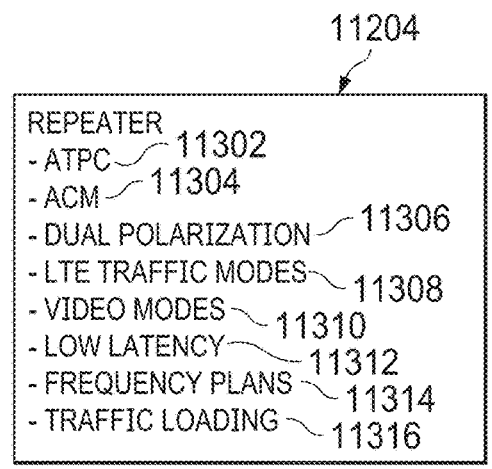
FIG. 113 illustrates various functionalities associated with a repeater/relay.

Referring also to FIG. 113, the repeater 11204 supports different modes and functions available in existing millimeterwave radio technologies. These include automatic transmit power control (ATPC) 11302, adaptive coding and modulation (ACM) 11304, dual polarization (XPIC) 11306, LTE traffic modes 11308 (data and VOLTE), video modes 11310 (digital, SD, HD, UHD, 4K), low latency 11312, frequency plans 11314 and traffic loading 11316. Automatic Transmit Power Control (ATPC) automatically increases the transmit power during "fade" conditions such as heavy rainfall or other conditions diminishing signal transmission characteristics. ATPC can be used separately from ACM or together to maximize link uptime, stability and availability. When the "fade" conditions are over, the ATPC system reduces the transmit power again. This reduces the stress on the system power amplifiers and reduces overall power consumption, heat generation and increases expected lifetime. ACM involves the matching of modulation, coding and other signal and protocol parameters to the conditions on the radio link. These conditions may include things such as path loss, interference due to signals coming from other transmitters, the sensitivity of the receiver, the available transmitter power margin, etc. XPIC, or cross-polarization interference cancelling technology, is an algorithm to suppress mutual interference between two received streams in a polarization-division multiplexing communication system.

Figure 114:
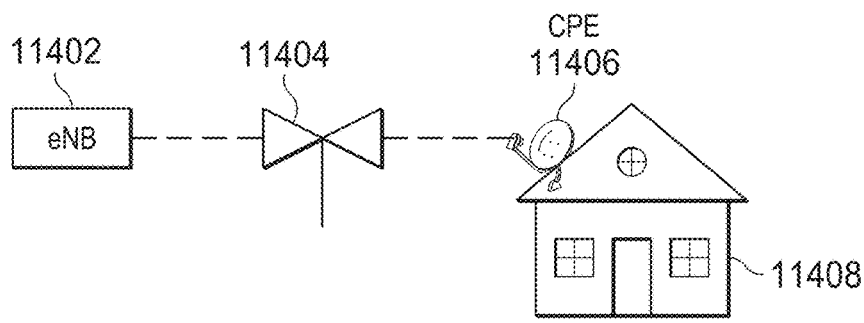
FIG. 114 illustrates a single relay system.
Figure 115:
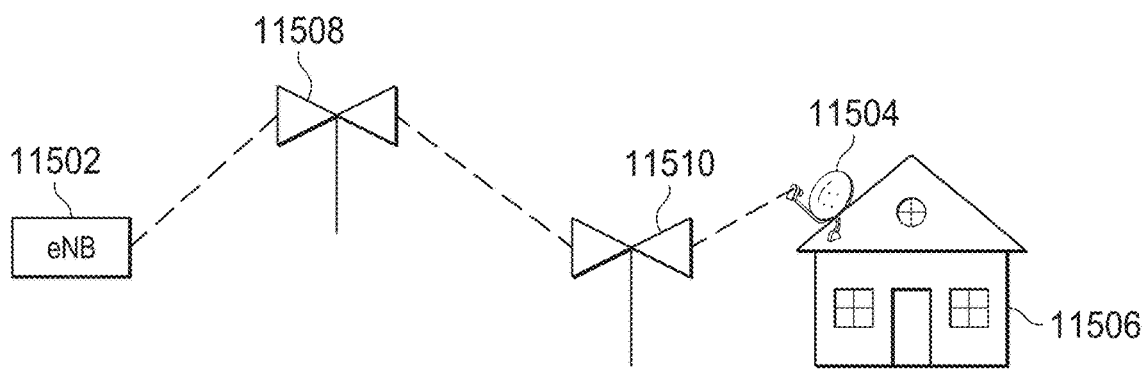
FIG. 115 illustrates a tandem relay configuration.

The millimeterwave repeater 11204 may be implemented in a variety of different configurations as shown in FIGS. 114-119. FIG. 114 illustrates a single relay system wherein an enodeB 11402 transmits signals between a repeater antenna 11404 that forwards signals on to a CPE (customer provided equipment) receiver 11406 at a home or business location 11408. FIG. 115 illustrates a tandem configuration where in signals are relayed from an enodeB 11502 to customer provided equipment 11504 at a home or business 11506 through a pair of repeaters 11508 and 11510. The enodeB 11502 transmit signals to a first repeater 11508 which forwards the signal to a second repeater 11510 that first repeater is operating in tandem with on the communications link. The second repeater 11510 transmits signals to the CPE receiver 11504 at the customer home or business 11506.

Figure 116:
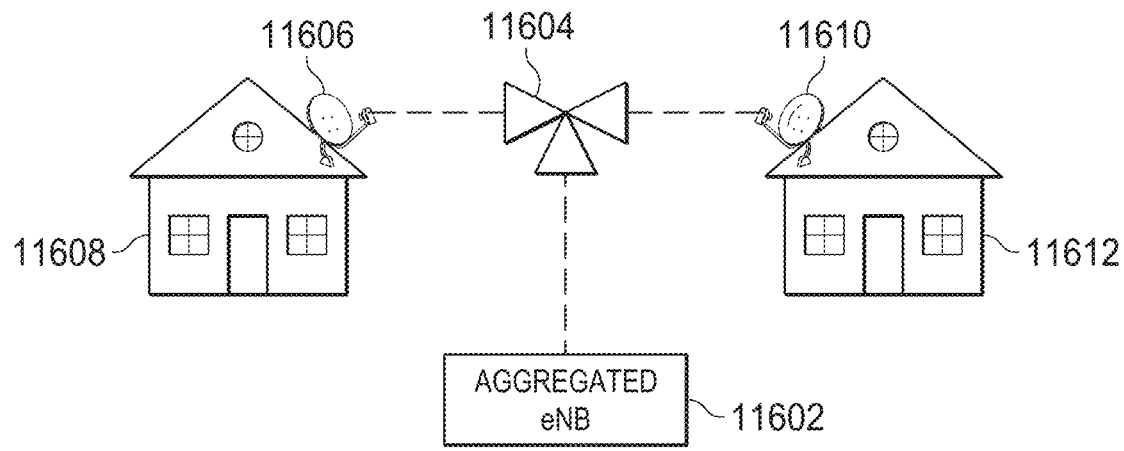
FIG. 116 illustrates a wide junction relay configuration.
Figure 117:
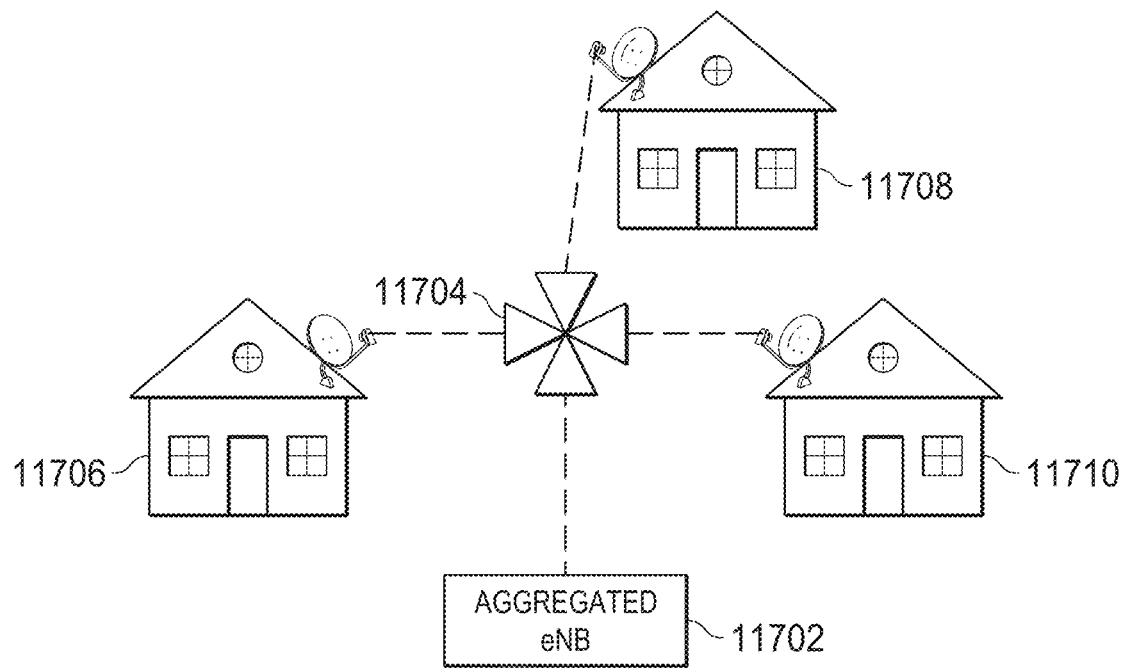
FIG. 117 illustrates an H junction relay configuration.
Figure 118:
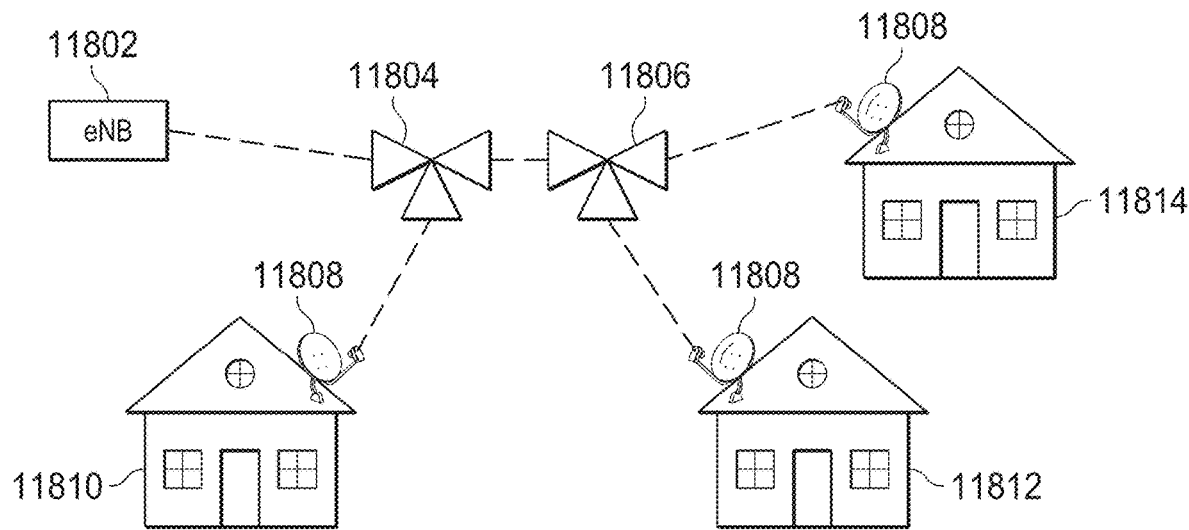
FIG. 118 illustrates a tandem wide junction relay configuration.

FIG. 116 illustrates a Y junction configuration. The aggregated enodeB 11602 transmits signals to a repeater 11604 which transmits the signals onward further in multiple directions. The first signals are transmitted from the repeater 11604 to CPE receiver 11606 at a user home or business 11608. A second signal is transmitted to a second CPE receiver 11610 at a second user home or business 11612. While FIG. 116 illustrates transmitting signals in two directions from the aggregated enodeB 11602 to the repeater 11604 signals may be transmitted in multiple directions as long as the multiple directionality distinction between the multiple transmitted signals may be maintained. One example of this is illustrated in FIG. 117 which illustrates an H junction configuration. In this embodiment, the aggregated enodeB 11702 transmits a signal to a repeater 11704 which transmits signals outward therefrom in three different directions. Signals are transmitted to a CPE receiver at a first home or business 11706, a second home or business 11708 and a third home or business 11710. FIG. 118 illustrates a tandem Y junction configuration. The enodeB 11802 transmit signals to a first repeater 11804. Repeater 11804 transmit the signal in a first direction to a second repeater 116 and to a CPE receiver 11808 associate with a customer home or business 11810. The signal received at the second repeater 11806 is further transmitted in two directions to the first and second CPE receivers 11808 associated with first and second customer home or business 11812 and 11814, respectively.

Figure 119:
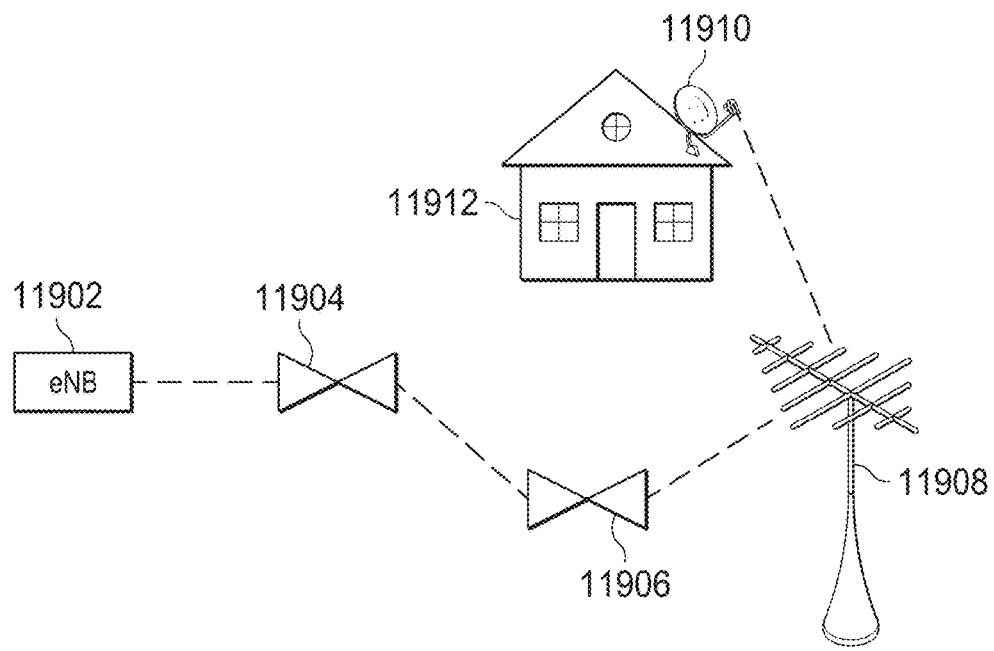
FIG. 119 illustrates a configuration of tandem repeaters and a passive reflector.

FIG. 119 illustrates the configuration using tandem repeaters and a passive reflector. The enodeB 11902 transmit signals to the first repeater 11904 for the signal to a second transmitter 11906. The second repeater 11906 transmit the signal to a passive reflector 11908 which reflects the signal toward a CPE receiver 11910 at a customer home or business 11912. Applicant notes that the above comments with respect to transmitting to or from a particular enodeB, repeater or CPE receiver involves bidirectional transmissions to and from the associated enodeB, repeater or CPE receiver. Transmissions do not only occur in a single direction but involve both transmissions and receptions.

Figure 120:
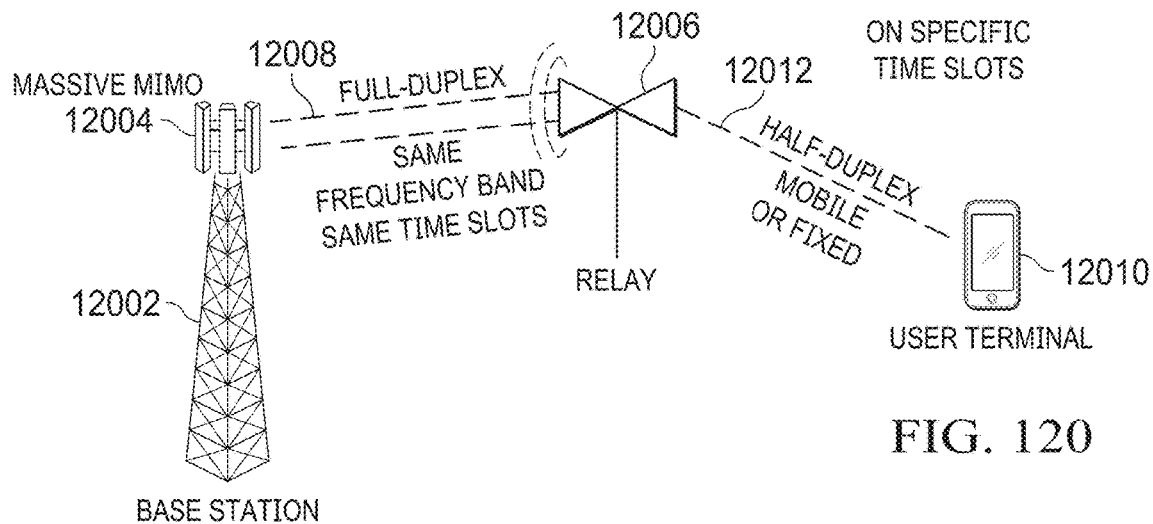
FIG. 120 illustrates the full duplex and half duplex communications used within a Peter system.

Referring now to FIG. 120, a base station 12002 utilizing a massive MIMO antenna configuration 11204 as described hereinabove transmits signals between a relay/repeater 12006 using a link 12008 utilizing full duplex communications. Full-duplex communications utilize the same frequency band and same time slots in the bidirectional communications between the relay/repeater 12006 and the base station 12002. For communications between the relay/repeater 12006 and a user terminal 12010, the communications link 12012 utilizes half duplex communications on specific timeslots.

Figure 121:
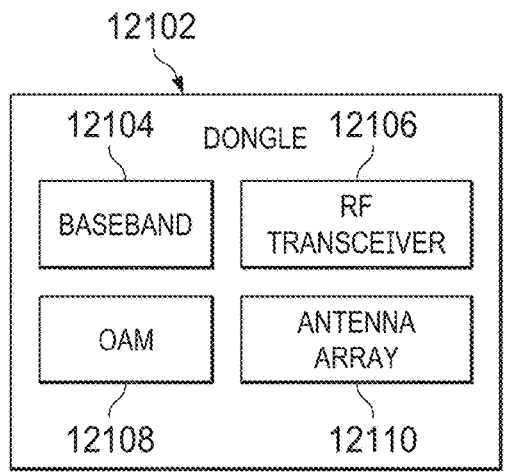
FIG. 121 illustrates a block diagram of a transceiver dongle implementing the millimeter wave repeater/relay.

FIG. 121 illustrates the implementation of a millimeter wave relay/repeater within a transceiver dongle. The transceiver dongle 12102 will connect to a USB port of a processing device using a USB interface 12101. Signals are received and transmitted using an RF transceiver 12106 as described herein. The signals can be converted between RF and baseband using Baseband Processing Circuitry 12104 as described herein. Signal interference and bandwidth issues may be further overcome using OAM processing circuitry 12108 that implements the various OAM processing techniques that are described herein above. The signals are transmitted from and received at the dongle 12102 using an antenna array 12110 that implemented any of the various configurations described herein. OAM 12204 may be applied to the millimeter wave signals to improve signal bandwidth and interference issues. MIMO 12206 transmission techniques may be used to improve the transmission and reception characteristics of the millimeter wave signals. Artificial intelligence based digital cancellation techniques 12200 are used for limiting interference between transmitted and received signals within the repeater/relay 12202 and self-interference caused by small distances between antenna patches in mmWave system. Finally, full duplex channel estimation 12210 is used for controlling self-interference caused by small distances between antenna patches in mmWave system.

Figure 122:
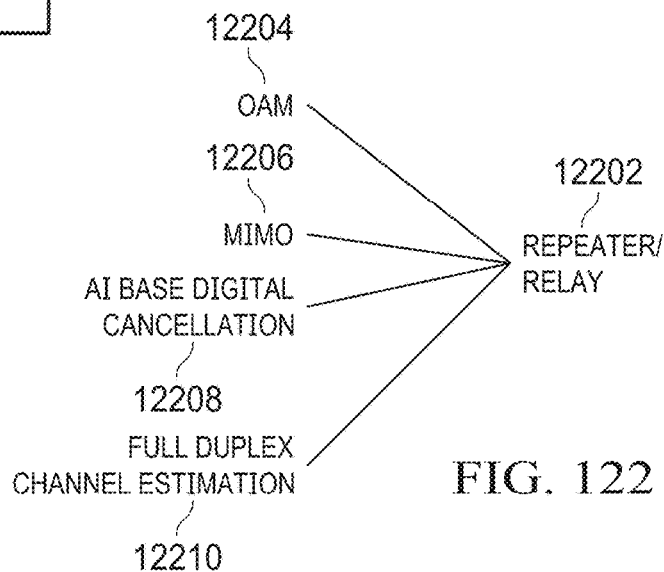
FIG. 122 illustrates the various functionalities implemented within the millimeter/wave repeater/relay.

Referring now to FIG. 122, there are illustrated the various functionalities and techniques implemented within a repeater/relay 12202 implemented according to the present disclosure.

Thus, using the repeater/relay configurations discussed above utilizing the describe manner for wireless signal communications described, and improve manner for transmitting the signals and more particularly millimeter wave signals may be provided.

It will be appreciated by those skilled in the art having the benefit of this disclosure that this hyper digital-analog mmwave repeater/relay with full duplex system provides a unimproved matter for forwarding millimeter wave signals from one point to another within a wireless communication system. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A repeater for transmitting millimeter wave signals, comprising:
   a transceiver for communicating with a plurality of remote locations over millimeter wave communications links, wherein the of transceiver further comprises:
      a patch antenna array including a plurality of patch antennas, the plurality of patch antennas including a transmitter array portion in a first orientation for transmitting signals and a receiver array portion in a second orientation for receiving signals, wherein the first and second orientations limit interference between the transmitted signals and the received signals;
      transceiver circuitry for transmitting the millimeter wave signals with the plurality of remote locations; and
   wherein the transceiver relays the millimeter wave signals between at least a first millimeter wave transceiver at a first one of the plurality of remote locations and a second millimeter wave transceiver at a second one of the plurality of remote locations.

2. The repeater of claim 1, wherein the transceiver circuitry transmits to the first one of the plurality of remote locations using full duplex communications and transmits to the second one of the plurality of remote locations using half duplex communications.

3. The repeater of claim 1, wherein the transceiver circuitry further comprises orbital angular momentum processing (OAM) processing circuitry for applying a selected orbital angular momentum to the transmitted signals being transmitted by the transceiver circuitry, wherein the selected orbital angular momentum prevents interference between the transmitted signals and the received signals.

4. The repeater of claim 1, wherein the transceiver circuitry further uses artificial intelligence cancellation techniques to limit interference between the transmitted signals and the received signals.

5. The repeater of claim 1, wherein the transceiver circuitry further uses full duplex channel estimation for controlling self-interference between the plurality of patch antennas.

6. The repeater of claim 1, wherein the transceiver relays the millimeter wave signals between at least the first millimeter wave transceiver at the first one of the plurality of remote locations and a plurality of second millimeter wave transceivers at a plurality of the plurality of remote locations.

7. The repeater of claim 1, wherein the transceiver circuitry provides automatic transmit power control to increase transmit power responsive to fade conditions and reduce transmit power responsive to removal of fade conditions.

8. A repeater for transmitting millimeter wave signals, comprising:
   a transceiver for communicating with a plurality of remote locations over millimeter wave communications links, wherein the of transceiver further comprises:
      a patch antenna array including a plurality of patch antennas, the plurality of patch antennas including a transmitter array portion for transmitting signals and a receiver array portion for receiving signals that is vertically separated from the transmitter array portion by a predetermined distance, wherein the predetermined distance vertically separating the transmitter array portion from the receiver array portion limits interference between the transmitted signals and the received signals;
transceiver circuitry for transmitting the millimeter wave signals with the plurality of remote locations; and
wherein the transceiver relays the millimeter wave signals between at least a first millimeter wave transceiver at a first one of the plurality of remote locations and a second millimeter wave transceiver at a second one of the plurality of remote locations.

9. The repeater of claim 8, wherein the transceiver circuitry transmits to the first one of the plurality of remote locations using full duplex communications and transmits to the second one of the plurality of remote locations using half duplex communications.

10. The repeater of claim 8, wherein the transceiver circuitry further comprises orbital angular momentum processing (OAM) processing circuitry for applying a selected orbital angular momentum to the transmitted signals being transmitted by the transceiver circuitry, wherein the selected orbital angular momentum prevents interference between the transmitted signals and the received signals.

11. The repeater of claim 8, wherein the transceiver circuitry further uses artificial intelligence cancellation techniques to limit interference between the transmitted signals and the received signals.

12. The repeater of claim 8, wherein the transceiver circuitry further uses full duplex channel estimation for controlling self-interference between the plurality of patch antennas.

13. The repeater of claim 8, wherein the transceiver relays the millimeter wave signals between at least the first millimeter wave transceiver at the first one of the plurality of remote locations and a plurality of second millimeter wave transceivers at a plurality of the plurality of remote locations.

14. The repeater of claim 8, wherein the transceiver circuitry provides adaptive coding and modulation to match signal and protocol parameters to conditions on the millimeter wave communication links.

15. A repeater for transmitting millimeter wave signals, comprising:
a transceiver for communicating with a plurality of remote locations over millimeter wave communications links, wherein the of transceiver further comprises:
a patch antenna array including a plurality of patch antennas, the plurality of patch antennas including a transmitter array portion in a first orientation for transmitting signals and a receiver array portion in a second orientation for receiving signals, the receiver array portion vertically separated from the transmitter array portion by a predetermined distance, wherein the first and second orientations and the predetermined distance vertically separating the transmitter array portion from the receiver array portion limit interference between the transmitted signals and the received signals;
transceiver circuitry for transmitting the millimeter wave signals with the plurality of remote locations; and
wherein the transceiver relays the millimeter wave signals between at least a first millimeter wave transceiver at first one of the plurality of remote locations and a second millimeter wave transceiver at a second one of the plurality of remote locations.

16. The repeater of claim 15, wherein the transceiver circuitry further comprises orbital angular momentum processing (OAM) processing circuitry for applying a selected orbital angular momentum to the transmitted signals being transmitted by the transceiver circuitry, wherein the selected orbital angular momentum prevents interference between the transmitted signals and the received signals.

17. The repeater of claim 15, wherein the transceiver circuitry further uses artificial intelligence cancellation techniques to limit interference between the transmitted signals and the received signals.

18. The repeater of claim 15, wherein the transceiver circuitry further uses full duplex channel estimation for controlling self-interference between the plurality of patch antennas.

19. The repeater of claim 15, wherein the transceiver relays the millimeter wave signals between at least the first millimeter wave transceiver at the first one of the plurality of remote locations and a plurality of second millimeter wave transceivers at a plurality of the plurality of remote locations.

20. A method for relaying millimeter wave signals, comprising:
locating a transmitter array portion of a patch antenna array of a transceiver with respect to a receiver array portion of the patch antenna array of the transceiver by at least one of:
locating the transmitter array portion in a first orientation and the receiver array portion in a second orientation to limit interference between transmitted signals and received signals;
locating the transmitter array portion to be vertically separated from the transmitter array portion by a predetermined distance, the predetermined distance vertically separating the transmitter array portion from the receiver array portion limiting interference between the transmitted signals and the received signals;
communicating with a first and second locations over millimeter wave communications links through the transceiver, wherein the step of communicating further comprises;
transmitting signals from the transmitter array portion of the patch antenna array including a plurality of patch antennas within the transceiver;
receiving signals on the receiver array portion of the patch antenna array including the plurality of patch antennas within the transceiver; and
relaying the millimeter wave signals between at least a first millimeter wave transceiver at first one of a plurality of remote locations and a second millimeter wave transceiver at a second one of the plurality of remote locations.

* * * * *